United States Patent [19]

Edwards et al.

[11] Patent Number: 4,907,229
[45] Date of Patent: Mar. 6, 1990

[54] SELECTIVE MULTIMODE/MULTICONFIGURABLE DATA ACQUISITION AND REDUCTION PROCESSOR SYSTEM

[75] Inventors: John C. Edwards, Dahlgren; James M. Deatherage, King George, both of Va.; James D. Peterman, Apex, N.C.

[73] Assignee: The United States of America as represented by the Secretary of the Navy, Washington, D.C.

[21] Appl. No.: 211,522

[22] Filed: Jun. 23, 1988

[51] Int. Cl.[4] .................... G01R 31/28; G06F 11/00
[52] U.S. Cl. ........................................ 371/16; 364/200
[58] Field of Search ...................... 371/15, 20, 16; 364/200, 900; 324/73 R, 73 AT

[56] References Cited

U.S. PATENT DOCUMENTS

| 4,425,643 | 1/1984 | Chapman et al. | 371/20 |
| 4,434,488 | 2/1984 | Palmquist et al. | 371/15 |
| 4,611,281 | 9/1986 | Suko et al. | 364/200 |
| 4,654,848 | 3/1987 | Noguchi | 371/20 |
| 4,697,138 | 9/1987 | Morishita et al. | 324/73 R |

Primary Examiner—Charles E. Atkinson
Attorney, Agent, or Firm—Elmer E. Goshorn; John D. Lewis

[57] ABSTRACT

An improved high frequency selective multimode/multiconfigurable data acquisition and reduction processor (DARP) system for analyzing more than one high frequency multibit sample data word stream (SDWSM) input from a digital data source arrangement being evaluated. As the result of this analysis, one or more sample data words of any SDWSM are accepted, time-tagged and stored for further analysis in evaluating the arrangement. The DARP system is generally made up of a host computer (HC), a plurality of trigger elements (TEs) and an asynchronous time-tag generator. Each TE is generally comprised of a master control board, a plurality of three trigger boards and a TE memory. The DARP system is advantageously provided with a plurality of five primary modes for each TE as well as various secondary modes therefor. Prior to operating any system TE, the operator of the HC normally sets one or more TEs in a setup mode for preselecting various parameters and secondary modes prior to utilizing one or more TEs in one or more primary modes such as for analyzing a SDWSM input. With the TEs being selectable for at least one primary and different secondary modes, one or more TEs may be configured for independent operation, two TEs for master and slave configurations; or three or more TEs for master, slave and independent where any one TE may only be directly linked to the HC.

91 Claims, 30 Drawing Sheets

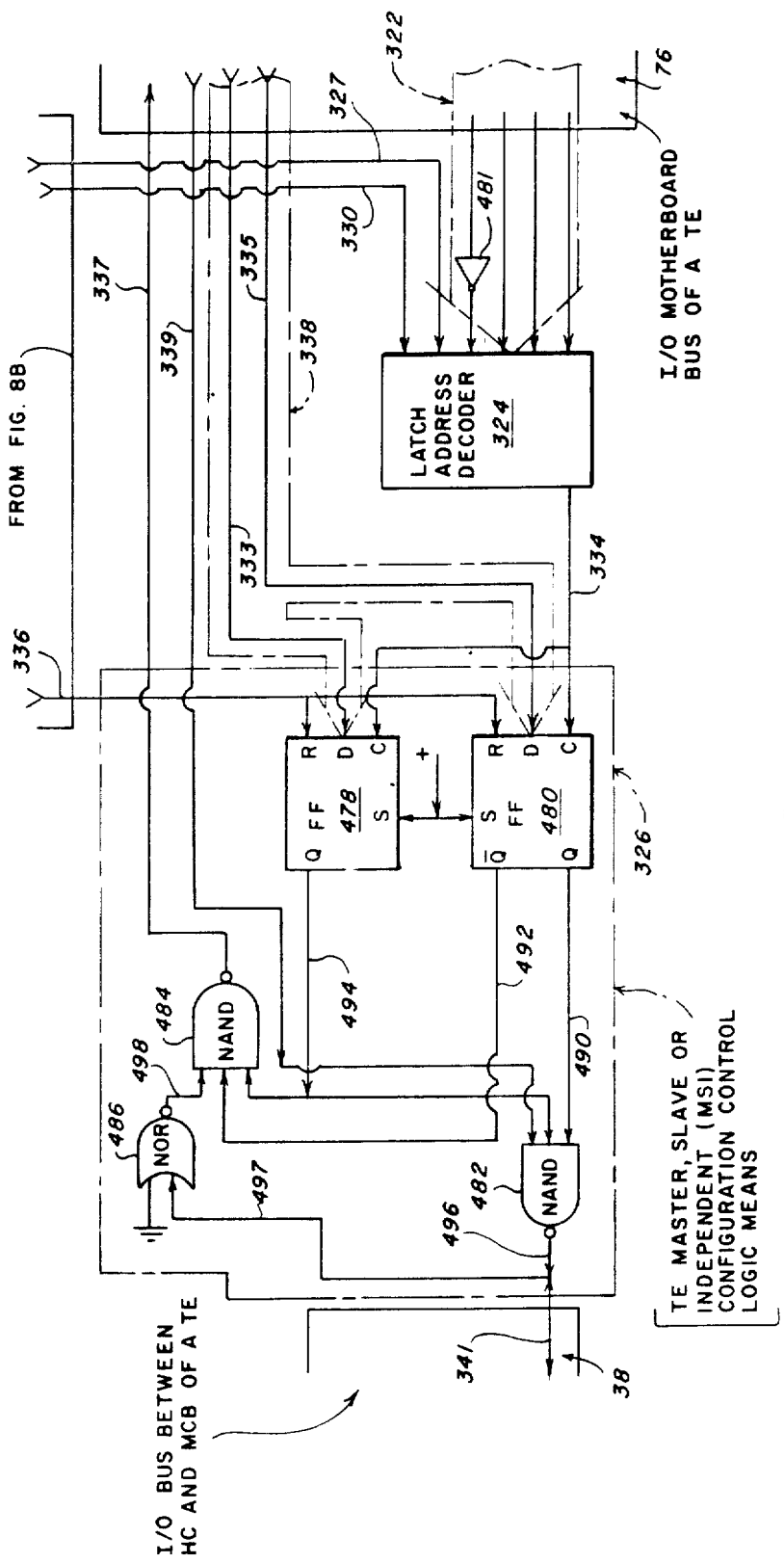

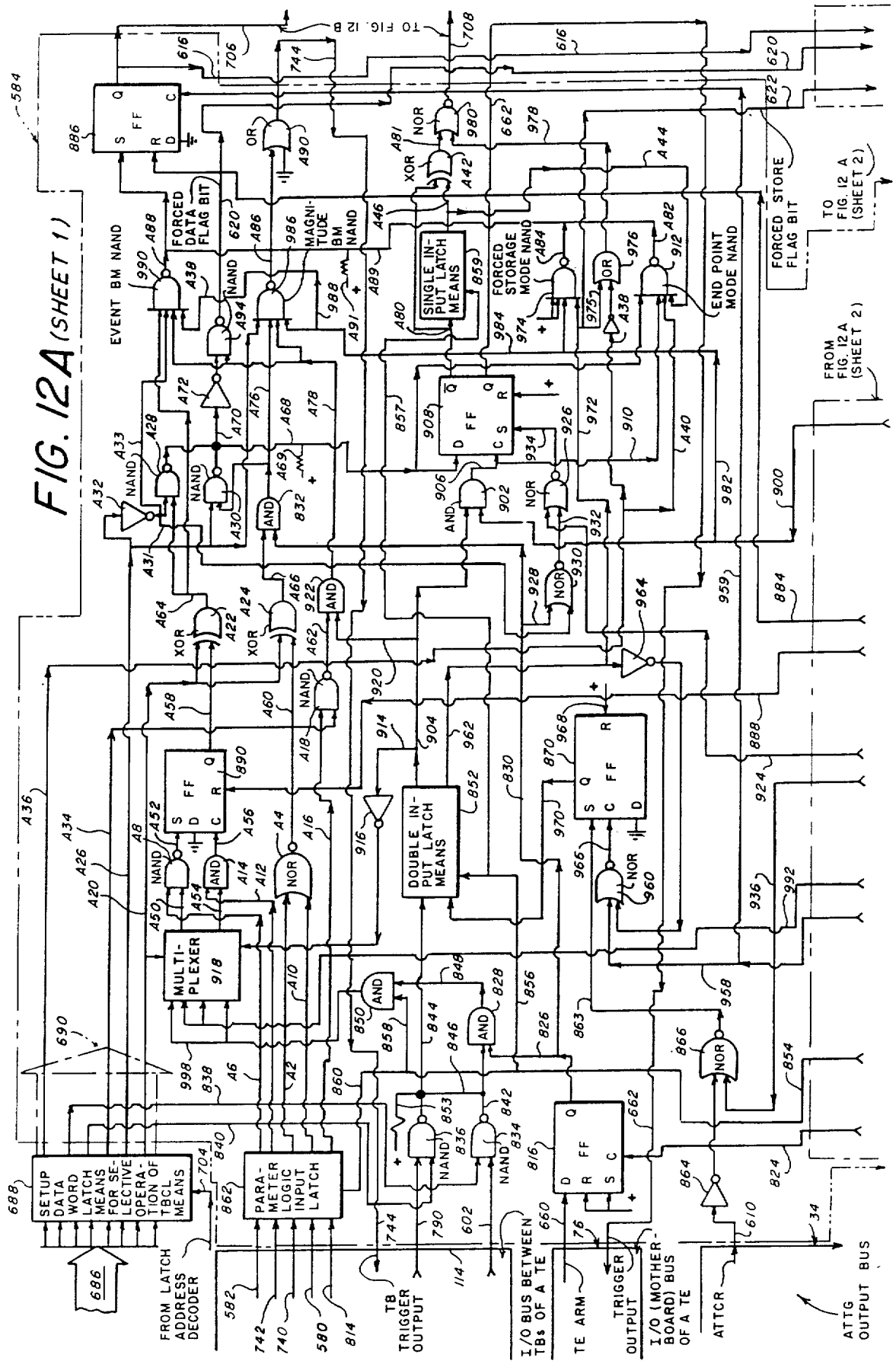

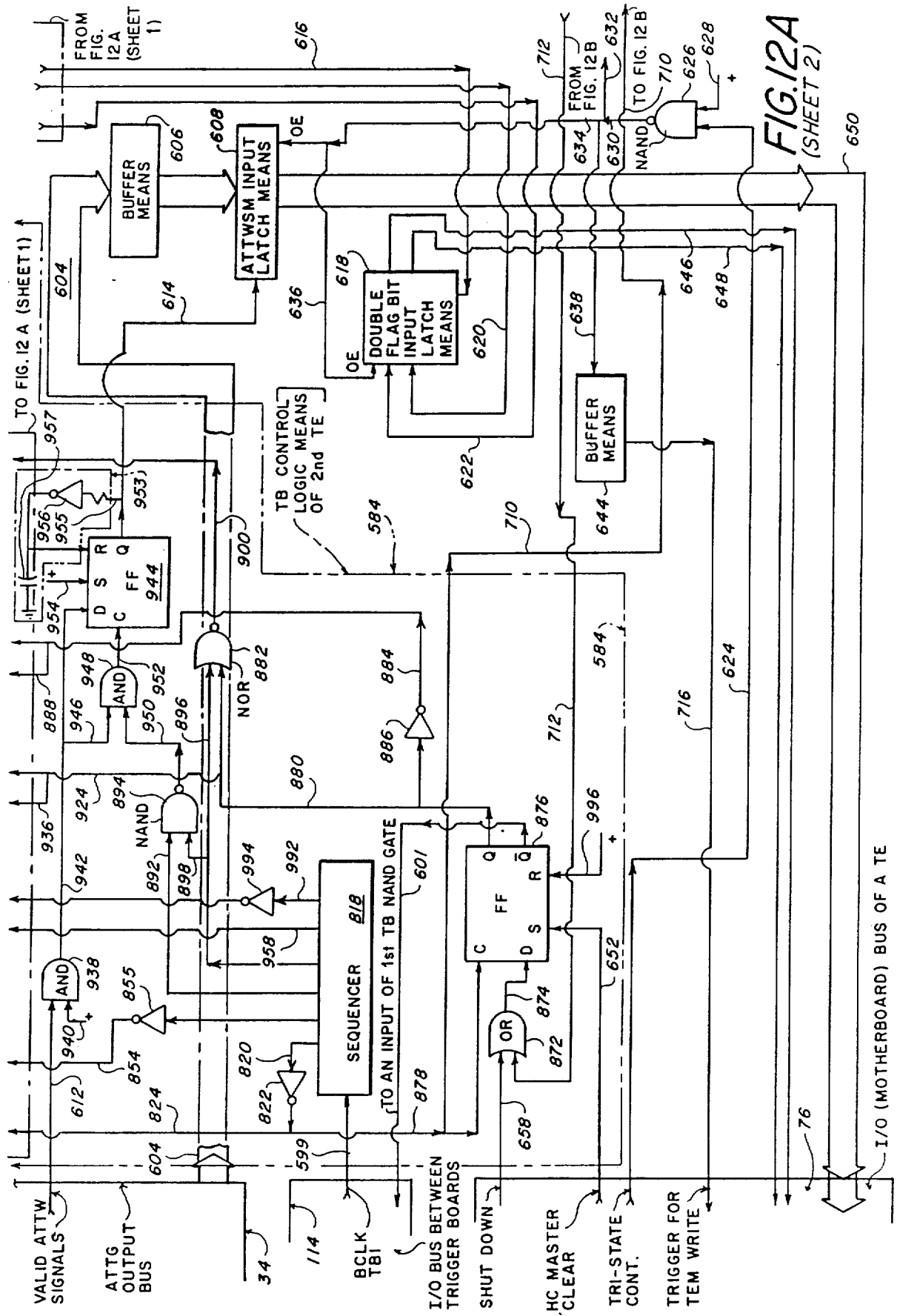

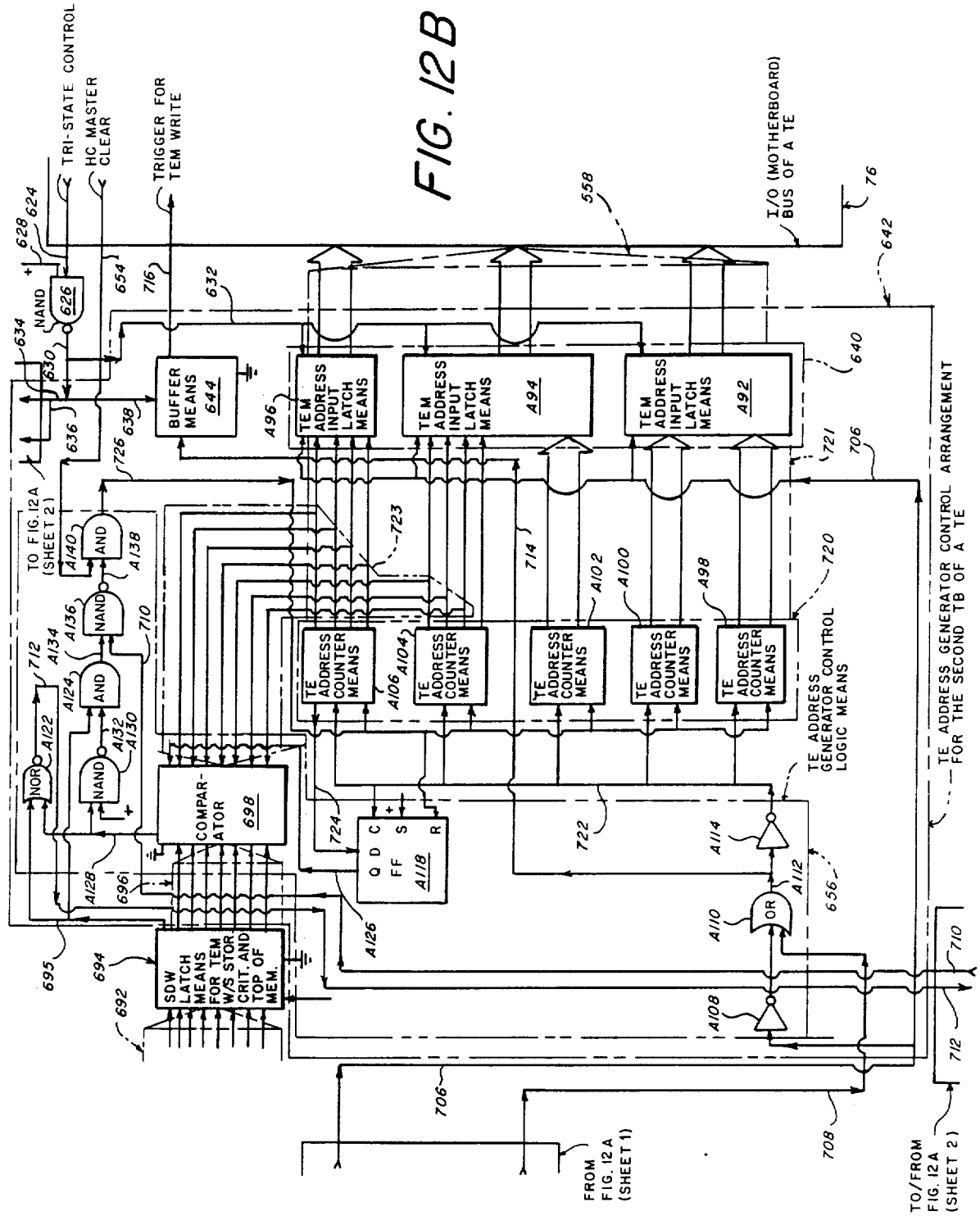

DARP MULTIMODE SPECIFICATION TABLE FOR A TRIGGER ELEMENT (TE)

| SELECTED MODE FOR A TE | OPERATING CHARACTERISTIC OF DARP SYSTEM IN RELATION TO THE SELECTED TE MODE BY THE HC FOR THE MCB OF A TE |
|---|---|
| 0 | A QUIESCENT (AT REST) TE (INACTIVE OR STANDBY) |
| 1 | HC READS THE STORED (TIME TAGGED) AND INTIALLY ANALYZED (ACCEPTED) SDWSM OF A TE MEMORY BY WAY OF A TEM ADDRESS FROM HC |
| 2 | A TE ENABLED FOR TRANSMITTING OF ONE OR MORE ACCEPTED AND TIME-TAGGED SDWs OF A SDWSM INPUT TO ITS MEMORY AND FIFO MEANS AND WITH ITS MCB ADDRESS OUTPUT TO HC DISABLED |
| 3 | SAME AS TE MODE 2 BUT WITH MCB ADDRESS OUTPUT TO HC ENABLED |
| 4 | HC WRITES WITH ITS STORED AND INTIALLY ANALYZED (ACCEPTED AND TIME-TAGGED) SDWSM TO BOTH A TE MEMORY AND FIFO MEANS |
| 5 | SAME AS TE MODE 0 |
| 6 | HC READS THE STORED AND INTIALLY ANALYZED (ACCEPTED/TIME-TAGGED) SDWSM OF THE FIFO MEANS OF A TE (REAL TIME ACQUISITION BY THE HC) WHILE THE TEM THEREOF PROVIDES SECONDARY STORAGE |
| 7 | HC WRITES ITS SETUP DATA/ADDRESS TO VARIOUS BUFFER/LATCH DECODER MEANS OF A TE |

FIG.14

DARP MCB PROM DATA BITS/MULTIMODE CORRELATION TABLE FOR A TE

| PROM OUTPUT BITS OF THE MCB OF A TE | TE FUNCTIONS AS IDENTIFIED BELOW AND AS EFFECTED BY ITS MCB PROM BIT OUTPUT PATTERN WHICH IS RELEVANT TO THE OPERATIVE MODE SELECTED BY THE HC USER | MCB OF A TE AND ITS HC PRESELECTED MODES INCLUDING THE BIT PATTERN FOR EACH MODE | | | | | | | |
|---|---|---|---|---|---|---|---|---|---|
| | | TE QUIES-CENT MODE 0 | HC/TE PRI-MARY MODE 1 | TE PRI-MARY MODE 2 | TE PRI-MARY MODE 3 | HC/TE PRI-MARY MODE 4 | TE QUIES-CENT MODE 5 | HC/TE PRI-MARY MODE 6 | HC/TE SETUP MODE 7 |
| 7 | MCB FIFO OUTPUT ENABLE | 1 | 1 | 1 | 1 | 1 | 1 | 0 | 1 |
| 6 | TE MEMORY READ OUT CONTROL | 0 | 0 | 1 | 1 | 1 | 0 | 1 | 1 |
| 5 | MCB TRI-STATE/SHUTDOWN CONTROL | 0 | 0 | 1 | 1 | 0 | 0 | 1 | 0 |
| 4 | MCB DATA DIRECTION CONTROL | 1 | 1 | 1 | 1 | 0 | 1 | 0 | 0 |
| 3 | MCB DATA TRI-STATE CONTROL | 0 | 0 | 1 | 1 | 1 | 0 | 1 | 0 |
| 2 | MCB ADDRESS DIRECTION CONTROL | 0 | 1 | 0 | 0 | 0 | 0 | 0 | 1 |
| 1 | MCB ADDRESS TRI-STATE CONTROL | 1 | 0 | 1 | 0 | 0 | 1 | 0 | 0 |
| 0 | MCB SETUP DATA ENABLE | 0 | 0 | 0 | 0 | 0 | 0 | 0 | 1 |

FIG.15

| HC REPRESENTATIVE SOFTWARE DISPLAY OF PRESELECTABLE SETUP DATA WORD PARAMETER LOGIC FUNCTIONS FOR A TE INCLUDING REPRESENTATIVE MULTIBIT LOGIC PATTERNS THEREFOR (UP TO 32 BITS) | Bit pattern (bits 10–0, 10–0, 10–0) |
|---|---|
| 1) M, S or I Configuration Value of a TEMSICC Logic Means | ...10 |
| 2) Lower Boundary (LB) Compare/Mask Value | 0 ← ... → 01000 |
| 3) Upper Boundary (UB) Compare/Mask Value | 0 ← ... → 010 ← ... → 0 |
| 4) New/Old Mask Value | X ← ... → X1111X ← ... → X |
| 5) Delay Timer Value | 0 ← ... → 01 ← ... → 1 |
| 6) Qualifier Compare/Mask Value | X ← ... → X1XXX |
| 7) TEM W/S Configuration Value (Bit 7) and Top of Memory Selection Value (Bits 0–6) for TEAGC Arrangem't Means | 10001111 |
| 8) Setup Data Word Latch Means for TEM Storage Criteria Operation Value of TBCL Means (as further Specified Below) | 1XX01010 |

SETUP DATA WORD BIT DESCRIPTIONS FOR (8) ABOVE

| BIT | |
|---|---|
| 0 | Inside or Outside Preselected Lower/Upper Boundary Limits (I or O) |
| 1 | Magnitude or Event Secondary Mode (M or E) |
| 2 | New/Old Parameter Enabled (Y or N) |
| 3 | Qualifier Parameter Enabled (Y or N) |
| 4 | Delay Timer Parameter Enabled (Y or N) |
| 7 | End Point Secondary Mode Enabled (Y or N) |

FIG. 16

MAGNITUDE BOUNDARY MODE (BM) (INSIDE OF THE BOUNDARIES AND NO END POINT MODE (EPM))*

LOWER BOUNDARY COMPARISON WORD VALUE (LBCWV)=10
UPPER BOUNDARY COMPARISON WORD VALUE (UBCWV)=20

| SDWSM INPUT (NO. OF INCREMENTS RELATIVE TO SDWs) | SDW GIVEN VALUE | HC MASTER SHUTDOWN (Y or N) | FORCED STORE FLAG BIT | FORCED DATA FLAG BIT | TE MEMORY STORAGE WHEN VALID TTW, ACCEPTED SDW AND ADDRESS | | |
|---|---|---|---|---|---|---|---|
| | | | | | MAJOR TTW (Y or N) | ACCEPTED SDW (Y or N) | ADDRESS (Y or N) |
| 1 | 5 | N(LOW) | 1 | 1 | Y(0) | Y(5) | Y(0) |
| 2 | 25 | | 0 | 1 | N(1) | N(25) | N(1) |
| 3 | 10 | | 0 | 0 | Y(2) | Y(10) | Y(1) |
| 4 | 11 | | 1(TTCR) | 0 | Y(0) | Y(11) | Y(2) |
| 5 | 5 | | 0 | 1 | N(1) | N(5) | N(3) |
| 6 | 10 | | 0 | 0 | Y(2) | Y(10) | Y(3) |
| 7 | 12 | | 1(TTCR) | 0 | Y(0) | Y(12) | Y(4) |
| 105 | 5 | ↓ | 0 | 1 | N(?) | N(5) | N(?) |
| 500 | 7 | Y(HIGH) | 1 | 1 | N(?) | N(7) | N(?) |

FIG. 17A

MAGNITUDE BM (OUTSIDE OF THE BOUNDARIES AND NO EPM)*

| SDWSM INPUT (NO. OF INCREMENTS RELATIVE TO SDWs) | SDW GIVEN VALUE | HC MASTER SHUTDOWN (Y or N) | FORCED STORE FLAG BIT | FORCED DATA FLAG BIT | TE MEMORY STORAGE WHEN VALID TTW, ACCEPTED SDW AND ADDRESS | | |
|---|---|---|---|---|---|---|---|
| | | | | | MAJOR TTW (Y or N) | ACCEPTED SDW (Y or N) | ADDRESS (Y or N) |
| 1 | 5 | N(LOW) | 1 | 0 | Y(0) | Y(5) | Y(0) |
| 2 | 15 | | 0 | 1 | N(1) | N(15) | N(1) |
| 3 | 25 | | 0 | 0 | Y(2) | Y(25) | Y(1) |
| 4 | 10 | | 1(TTCR) | 0 | Y(0) | Y(10) | Y(2) |
| 115 | 12 | ↓ | 0 | 1 | N(?) | N(12) | N(?) |
| 1,000 | 13 | Y(HIGH) | 1 | 1 | N(?) | N(13) | N(?) |

FIG. 17B

*FOR ALL FIGS. 17A → 17D ASSUME LBCWV=10; UBCWV=20. FURTHER NEW≠OLD, QUALIFIER MATCH AND DELAY COUNTER ARMED PARAMETERS, ALL ASSUMED LOW. ALSO VALIDATION CONTROL SIGNAL AND TE ARM SIGNAL ARE BOTH HIGH. BEFORE STARTING ANY MODE OF A TE; MASTER CLEAR IS LOW AND MASTER SHUTDOWN IS HIGH.

EVENT BM (INSIDE THE BOUNDARIES AND NO EPM)*

| SDWSM INPUT (NO. OF INCREMENTS RELATIVE TO SDWs) | SDW GIVEN VALUE | HC MASTER SHUT-DOWN (Y or N) | FORCED STORE FLAG BIT | FORCED DATA FLAG BIT | TE MEMORY STORAGE WHEN VALID TTW, ACCEPTED SDW AND ADDRESS | | |
|---|---|---|---|---|---|---|---|
| | | | | | MAJOR TTW (Y or N) | ACCEPTED SDW (Y or N) | ADDRESS (Y or N) |
| 1 | 5 | N (LOW) | 1 | 1 | Y(0) | Y(5) | Y(0) |
| 2 | 10 | | 0 | 0 | Y(1) | Y(10) | Y(1) |
| 3 | 8 | | 0 | 0 | Y(2) | Y(8) | Y(2) |
| 4 | 9 | | 1(TTCR) | 0 | Y(0) | Y(9) | Y(3) |
| 5 | 20 | | 0 | 0 | Y(1) | Y(20) | Y(4) |
| 6 | 15 | ↓ | 0 | 1 | N(2) | N(15) | N(5) |
| 1200 | 2 | Y(HIGH) | 1 | 1 | N(?) | N(2) | N(?) |

*FIG. 17C*

EVENT BM (OUTSIDE THE BOUNDARIES AND NO EPM)*

| SDWSM INPUT (NO. OF INCREMENTS RELATIVE TO SDWs) | SDW GIVEN VALUE | HC MASTER SHUT-DOWN (Y or N) | FORCED STORE FLAG BIT | FORCED DATA FLAG BIT | TE MEMORY STORAGE WHEN VALID TTW, ACCEPTED SDW AND ADDRESS | | |
|---|---|---|---|---|---|---|---|
| | | | | | MAJOR TTW (Y or N) | ACCEPTED SDW (Y or N) | ADDRESS (Y or N) |
| 1 | 5 | N (LOW) | 1 | 0 | Y(0) | Y(5) | Y(0) |
| 2 | 20 | | 0 | 0 | Y(1) | Y(20) | Y(1) |
| 3 | 15 | | 0 | 0 | Y(2) | Y(15) | Y(2) |
| 4 | 10 | | 1(TTCR) | 0 | Y(0) | Y(10) | Y(3) |
| 5 | 16 | | 0 | 1 | N(1) | N(16) | N(4) |
| 6 | 7 | | 0 | 1 | N(2) | N(7) | N(4) |
| 7 | 20 | | 1(TTCR) | 1 | Y(0) | Y(20) | Y(4) |
| 9 | 5 | ↓ | 0 | 0 | Y(1) | Y(5) | Y(5) |
| 10 | 14 | Y(HIGH) | 1 | 0 | N(?) | N(14) | N(?) |

* SEE ASSUMPTIONS AS SPECIFIED FIGS. 17A AND 17B

*FIG. 17D*

MAGNITUDE BM (INSIDE BOUNDARY LIMITS & END POINT MODE (EPM))*

| SDWSM INPUT NO. OF INCRE-MENTS RELATIVE TO SDWs) | SDW GIVEN VALUE | HC MASTER SHUTDOWN (Y or N) | FORCED STORE FLAG BIT | FORCED DATA FLAG BIT | OUTPUT (A60) OF NOR GATE (A4) | OPEN COLLECTOR OF NAND GATES (A28) AND (A30) | Q̄ OF FLIP FLOP (908) | OUTPUT (A46) OF LATCH MEANS (859) | OUTPUT (708) OF NOR GATE (980) | TE MEMORY STORAGE WHEN VALID TTW, ACCEPTED SDW AND ADDRESS | | |
|---|---|---|---|---|---|---|---|---|---|---|---|---|
| | | | | | | | | | | MAJOR TTW (Y or N) | ACCEPTED SDW (Y or N) | ADDRESS (Y or N) |
| 1 | 0 | N(LOW) | 1 | 1 | LOW | HIGH | LOW | LOW | LOW | Y(0) | Y(0) | Y(0) |
| 2 | 11 | | 0 | 0 | HIGH | LOW | HIGH | LOW | LOW | Y(1) | Y(11) | Y(1) |
| 3 | 10 | | 0 | 0 | HIGH | LOW | HIGH | HIGH | HIGH | Y(2) | Y(10) | N(2) |
| 4 | 20 | | 0 | 0 | HIGH | LOW | HIGH | HIGH | HIGH | Y(3) | Y(20) | N(2) |
| 5 | 15 | | 1(TTCR) | 0 | HIGH | LOW | HIGH | HIGH | LOW | Y(0) | Y(15) | Y(2) |
| 6 | 5 | | 0 | 0 | LOW | HIGH | LOW | LOW | LOW | Y(1) | Y(5) | Y(3) |
| 7 | 12 | | 0 | 0 | HIGH | LOW | HIGH | LOW | LOW | Y(2) | Y(12) | Y(4) |
| 8 | 25 | | 0 | 0 | LOW | HIGH | LOW | HIGH | LOW | Y(3) | Y(25) | Y(5) |
| 9 | 7 | ↓ | 1(TTCR) | 1 | LOW | HIGH | LOW | LOW | LOW | Y(0) | Y(7) | Y(6) |

*ASSUMPTIONS FOR FIGS. 17A → 17D ALSO APPLY TO FIGS. 18A → 18D

FIG. 18A

MAGNITUDE BM (OUTSIDE BOUNDARY LIMITS & EPM)*

| SDWSM INPUT (NO. OF INCREMENTS RELATIVE TO SDWs) | SDW GIVEN VALUE | HC MASTER SHUTDOWN (Y or N) | FORCED STORE FLAG BIT | FORCED DATA FLAG BIT | OUTPUT (A60) OF NOR GATE (A4) | OPEN COLLECTOR OF NAND GATES (A28) AND (A30) | Q̄ OF FLIP FLOP (908) | OUTPUT (A46) OF LATCH MEANS (859) | OUTPUT (708) OF NOR GATE (980) | MAJOR TTW (Y or N) | ACCEPTED SDW (Y or N) | ADDRESS (Y or N) |
|---|---|---|---|---|---|---|---|---|---|---|---|---|
| 1 | 0 | N(LOW) | 1 | 0 | LOW | LOW | HIGH | LOW | LOW | Y(0) | Y(0) | Y(0) |
| 2 | 20 |  | 0 | 1 | HIGH | HIGH | LOW | HIGH | LOW | Y(1) | Y(20) | Y(1) |
| 3 | 10 |  | 0 | 1 | HIGH | HIGH | LOW | LOW | HIGH | N(2) | N(10) | N(2) |
| 4 | 15 |  | 1(TTCR) | 1 | HIGH | HIGH | LOW | LOW | LOW | Y(0) | Y(15) | Y(2) |
| 5 | 20 |  | 0 | 1 | HIGH | HIGH | LOW | LOW | HIGH | N(1) | N(20) | N(3) |
| 6 | 25 |  | 0 | 0 | LOW | LOW | HIGH | HIGH | LOW | Y(2) | Y(25) | Y(3) |
| 7 | 14 |  | 1(TTCR) | 1 | HIGH | HIGH | LOW | HIGH | LOW | Y(0) | Y(14) | Y(4) |
| 8 | 18 |  | 0 | 1 | HIGH | HIGH | LOW | LOW | HIGH | N(1) | N(18) | N(5) |
| 9 | 3 |  | 0 | 0 | LOW | LOW | HIGH | LOW | LOW | Y(2) | Y(3) | Y(5) |
| 10 | 22 |  | 1(TTCR) | 1 | LOW | LOW | HIGH | HIGH | LOW | Y(0) | Y(22) | Y(6) |
| 11 | 15 |  | 0 | 1 | HIGH | HIGH | LOW | HIGH | LOW | Y(1) | Y(15) | Y(7) |

* SEE ASSUMPTIONS AS SPECIFIED FIG. 18A

FIG. 18B

EVENT BM (INSIDE THE BOUNDARIES & EPM)*

←――――――――――― FIG.12A (SHEET 1) ―――――――――――→

| SDWSM INPUT NO. OF INCRE- MENTS RELATIVE TO SDWs | SDW GIVEN VALUE | HC MASTER SHUTDOWN (Y or N) | FORCED STORE FLAG BIT | FORCED DATA FLAG BIT | Q OF FLIP FLOP (890) AT SECOND SEQUENCE | Q OF FLIP FLOP (890) AT SIXTH SEQUENCE | OPEN COLLECTOR OF NAND GATES (A28) AND (A30) | Q̄ OF FLIP FLOP (908) | OUTPUT (A46) OF LATCH MEANS (858) | OUTPUT (708) OF NOR GATE (980) | TE MEMORY STORAGE WHEN VALID TTW, ACCEPTED SDW AND ADDRESS |||
|---|---|---|---|---|---|---|---|---|---|---|---|---|---|
| | | | | | | | | | | | MAJOR TTW (Y or N) | ACCEPTED SDW (Y or N) | ADDRESS (Y or N) |
| 1 | 5 | N(LOW) | 1 | 1 | LOW | LOW | HIGH | LOW | LOW | LOW | Y(0) | Y(5) | Y(0) |
| 2 | 10 | | 0 | 0 | HIGH | HIGH | LOW | HIGH | LOW | LOW | Y(1) | Y(10) | Y(1) |
| 3 | 20 | | 0 | 0 | HIGH | LOW | LOW | HIGH | HIGH | HIGH | Y(2) | Y(20) | N(2) |
| 4 | 11 | | 1(TTCR) | 1 | LOW | LOW | HIGH | LOW | HIGH | LOW | Y(0) | Y(11) | Y(3) |
| 5 | 25 | | 0 | 1 | LOW | LOW | HIGH | LOW | LOW | HIGH | N(1) | N(25) | N(3) |
| 6 | 8 | | 0 | 0 | HIGH | LOW | HIGH | HIGH | LOW | HIGH | N(2) | N(8) | N(3) |
| 7 | 10 | | 1(TTCR) | 0 | HIGH | HIGH | LOW | HIGH | LOW | LOW | Y(0) | Y(10) | Y(3) |
| 8 | 15 | | 0 | 0 | HIGH | HIGH | LOW | HIGH | HIGH | HIGH | Y(1) | Y(15) | N(4) |
| 9 | 25 | ↓ | 0 | 0 | HIGH | HIGH | LOW | HIGH | HIGH | HIGH | Y(2) | Y(25) | N(4) |

*SEE ASSUMPTIONS AS SPECIFIED FIG. 18A

FIG. 18C

EVENT BM (OUTSIDE THE BOUNDARIES & EPM)*

| SDWSM INPUT NO. OF INCREMENTS RELATIVE TO SDWs | SDW GIVEN VALUE | HC MASTER SHUTDOWN (Y or N) | FORCED STORE FLAG BIT | FORCED DATA FLAG BIT | Q OF FLIP FLOP (890) AT SECOND SEQUENCE | Q OF FLIP FLOP (890) AT SIXTH SEQUENCE | OPEN COLLECTOR OF NAND GATES (A28) AND (A30) | Q̄ OF FLIP FLOP (908) | OUTPUT (A46) OF LATCH MEANS (858) | OUTPUT (708) OF NOR GATE (980) | TE MEMORY STORAGE WHEN VALID TTW, ACCEPTED SDW AND ADDRESS ||| |
|---|---|---|---|---|---|---|---|---|---|---|---|---|---|
| | | | | | | | | | | | MAJOR TTW (Y or N) | ACCEPTED SDW (Y or N) | ADDRESS (Y or N) |
| 1 | 0 | N(LOW) | 1 | 0 | LOW | LOW | LOW | HIGH | LOW | LOW | Y(0) | Y(0) | Y(0) |
| 2 | 25 | | 0 | 0 | LOW | LOW | LOW | HIGH | HIGH | HIGH | Y(1) | Y(25) | N(1) |
| 3 | 20 | | 0 | 0 | LOW | LOW | LOW | HIGH | HIGH | HIGH | Y(2) | Y(20) | N(1) |
| 4 | 10 | | 1(TTCR) | 0 | LOW | HIGH | LOW | HIGH | HIGH | LOW | Y(0) | Y(10) | Y(1) |
| 5 | 11 | | 0 | 1 | HIGH | HIGH | HIGH | LOW | HIGH | HIGH | Y(1) | Y(11) | Y(2) |
| 6 | 16 | | 0 | 1 | HIGH | HIGH | HIGH | LOW | LOW | LOW | N(2) | N(16) | N(3) |
| 7 | 10 | | 1(TTCR) | 1 | HIGH | HIGH | HIGH | LOW | LOW | HIGH | Y(0) | Y(10) | Y(3) |
| 8 | 20 | | 0 | 0 | LOW | LOW | LOW | HIGH | LOW | LOW | Y(1) | Y(20) | Y(4) |
| 9 | 8 | | 0 | 0 | LOW | LOW | HIGH | HIGH | HIGH | HIGH | Y(2) | Y(8) | N(5) |
| 10 | 10 | | 1(TTCR) | 0 | LOW | HIGH | LOW | HIGH | HIGH | LOW | Y(0) | Y(10) | Y(5) |
| 11 | 6 | | 0 | 1 | HIGH | HIGH | HIGH | LOW | HIGH | LOW | Y(1) | Y(6) | Y(6) |

*SEE ASSUMPTIONS AS SPECIFIED FIG. 18A

FIG. 18D

SELECTIVE MULTIMODE/MULTICONFIGURABLE DATA ACQUISITION AND REDUCTION PROCESSOR SYSTEM

This invention relates to a selective multimode/multiconfigurable dta acquisition and reduction processor (DARP) system for selectively analyzing and storing sample data words of multibit sample data word stream inputs from a computer being evaluated; and, more particularly, it concerns an improved high frequency selective multimode/multiconfigurable DARP system for selectively and simultaneously analyzing and storing one or more high frequency multibit sample data word stream inputs from a computer being evaluated while at the same time the improved system time-tags each accepted stored data word of any analyzed sample data word stream input.

BACKGROUND OF THE INVENTION

Various types of logic analyzers or evaluation-type devices have been designed in the past. For example, U.S. Pat. No. 4,334,305 to H. Thinschmidt et al. concerns an error evaluation test arrangement for a multi-micro-computer system. The arrangement is generally made up of a bus for interconnection to each system to be evaluated. A series of three logic evaluation/control devices are connected to the bus for enabling evaluation of the full bus width output of each computer system. One or more optic display devices are connected to each logic device. U.S. Pat. No. 4,425,643 to David D. Chapman et al. concerns a multi-speed logic analyzer. The analyzer is generally made up of two data input memory sections where each section is capable of receiving data at different clock rates. An I/O bus of the analyzer interconnects the input sections with the analyzer/control arrangement thereof. Each input section is provided with a data word trigger device that responds to one or more coded bits of an input for controlling the operation of the analyzer of the control/analyzer arrangement during operator use. U.S. Pat. No. 4,517,671 to J. D. Lewis discloses a visual display apparatus for analyzing the performance output of a computer. The apparatus is generally made up of a series of buffers for selectively interconnecting a computer to be analyzed. The apparatus is further provided with operator control logic, data input pattern recognizers, etc., so that the display will provide an analytic output desired. U.S. Pat. No. 4,636,941 to S. Suko concerns an analyzer for a microprocessor that needs to be evaluated. The analyzer is generally made up of a control microprocessor, a memory, a trigger comparison circuit and routine detection circuits for receiving bus output data from a microprocessor being evaluated and selectively coupled to the analyzer for evaluation. When the trigger comparison circuit detects a fault in the bus output data, the analyzer is stopped thereby rejecting the microprocessor. However, none of the aforediscussed references, whether taken alone or in any combination, remotely contemplated an improved multimode/multiconfigurable digital data evaluation system that preferably operates at a relatively high frequency and that can readily and quickly analyze a variety of multibit data word stream outputs of more than one type of digital data source means, e.g., main frame computer or smaller. Depending on the size of the digital data source means being evaluated by the improved system, more than one source means can be evaluated at the same time. At the same time the system in being of solid-state construction is of relatively small, lightweight modular construction so that it can readily be used in the field or laboratory. In other words, this highly versatile and improved DARP (digital dta evaluation) system of applicants, as will be described below, not only is highly versatile and multiconfigurable during use; but it is readily portable and thus can be easily transported to where the digital data source means or computer is that needs to be periodically evaluated so as to enable certification of its operational performance.

SUMMARY OF THE INVENTION

An object of the present invention is to provide an improved selectively operable multimode/multiconfigurable data acquisition and reduction processor (DARP) system for evaluating one or more multibit sample data word stream outputs of a computer by storing selected data samples from each output thereof.

Another object of the present invention is to provide an improved DARP system that is of relatively lightweight, modular construction so that the system is capable of being used at more than one location thereby enhancing its utility.

Still another object of the present invention is to provide an improved DARP system for evaluating a digital data source means, computer or the like where the system is made up of a plurality of trigger elements (TEs) and a host computer operatively associated therewith such that each TE is operable in any one of a plurality of selectable primary modes, including various secondary modes, all for the purpose of enabling the DARP system to evaluate, e.g., a computer in an efficient manner.

And still another object of the present invention is to provide an improved DARP system for evaluating a programmed computer where it not only simultaneously acquires one or more SDWSM outputs of a computer being evaluated but also time-tags each accepted sample data word (SDW) of any SDWSM input with a time-tag word (TTW) so as to correlate each accepted SDW with its associated TTW thereby enabling the system to simultaneously evaluate the outputs of the computer.

And further, another object of the present invention is to provide an improved DARP system for evaluating a programmed computer where each accepted/analyzed SDW of any acquired SDWSM is not only time-tagged with a multibit time-tag word (TTW) for association purposes to assist further analysis, but also each TTW is provided with at least two flag bits for indicating when special conditions occur in accepting an analyzed SDW such as time-tag counter generator rollover, master shutdown of the system and forced SDW (data) storage.

And further, another object of the present invention is to provide an improved DARP system for a computer being evaluated whereby any trigger element (TE) of the plurality of TEs provided for the system not only has a random access memory (RAM), but also first-in, first-out (FIFO) means for the purpose of enabling real time acquisition and analysis of accepted time-tagged SDWs when a TE is directly linked to the HC during a HC/TE primary mode thereof.

And still further, another object of the present invention is to provide an improved DARP system for evaluating a computer that even though the outputs of a computer are different that have to be evaluated, the system is provided with a plurality of TEs where each TE is selectively presettable not only in relation to predetermined conditions, but also secondary storage criteria modes so that a given system may effectively evaluate the computer output with which it is associated.

And yet still another object of the present invention is to provide an improved DARP system for evaluating a programmed computer where, depending on the requirements for evaluating the computer and to further illustrate versatility of the system, one or more TEs of the system can be set in a master configuration while one or more other TEs of the system can be set in a slave configuration arrangement, such that the slave TE(s) are subject to the master TEs as to the acceptability of any SDW of a SDWSM input.

And yet another object of the present invention is to provide an improved DARP system for evaluating a computer where the system is made up of a series of three or more TEs where in evaluating the different outputs of the computer one TE may be master configured, the second slave configured, and the third may be independent configured such that any independent configured TE is not affected by any master configured TEs while any slave configured TE is.

And still another object of the invention is to provide an improved DARP system where the system is provided with a series of TEs where the TEs may be configured a combination of master and slaves, and where the HC is provided with a selective operable control means that is interconnected to the master or slave configuration control logic of each TE such that the HC control means as the result of operator use of the HC control means may override the master TE control of the slave TE in preventing any slave from analyzing a SDWSM input for acceptability as to one or more SDWs thereof.

In summary, the present invention concerns an improved selective multimode and selective multiconfigurable high frequency DARP system that is readily adaptable for evaluating most computer or digital data source designs where certification of the performance output of any programmed computer or digital data source is needed in a timely and efficient manner. More particularly, the improved high frequency DARP system is generally made up of an operator and software-controlled host computer (HC) with a visual display, a series of trigger elements (TEs) and an asynchronous time-tag generator (ATTG) that is common to all TEs of the system. The HC and the ATTG are operatively associated with and separately interconnected to each one of the trigger elements (TEs) of the series thereof. Any computer or digital data source means to be evaluated by the system is selectively connected to one or more TEs of the series of TEs. To facilitate this connection, a plurality of bus driver units (BDUs) are normally interfaced between the computer being evaluated and the series of TEs so that the various outputs of the computer are appropriately rearranged prior to being connected to their associated TE of the series of TEs of the system. In order to assure the utility of the system, the ATTG is normally driven at a higher frequency than any sample data word stream (SDWSM) input from a computer being evaluated by the system. In one reduction to practice of the improved system an IBM personal computer designated PC-AT served as the HC and a series of eight TEs were separately interconnected by a common I/O bus to the HC. The ATTG was interconnected by one output bus to one group of four TEs, and by another output bus to another group of four TEs. A series of four BDUs were appropriately connected to both central processor units (CPUs) and to both input/output controllers (IOCs) of a Navy mainframe computer designated the AN/UYK-43. These four BDUs interfaced with and provided sample qualifier word stream (SQWSM) and SDWSM inputs (parallel format) of sixteen and thirty-two bits respectively to the series of eight TEs of the system as generally shown in FIG. 1.

Each TE of the system is generally made up of a master control board (MCB), a plurality of three trigger boards (TBs) and a TE memory (TEM). A first input-/output (I/O) parallel bus interconnects the HC to the MCB of each TE of the series of TEs. A second I/O or TB bus of each TE interconnects all TBs thereof. A third TE I/O (motherboard) bus of any TE is operatively associated with and interconnects the MCB, TEM and all three TBs thereof.

An HC is generally made up of a software and keyboard controlled I/O processing control (SKPC) system, a display; and a series of three bidirectional buffer latch means (BBLM), One BBLM is for TE memory (TEM) address from either the HC or a TE, another for an associated time-tag word stream (TTWSM) to/from TEM storage and the third for HC preselected setup data during a HC/TE setup mode for a TE or an initially analyzed/accepted SDWSM from a TE during certain HC/TE primary modes. The HC is also generally comprised of a combined control arrangement for TEs of the system, a TE status word buffer means, and a latch-control logic means. The latch-control logic means is connected to an output bus of the SKPC system and is provided with output means for selectively controlling the combined control arrangement and each BBLM of the series of three thereof. An HC I/O bus extends between and is interconnected to the SKPC system, the combined control arrangement and each BBLM of the series of three thereof. As will become more apparent hereinafter and by reason of the operator use of the SKPC system of the HC during system operation together with the status word buffer means, the series of three BBLMs, the HC latch-control logic means and the HC I/O bus, each TE of the system TEs as the result of operation of the HC by the user, e.g., can be generally operated in any one of the following fashions: is mode controlled (primary, quiescent or setup) after mode selection by the HC; receives its setup data from the HC after being selected by the HC relating to selected secondary modes, selected boundary conditions, various parameters, etc.; provides TEM address to the HC for review; receives TEM address along with associated (flagged) TTWSM and accepted SDWSM from the SKPC system for storage in the TEM of the TE; provides associated TTWSM and accepted SDWSM from its data collection when the RAM means of its TEM is read by the HC; operates on its own for analyzing accepting (or rejecting) one or more SDWs of a SDWSM input from a computer being evaluated during a TE primary mode for data collection by the TE; and during a HC/TE primary mode provides real time acquisition of an associated TTWSM and accepted SDWSM from its first-in, first-out (FIFO) means. Thus, each TE of the system along with the HC are highly versatile arrangements for assisting in evaluating a digital data source.

The control word of the HC combined control arrangement not only includes master clear and master shutdown signals for all TEs of the system, but also a mode strobe signal as well as a setup data strobe or HC trigger output signal. The setup data strobe output signal is used during any HC/TE setup mode while the HC trigger output is used during a HC/TE primary mode for writing associated TTWSM and accepted SDWSM to both the TEM of a TE and the FIFO means thereof. The HC in being provided with the TE status word buffer means receives one or more status signals that stem from the FIFO means of the MCB of a TE during certain modes thereof. As will become more apparent hereinafter, these status signals serve as flag bits when a given TE is in a HC/TE primary mode for real time acquisition of accepted SDWSM from the FIFO means of the given TE.

The ATTG is generally made up of a multibit counter, an oscillator, a sequencer and first and second flip-flops. The counter is connected via first HC/MCB I/O bus to a HC master shutdown output of the HC combined control arrangement. An asynchronous time-tag word stream (ATTWSM) output of the counter is connected via an ATTG output bus to an ATTWSM input latch means of the second TB of each TE of a series of four TEs of the system. Another output of the counter at a predetermined counting level of the counter provides a high signal to the D input of a first flip-flop. The oscillator is connected to the sequencer such that its first delayed output drives the counter and also the C input of the first flip-flop. Consequently, the Q* output of the first flip-flop provides an asynchronous time-tag counter rollover (ATTCR) signal (low) to the second TB of a TE whenever a predetermined counting level signal is received by the D input of the first flip-flop. The second and third delayed outputs of the sequencer are connected via a NAND gate output to the R input of the second flip-flop so that the second flip-flop is reset during each oscillator time period. As the result of this reset, second flip-flop Q* output provides a valid asynchronous time-tag word (ATTW) signal (high) to the second TB of each TE of a series of four TEs via an ATTG output bus for each count of the counter upon cycling of the ATTG oscillator during system use.

The MCB of a TE is generally made up of TE select decoder, PROM, mode control word latch (MCWL) means and power-on reset and mode strobe (PR/MS) logic means, and a TE mode control logic (TEMCL) means. The combined control arrangement of the HC in response to operator use of the HC provides data strobe, mode strobe, master clear (MC) and HC master shutdown (HCMS) signals for carrying out various operations of a TE. As will become more apparent hereinafter, the output of the MCWL means sets the mode of the TEMCL means so as to maintain a TE in a desired mode in relation to a SDWSM input or a combined SDWSM input and sample qualifier word stream input all from an output of a computer or digital data source to be evaluated. By reason of the select decoder for each TE, the PROM and the MCWL means thereof when any TE is selected, the TE not only can be set up for a primary mode operation and master cleared but then after setup, a TE may be operated in a TE or HC/TE primary mode or quiescent mode once the HCMS is released. The DARP system after sufficiently analyzing a computer or the like, or for any other reason, may be shut down by either actuating the HCMS or turning it off. The MCB of a TE is also provided with a FIFO logic control arrangement, a MCB bidirectional buffer means (BBM), a MCB TE master, slave and independent configuration control (MSICC) logic arrangement and a MCB bidirectional address (BA)-means. By reason of the MCB BBM HC setup data or associated TTWSM and accepted SDWSM are controlled between the first I/O HC/MCB bus of a TE and the third I/O mother-board bus thereof. Similarly, a TEM address to/from the HC is controlled by the MCB BA means between the first and third buses. Two status or flag signal outputs are provided by the FIFO arrangement means of the FIFO control logic arrangement, are controlled by a common control output of the TEMCL means and are connected via the first I/O bus to the TE status word buffer means of the HC. A TE address update signal output extends from the FIFO control logic means, is controlled by a control output from the TEMCL means and is connected via the first I/O bus to the HC latch-control logic means for the purpose of obtaining a correct TEM address (from a TE) by the HC during system use. The TEMSICC logic arrangement of the MCB of any TE is also connected via the first I/O bus to the HC combined control arrangement such that the operator of the HC can selectively override data collection of any slave TE during a TE primary mode of the DARP system. The MCB TEMCL means of each TE not only controls the MCB BBM, BA means, the FIFO control logic arrangement, and the TEMSICC logic arrangement but the MCB of each TE also controls various functions of the TBs and the TEM thereof.

The first TB of a TE is generally made up of a delay timer parameter logic (DTPL) arrangement and a lower boundary parameter logic (LBPL) arrangement. A SDWSM input from a BDU is connected to a SDWSM input latch means of the first TB of a TE. Output means of the input latch means is connected to the LBPL arrangement and is also connected via the TB I/O bus of a TE to other logic arrangements of the second and third TBs thereof. A sample clock (SC) input from the BDU is connected to the input latch means. For each pulse of the SC input a SDW of the SDWSM input from the latch means is transmitted to the LBPL arrangement and other logic arrangements of the second and third TBs. A first latch address decoder/setup data words buffer (LAD/SUDWB) arrangement is connected to the motherboard bus of a TE; and control outputs thereof are connected to both the DTPL arrangement and the LBPL arrangement. An accepted SDWSM latch means is also connected to the output means of the input latch means. Output means of the DTPL arrangement and the LBPL arrangement are connected via the TB I/O bus to the trigger board control logic (TBCL) means of the second TB. A TB clock or pulse generator of the first TB is connected to the SC input and provides a TB clock input to the TBCL means of the second TB.

The second TB of a TE is also generally made of of an upper boundary parameter logic (UBPL) arrangement and a TE address generator control (TEAGC) arrangement. Outputs of the UBPL arrangement are connected to the TBCL means. A TEM address output of the TEAGC arrangement is connected via the I/O motherboard bus to the item of the TE. A second latch address decoder/setup data words buffer (LAD/-SUDWB) arrangement is connected to the I/O motherboard bus. A setup data word (SUDW) latch means is connected to the TBCL means for controlling the selective secondary mode operation of the TBCL means in storing or discarding a SDW of the SDWSM input for each pulse of the TB clock input. Another setup data word (SUDW) latch means is connected to the HC TEAGC arrangement for controlling the TEM wrap/stop storage criteria of an accepted SDWSM and associated (flagged) TTWSM as well as for controlling the top of the TEM (its memory configuration). Control outputs of the second LAD/SUDWB arrangement are connected to the UBPL arrangement and the first and second SUDW latch means.

The ATTWSM input from the ATTG output bus is connected to an ATTWSM input latch means of the second TB. A valid ATTW signal input from the ATTG output bus and an ATTCR signal input therefrom are connected to the TBCL means. A forced data flag bit (FDFB) output of the TBCL means and a forced store flag bit (FSFB) output thereof are both connected to a double flag bit (DFB) input latch means of the second TB. Two control outputs of the TBCL means are connected to the ATTWSM input latch means and the DFB input latch means. FDFB and FSFB outputs of the DFB input latch means are connected to the I/O motherboard bus. Output means of the ATTWSM input latch means is also connected to the I/O motherboard bus. As will become more apparent hereinafter and by reason of the TBCL means control output to the ATTWSM input latch means together with the design of the ATTWSM input latch means, each TTW output of the ATTWSM output means is not only synchronized with each SDW of the SDWSM input but each TTW output is partially reduced by two bits as compared to each ATTW of the ATTWSM input. This reduction accommodates the double flag bit output of the DFB input latch means. With this accommodation each flagged TTW output on the I/O motherboard bus is associated with an accepted SDW also thereon for storage in the TEM. An accepted SDW stems from the output means of the accepted SDW input latch means of the first TB and occurs for a given pulse of the TB clock input and as the result of the determination made by the TBCL means as to the acceptability of a SDW of the SDWSM input during a TE or a HC/TE primary mode. It is also noted here that when the TBCL means (unless it is in a special secondary mode) has made a determination that a SDW is acceptable; output means of the TBCL means, that are connected to the TEAGC arrangement and the TEM, cause a TEM address to be provided by the address output of the TEAGC arrangement so that associated (flagged) TTW and the accepted SDW are stored in the TEM for data collection.

The third TB is generally made up of a new/old parameter logic (NOPL) arrangement and a qualaifier parameter logic (QPL) arrangement. A third latch address decoder/setup data word buffer (LAD/SUDWB) arrangement is connected to the I/O motherboard bus and is provided with control outputs connected to the NOPL and QPL arrangements. A BDU provides a sample qualifier word stream (SQWSM) input via a SQWSM input latch means to the QPL arrangement. Outputs of the NOPL and QPL arrangements are connected via the TB I/O bus to the TBCL means. The TB clock input of the first TB is also connected via the I/O TB bus to the SQWSM input latch means such that for each pulse of the TB clock input a SQW input is transmitted via the output means of the SQWSM input latch means to the QPL arrangement.

The combined control arrangement of the HC in response to operator use selects a TE for setup mode. As the result of this selection the operator of the HC provides setup address and preselected data for each LAD/SUDWB arrangement of the three TBs such that, e.g., the LBPL arrangement is provided with certain compare/mask words, the first SUDW latch means with certain enabling conditions for operation of the TBCL means, the second SUDW latch means for either wrap or stop of the TEM and either top of the memory capacity of the TEM or less than top of the memory capacity thereof. Once each TE of the system that is desired by the operator to be setup in relation to a computer to be evaluated, the operator will normally select the desired primary or quiescent mode (standby) for each TE after set up and then after all TEs are set up releases the HCMS so that all setup system TEs simultaneously operate in their primary or quiescent (Q) mode.

When all the TEs are operating in one TE primary mode for data collection as either master, slave or independent configured during setup mode, the operator of the HC may directly link one TE at a time of all TEs for another TE primary mode that permits the HC operator to review the TEM address of the TEAGC arrangement of the second TB by appropriate actuation of the BA means of the MCB as effected by the TEMCL means. On the other hand, the HC operator prior to any TE primary mode may test each TE by directly linking a TE in a HC/TE mode for writing associated (flagged) TTWSM and accepted SDWSM from the memory of the SKPC system of the HC to the TEM of the linked TE. Then after the HC has written to the TEM of a selecyted TE, the HC can be operated to read the previously stored data collection to be sure that the TEM is operating properly prior to operating in a TE primary mode for evaluating a SDWSM or SQWSM input. Morevover, depending on the requirements for evaluating the computer, the HC may place a given TE in a HC/TE mode where the FIFO control logic arrangement provides a real time output of associated (flagged) TTWSM and accepted SDWSM while at the same time the TEM of the given TE is taking a secondary data collection of all associated (flagged) TTWSM and accepted SDWSM. Thus the DARP system is a highly versatile arrangement for not only testing itself but also in being readily tailorable to evaluate any digital data source means.

By the ATTG being common to all TEs, and with the HCMS also being common to all TEs and the ATTG, when the HCMS is actuated the ATTG is also shut down so as to provide an accurate time-tagged data collection for analysis by the TEM of any TE of the system. In order that the DTPL arrangement of a TE will not operate until the TE is in a TE primary mode and the HCMS is released, the TEMCL means of a TE not only provides a shutdown output to its DTPL arrangement but also to its TBCL means when the TE is in a HC/TE primary mode for writing to or reading from the TEM of the TE, Q mode or setup mode. Moreover, in order that the ATTWSM input latch means, the accepted SDWSM latch means, the DFB input latch means and the TEM address input latch means of the TEAGC arrangement all do not provide output means to the I/O motherboard bus during the HC/TE primary mode for writing to or reading from the TEM of a selected TE, these latch means are tri-stated by an output from the TEMCL means so as not to provide an associated (flagged) TTWSM output, accepted SDWSM or TEM address.

Other objects and advantages of the invention will become apparent when taken in conjunction with the accompanying specification and drawings as follows.

BRIEF DESCRIPTION OF THE DRAWINGS

FIGS. 8A, 8B and 8C are enlarged diagrammatic views taken within the bounds of three encompassing lines 8A—8A, 8B—8B and 8C—8C, all within FIG. 7; and with parts added to illustrate when taken together further details of various components of the MCB.

FIGS. 12A—12A (Sheets 1 and 2 thereof) and 12B—12B are all schematic views taken with the bounds of two encircling lines 12A—12A and 12B—12B respectively of FIG. 10 with parts added and illustrate still further details of various components of FIG. 10 of the second TB.

FIG. 14 is a table specifying various TE modes of the improved system.

FIG. 15 is another table specifying various bit output patterns of the PROM with each pattern being for a TE or HC/TE mode, and illustrates the MCB function relating to each bit of a given pattern.

FIG. 16 is a view that illustrates a representative software display of the HC and illustrates various operator preselectable setup data parameter functions for a TE as well as prselectable storage criteria therefor.

FIGS. 17A, 17B, 17C and 17D is a set of four separate representative tables for TE primary mode 2 or 3 of a TE (or HC/TE mode 6 thereof) of the improved system where each table for a specified analytical mode with boundary conditions illustrates acceptance or rejection of more than one sample data word (SDW) at given values (of a sample data word stream (SDWSM input). FIGS. 18A, 18B, 18C and 18D is another set of four separate representative tables for TE primary mode 2 or 3 of a TE (or HC/TE mode 6 thereof) of the improved system where each table for another specified and more complex analytical mode with boundary conditions illustrates acceptance or rejection of more than one SDW at given vaues of a SDWSM input.

DETAILED DESCRIPTION OF THE SPECIFICATION

Figure 1:
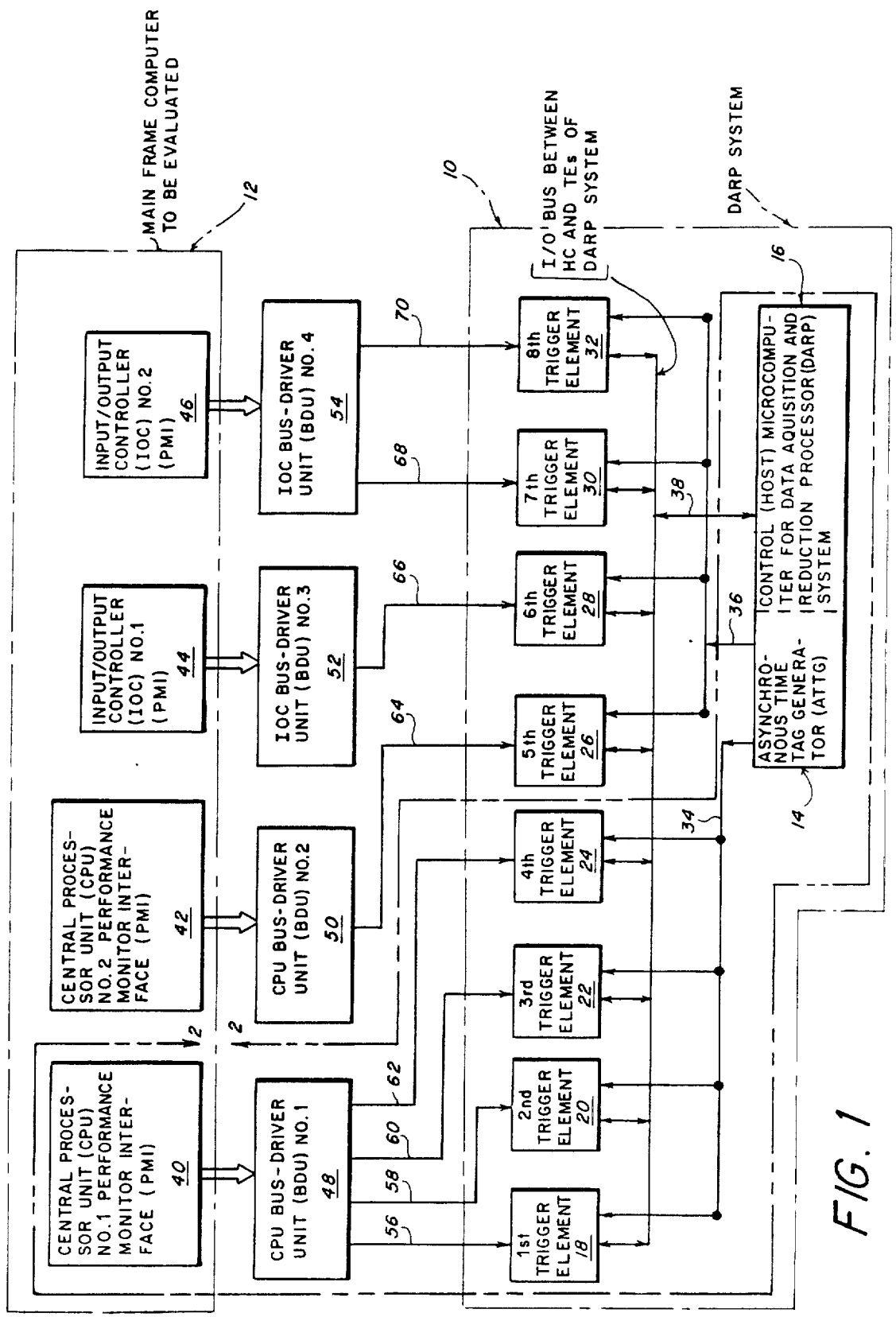
FIG. 1 is an overall schematic view of an improved selective multimode/multiconfigurable data acquisition and reduction processor system (DARP) for selectively and continuously evaluating the performance of a given programmed computer.

With further reference to FIG. 1, an improved selective multimode and selective configurable DARP system 10 is illustrated for progressively and continuously evaluating a programmed main-frame computer (MFC) 12. The DARP system is generally made up of an asynchronous time-tag generator (ATTG) 14, a control (host) microcomputer (HC) 16 and a series of eight trigger elements (TEs) 18, 20, 22, 24, 26, 28, 30 and 32. The ATTG is provided with separate output buses 34 and 36. One output bus 34 is parallel-connected to four TEs 18, 20, 22 and 24 while output bus 36 is parallel-connected to the other four TEs 26, 28, 30 and 32. A first input/output (I/O) HC/TE bus 38 interconnects HC 16 to each one of the TEs of the series of eight TEs 18, 20, 22, 24, 26, 28, 30 and 32. MFC 12 is generally made up of a pair of central processor units (CPUs) 40 and 42 and a pair of I/O controllers 44 and 46. The output of each CPU 40 or 42 is connected to its associated bus driver unit (BDU) 48 or 50. Similarly, the output of each I/O controller 44 or 46 is connected to its associated BDU 52 or 54. BDU 48 is provided with a plurality of four outputs with each output 56, 58, 60 or 62 of the plurality being separately connected to its associated TE 18, 20, 22 or 24. Similarly, BDUs 50 and 52 with their single outputs 64 and 66 are connected to TEs 26 and 28 respectively. However, BDU 54 is provided with two outputs 68 and 70 connected to TEs 30 and 32 respectively. It is to be understood that the interconnection of a computer or digital data source means to one or more TEs of system 10 could be any suitable means other than the BDUs shown. Further depending on the design requirements of DARP system 10 in relation to a computer to be diagnosed, main-frame or otherwise, output 56 of BDU 48, e.g., may provide more than one type of sample data word input to TE 18 for evaluation during system use. Moreover, depending on the mode of one or more TEs as selected by the operator of HC 16 and depending on whether the operator has selected one or more TEs for operating in some fashion, the DARP system can be configured in numerous ways thereby adding to the enhanced utility of the improved system, all of which will become more apparent hereinafter.

Figure 2:
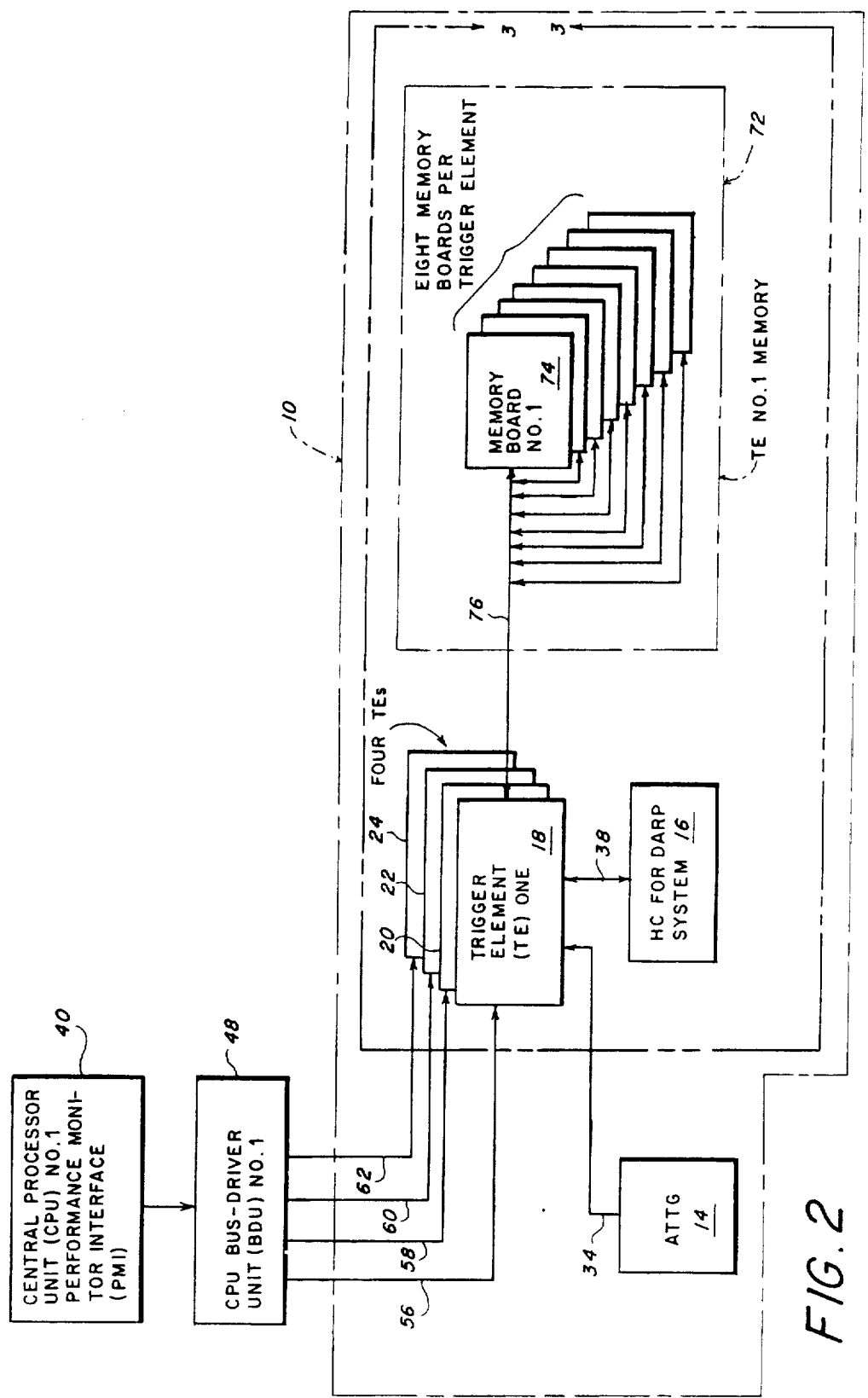
FIG. 2 is another and enlarged schematic view taken within the bounds of encompassing line 2—2 of FIG. 1 and with parts added and other parts broken away; and it illustrates further details of the invention.

As is further evident in FIG. 2, each TE, e.g., TE 18 is provided with a memory (TEM) 72 generally made up of a series of eight memory boards, only one of which is designated by reference numeral 74. Each memory board of a TEM is interconnected via a I/O motherboard bus to a TE, e.g., TE 18 is interconnected via bus 76 to all memory boards of its memory 72.

Figure 3:
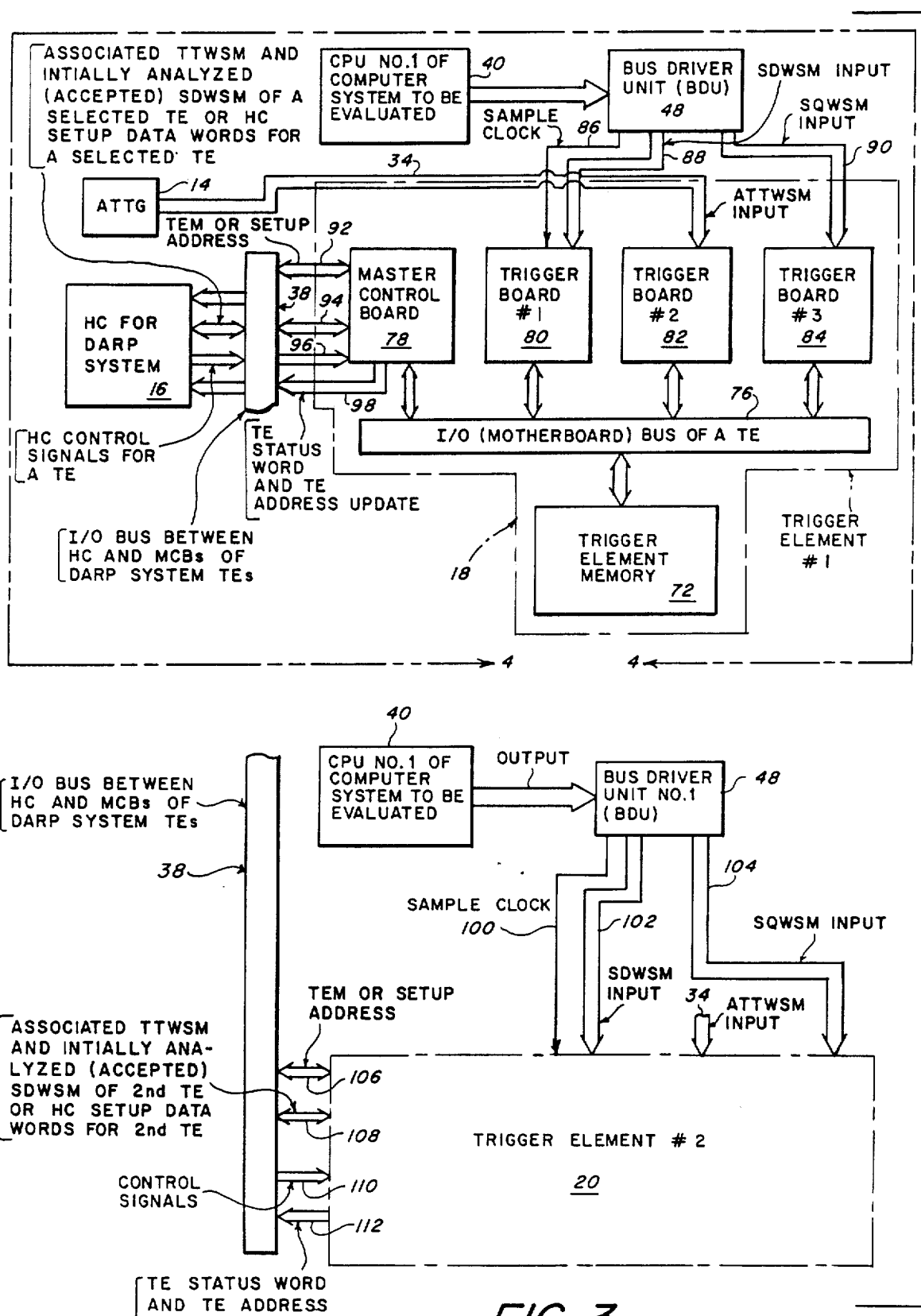
FIG. 3 is still another and enlarged schematic view taken within the bounds of encircling line 3—3 of FIG. 2; with parts rearranged, other parts removed, and still other parts broken away as well as parts added.
Figure 4:
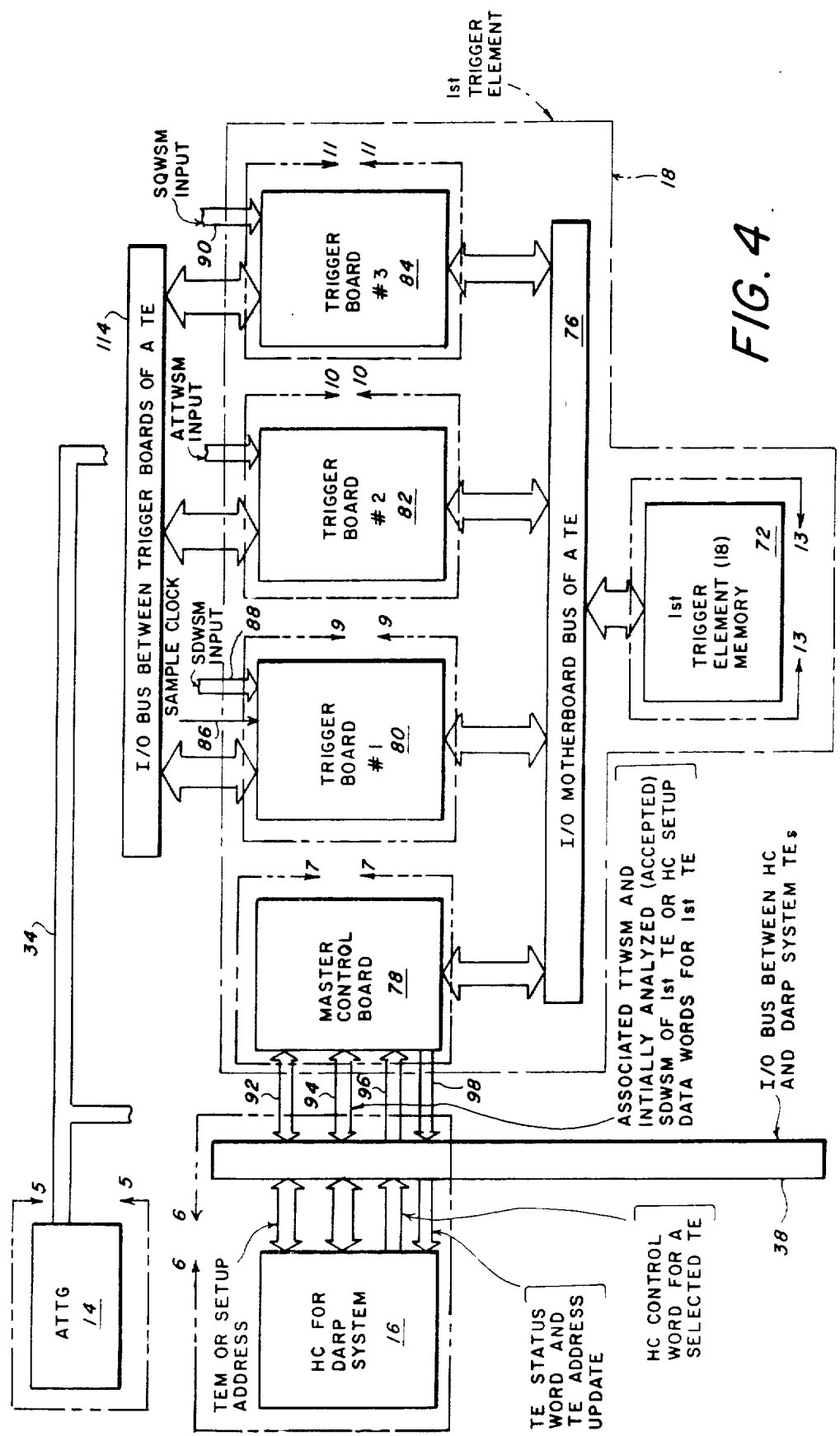
FIG. 4 is an enlarged schematic view taken within the bounds of encompassing line 4—4 of FIG. 3; and with parts added and other parts removed.

As illustrated in FIG. 3, TE 18 is generally made up of a master control board (MCB) 78, and a series of three trigger boards (TBs) 80, 82 and 84. Although output 56 of BDU 48 is generally specified in FIGS. 1-2, it is actually made up of a three outputs that serve as inputs to TE 18, namely: a sample clock input 86, and a SDWSM input 88 being connected to first TB 80; and a SQWSM input 90 being connected to third TB 84. As further disclosed in FIG. 3, I/O bus 38 provides a TEM or HC setup address interconnection 92, an associated TTWSM and initially analyzed (accepted) SDWSM or setup data words interconnection 94, one-way HC control signals 96 and one-way TE MCB status word and TE address update signal 98 all between HC 16 and MCB 78. Similarly, output 58 of BDU 48 for TE 20 is generally made up of a series of three different outputs that serve as inputs, namely, a sample clock input 100, a SDWSM input 102 and a SQWSM input 104. As with TE 18, bus 38 proves interconnections 106, 108, 110 and 112 all between HC 16 and MCB (not shown) of TE 20. As further illustrated in FIG. 4, an I/O TB bus 114 of a TE provides interconnection between various components of TBs 80, 82 and 84 of TE 18 as will be more fully described hereinafter. Inasmuch as any TE of system 10 is substantially the same construction, description of one TE, e.g., TE 18, will suffice for all TEs of system 10 unless otherwise specified as set forth below.

ASYNCHRONOUS TIME-TAG GENERATOR

Figure 5:
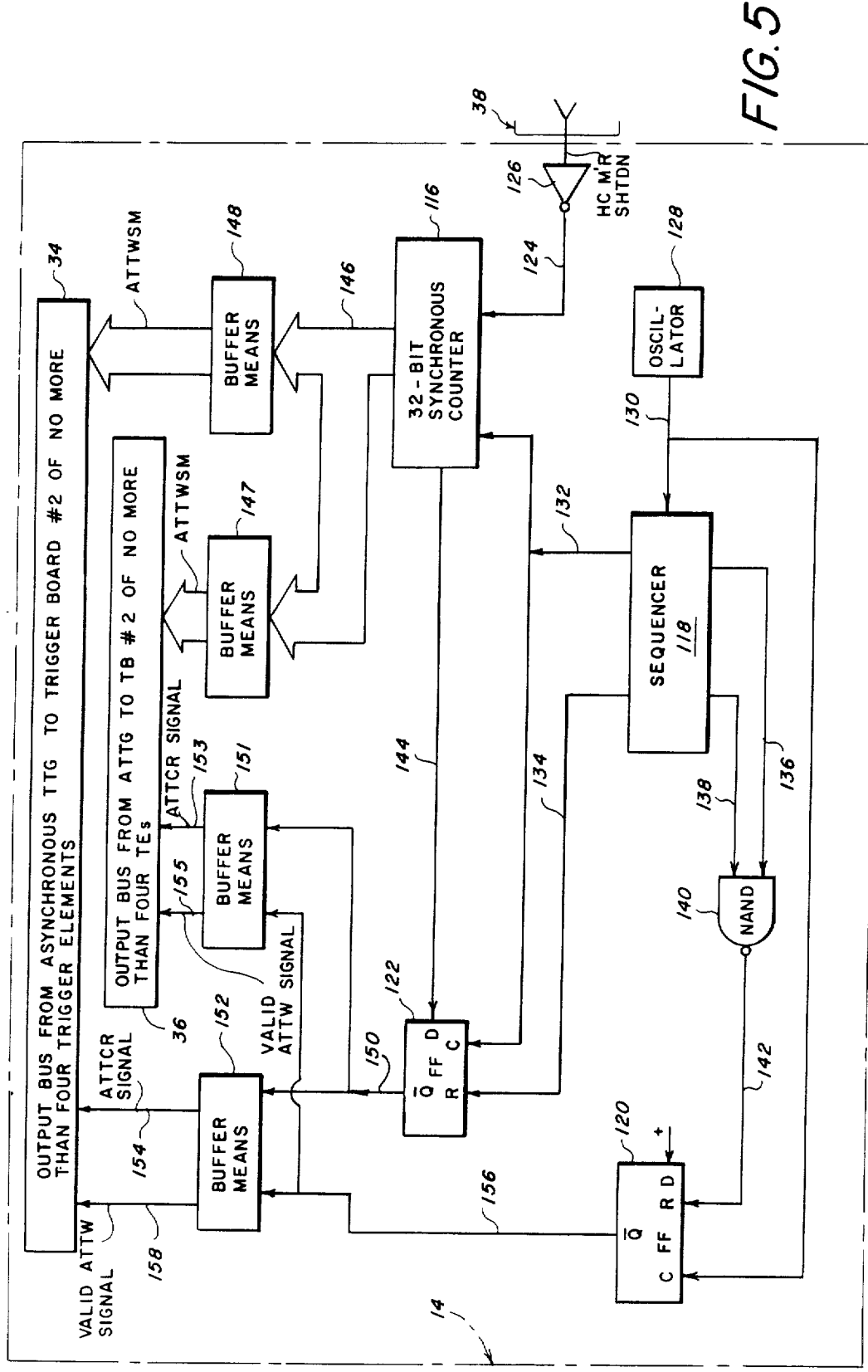
FIG. 5 is an enlarged schematic view taken within the bounds of encompassing line 5—5 of FIG. 4; and with parts added to illustrate details of the ATTG arrangement of the improved system.

As best shown in FIG. 5, ATTG 14 is generally comprised of a multibit synchronous counter 116, a sequencer 118 and two flip-flops (FFs) 120 and 122. Counter 116 is provided with an input 124 having an inverter 126. A HC master shutdown (HCMS) output of I/O bus 38 is connected to an input of inverter 126. As will become more apparent hereinafter counter 116 is normally shutdown before or after any operating cycle of system 10. Oscillator 128 provides a parallel output 130 to an input of sequencer 118 and the C (clock) input of FF 120. A first delayed output 132 of sequencer 118 is parallel-connected to an input of counter 116 and the C input of FF 122. A third delayed output 134 of sequencer 118 is connected to the R (reset) input of FF 122. Second and fourth delayed outputs 136 and 138 of sequencer 118 are connected to separate inputs of a NAND gate 140. An output 142 of NAND gate 140 is connected to the R input of FF 120. An output 144 of counter 116 is connected to a predetermined maximum count level thereof that serves as the rollover signal for counter 116 during use of system 10 as hereinafter described. Output 144 is also connected to the D input of FF 122. An asynchronous time-tag word stream (ATTWSM) output 146 of counter 116 is connected to bus 34 via buffer means 148 and is also connected to bus 36 via buffer means 147. A Q* output 150 of FF 122 that provides an asynchronous time-tag counter rollover (ATTCR) signal when it occurs is connected to bus 34 via a buffer means 152 and its output 154 and to bus 36 via a buffer means 151 and its output 153. Similarly, Q* output 156 of FF 120 that indicates a valid asynchronous time-tag word (ATTW) signal for each valid count of counter 116 during an operative cycle of oscillator 128 is connected to bus 34 via buffer means 152 and its other output 158; and also to bus 36 via buffer means 151 and its other output 155. One of the purposes of the buffer means, (such as buffer means 148 and 152 of ATTG 14), as used throughout system 10 is to minimize background noise that would otherwise interfere with the operation and sensitivity of system 10 during its use.

During use of system 10, counter 116 of ATTG 14 (without an actuated HCMS input from bus 38) provides an endless stream of progressively different multibit ATTW outputs, all in parallel format, via buses 146 and 34 to a series of four TEs of system 10 and buses 146 and 36 to a second series of four TEs where any ATTW output of the ATTWSM output is common to all TEs of the system. At the same time FF 120 as the result of an oscillator output 130 and the delayed output of gate 140 provides a timely Q* output 156 (high) for each valid ATTW of the TTWSM output furnished by counter 116. It is noted here that during each oscillator cycle, output 130 to the C input of FF 120 clocks the D input thereby setting Q* output 156 low before a valid ATTW signal occurs via NAND gate output 142. Further, when counter 116 provides a a signal output 144 that is indicative of the counter reaching a predetermined rollover level, then Q* output 150 of FF as the result of first and third delayed sequencer inputs 132 and 134 to the C and R inputs of FF 122 provides a predetermined ATTCR (low) output to buses 34 and 36. As will become more apparent hereinafter, the ATTWSM output of ATTG together with one or more valid ATTW signal outputs and a valid ATTCR signal are directed via buses 34 and 36 to the second TB of each TE of all TEs of system 10. Depending on the mode selected by the HC for each TE of system 10, as will become more apparent hereinafter, the ATTW, ATTCR and ATTWSM outputs of ATTG arrangement 14 are further processed by the system TEs.

HOST COMPUTER OF DARP SYSTEM

Figure 6:
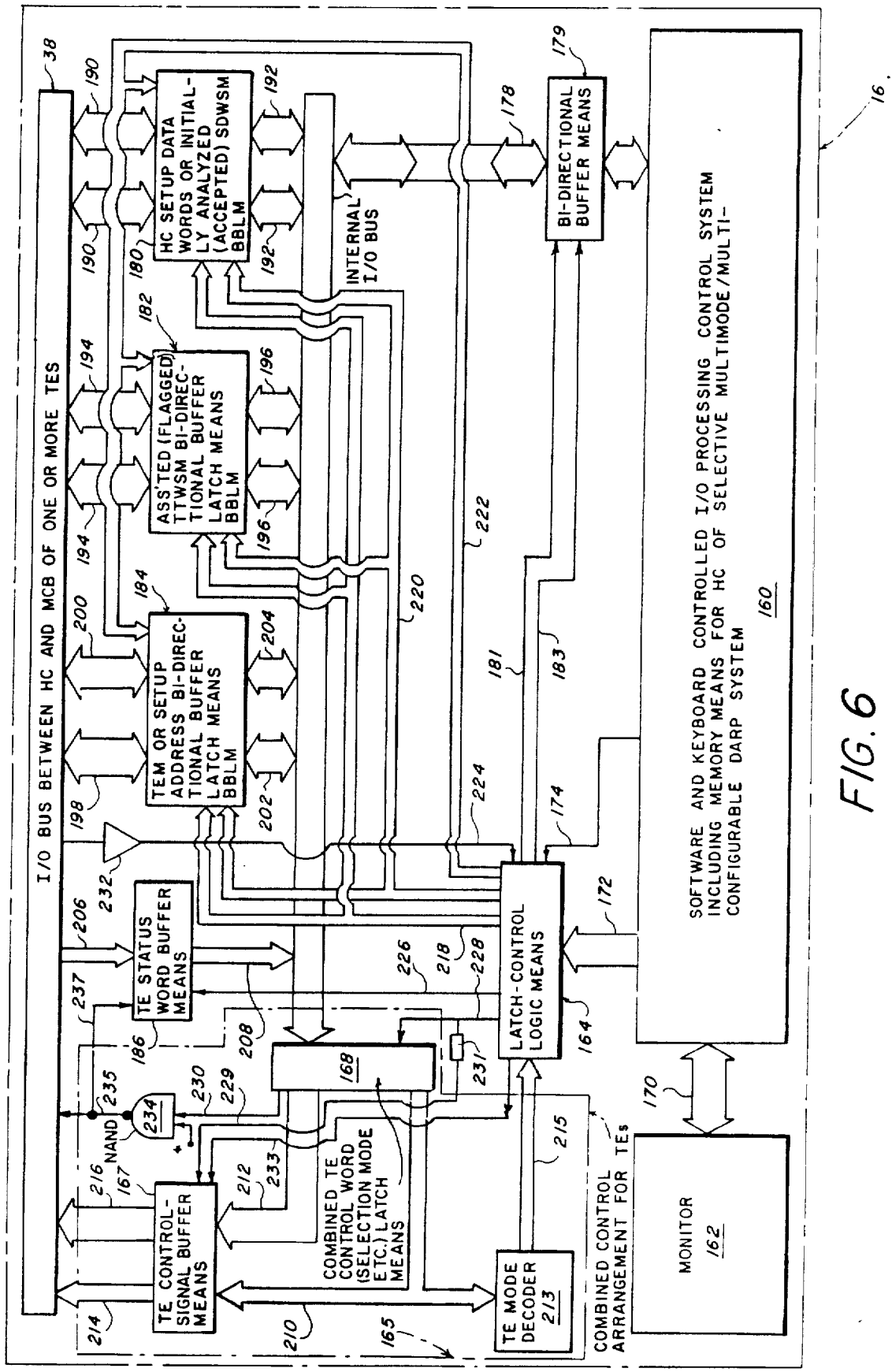
FIG. 6 is an enlarged schematic view taken within the bounds of encompassing line 6—6 of FIG. 4; and with parts added and other parts removed to illustrate further details of the host computer (HC) of the improved system.

As best depicted in FIG. 6, HC 16 is generally made up of a software and keyboard-controlled I/O processing control (SKPC) system 160, a monitor display 162, a latch control logic means 164 and a combined control arrangement 165 for all system TEs. The arrangement is provided with a TE control signal buffer means 167 and a control-word latch means 168. An I/O bus 170 interconnects SKPC system 160 and display 162. A logic-encoded output bus 172 connects SKPC system 160 to logic means 164. A clock output 174 of the SKPC system is also connected to logic means 164. An internal I/O bus 178 is connected between control-word latch means 168 and SKPC system 160 and is provided with bidirectional buffer (BB) means 179. Direction and enable control outputs 181 and 183 from logic means 164 are connected to BB means 179. The HC is also provided with setup data words or initially analyzed (accepted) sample data word stream (SDWSM) bidirectional buffer latch means (BBLM) 180, an associated (flagged) TTWSM BBLM 182, a TEM or setup address BBLM 184, and a TE status word buffer means 186. Separate pairs of 16-bit I/O buses 190 and 192 interconnect BBLM means 180 to buses 38 and 178 respectively. Similarly, separate pairs of I/O buses 194 and 196 interconnect BBLM 182 to buses 38 and 178 respectively. Also, separate pairs of I/O buses 198 and 200; and 202 and 204 interconnect BBLM 184 to buses 38 and 178 respectively. The TE status word buffer means is interconnected by input and output buses 206 and 208 to buses 38 and 178 respectively. TE control signal buffer means 167 is interconnected by two pairs of input buses 210 and 212; and two pairs of output buses 214 and 216 to combined TE control-word latch means 168 and bus 38 respectively. A TE mode decoder 213 is also connected to input bus 210 and provides an input bus 215 to logic means 164.

A multibit clock output bus 218, a multibit latch enable output bus 220, and a multibit directional control output bus 222, all of logic means 164 are each parallel-connected to BBLMs 180, 182 and 184 as shown in FIG. 6. It is noted here that buses 218, 220 and 222 are of such construction that encoded signals are sent to BBLM 184 when a TEM address is being received from a selected TE during TE primary mode 3. Similarly, encoded signals are sent via buses 218, 220 and 222 to BBLMs 180 and 184 when an HC setup address and HC setup words are being transmitted to the TBs of a selected TE for setup during setup mode of the system. Further encoded signals are sent via these buses to BBLMs 180, 182 and 184 when a TEM address is being sent from SKPC system 160 while an associated TTWSM and accepted SDWSM is also being sent from the memory means of the SKPC system when the TE is in a HC/TE (write) primary mode. On the other hand, different encoded signals are sent via these buses to BBLMs 180, 182 and 184 when, e.g., a TEM address is being sent from a selected TE along with the SDWSM and TTWSM stored in the TEM thereof during another HC/TE mode. Moreover, encoded signals are also being sent via buses 218, 220 and 222 to BBLMs 180 and 182 as well as an enable signal by output 226 to buffer means 186 when a selected TE is in a HC/TE primary mode for real time acquisition of associated (flagged) TTWSM and accepted SDWSM along with the TE status word (flag words) as to the condition of the FIFO arrangement means thereof. A TE address updata signal output 224 (having a driver 232) from the MCB of any selected TE of system 10 (via bus 38 and as will be more fully described hereinafter) is connected to logic means 164. A clock output 228 of logic means 164 is connected to combined TE control-word latch means 168. A mode strobe output 229 is parallel connected to output 228 and is provided with a delay 231. The mode strobe output is connected to TE control signal buffer means 167. A setup strobe output 233 of logic means 164 is also connected to buffer means 167. An HC external trigger control output 230 for selectively overriding the master, slave or independent configuration control (MICC) logic arrangement of the MCB of any TE when it is slave configured with one or more slave configured TEs during a TE or a HC/TE primary mode of system 10 is connected via NAND gate 234, output 235 and bus 38 to the MCB of each TE as will be more fully disclosed hereinafter. Output 235 is also parallel-connected via its branch 237 to TE status word buffer means 186.

Output bus 212 of combined TE control word latch means is advantageously made up of 3-bit TE selection encoded signals for selecting any one of eight TEs of system 10 during its use. Output bus 210 of combined TE control word latch means is advantageously comprised of 3-bit TE mode encoded signals for selecting any one of eight modes that were previously stored in the PROM of the MCB of any selected TE of the eight TEs of system 10 during its use. In providing output buses 210 and 212 with appropriate signals during system use, latch means 168 not only receives an input from bus 178 but also a clock input from logic means 164. Whenever a mode is being selected for a selected TE as effected by HC 16, mode decoder 213 is being connected to bus 210 provides verification to logic means 164 via bus 215.

In summary and as will be more fully apparent hereinafter, HC 16 (preferably of portable construction) regardless of the type used, such as disclosed in FIG. 6, significantly contributes to the operation of system 10 by providing one or more or all TEs of the system to be configured differently as to setup mode, any TE a TE or HC/TE primary mode or quiescent mode (standby or inactive). Thus system 10 is highly versatile via HC 16 in offering a wide variety of modes and configurations in evaluating one or more computers in unique fashion, such as MFC 12 as hereinafter set forth.

MASTER CONTROL BOARD OF A TRIGGER ELEMENT

Figure 7:
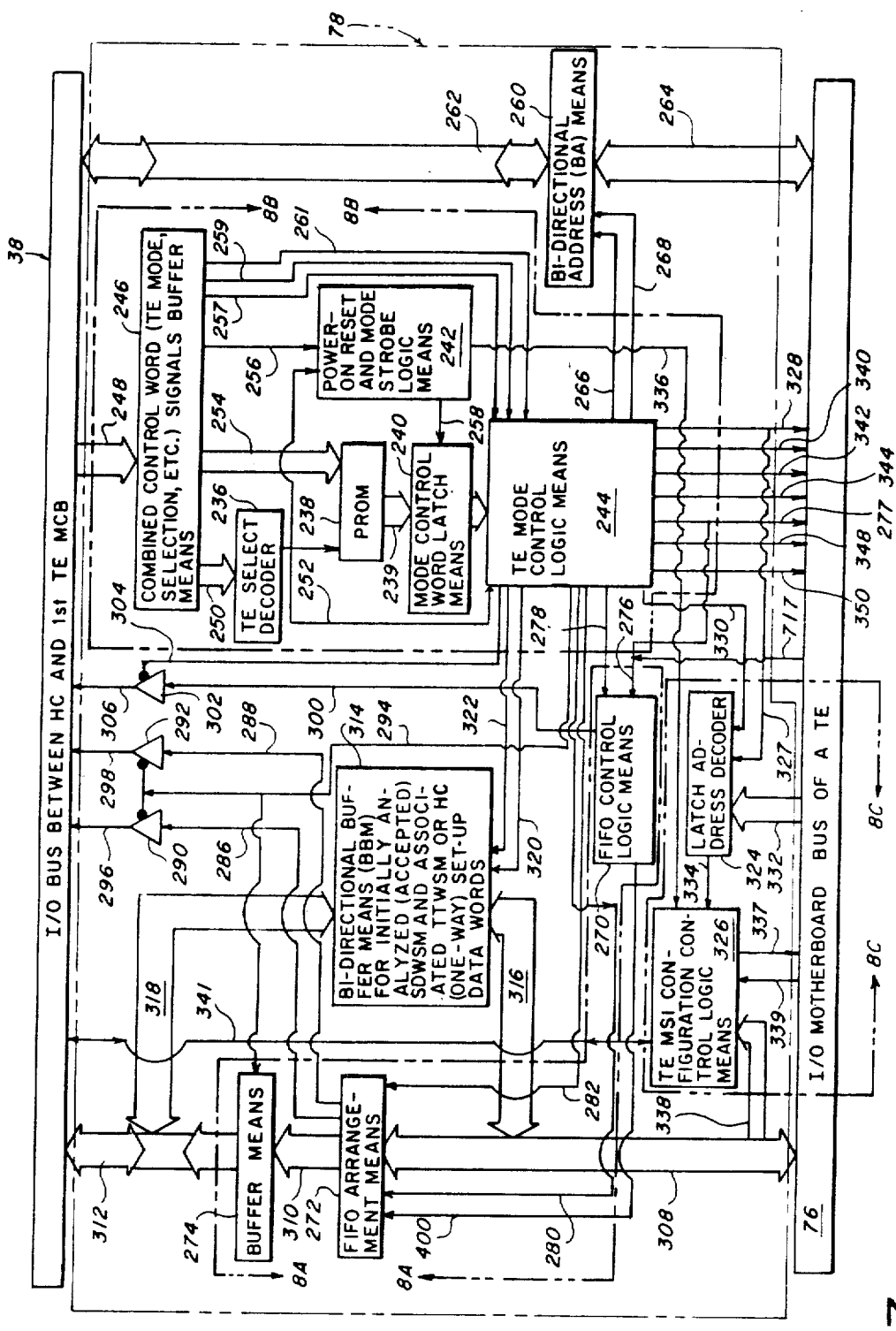
FIG. 7 is an enlarged diagrammatic view taken within the bounds of encompassing line 7—7 of FIG. 4 with parts added and reoriented to illustrate general details of the master control board (MCB) of a trigger element (TE) of the improved system.

As depicted in FIG. 7, MCB 78 of first TE 18 is generally made up of a TE select decoder 236, a programmable read only memory (PROM) 238, a mode control word latch (MCWL) means 240, a power-on reset and mode strobe (PR/MS) logic means 242 and a TEMCL means 244. A MCB combined control word signals buffer means 246 is connected to bus 38 via its input bus 248. A TE select three-bit output bus 250 of buffer means 246 is connected to decoder 236. A TE select signal output 252 of decoder 236 is parallel-connected to PROM 238, PR/MS logic means 242 and TEMCL means 244. A TE mode select three-bit output bus 254 of buffer means 246 is connected to PROM 238. The PROM provides an eight-bit output bus 239 which is connected to MCWL means 240. A mode strobe signal output 256 of buffer means 246 is connected to logic means 242. An output 258 of PR/MS logic means 242 is connected to MCW1 means 240. A setup strobe or HC trigger input 257, a master clear input 259, and a HC master shutdown (HCMS) input 261 all from MCB means 246 (via strobe 233, buses 212 and 216 and means 167; all of HC 16 as well as buses 38 and 248) are separately connected to logic means 244. Mode strobe 229 is connected to MCB mode strobe 256 of means 246 via bus 216 and means 167 of HC 16 and buses 38 and 248.

A bidirectional address (BA) means 260 is interconnected between buses 38 and 76 by I/O buses 262 and 264. TEMCL means 244 provides a tri-state output 266 and a directional control output 268 to BA means 260. It is noted here whenever tri-state output 266 is enabled by TEMCL means 244 during any TE mode, that BA means 260 is incapable of providing an output to either bus 38 or 76.

MCB 78 is also generally made up of first-in, first out (FIFO) control logic arrangement. The arrangement is provided with FIFO control logic means 270, FIFO arrangement means 272 and buffer means 274. TEMCL means 244 provides a HC trigger output 277 connected to bus 76 and FIFO control logic means 270 via its branch 276. TEMCL means 244 also provides a master clear signal output 278 to logic means 270. FIFO read and reset signal outputs 280 and 282 of TEMCL means 244 are connected to FIFO arrangement means 272. FIFO arrangement means 272 ready-to-read and error outputs 286 and 288 are connected to their associated drivers 290 and 292. An enable control output 294 of TEMCL means 244 is parallel-connected to buffer means 274 and drivers 290 and 292. Outputs 296 and 298 of drivers 290 and 292 are connected to bus 38 and then to buffer means 186 of HC 16 via bus 206. FIFO control logic means 270 provides a TE address update output 300 to a driver 302. An enable control output 304 of TEMCL means 244 is connected to driver 302. Output 306 of driver 302 is connected to bus 38 and input 224 of HC 16.

MCB 78 is also provided with a bidirectional buffer means (BBM) 314 for associated TTWSM and initially analyzed (accepted) SDWSM stream or one-way HC setup data words for TE 18. The buffer means is parallel-interconnected to buses 308 and 312 by I/O buses 316 and 328. A data enable output 320 of TEMCL means 244 and a data directional control output 322 thereof are connected to buffer means 314.

The MCB is also generally comprised of a TE master, slave or independent configuration control (MSICC) logic arrangement made up of a latch address decoder 324 and a TE MSICC logic means 326. An HC setup strobe output 328 of TEMCL means 244 is connected to bus 76 and decoder 324 via branch 327. Further TEMCL means 244 provides a setup enable output 330 to decoder 324. An HC setup address bus 332 via bus 76 is connected to decoder 324. A clock output 334 of decoder 324 is connected to TEMSICC logic means 326. A reset control output 336 of PR/MS logic means 242 is connected to TEMSICC logic means 326. A TE arm output 337 of TEMSICC logic means 326 is connected to bus 76. A trigger control input 339 from bus 76 is connected to TEMSICC logic means 326 and stems from a trigger control output of the trigger board control (TBCL) means of second TB 82 of TE 18 as hereinafter described. An HC setup data word input bus 338 from bus 38 is connected to logic means 326. A TE master/slave control 341 from bus 38 is connected to logic means 326 and is interconnected via bus 38 to the TEMSICC logic means of all TEs and is also interconnected via bus 38 to HC trigger output 235. As will become more apparent by reason of this interconnection, any master configured TE can override any slave configured TE as well as the HC trigger output can override any slave configured TE regardless of any master configured TE.

TEMCL means 244 also provides a TB tri-state control output 340, a TEM read control output 342, a TE master clear output 344, a TE master shutdown output 348 and a set up enable output 350; all of which are separately connected to bus 76 as depicted in FIG. 7.

Figure 8A:
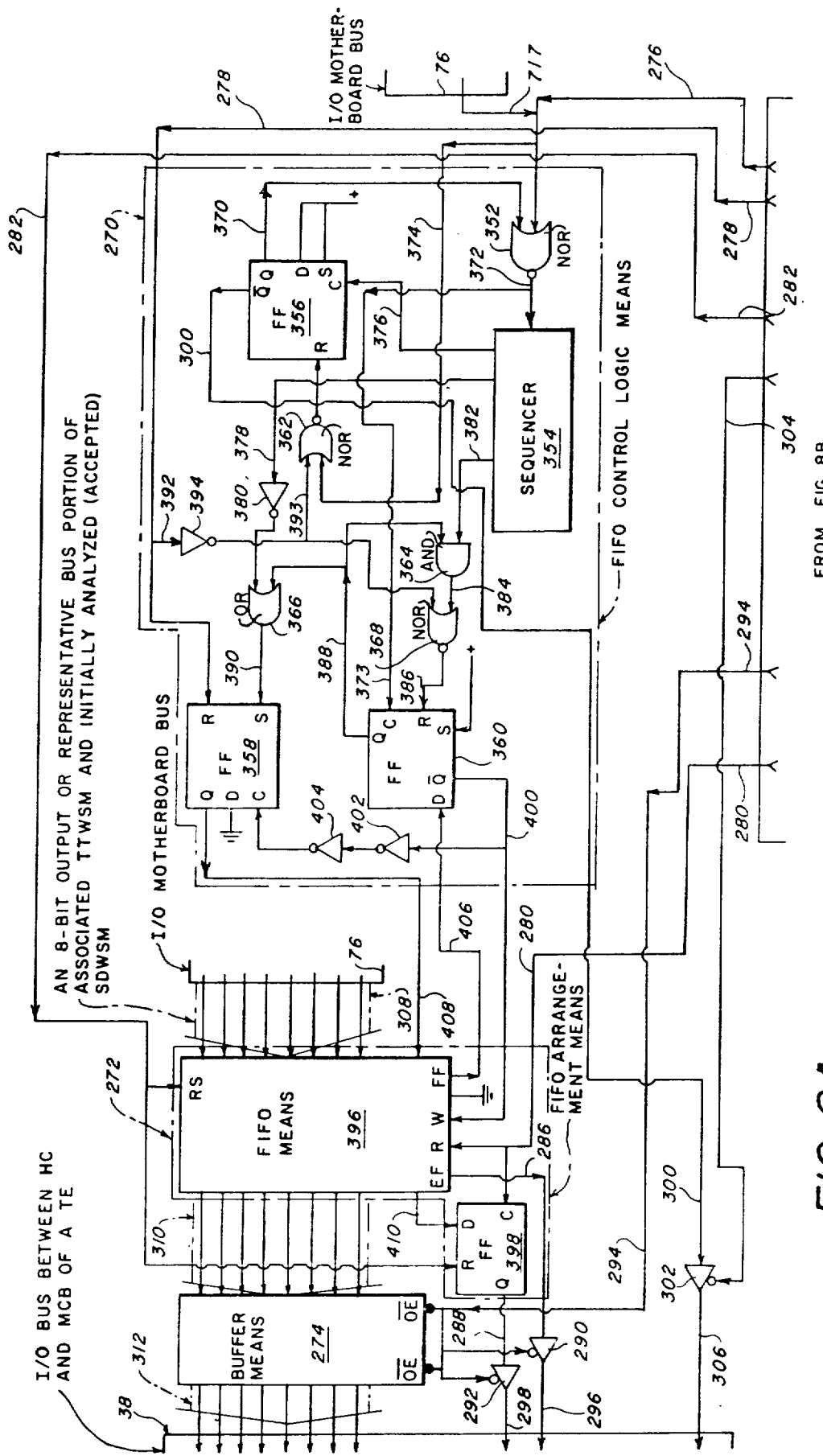

With reference to FIG. 8A, FIFO logic control means 270 is generally made up of a NOR gate 352, a sequencer 354, a series of three FFs 356, 358 and 360, first and second NOR gates 362 and 368, an AND gate 364, and an OR gate 366. One input of NOR gate 352 is connected to TEMCL means output 276 that stems from HC trigger output or setup strobe 257. Another input of gate 352 is connected to Q output 370 of FF 356. Q* output of FF 356 is connected to TE address update 300 aforedescribed. Inverted output 372 of NOR gate 352 is parallel-connected to sequencer 354 and via its branch 373 to the C input of FF 360. A branch 374 of TEMCL means output 276 is connected to an input of NOR gate 362. A first delayed output 376 of sequencer 354 is connected to the C input of FF 356. Second delayed output 378 of the sequencer is connected via an inverter 380 to an input of OR gate 366. A third delayed output 382 of sequencer 354 is connected to an input of AND gate 364. An output 384 of AND gate 364 is connected to an input of NOR gate 368. Output 386 of NOR gate 368 is connected to the R input of FF 360. Q output 388 of FF 360 is parallel-connected to another input of AND gate 364 and to another input of OR gate 366. Output 390 of OR gate 366 is connected to the S input of FF 358. Master clear output 278 of TEMCL means 244 (see FIG. 7) is connected to the R input of FF 358. Branch 392 of output 278 is connected to an inverter 394. Output 393 of inverter 394 is parallel-connected to another input of NOR gate 368 and to another input of NOR gate 368.

FIFO arrangement means 272 is comprised of FIFO means 396 and a FF 398 as further illustrated in FIG. 8A. FIFO means 396 is a chip having eight I/O ports. For the sake of brevity, only one FIFO means 396 is shown in FIG. 8A. It is to be understood that there are eight FIFO means 396 with separate buffer means 274 for each FIFO means. TTWSM and initially analyzed (accepted) SDWSM is directed from bus 76 via bus 308 to FIFO means 396 and then from the FIFO means to bus 310, buffer means 270, buses 312 and 38, BBLMs 180 and 182 of HC 16, I/O bus 178 and SKPC system 160. FIFO read output 280 of TEMCL means 244 (see FIG. 7) is parallel-connected to the R input of FIFO means 296 and the C of FF 398. Control output 294 of TEMCL means 244 is parallel-connected to the enable inputs of drivers 290 and 292; and it is also parallel-connected to the pair of enable inputs of buffer means 274. Reset output 282 of TEMCL means 244 is parallel-connected to the RS input of FIFO means 396 and the R input of FF 398. Q* output 400 of FF 360 is parallel-connected to the W (write) input of FIFO means 396 and to the C input of FF 358 by way of a pair of series-interconnected inverters 402 and 404. A full (FF) output 406 of FIFO means 396 is connected to the D input of FF 360. An output 410 of FIFO means 396 that corresponds to the input thereof associated with Q output 408 is connected to the D input of FF 398. The EF output of FIFO means 396 is connected to FIFO arrangement means output 286 which in turn is connected to driver 290, output 296, bus 38, HC bus 206, HC buffer means 186, etc. for indicating that the FIFO means 396 contains information to be read. The Q output of FF 398 is connected to output 288 of FIFO arrangement means 272, driver 292, its output 298, bus 38, HC 16, etc. for indicating an error signal that one or more associated TTWSM and initially analyzed (accepted) SDWSM may have been lost when FIFO means 396 or a TE is filled up upon the TE being used in a HC/TE primary mode during system use.

Figure 8B:
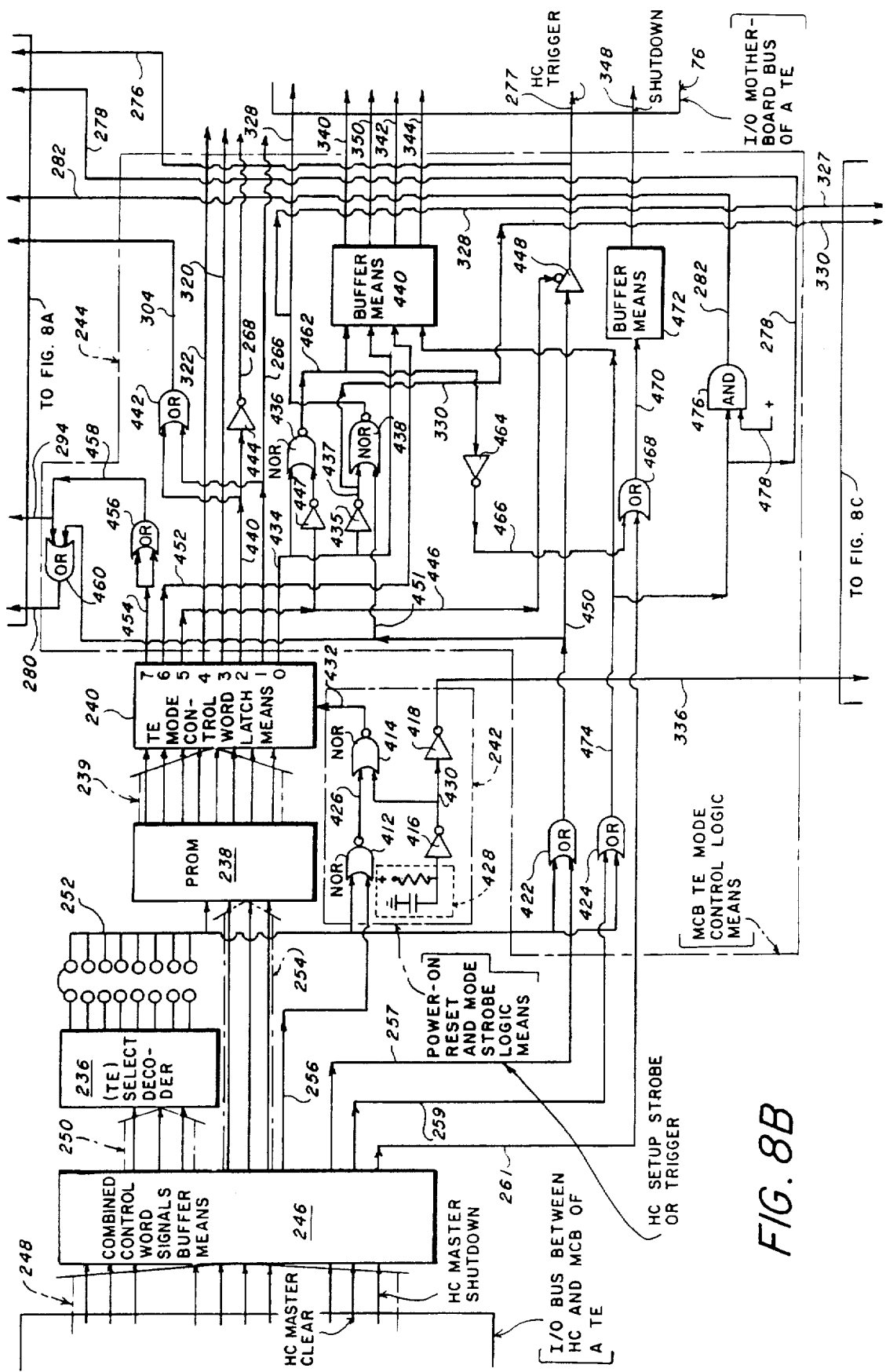

With reference to FIG. 8B, PR/MS logic means 242 is generally comprised of a pair of NOR gates 412 and 414 and a pair of inverters 416 and 418. Jumper-connected output 252 of TE select decoder 236 is parallel-connected to an input of PROM 238, an input of NOR gate 412 and inputs of a pair of OR gates 422 and 424 of TEMCL means 244. Setup strobe (or HC trigger control) output 257 of buffer means 246 is connected to another input of gate 422. HC master clear output 259 of the buffer means is connected to another input of gate 424. HC mode strobe output 256 of buffer means 256 is connected to another input of NOR gate 412. Output 426 of NOR gate 412 is connected to an input of NOR gate 414. The input of inverter 416 is conneced to a positive bias RC network output 428. Output 430 of inverter 416 is parallel-connected to another input of NOR gate 414 and the input of inverter 418. Output 336 of inverter 418 is connected to the R inputs of a pair of FFs of TEMSICC logic means 326 (see FIG. 8C) as hereinafter described. It is sufficient to note here when any TE is provided with power during startup of system 10, RC network 428 of TE 18 initially provides a low input to inverter 416 so that output 336 will be low for resetting the pair of FFs of TEMSICC logic means 326. Output 432 of NOR gate 414 is connected to the C input of MCWL means 240 of MCB 78.

With further reference to TEMCL means 244 of FIG. 8B, an output 434 of MCWL means 240 is parallel-connected to an inverter 435 and an input of buffer means 440. This input of buffer means corresponds to TEMCL means enable output 350 for certain TB components during HC/TE setup mode as aforedescribed. Output 437 of inverter 435 is connected to an input of NOR gate 438 and is also parallel-connected to setup enable output 330 of TEMCL means 244 for decoder 324 (see FIG. 8C). The output of gate 438 is parallel-connected to TEMCL means setup strobe output 327 for decoder 324 and TEMCL means setup strobe output 328 for certain TB components. A second output of MCWL means 240 is connected to MCB address tri-state control output 266 of TEMCL means 244. Output 266 within TEMCL means 244 is also parallel-connected to an input of OR gate 442. A third output 440 of MCWL means 240 is parallel-connected to another input of OR gate 442 and the input of an inverter 444. The output of OR gate 442 is connected to TEMCL means TE address update enable control output 304 aforedescribed. The output of inverter 444 is connected to MCB address-direction control output 268 of TEMCL means 244. These TEMCL means outputs 266 and 268 are connected to MCB BA means 260 as aforedescribed. Fourth and fifth outputs of latch means 240 are connected to data tri-state and direction control outputs 320 and 322 of TEMCL means 244, which outputs 320 and 322 are also connected to MCB BBM 314 as aforedescribed. Sixth output 446 of MCWL means 240 is connected to the input of an inverter 447 and is also parallel-connected to the enable input of a tri-statable driver 448. The output of inverter 447 is connected to another input of NOR gate 436. Output 450 of OR gate 422 is parallel-connected to the input of driver 448, another input of NOR gate 438 and an input of OR gate 460. The output of driver 448 is parallel-connected to the MCB HC/TE trigger control output 277 to bus 76 and to HC/TE trigger control output 276 of MCB FIFO control logic means 270 of FIG. 8A. Seventh output 452 of MCWL means 240 is connected to another input of buffer means 440 that corresponds to TEMCL means read control output 344 aforedescribed. Eighth output 454 of MCWL means 240 is connected to both inputs of OR gate 456. Output 458 of gate 456 is connected to another input of OR gate 460 and is also parallel-connected to TEMCL means control output 294 which is connected to buffer means 274, etc., of FIG. 8A as aforedescribed. The output of OR gate 460 is connected to FIFO read control output 280 of TEMCL means 244.

Output 462 of NOR gate 436 is parallel-connected to still another input of buffer means 440 and the input of an inverter 464. This input of buffer means 440 corresponds to TEMCL means TB tri-state control output 340 aforedescribed. Output 466 of the inverter is connected to an input of OR gate 468. Another input of OR gate 468 is connected to HC master shutdown (HCMS) output 261. Output 470 of gate 468 is connected to buffer means 472 and its output to TE master shutdown output 348 of TEMCL means 244. Output 474 of OR gate 424 is parallel-connected to another input of buffer means 440, to an input of AND gate 476; and to TEMCL means master clear output 278 for FIFO control logic means 270 of FIG. 8A as aforedescribed. Also, this input of buffer means 440 corresponds to TB master clear output 344 of TEMCL means 244 as aforedescribed. Another input of AND gate 476 is connected to a positive bias 478.

With reference to FIG. 8C, TEMSICC logic means 326 of the TEMSI logic arrangement is generally made up of a pair of FFs 478 and 480, a pair of NAND gates 482 and 484 and a NOR gate 486. Output 334 of MCB latch address decoder 324 is parallel-connected to the C inputs of FFs 478 and 480. It is noted here that one of the bit inputs of TE setup address bus 322 is provided with an inverter 481. The R inputs of FFs 478 and 480 are parallel-connected to PR/MS logic means reset output 336 aforedescribed. The S inputs of both FFs are parallel-connected to a positive bias 488. The D inputs of both FFs are connected to their associated set up data bit control leads 333 and 335 from I/O bus 76 via bus 338 as shown. Q output 490 of FF 480 is connected to an input of NAND gate 482. Q* output 492 of FF 480 is connected to an input of NAND gate 484. Q output 494 of FF 478 is parallel-connected to another input of NAND gate 482 and also to another input of NAND gate 484. A TB master/slave (M/S) trigger control input 339 that stems from the TBCL means of second TB 82 via bus 76 as hereinafter described is connected to a third input of NAND gate 482. Output 496 of NAND gate 482 is connected via branch 497 to an input of NOR gate 486 and is parallel-connected to TE master/slave intercontrol output 341 that is interconnected to all TEs (see FIG. 7). Output 498 of NOR gate 486 is connected to a third input of NAND gate 484. The output of NAND gate 484 is connected to TE arm control output 337 of TEMSICC logic means 326. Output 337 is connected to the TBCL means of second TB 82 as hereinafter described.

FIRST TRIGGER BOARD (TB) OF A TE

Figure 9:
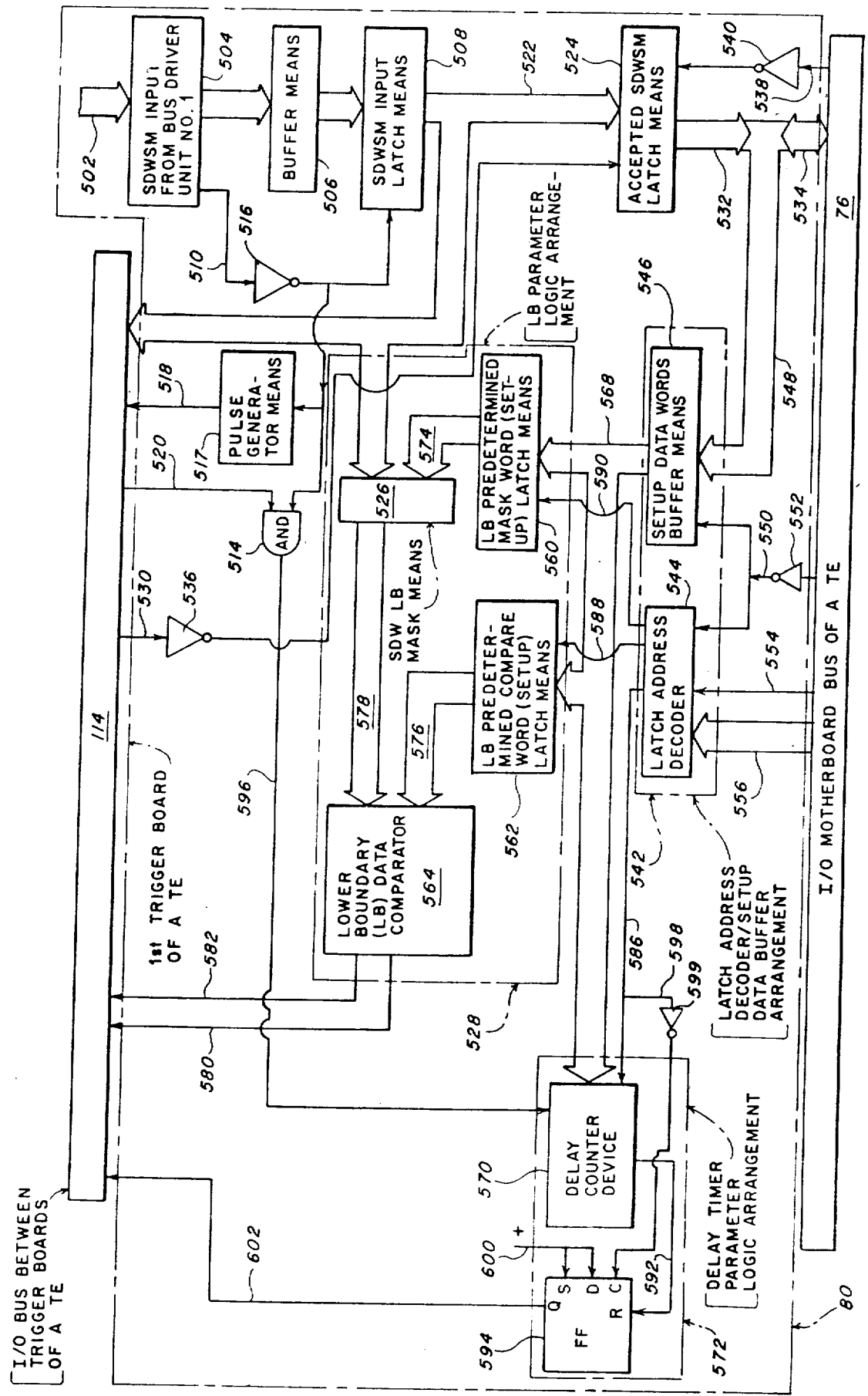
FIG. 9 is a diagrammatic view taken within the bounds of encircling line 9—9 of FIG. 4 with parts added and illustrates further details of various components of the first trigger board (TB) of a trigger element (TE).

As depicted in FIG. 9, BDU bus 56 of FIG. 1 includes a SDWSM input bus 502 that is connected to input 504 of TB 80. The output bus of input 504 is series interconnected to buffer means 506 and SDWSM input latch means 508. SDWSM input bus 502 also provides a sample clock input as evidenced by sample clock output 510 from input 504. Clock input 510 is inverted by inverter 516 and then is parallel-interconnected to input latch means 508, pulse generator means 512 and an input of a NAND gate 514. Pulse generator means 517 provides a TB clock input 518 to second and third TBs 82 and 84 as hereinafter described. Another input of gate 514 is connected to a latched master shutdown input 520 that stems from TB 82 as also further described.

Output bus 522 of input latch means 508 is parallel-interconnected to an accepted SDWSM latch means 524, a SDW lower boundary (LB) mask means 526 of a LB parameter logic (LBPL) arrangement 528 and to other parameter logic arrangements of second and third TBs 82 and 84 as further described hereinafter. It is noted here that a TB trigger control output 530 which stems from the TBCL means of second TB 82 as hereinafter described is connected to inverter 536 and then the output of the inverter is connected to latch means 524 for controlling the timely transfer of any accepted SDW of SDWSM input on bus 522 from latch means 524 to I/O bus 76 via output bus 532 and I/O bus 534. A tri-state control input 538 has an inverter 540 series-connected thereto and is connected to accepted SDWSM latch means 524. Input 538 is also connected via I/O bus 76 to tri-state control output 340 of TEMCL means 244 of MCB 78 via I/O bus 76. As will become more apparent hereinafter, MCB output 340 prevents any accepted SDWSM output of latch means 524 when any TE is in a quiescent (Q) or HC/TE read or write mode so as to permit the passage via I/O bus 76 of associated TTWSM and accepted SDWSM between the HC and the TEM of a selected TE.

A first latch address/decoder setup data words buffer (LAD/SUDWB) arrangement 542 is generally made up of a setup latch address decoder 544 and setup data words buffer means 546. A setup data words input bus 548 is connected to I/O bus 534. An enable input 550 with its inverter 552 is parallel-connected to decoder 544 and buffer means 546. Input 550 is connected via bus 76 to enable output 350 of the TEMCL means of MCB 78. A setup strobe input 554 is series-interconnected via bus 76 between decoder 544 and setup strobe output 328 of the TEMCL means of MCB 78. A 4-bit TE setup address bus 556 is parallel-interconnected via bus 76 to address I/O bus 264 of MCB 78, BA means 260, I/O buses 262 and 38, I/O buses 198 and 200 of HC 16, HC BBLM 184, etc.

LBPL arrangement 528 is also generally comprised of a LB predetermined mask word latch means 560, a LB predetermined compare word latch means 562 and a LB comparator 564. A setup data words output bus 568 of buffer means 546 of arrangement 542 is parallel-interconnected to latch means 560 and 562 of arrangement 528 and a delay counter device 570 of a delay time parameter logic (DTPL) arrangement 572. Latch means 560 is connected via an output bus 574 to SDW LB mask means 526. Similarly, output buses 576 and 578 of latch means 562 and mask means 526 are separately connected to comparator 564. Comparator 564 provides two outputs 580 and 582. First output 580 indicates whether the HC preselected lower boundary compare word value (LBCWV) of a setup data word for latch means 562 is greater than or not greater than any current SDW of a SDWSM input being analyzed by LBPL arrangement 528. Second output 582 indicates whether the HC preselected LBCWV of a setup data word for latch means 562 is equal to or not equal to any current SDW of a SDWSM input being analyzed by the LBPL arrangement. Outputs 580 and 582 are connected via bus 114 to TBCL means 584 of second TB 82 (see FIG. 10).

Decoder 544 of arrangement 542 provides a series of three clock outputs 586, 588 and 590. Output 586 is connected to device 570 of arrangement 572. Branch output 598 is connected to inverter 599 with its output connected to the C input of FF 594. Output 592 of device 570 is connected to the R input of FF 594. Outputs 588 and 590 of decoder 544 are connected to latch means 562 and 560 respectively of arrangement 528. Output 596 of AND gate 514 is connected to device 570. The D and S inputs of FF 594 are parallel-connected to a positive bias 600. As will become more apparent hereinafter, Q output 602 of FF 594 indicates when setup conditions of device 570 have been met (low) or have not been met (high).

SECOND TRIGGER BOARD OF A TE

Figure 10:
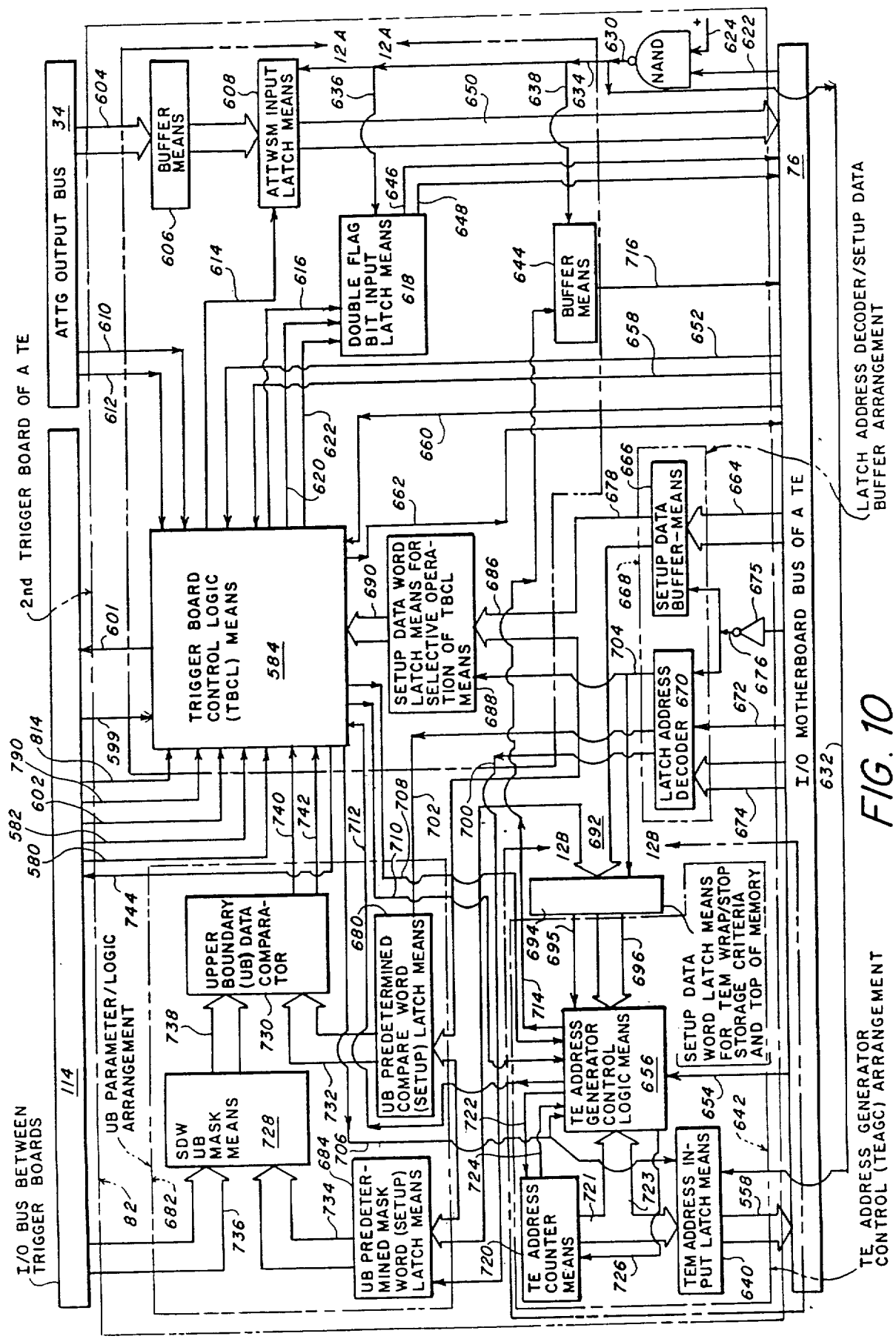
FIG. 10 is a diagrammatic view taken within the bounds of encompassing line 10—10 of FIG. 4 with parts added and illustrates further details of various components of the second TB of a TE.

As depicted in FIG. 10, TB clock input 599 of TBCL means 584 is connected via bus 114 to TB clock output 518 of first TB 80 (FIG. 9). Latch master shutdown (LMS) input 520 of TB 80 is connected via bus 114 to a LMS output 601 of TBCL means 584.

As further shown in FIG. 10, an output bus 604 series-interconnects ATTWSM output bus 146 of FIG. 5 via ATTG output bus 34 to buffer means 606 and ATTWSM input latch means 608. Similarly, ATTCR signal output 154 and valid ATTW signal output 158 all of FIG. 5 are interconnected via bus 34 to inputs 610 and 612 of TBCL means 584 respectively. As will become more apparent hereinafter, TBCL means 584, in response to a valid ATTW signal output 158 via bus 34 and input 612, provides a synchronized and transformed clock output 614 to ATTWSM input latch means 608. TBCL means 584 provides a forced data flag bit (FDFB) output 620 and a forced storage flag bit (FSFB) output 622. These outputs are connected to double flag bit (DFB) input latch means 818. These outputs 620 and 622 when high indicate that both forced data and forced storage occurs. As will become more apparent hereinafter when forced data or forced storage occurs a SDW of the SDWSM input is stored in the TEM of a TE that is otherwise normally rejected by the TE and its TBCL means 584. Tri-state control output 340 of MCB 80 is connected via bus 76 to an input 624 of a NAND gate 626. Another input of gate 626 is connected to a positive bias 628. Output 630 of NAND gate 626 is parallel-interconnected via branch leads 632, 634, 636 and 638 to TEM address input latch means 640 of TE address generator control (TEAGC) arrangement 642, ATTWSM input latch means 608, DFB input latch means 618, and buffer means 644, respectively. Moreover, a trigger control output 616 of TBCL means 584 is connected to DFB input latch means 618. This output 616, as will become more apparent hereinafter, causes a FDFB 616 and FSFB when high to be latched-in in latch means 618 in response to a given pulse of TB clock input 599 as the result of the analysis by the TBCL means in relation to a SDW of the SDWSM input and the given pulse. As the result of FDFB 620 and FSFB 622 being latched-in in means 618 as effected by TBCL means output 616, means 618 provides FDFB and FSFB outputs 646 and 648 that form part of the synchronized TTWSM which stems from output bus 650 of ATTWSM latch means 608.

TBCL means 584 is interconnected to TE master clear output 344 of MCB 78 via bus 76 and TE master clear input 652. Also TE master clear output 344 of MCB 78 is interconnected via bus 76 and another TE master clear input 654 to TE address generator control (TEAGC) logic means 656 of TEAGC arrangement 642. TE master shutdown output 348 of MCB 78 is interconnected via bus 76 to TE shutdown input 658 of TBCL means 584. TE arm output 337 of TEMSICC logic means 326 is interconnected via bus 76 and a TE arm input 660 to TBCL means 584. A TB M/S trigger control output 662 of TBCL means 584 is connected via bus 76 to TB M/S trigger control input 339 of TEMSICC logic means 326 of MCB 78.

An HC setup data words input bus 664 is connected to setup data buffer means 666 of a second LAD/-SUDWB arrangement 668 and interconnected via bus 76 to HC setup data words output bus 308 of MCB 78 (FIG. 7). MCB/HC setup strobe output 328 is also interconnected via bus 76 and a setup strobe input 672 to latch address decoder 670 of arrangement 668. An HC setup address bus 674 is connected to decoder 670 and is interconnected via buses 76, 264, BA address means 260, buses 262, 38, 198 and 200 to HC BBLM 184, etc. MCB enable output 350 is parallel-connected via bus 76 and enable input 676 including inverter 675 to buffer means 666 and decoder 670.

An HC setup data words output bus 678 is parallel-connected to upper boundary (UB) predetermined compare word latch means 680 of an UB parameter logic UBPL arrangement 682 and to UB predetermined mask word latch means 684 thereof. An HC setup data word output bus portion 686 of bus 678 is connected to a setup data word (SUDW) latch means 688 for effecting via its output bus 690 selective secondary mode operation of TBCL means 584. Another HC setup data word output bus portion 692 of bus 678 is connected to SUDW latch means 694 for effecting via its output 695 and output bus 696 to TEAGC logic means 656 of TEAGC arrangement 642 selective wrap or stop TEM storage criteria and selective top of memory configuration of the TEM as will become more fully apparent hereinafter. Output bus 696 of latch means 694 is connected to a comparator 698 (see FIG. 12B) of TEAGC logic means 656 of TEAGC arrangement 642. Separate clock outputs 700 and 702 of decoder 670 are connected to mask word latch means 684 and compare word latch means 680 respectively. Another clock output 704 of decoder 670 is parallel-connected to both SUDW latch means 694 for TEAGC logic means 656 and SUDW latch means 688 for TBCL means 584.

A second TB trigger control output 706 of TBCL means is parallel-interconnected to TEAGC logic means 656 and TEM address input latch means 640. A TE address enable output 708 of TBCL means 584 is connected to TEAGC logic means 656. A first-delayed clock output 710 of TBCL means 584 is connected to TEAGC logic means 656. A memory wrap/stop control output 712 of TEAGC logic means 656 is connected to TBCL means 584. A TEM write control output 714 of TEAGC logic means 656 is connected to buffer means 644. A TEM write control output 716 of buffer means 644 is connected via bus means 76 to TEM write input 718 of TEM board 74 of TEM 72 (see FIG. 13) and is further connected via its branch 717 and I/O bus 76 to MCB HC trigger control output 276 for FIFO control logic means 270 see FIG. 8A. A TE address counter means 720 of TEAGC arrangement 642 is connected to an output 722 of TEAGC logic means 656. This output 722 is also connected to a FF (not shown in FIG. 7) of the TEAGC logic means. A TE address counter output bus 721 is connected to TEM address input latch means 640. An input bus portion 723 of output bus 721 is connected to TEAGC logic means 656. A memory wrap/stop control output 726 of TEAGC logic means 656 is connected to TE address counter means 720 and to the FF (not shown in FIG. 7) of the TEAGC logic means. An output 724 of counter means 720 is also connected to the FF of logic means 656.

UBPL arrangement 682 is also generally made up of SDWUB mask means 728 and an UB data comparator 730. An output bus 732 of UB compare word latch means 680 is connected to data comparator 730. An output bus 734 of UB mask word latch means 684 is connected to mask word means 728. An input bus 736 is parallel-connected via bus 114 to SDWSM input bus 522 of first TB 80. An output bus 738 of mask means 726 is connected to comparator 730. Output 742 of UB data comparator 730 is connected to TBCL means 584 and indicates when any current SDW of a SDWSM input being analyzed by arrangement 682 is equal to or not equal to the preselected UB comparison word value (UBCWV) of latch means 680 as effected during HC/TE setup mode of a selected TE. Output 740 of UB comparator 730 is also connected to TBCL means 584 and indicates when any current SDW of a SDWSM input being analyzed by arrangement 682 is less than or greater than the preselected UBCWV of latch means 680 as effected by HC 16 during the setup mode. A third trigger control output 744 of TBCL means 584 of TE 18 indicates when low that a SDW of a SDWSM input from computer 12 is acceptable as the result of parameter logic arrangement analysis of TE 18 together with TBCL means analysis thereof. Trigger control output 744 is connected via bus 114 to input 530 of first TB and then to accepted latch means 524 thereof for actuating same to effect release of a SDW as acceptable from the SDWSM input. Trigger output 744 is also connected via bus 114 to a trigger control input 746 including an inverter 747, (all of third TB 84) that is connected to a parameter logic arrangement thereof as hereinafter described. TB clock input 518 of first TB 80 is parallel-connected via I/O bus 114 to TB clock input 750 having an inverter 756 that is associated with a sample qualifier word stream (SQWSM) input of the third TB as also described hereinafter.

THIRD TRIGGER BOARD OF A TRIGGER ELEMENT

Figure 11:
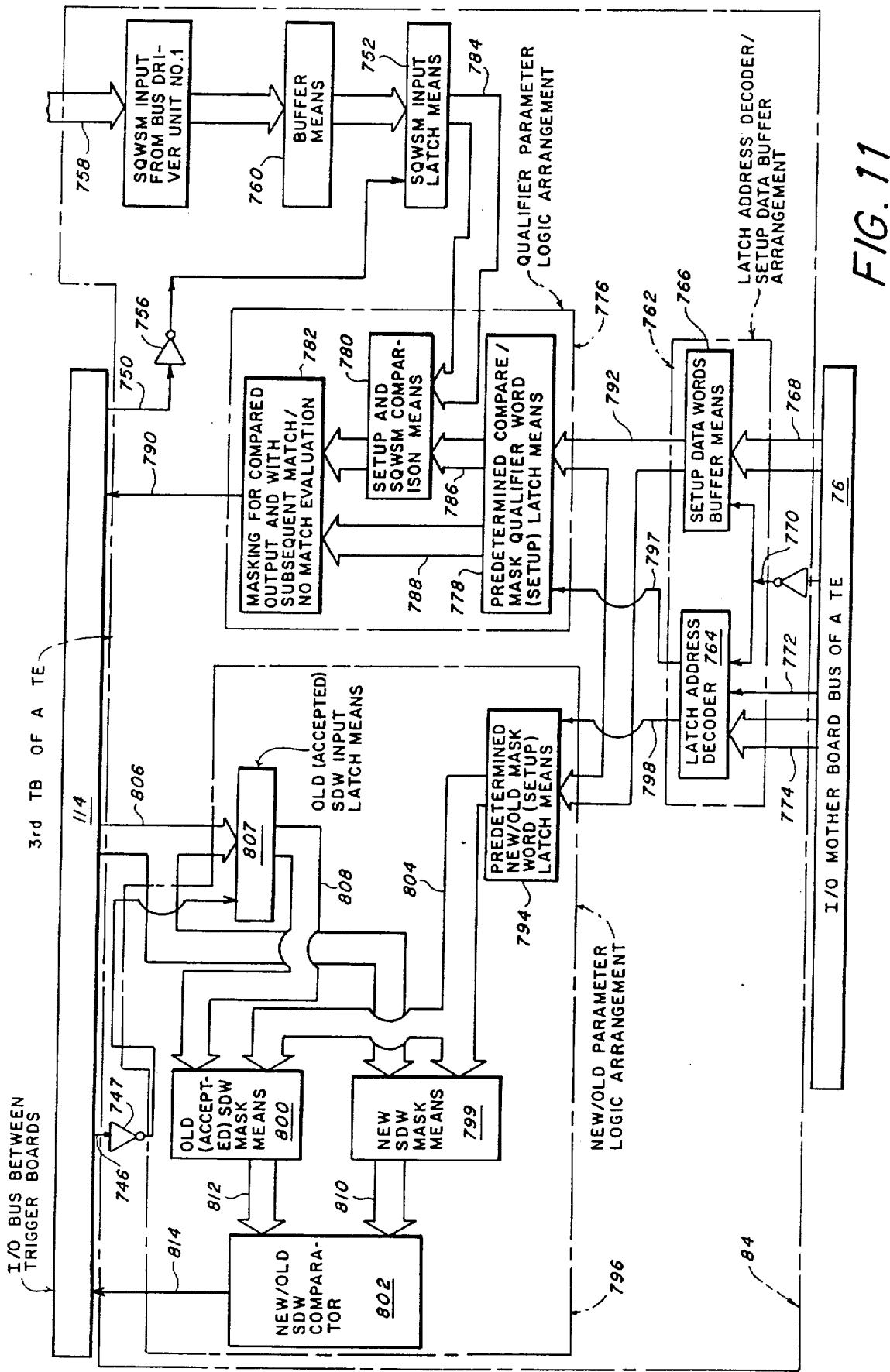
FIG. 11 is a diagrammatic view taken within the bounds of encompassing line 11—11 of FIG. 4 with parts added and illustrates further details of the third TB of a TE.

BDU output bus 56 of MFC 12 (FIG. 1) is also provided with a SQWSM input bus 758 that is provided to third TB 84 and is connected to buffer means 760 as depicted in FIG. 11. An output bus of the buffer means is connected to SQWSM input latch means 752.

A third LAD/SUDWB arrangement 762 is generally made up of a latch address decoder 764 and a setup data words buffer means 766. An HC setup data words input bus 768 is interconnected to buffer means 766 and BBLM 180 of HC 16, etc., via buses 192 and 192 of HC 16; buses 38, 312 and 318; BB means 314; and buses 316, 308 and 76. An enable input 770 which includes an inverter is parallel-connected to decoder 764 and buffer means 766 and is also interconnected via bus 76 to MCB setup output 350. A setup strobe input 772 is connected to decoder 764 and is also interconnected via bus 76 to MCB HC/TE setup strobe output 328. A HC setup address bus portion 774 is connected to decoder 764 and is also interconnected to BBLM 184 of HC 16 via buses 198 and 200 of HC 16, buses 38 and 262; MCB BA means 260; buses 264 and bus 76.

A qualifier parameter logic (QPL) arrangement 776 is generally comprised of a predetermined compare/mask qualifier word latch means 778, setup and SQWSM comparison means 780 and masking means 782 for the compared output of the comparison means. Masking means 782, after masking the compared output, includes match/no match evaluation. An output bus 784 of SQWSM input latch means 752 is connected to comparison means 780. A compare word output bus 786 of latch means 778 is connected to comparison means 780. A mask word output bus 788 of latch means 778 is connected to masking means 782. Output 790 of masking means 782 indicates a match or no match (low or high) of any current SQW of the SQWSM input upon selection of the QPL arrangement during system use as described further hereinafter. This output 790 is connected via bus 114 to TBCL means 584 of second TB 82. It is noted here in response to each pulse of TB clock input 750, SQWSM input latch means provides a SQW of the SQWSM input to bus 784 for affecting analysis by QPL arrangement 776.

A HC/TE setup data words output bus 792 of buffer means 766 of arrangement 762 is parallel-connected to qualifier word latch means 778 of arrangement 776 and to a predetermined new/old mask word latch means 794 of a new/old parameter logic (NOPL) arrangement 796. Separate clock outputs 797 and 798 of decoder 764 are connected to qualifier word latch means 778 of QPL arrangement 776 and new/old mask word latch means 794 of NOPL arrangement 796 respectively.

NOPL arrangement 796 is also generally made up of a new SDW mask means 799, an old (accepted) SDW mask means 800 and a new/old SDW comparator 802. An output bus 804 of mask word latch means 794 is parallel-connected to new SDW mask means 799 and old (accepted) SDW mask means 800. A SDWSM input bus 806 is parallel-connected to old (accepted) SDW input latch means 807 and to new SDW mask means 799. Bus 806 is also connected via bus 114 to SDWSM input bus 522 of first TB 80. An output bus 808 of old (accepted) SDW input latch means 807 is connected to old (accepted) SDW mask means 800. Output buses 810 and 812 of new SDW mask means 799 and old SDW mask means 800 respectively are separately connected to SDW comparator 802. An output 814 of comparator 802 indicates that any current new SDW of a SDWSM input is equal to or not equal to (high or low) the old accepted SDW of input latch means 807 during use of TE 18 of system 10 when the TE is in a TE or HC/TE primary mode. Output 814 is connected via bus 114 to TBCL means 584 of second TB 82. It is noted here that whenever third TB output 744 of TBCL means indicates an accepted SDW, then branch 746 of output 744 actuates latch means to latch-in the accepted SDW therein so that NOPL arrangement will carry out an updated analysis of the SDWSM input relative to each accepted SDW thereof.

FURTHER DETAILS OF CERTAIN COMPONENTS OF THE SECOND TRIGGER BOARD OF A TE

A TE arm input 660 that is connected via bus 76 to TE arm output 337 of TEMSICC logic means 326 (FIG. 7) is connected to the D input of a FF 816 of TBCL means 584 as illustrated in FIG. 12A (sheet 1). TB clock input 599 is connected to a sequencer 818 as depicted in FIG. 12A (sheet 2). A first delayed output 820 of sequencer 818 has series connected thereto an inverter 822. A branch output 824 of inverter 822 is connected to the C input of FF 816 as further shown in FIG. 12A (sheet 1). The R and S inputs of FF 816 are parallel-connected to a positive bias. Q output 826 of FF 816 is connected to an input of AND gate 828. A branch output 830 of output 826 is parallel-connected to an AND gate 832.

DTPL arrangement output 602 of first TB 80 is connected via bus 114 to an input of a NAND gate 834. Similarly, QPL arrangement output 790 of third TB 84 is connected via bus 114 to an input of a NAND gate 836. Enable outputs 838 and 840 of output bus 690 of SUDW latch means 688 are connected to the other inputs of NAND gates 834 and 836 respectively. These gates 834 and 836 are both open-collector type NAND gates. Outputs 842 and 844 of NAND gates 834 and 836 are parallel-interconnected via an interconnecting lead 846. Output 842 is further connected to another input of AND gate 828. Output 848 of AND gate 828 is connected to an input of AND gate 850. Output 844 of NAND gate 836 is further connected to an input latch means 852. A positive bias source 853 is connected to branch 846.

A second delayed output 854 of sequencer 818 (FIG. 12A, sheet 2) has series-connected thereto an inverter 855. Second delayed output 854 is also parallel-interconnected via a series of three branches 856, 858 and 860 to latch means 852, another input of AND gate 850 and a clock input of parameter logic input latch means 862. Another branch 857 of branch 856 is connected to an input latch means 859. LBPL arrangement outputs 580 and 582 of first TB 80 are connected via bus 114 to parameter logic input latch means 862. Similarly, UBPL logic arrangement outputs 740 and 742 of second TB 82 are also connected via bus 114 to latched means 862. Also NOPL arrangement output 814 of third TB 84 is connected via bus 114 to input latch means 862.

ATTCR input 610 via ATTG bus 34 has an inverter 864 series-connected thereto and is connected to an input of a NOR gate 866 as shown in FIG. 12A (sheet 1). Output 863 of gate 866 is connected to the S input of a FF 870. MCB/TE shutdown input 658 of second TB 82 is connected to an input of OR gate 872 as shown in FIG. 12A (sheet 2). Output 874 of gate 872 is connected to the D input of a FF 876. Another input of gate 872 is connected to wrap/stop signal output 712 of TEAGC logic means 656 (FIG. 12B). A second branch 878 of inverted/first delayed output 820 is connected to the C input of FF 876. Branch 878 of first delayed output 820 is also connected to output 710 that is connected to TEAGC logic means 642 (best shown when FIG. 12A (sheet 2) and FIG. 12B are taken together.) TB master clear input 652 of the TEMCL means of second TB82 is connected to the S input of FF 876. Q output 880 of FF 876 is connected to an input of a NOR gate 882. A parallel branch 884 of Q output 880 has an inverter 886 series-connected thereto and is connected to the R input of a FF 886 as depicted in FIG. 12A (sheet 1). A parallel branch 888 of branch 884 is connected to the R input of a FF 890.

A third delayed output 892 of sequencer 818 is connected to an input of a NAND gate 894 as evident in FIG. 12A (sheet 2). A fourth delayed output 896 is connected to another input of NOR gate 882. A parallel branch 898 of output 896 is connected to another input of NAND gate 894. Output 900 of NOR gate 882 is connected to an input of an AND gate 902 as shown in FIG. 12A (sheet 1). An output 904 of input latch means 852 is connected to another input of AND gate 902. Output 906 of gate 902 is connected to the C input of a FF 908. A parallel branch 910 of output 906 is connected to a an input of secondary End Point Mode (EPM) NAND gate 912. A parallel branch 914 of output 904 of latch means 852 has an inverter 916 series-connected thereto and is connected to the control input of a multiplexer 918. Another parallel branch 920 of output 904 of latch means 852 is connected to an input of an AND gate 922.

Another parallel branch 924 of Q output 880 of FF 876 (FIG. 12A, sheet 2) is connected to an input of a NOR gate 926 as depicted in FIG. 12A (sheet 1). Another parallel branch 928 of branch 830 of Q output 826 of FF 816 is connected to an input of a NOR gate 930. Output 932 of gate 930 is connected to another input of NOR gate 926. Output 934 of gate 926 is connected to the S input of FF 908. A parallel branch 936 of branch 924 of Q output 880 of FF 876 is connected to another input of NOR gate 866 as evident in FIG. 12A (sheets 1 and 2).

A valid ATTW input 612 of ATTG bus 34 is connected to an input of an AND gate 938 as shown in FIG. 12A (sheet 2). Another input of gate 938 is connected to a positive bias 940. Output 942 of gate 938 is connected to the D input of a FF 944. A parallel branch 946 of output 942 is connected to an input of an AND gate 948. Output 950 of NAND gate 894 is connected to another input of ANd gate 948. Output 952 of gate 948 is connected to the C input of FF 944. The S input of FF 944 is connected to a positive bias 954. The Q output of FF 944 is connected to input 614 of ATTWSM input latch means 608. A parallel branch 955 of the Q output of FF 944 is connected to a R-C network 953. Output of inverter 956 of the network is series-connected through a resistor and then is parallel-connected to a grounded capacitance 957 and the R input of FF 944.

A fifth delayed output 958 of sequencer 818 is connected to an input of a NOR gate 960 as illustrated in FIG. 12A (sheets 1 and 2). A branch 959 of fifth-delayed output 958 is connected to the C input of FF 886. An output 962 of input latch means 852 has an inverter 964 series-connected thereto and is connected to another input of NOR gate 960. Output 966 of NOR gate 960 is connected to the C input of FF 870. The D input of FF 870 is grounded while its R input is connected to a positive bias 968. Q output 970 of FF 870 is connected to another input of latch means 852. A parallel branch 972 of output 962 of means 852 is connected to an input of a special Forced Storage Mode (FSM) NAND gate 974. A branch 975 of branch 972 is connected to an input of an OR gate 976. Branch 975 is also connected to FSFB input 622 of DFB input latch means 618 (FIG. 12A, sheet 2). Output 978 of gate 976 is connected to an input of a NOR gate 980. Output of gate 980 is connected to TE address control enable input 708 of TEAGC logic means 642 as best shown in FIG. 12B.

A branch 982 of output 900 of NOR gate 882 is connected to another input of FSM NAND gate 974. Branch 984 of branch 982 is connected to an input of a secondary magnitude boundary mode (MBM) NAND gate 986. A branch 988 of branch 984 is connected to an input of a secondary event boundary mode (EBM) NAND gate 990. Sixth delayed output 992 of sequencer 818 has an inverter 994 series-connected thereto and is parallel-connected to two inputs of multiplexer 918 as illustrated in FIG. 12A (sheets 1 and 2).

Q* output of FF 876 is connected to latched master shutdown (LMS) output 601 of TBCL means 584 that is connected via bus 114 to input 520 of AND gate 514 of first TB 80. A positive bias 996 is connected to the R input of FF 876.

As depicted in FIG. 12A (sheet 1) output 998 of AND gate 850 is parallel-connected to another two inputs of multiplexer 918. An output A2 of parameter logic input latch means 862 is connected to an input of a NOR gate A4. Another output A6 of latch means 862 is connected to an input of a NAND gate A8. A third output A10 of latch means 862 is connected to another input of NOR gate A4. A fourth output A12 of latch means 862 is connected to an input of an AND gate A14. A fifth output A16 of latch means 862 is connected to an input of a NAND gate A18.

A third enabling output A20 of output bus 690 of latch means 688 for indicating either outside of the boundary (high) or inside of the boundary (low) during system use is parallel-connected to separate inputs of two exclusive OR (XOR) gates A22 and A24 and is also parallel-connected to the time-sequence selection input of multiplexer 918. A fourth enabling output A26 of output bus 690 of SUDW latch means 688 for indicating either a secondary MBM (high) or secondary EBM (low) during system use is parallel-connected to an input of a NAND gate A30 and another input of MBM NAND gate 986. Output A26 also has an inverter A32 series-connected thereto. Output of inverter A32 is directly connected to an input of a NAND gate A28 and a branch A33 of the inverter output is connected to another input of EMB NAND gate 990. Another branch A31 of the inverter output is connected to another input of NOR gate 930. Thus, the fourth enabling output of latch means 688 is connected to NOR gate 930 and four NAND gates A28, A30, 986 and 990.

A fifth enabling output A34 of latch means 688 for enabling output 814 of NOPL arrangement of third TB 84 is connected to another input of NAND gate A18. A sixth enabling output A36 of SUDW latch means 688 for enabling secondary EPM logic of TBCL means 584 is parallel-interconnected to an input of OR gate 976 via its first branch A38 having an inverter connected thereto, and to a second input of EPM NAND gate 912 via its second branch A40. An input A46 of an exclusive OR (XOR) gate A42 via its branch A44 is parallel-connected to a third input of EPM NAND gate 912 and is also connected to an output of input latch means 859.

An output A50 of multiplexer 918 is connected to another input of NAND gate A8. Output A52 of NAND gate A8 is connected to the S input of FF 890. A second output A54 of multiplexer 918 is connected to another input of AND gate A14. Output A56 of ANd gate A14 is connected to the C input of FF 890. Q output A58 of FF 890 is connected to another input of XOR gate A22. Output A60 of NOR gate A4 is connected to another input of XOR gate A24. Output A62 of NAND gate A18 is connected to another input of AND gate 922.

Output A64 of XOR gate A22 is parallel-interconnected to another input of NAND gate A28 and a third input of EBM NAND gate 990. Output A66 of XOR gate A24 is connected to another input of AND gate 832. Output A68 of NAND gate A28 is parallel-interconnected to the D input of FF 908 and a fourth input of EPM NAND gate 912. Output A70 of NAND A30 has an inverter A72 series-connected thereto. The inverter output is connected to an input of a Forced Data (FD) NAND gate A94. Also, output A70 is parallel-connected to output A68 so as to form an open collector output arrangement between the outputs of NAND gates A28 and A30. A positive bias A69 with resistor is connected to output A68. Output A76 of AND gate 832 is parallel-connected to another input of NAND gate A30 and a third input of MBM NAND gate 986. Output A78 of ANd gate 922 is parallel-interconnected to a fourth input of MBM NAND gate 986, another input of NAND gate A94 and a fourth input of EBM NAND gate 990. The output of FD NAND gate A94 is connected to FDFB input 620 of DFB input latch means 618 as best shown in FIG. 12A (sheets 1 & 2).

Q* output A80 of FF 908 is parallel-connected to an input of latch means 859 and another input of XOR gate A42. Output A81 of XOR gate A42 is connected to another input of NOR gate 980. The Q* output of FF 908 is connected to TB M/S trigger control output 662 which is connected via bus 76 to M/S trigger control input 339 of TEMSICC logic means 326 of MCB 78 (FIGS. 7 and 8C).

Outputs A82, A84, A86 and A88 of EPM, FSM, MBM and EBM NAND gates 912, 974, 986 and 990 are all parallel-interconnected together via their common branch A89 so as to form an open collector arrangement and are further parallel-interconnected to the S input of FF 886 and to an input of OR gate A90. A positive bias A91 with resistor is connected to common branch A89. Output of OR gate A90 is connected to TB trigger control output 744 that is parallel-interconnected via bus 114 to trigger control input 530 of first TB 80 for actuating accepted SDWSM latch means 524 and TB trigger control input 746 for actuating input latch means 807 of NOPL arrangement of third TB 84. The output of NOR gate 980 is connected to TE address control enable input 708 that is connected to TEAGC logic means 656 as depicted in FIGS. 12A (sheet 1) and 12B. TE address control enable input 706 which is connected to the Q output of FF 886 is parallel-connected to control enable input 616 for DFB input latch means 618; TEAGC logic means 656 and TEM latch means 640.

As further illustrated in FIG. 12B, TEM address input latch means 640 is generally made up of a plurality of three chip address means A92, A94 and A96. TE address counter means 720 is generally made up of a series of five counter means A98, A100, A102, A104 and A106. A branch of TE address enable input 706 in being connected to TEAGC logic means 656 is connected to inverter A108. The output of inverter A108 is connected to an input of an OR gate A110. TE address counter enable input 708 from TBCL means 584 of second TB 82 is connected to another input of OR gate A110. Output A112 of gate A110 is connected to an input of an inverter A114. Output A112 is also parallel-connected to output 714 of TEAGC logic means 656 that is connected to an input of buffer means 644 as aforedescribed in FIG. 10. The output of inverter A114 in being connected to TEAGC logic means output 722 is parallel-interconnected to the C input of a FF A118 of the TEAGC logic means and to the C input of each counter means A98, A100, A102, A104 and A106 of the series of five thereof. The D input of FF A118 is connected to output 724 of counter means A106 of TE address counter means 720.

Output 695 of SUDW latch means 694 for effecting selection of wrap or stop (high or low) storage criteria for the TEM of a TE is parallel-connected to separate inputs of a NOR gate A122 and an AND gate A124 as depicted in FIG. 12B. Output bus 696 of SUDW latch means 694 is connected to comparator 698 for TEAGC logic means 642 for effecting selection of the top of memory configuration of the TEM of a TE. This selection, e.g., can be based on the data rate of the SDWSM input from MFC 12 with which a TE is associated. To this end, bus 696 is made up of a series of seven input leads. Each counter means A104 and A106 provides a series of four outputs. Output bus 723 is connected to the three upper outputs of counter means A104 and to all outputs of counter means A106. These outputs of counter means A104 and A106 that form bus 723 are then connected to comparator 698 such that the lowest counting level output of counter means A104 is connected to the lowest input of comparator 698 while the uppermost output of counter means A106 is connected to its associated seventh upper input of comparator 698 as evident in FIG. 12B. Then, depending upon the bit pattern output of the leads of bus 696, the top of memory configuration control of the TEM of a TE is determined. In other words, if the bit pattern of all leads of bus 696 are high then the memory of the TEM is configured at its maximum storage capacity. However, if an lead of the leads of bus 696 are low then the memory of the TEM is configured at less than its maximum storage capacity. An output A128 of comparator 698 is parallel-connected to another input of NOR gate A122 and an input of a NAND gate A130. Q output A126 of FF A118 is connected to the uppermost input of comparator 698. The corresponding uppermost input to comparator 698 is grounded as evident in FIG. 12B. When all leads of bus 696 are high and FF A118 is actuated by TEAGC logic means output 722 to the C input thereof, as the result of a SDW being acceptable for storage by TBCL means 584, a high Q output A126 is provided by FF A118. With Q output A126 being grounded by comparator 698 then its output A128 is low for a given pulse of TB clock input 599. It is noted here until comparator output A128 is low for each pulse of TB clock input 599 (as the result of any lead of bus 696 being set low or as the result of Q output A126 being grounded by comparator 698 as with all leads of bus 696 high) then the logic of gates A122, A124, A130, A136 and A140 all become operative as will become more fully apparent hereinafter.

Output of NOR gate A122 is connected to TE wrap/-stop control input 712 which is connected to another input of OR gate 872 of TBCL means 584 as illustrated in FIGS. 12B and 12A (sheet 2). Output A132 of NAND gate 130 is connected to another input of AND gate A124. Output A134 of AND gate A124 is connected to an input of a NAND gate A136. Another input of gate A136 is connected to output 710 which is connected to inverted/first delayed TB clock output 820 via branch 878 as best shown in FIG. 12A (sheet 2). Output A138 of NAND gate A136 is connected to an input of an AND gate A140. Another input of AND gate A140 is connected to TE clear HC master input 654 that is parallel-interconnected via bus 76 to MCB/TE clear output 344 of TEMCL means 244 of MCB 78 as evident from FIGS. 8B and 12B. Output of AND gate A140 is connected to clear/reset output 726 of TEAGC logic means 656 that is parallel-interconnected to each clear input of all counter means A98, A100, A102, A104 and A106 of the plurality of five counter means of means 720 and the R input of FF A118 of TEAGC logic means 656. As evident from FIGS. 10 and 12B, outputs of all counter means A98, A100, A102, A104 and A106 are part of output bus 721 between counter 720 and TEM address input latch means 640. Similarly, outputs of all latch means A92, A94 and A96 form TEM address output bus 558 that is connected to I/O bus 76.

TE MEMORY

Figure 13:
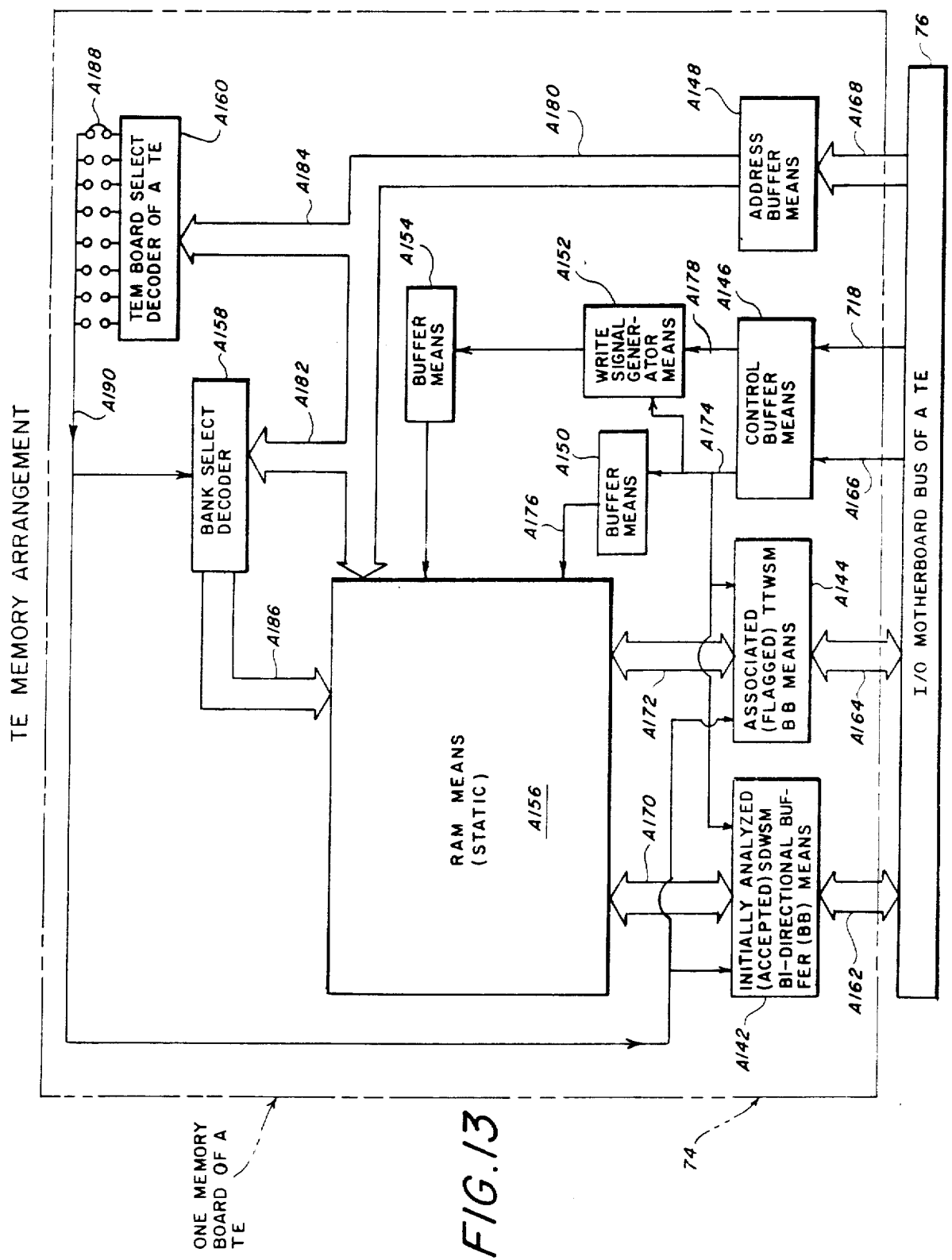
FIG. 13 is a diagrammatic view taken within the bounds of encircling line 13—13 of FIG. 4 with parts added and illustrates details of various components of a TE memory.

As generally illustrated in FIG. 2, memory 72 of TE 18 is generally made up of eight memory boards. Since each memory board is of substantially corresponding construction, description of one TEM board will suffice for all. As best shown in FIG. 13, TEM board 74 is generally comprised of initially analyzed (accepted) SDWSM bidirectional buffer (BB) means A142, associated (flagged) TTWSM BB means A144, control buffer means A146 and address buffer means A148, read control output buffer means A150, write signal generator means A152, write signal buffer means A154, static-type RAM means A156, bank select decoder A158 of TEM board 74 and TEM board select decoder A160 of TE 18. I/O bus A162 interconnects accepted SDWSM BB means A142 to the output means of accepted SDWSM latch means 524 via buses 76, 532 and 534 of first TB 80 when any system TE is in a TE primary mode and one system TE is HC/TE primary mode 1, 4 or 6. I/O bus A164 interconnects via bus 76, TTWSM BB means A144 to both output bus 650 of ATTWSM input latch means 608 of second TB 82 and two flag-bit outputs 646 and 648 of DFB input latch means 618 thereof when any system TE is in a TE primary mode and one system TE of the system is in HC/TE primary mode 6. Read control input A166 via bus 76 interconnects control buffer means A146 to read control output 342 of MCB 78 (FIG. 7) when one system TE is in HC/TE primary mode1. Memory write input 718 via bus 76 interconnects control buffer means A146 to TE memory write output 716 of buffer means 644 of econd TB 82 (FIG. 10) when system 10 is in a TE primary mode (or one system TE is in HC/TE primary mode 4 or 6). Memory write input 718 via bus 76 also interconnects HC trigger output 277 of TEMCL means 244 of MCB 78 when system 10 and one of its TEs is in HC/TE mode 4. When system 10 is in a TE primary mode or in HC/TE primary mode 6, write output 716 of buffer means 644 is parallel-connected via bus 76 to input 717 of FIFO control logic means 270 (see FIG. 8A) as will bemore fully described hereinafter. Similarly, when one TE of system 10 is in HC/TE mode 4, HC trigger output 277 via its branch 276 is connected to FIFO control logic means 270. Input bus A168 interconnects via bus 76 addres buffer means A148 to output bus 558 of TEAGC arrangement 642 of second TB 82 when system 10 and one or more TEs thereof are in a TE primary mode or one of its TEs is in HC/TE primary mode 6. It is further noted here when one of the TEs of system 10 is in HC/TE mode 4, the memory means of SKPC system 160 of HC 16 provides a stored output of accepted SDWSM and associated (flagged) TTWSM from BBLMs 180 and 182 of HC 16 to BB means A142 and A144 of TEM board 74 where the outputs of BBLM 180 and 182 are interconnected via buses 190, 194, 38, 312, and 318; MCB BBM 314; and buses 316, 308, 76, A162 and A164. At the same time, SKPC system 160 of HC 16 provides a TEM address from BBLM 184 to TEM board buffer means A148 via buses 198, 200, 38, and 262; MCB BA means 260; and buses 264, 76 and A168. Similarly, when one of the TEs of system 10 is in HC/TE primary mode 1 for reading memory means A156 of TEM board 74, BBLM 184 of HC 16 provides a TEM address output (that stems from SKPC system 160) to TEM board buffer means A148 as aforediscussed herein.

I/O buses A170 and A172 separately interconnect accepted SDWSM BB means A142 and TTWSM BB means A144 to memory means A156. Read control output A174 of buffer means A146 is parallel-interconnected to both BB means A142 and A144, buffer means A150 and write output signal generator means A152. Output A176 of buffer means A150 is connected to memory means A156.

Memory write output A178 of buffer means A146 is connected to memory means A156 and has series-connected thereto write signal generator means A152 and buffer means A154. An output bus A180 of TEM address buffer means A148 is connected to memory means A156 and is also provided with bus branch portions A182 and A184 parallel-connected to both bank select decoder A158 of TEM board 74 and TEM board select decoder A160 of TE 18. An output bus A186 of decoder A158 is connected to memory means A156. One of the eight output terminals of TEM board select decoder A160 is connected via a jumper element A188 to an output A190. Output A190 is further parllel-interconnected to bank decoder A158 of TEM board 74 and both BB means A142 and A144 thereof. It is noted here that a jumper element (not shown) for each TEM board of TE 18 would be connected to a different pair of terminals of decoder A160 so that each TEM board of all eight TEM boards of TE 18 is properly connected as the result of an address via address input branch bus A184 that stems from the TEM address of TEAGC arrangement 642 or SKPC system 160 of HC 16 during storage or reading of an accepted SDWSM, etc., upon use of system 10 as will become more fully apparent hereinafter.

HC MASTER CLEARING OF DARP SYSTEM (INITIALIZATION)

Prior to operating any TE of system 10, in a given mode thereof, such as defined in FIGS. 14-15, each selected TE of the system is cleared. For the purpose of illustration, actuation of the master clear signal between high and low as effected by the user of HC 16 will be described with reference to TE 18, but it will apply to all system TEs.

HC Master clear (HCMC) output 259 (normally high) of MCB buffer means 246 goes low when the user of HC 16 actuates the keyboard of SKPC system 160 thereof. To this end, appropriate signals are transmitted by SKPC system 160 to logic means 164 via bus 172 and control output 174 and to latch means 168 via bus 178 and buffer means 179. When latch means 168 receives a clock signal from logic means output 228, a HCMC output is provided by latch means 168 via bus 212, buffer means 188, buses 216, 38 and 248; and MCB buffer means 246 to MC output 259 of MCB 78 as best shown in FIG. 8B.

When any TE is selected by HC 16, TE select decoder output 252 is low thereby providing a low input to OR gate 424. At the same time, whe HCMC output 259 goes low, then OR gate output 474 will always be low for any selected TE of system 10.

Low output 474 is directed via buffer means 440, MCB output 344 and bus 76 to input 652 of TBCL means 584 and the S input of FF 876 as best shown in FIG. 12A (sheet 2). With the HCMC being low and being directed to the S input of FF 876 of second TB 82 it provides Q and Q* outputs 880 and 601 high and low when the C input of FF 876 receives first delayed output 878 from sequencer 818 relative to a pulse of TB clock input 599. Because of Q output 880 being high, branch 924 is high to NOR gate 926, but its output 934 is low to the S input of FF 908 thereby setting its Q and Q* outputs 662 and A80 high and low. At the same time, branch 936 of Q output 880 being high, output 863 of NOR gate 866 is low thereby the S input of FF 870 sets Q output 970 high. Q output 880 of FF 876 in also being connected to NOR gate 882 causes its output 900 to go low thereby resulting in the C input of FF 908 to be low; one input of EBM, MBM and FSM NAND gates 990, 986 and 974 to be low as well as one input (via AND gate output branch 910) of EPM NAND gate 912 to be low (thereby causing the S input of FF 886 to be high). At the same time inverted branch output 884 (low) of Q output 880 causes the R input of FF 886 to be low and thus reset same so its Q is now low. Similarly, branch 888 of branch 884 causes the R input of FF 890 to be low and thus reset same so its Q is now low. Moreover, Q output 601 (low) of FF 876 is connected via bus 114, and input 520 to NAND gate 514 of first TB 80. With the other input to AND gate 514 being high output 596 of AND gate 514 is low thereby preventing incrementing of device 570 of DTPL arrangement 572 of first TB 80.

With further reference to FIG. 8B, output 474 of OR gate 424 that stems from HCMC input 259 (now low) is also low to AND gate 476 and to branch 278. Branch 278 (low) is connected to the R input of FF 358 of FIFO control logic means 270 thereby resetting same as best shown in FIG. 8A. The output of inverter 394 in being connected at its input to branch 392 of branch 278 is high. Branch 393 (high) of the output of inverter 394 is connected to an input of NOR gate 362 thereby results in the gate output being low to the R input of FF 356 so as to reset same with the Q and Q* outputs low and high respectively when NOR gate input 374 is low. Output 282 (low) of AND gate 476 is connected to the RS (reset) and R inputs of FIFO means 396 and FF 398 respectively all of MCB FIFO arrangement means 272 thereby resetting same (such that the Q output of FF 398 goes low).

As shown in FIGS. 8B, 10 and 12B, with input 654 being interconnected via bus 76 to MCB/TE output 344 of HCMC input259, output 726 (low) ofAND gate A140 is connected to the reset inputs of all TE address counter means A98 to A106 and the R input of FF A118 when an input (high or low) is received NAND gate output A138.

In view of the foregoing, it is evident that HCMC input when low from HC 16 to any selected TE of system 10 resets appropriate elements of FIFO arrangement means 272, FIFO control logic means 270, TEAGC arrangement 642 and TBCL means 584 of the second TB of any selected TE.

SHUTDOWN OF DARP SYSTEM

During use of system 10 all TEs may be simultaneously started or shutdown by operator control from HC 16 of the HC master shutdown (HCMS) signal. Accordingly, SKPC system 160 of HC 16 is interconnected via bus 178, latch means 168 (timely actuated by output 228 of logic means 164), bus 212, buffer means 167 and buses 216 and 38 to MCB buffer means 246 with HCMS output 261. HCMS output 261 is connected to an input of TEMCL means OR gate 468; with its output 470 being connected to an input of TBCL means OR gate 872 via buffer means 472, TEMCL means output 348, bus 76 and TBCL means input 658 to OR gate 872. Output 874 of the OR gate is connected to the D input of FF 876 (FIG. 12A, sheet 2).

When HCMS output 261 is high as result of operator selection of a key on the keyboard of SKPC system 160 of HC 16, then the D input of FF 876 is high and TE 18 including all system TEs are shut down. To this end, when the C input of FF 876 of TE 18, e.g., receives a first-delayed inverted output 878 of sequencer 818 during a given pulse of TB clock input 599, then Q output 880 to an input of NOR gate 882 is high. When the fourth delayed output 896 of sequencer 818 is received by NOR gate 882 during the given pulse of TB clock input 599 then NOR gate output 900 is low to the C input of FF 908, to an input (via branch 910) of EPM NAND gate 912, to an input (via branch 982) of FSM NAND gate 974, to an input (via branch 984) of MBM NAND gate 986 and to an input (via branch 988) of EBM NAND gate 990. With at least one input of all NAND gates 912, 974, 986 and 990 low, then open collector input A89 to the S input of FF 886 is high.

At the same time inverted output 884 that stems from the Q output of FF 876 is also low to the R input of FF 886 thereby resetting its Q output low and shutting down (via Q output 706 low) TEAGC arrangement 642 and TEM 72. Also, branch 888 of output 884 in being connected to the R input of FF 890 resets its Q output A58 low. Since all TEs have the same configuration as TE 18, when HCMS output 261 is high as effected by the operator, then all TEs of system 10 are simultaneously shut down regardless of their operative mode. Moreover, as long as HCMS output 261 is high, output 900 of NOR gate 882 remains low to shut down TE 18 or any system TE.

On the other hand, and assuming that HCMS output 261 is low, each TE of system 10 can be automatically shut down by its own TEMCL means 244 during mode 0, 1, 4, 5 or 7. It is noted here that even though a TE in mode 1 or 4 is shut down by TEMCL means 244, its TEM is linked to HC 16 as hereinafter further described such that stored data is read therefrom or accepted SDWSM and associated TTWSM from the memory of SKPC system 160 is stored therein. As best illustrated in FIG. 8B, TEMCL means OR gate 468 is provided with an input from TE mode output 466 that is controlled by NOR gate 436 and inputs from bits 0 and 5 of MCWL means 240. As evident from the bit pattern table of FIG. 15, output 466 is high for mode 0, 1, 4, 5 or 7. Consequently, OR gate output 470 is high and FF 876 of TBCL means 584 will shut down the TBCL means operation of TEM 72 of TE 18. Thus, it is evident for any system TE in mode 0, 1, 4, 5 or 7 its TBCL means will be shut down such as, e.g., TBCL means 584 of TE 18.

Similarly, depending on the storage configuration selected for TEM 72 of TE 18 as controlled by TEAGC arrangement 642, namely via its SUDW latch means 694, comparator 698 as aforedescribed, TEM 72 may be in a warp (continuous) mode or a stop (something equal to or not equal to full capacity) as best shown in FIGS. 12B and 13. Assuming that TEM 72 is in a stop mode, when TEAGC logic means output 712 is high as an input to OR gate 872 as best illustrated in FIG. 12A (sheet 2). With an input to OR gate 872 high while other OR gate input 685 is low its output 874 is high and FF 876 will in effect shutdown TBCL means 584 of TE or any system TE having a similar TEM stop configuration.

In view of the foregoing, it is evident that all system TEs are shut down regardless of operative mode when HCMS output 261 is high. If HCMS output 261 is low, then all system TEs are simultaneously started in their preselected mode as previously effected by the operator of HC 16. it is noted here that when a system TE has been selected for an operative mode for evaluating MFC 12, a TE is also set up prior to operating in its selected mode as hereinafter described.

A TE QUIESCENT MODE

As further illustrated in FIG. 15 when TE 18 of system 10 is in its quiescent (Q) mode 0 (or 5) (inactive or standby) as effected by HC 16 it has the following characteristics. Output mode pattern signals of MCB MCWL means 240 stem from PROM 238 and its output bus 239 as effected by mode output bus 210 of HC 16, latch means 168 thereof, etc. During Q mode, setup enable output 350 of TEMCL means 244 is low and stems from output 434 of MCWL means 240 and buffer means 440 as best shown in FIG. 8B. With setup enable output 350 low, all set up enable inputs 550, 676 and 770 of first, second and third TBs 80, 82 and 84 are low thereby preventing the latching in or buffering of any HC setup data. With the low of setup data enable output 434 of MCWL means 240 and the inverted low (high) of tri-state control output 446 thereof both being connected as separate inputs of NOR gate 436, its output provides a low to tri-state control output 340 of MCB 78 via buffer means 440. With this low output 340 being connected via bus 76 to input 622 of NAND gate 626 of second TB 82, output 630 of the gate is high via its branches 632, 634, 636 and 638 thereby preventing outputs from TEM address input latch means 640, buffer means 644, flagged double-bit input latch means 618 and ATTWSM input latch means 608 to bus 76. Similarly, inverter 540 of first TB 80 is connected via its input 538 and bus 76 to the low of tri-state control output 340 so that its high output prevents an output of any accepted SDW of SDWSM input from latch means 524 of first TB 80 to bus 76. With low output 462 of NOR gate 436 being inverted by inverter 464, its high output 466 to OR gate 468 shuts down all SDWSM input data processing of the TBCL means of TE 18 in mode Q.

With reference to PROM bits 1 and 2 of FIG. 15 for Q mode of TE 18 both MCB address tri-state control output 266 and MCB address direction control output 268 (because of inverter 440) are high, then MCB BA means 260 (FIG. 7) prevents the passage of any TEM address from HC 16 to bus 76. OR gate 442 in receiving the high/low outputs of MCB address tri-state control output 266 of MCWL means 240 and MCB address direction control 440 thereof provides a high output 304 to the enable input of tri-statable driver 302 (FIG. 8A). With its enable input high, output 306 of driver 302 provides no TE address update signal to HC 16 via bus 38 and HC input 224.

With both outputs 320 and 322 of MCWL means 240 as 3rd and 4th output bits of PROM 238 being high as TEMCL means outputs for data tri-state and data direction control of MCB BBM 314, no data passes between BBM 314 and buses 38 and 76 as best shown in FIG. 7.

Also TEMCL means memory read-out control output 342 (because of output 452 of MCWL means 240 being low) is low to read control input A166 of TEM board 74 (FIG. 13). Even though read control input is low, no address comes to TEM board input bus A168 because TEM latch address means 640 of TEAGC arrangement 642 and MCB BA means 260 are both tri-stated during the TE Q mode.

Further, as depicted in FIG. 8B, high output 454 of latch means 240 (7th bit output of PROM 238) is across both inputs of OR gate 456 thereby providing a high output 458 to an input of OR gate 460 and forcing its output 280 to be high. With output 458 high, its branch output 294 is high thereby preventing enabling of MCB FIFO buffer means 274 and also preventing enabling of both FIFO status signal drivers 290 and 292. At the same time, high output 280 of OR gate 460 to the R input of FIFO RAM means 396 prevents it from outputting any accepted SDWSM and associated TTWSM data stored therein. But high output 280 to the C input of FF 398 clocks its D input 410. However, Q output 288 of FF 398 is blocked by disabled driver 292.

Output 434 (low) of MCWL means 240 is also connected to inverter 435, its TEMCL means output 330 (high) being connected to the setup enable input of MCB decoder 324 for TEMSICC logic means 326 as depicted in FIG. 8C. This disables the decoder. High output 437 of inverter to the input of NOR gate 438 holds low the setup strobe output 328 and such is held low regardless of the state of the other input to NOR gate 438. Therefore, HC setup strobe pulses out of OR gate 422 cannot pass through NOR gate 438 to become MCB setup strobe 328. Since TEMCL means setup enable output 350 is high as inverted to inputs 550, 676 and 770 as aforedescribed, no decoder nor buffer means is actuated of arrangements 542, 668 and 762. Also setup strobe TEMCL means branch output 327 is high and is connected to decoder 324 for TEMSICC logic means 326. This high of output 327 keeps decoder 324 inactive and prevents any high output 334 to the C inputs of FFs 478 and 480 of TEMSICC logic means 326.

Although not heretofore mentioned, in order to switch any TE of system 10 to its Q the operator of HC 16 provides from its SKPC system 160 an encoded select signal for the TE selected via bus 178 to latch means 168 of arrangement 165 as shown in FIG. 6. Logic means 164 in order that the encoded select signal is transmitted by bus 178 provides appropriate signals via outputs 181 and 183 to buffer means 179. At the same time, latch means 168 receives the encoded select signal from SKPC system 160; and logic means 164 provides clock output 228 for latching-in same so that the encoded select signal via buses 212, 216 and 38 will appear in all TE select decoders of system TEs, but only decoder 236 of TE 18 will respond to encoded output signal as it appears on buses 248 and 250 so that jumped output 257 of decoder 236 goes low so as to enable PROM 238 and PR/MS logic means 242 as best shown in FIG. 8B.

At the same time the HC via bus 178 provides an encoded Q mode select signal for the TE to be selected to latch means 168. The latch means in response to output 228 provides a latched-out encoded mode select signal via buses 210, 214, 38, 248 and 254 to PROM 238 of selected TE 18. Logic means 164 provides delayed mode-strobe output 229 to buffer means 167, buses 216 and 248 and then to HC mode strobe output 256 of MCB 78. Output 256 is connected to NOR gate 412 so that output 432 in response to output 426 of NOR gate 412 and output of inverter 416 latches in the Q mode selected output of PROM 238.

Whether it is the Q mode as aforedescribed, any primary or setup mode of any system TE, an operative TE mode is effected in similar fashion once any system TE is first selected by the HC prior to directing a mode select signal thereto such as Q, any primary or setup mode therefor.

PRESELECTABLE SETUP DATA PARAMETER FUNCTIONS AND STORAGE CRITERIA

With reference to FIG. 16, of the table illustrates a list of eight different parameter functions. The first parameter function pertains to the control word for the D inputs of the FFs of TEMSICC logic means 326 (best shown in FIG. 8C). Both LB and UB compare/mask values of the second and third parameter functions can be any series of zeros (0s) and ones (1s) and don't cares (Xs) (not shown). These values are selected by the DARP user of SKPC system 160 of HC 16 which in turn transmits these values to a selected TE of the DARP system in HC/TE setup (S) mode 7 as more fully set forth below. Another parameter, new/old compare/mask value depends on one or more ones (1s) to be effective while the bit locations not designated ones (1s) are designated with an "X" meaning don't care or of no consequence. A DTPL arrangement parameter value depends on designating a binary word that represents a number of data sample clock pulses where such designated word causes a delay before any storage of any SDW of a SDWSM input by a previously setup TE of the DARP system. A sixth parameter, qualifier compare/mask value also depends on a selection of any series of zeros (0s), ones (1s), and don't cares (Xs). Thus, if only one bit of the qualifier compare/mask value is selected to be a specific value (1 or 0) at a given bit location as shown in FIG. 16 then this bit will govern during operation of QPL arrangement 776 of 3rd TB 84 during system use. As to seventh parameter function for SUDW latch means 694 for TEAGC arrangement 642 of 2nd TB 82, reference is made to FIGS. 10 and 12B. This function is for selecting TEM W/S configuration of the TEM of a selected TE in S mode. A 8-bit parameter word of all 1s means full capacity of the TEM is being used in the warp mode. On the other hand, if bits 0–6 are a series of 0s and 1s as shown, then less than full capacity of the TEM is being used. When bit 7 of the parameter word is zero, then the TEM of a TE will stop storing data when a zero occurs among bits 0–6, or will stop storing at full capacity of the TEM if bits 0–6 are all 1s by virtue of Q output A126 of FF A118 as aforedescribed in FIG. 12B.

As to the eighth parameter function, it pertains to TBCL means storage criteria. Even though an 8-bit word, bits 5 and 6 are don't cares (Xs) because there are only six selective storage criteria for TBCL means 584 in its preferred embodiment. As to the active 6-bit locations, bits 0–4 and 7 of the parameter word for the eighth parameter function for SUDW latch means 688 of second TB 82 (FIG. 10), they are further defined at the bottom of the FIG. 16 table.

As specified in the table, if inside is selected, bit 0 is high, and if magnitude mode is selected, bit 1 is high, too. In this situation, TBCL means 584 functions to accept SDWs of SDWSM input of a TE in modes 2, 3 or 6 when any SDW falls between the upper/lower boundary limits as established by the upper/lower boundary comparison word values (BCWVs) of parameter functions as specified in item 2 and 3 of the FIG. 16 table. On the other hand, if outside is selected, bit 0 is low; with magnitude mode still being selected, bit 1 remains high. Then, when any SDW of a SDWSM input of a TE falls outside of the upper/lower (U/L) BCWV of parameter functions as specified in items 2 and 3, it is stored in the TEM of the TE.

On the other hand, if the event mode is enabled and with inside the upper/lower boundary limits also being enabled, then such storage criteria actually specifies when any SDW of a SDWSM input of a TE in mode 2, 3 or 6 is (accepted) stored in the TEM as occurring between the time of the first event, (preselected lower BCWV of item 2 of the FIG. 16 table) and the time of the second event (preselected upper BCWV of item 3 of the FIG. 16 table). However, if the event mode is still enabled but with outside the boundary limits being enabled, then the storage criteria specifies that when any SDW of a SDWSM input in being analyzed by a TE in mode 2, 3 or 6 occurs between the time of the second event (preselected upper BCWV of item 3 of the table) and the time of the first event (preselected lower BCWV of item 2 of the table) it is (accepted) stored in the TEM of the TE.

If the next criteria new/old is enabled, bit 2 is high then parameter four of the table will function in relation to the value shown in FIG. 16, e.g., during use of a TE setup in this fashion for rejecting or accepting one or more analyzed SDWs of a SDWSM input from an output of MFC 12 being evaluated by DARP system 10.

If the QPL arrangement is enabled along with a preselected QPL compare/mask word value being such as FIG. 16, e.g., and any SQW of the SQWSM input of third TB fails to match the QPL preset word value, then the TBCL means is effected to reject a SDW associated with the SQW for a given pulse of the TB clock input as hereinafter further described.

As to the fifth criteria, if the DTPL arrangement is enabled, then the preselected delay timer parameter word such as listed in the table will be effective in delaying storage of otherwise acceptable one or more SDWs of a SDWSM input until the present conditions of the 1s of enabled delay timer parameter word value of FIG. 16, e.g., are met by DTPL arrangement 572 of 1st TB BO during a TE primary mode or HC/TE primary mode 6 of a setup TE during system use.

End point mode (EPM) criteria when enabled (high) for a TE in mode 2, 3 or 6 permits data storage to be reduced in such a way as to store only data representing the start and stop of certain data sequences rather than all data sequences between the start and stop thereof. Since each stored data sequence or event is a timing event; such event can be analyzed in evaluating the SDWSM from MFC 12. Thus, even though not all data sequences are taken during EPM such does not adversely affect a SDWSM input from MFC 12 being evaluated. In view of the foregoing, it should be evident that by tailoring the parameter word values for each TE of system 10 along with selecting one or more storage criteria (all during the S mode) for each TE thereof the DARP system can be readily adapted to meet the expected outputs of MFC 12 as well as the demands of the user in planning to effectively evaluate MFC 12 by use of improved system 10 of the invention.

HC/TE SETUP (S) MODE 7: HC WRITES ITS SETUP DATA

WORD/ADDRESS TO VARIOUS (LAD/SUDB) LATCH/DECODER ARRANGEMENT MEANS OF A SELECTED TE

During HC/TE S mode, HC is directly linked to a selected Te until it is set up in accordance with the operator requirements for evaluating an SDWSM input or the like from MFC 12. When the system is in S mode, SKPC system 160 in response to operator selection provides a series of nine (9) setup words and series of nine different HC setup addresses where each address is associated with its respective setup word. Prior to HC 16 transmitting a setup word and associated address, the HC selects a TE including its mode as aforedescribed.

Reference is now made to FIG. 15 with HC 16 now in HC/TE setup (S) mode seven, bit output 434 of MCB latch means 240 is high (see FIG. 8B). Accordingly, TEMCL means setup enable output 350 is high. With output 350 high and transmitted via bus 76, inverted setup enable input 550 is low to decoder 544 and buffer means 546 of first LAD/SUDWB arrangement 542 (FIG. 9) for enabling same, inverted setup enable input 676 is low to decoder 670 and buffer means 666 of second LAD/SUDWB arrangement 668 (FIG. 10) for enabling same, and inverter setup enable input 770 is low to decoder 764 and buffer means 766 of third LAD/SUDWDB of arrangement 762 (FIG. 11) for also enabling same. Similarly, the inverted setup enable output 437 (low) is connected to setup enable input 330 of MCB decoder 324 for TE MSICC logic means 326 (as depicted in FIG. 8C).

At the same time HC setup data word (HCSUDW) strobe output 257 in being pulsed low is connected to an input of TEMCL means NOR gate 438 via OR gate output 450 and its branch 451. With inverted output 437 pulsed low as an input to NOR gate 438, TEMCL means setup strobe output 328 (pulsed high) of gate 438 is parallel-connected via bus 76 to input 554 of decoder 544 (FIG. 9), input 672 of decoder 670 (FIG. 10) and input 772 of decoder 764 (FIG. 11). These pulsed inputs become the latch pulse outputs of each decoder when properly addressed. Similarly, the setup strobe output 328 (pulsed high) of NOR gate 438 via its branch 327 is connected to decoder 432 for TEMSICC logic means 326, see FIG. 8C.

As further illustrated in FIG. 8B, bit one tri-state control output 266 of MCWL means 240 is low to MCB BA means 260 thereby permitting means 260 (FIG. 7) to be directionally controlled. With bit two output 440 (high) of MCWL means 240 but inverted by inverter 444, TEMCL means directional control output 268 to MCB address means 260 is a low thereby permitting HC setup address via buses 198, 38, 262, 264 and 76 to a TE in S mode. Bit outputs 3 and 4 of latch means 240 are both low; thus data tri-state and directional control outputs 320 and 322 are both low to MCB BBM 314 thereby a setup data word is permitted to pass from HC 16 via buses 190, 38, 312 and 318 to MCB BBM 314 and then to buses 316, 308 and 76 of a TE in S mode. Bit five output 446 of MCWL means 240 is high, then inverter 447 provides a low input to NOR gate 436. Since bit zero output 434 provides a high to NOR gate 436, the low output of gate 436 is buffered to TEMCL means tri-state output 340. Low tri-state output 340 is connected via bus 76 to NAND gate 626 of second TB 82 (FIG. 10) thereby preventing any output from means 524, 640, 608, 618 and 644 as aforedescribed. Since TEMCL OR gate 468 receives a high via input 466, the output of OR gate 468 is high and thus the TBCL means of a TE in S mode is shutdown and no SDWSM input is being processed.

Bit six output 452 is high, buffered TEMCL means read control output 342 is high then read control input A166 of TEM board 74 (FIG. 13) via bus 76 is also high. With buffered output A174 high then a high on buffer means input A176 prevents output of any stored timetagged accepted SDWs of an analyzed SDWSM input in memory means A156. Such output of stored TTWSM and accepted SDWSM from TEM 72 to bus 76 would interfere with the setup data words from HC 16 sharing the same portions of bus 76. Also high output A174 is being parallel-connected to BB means A142 and A144 permits the input of setup data to RAM means A156 of TEM board 74. Also at the same time HC setup address will appear during S mode on TEM address bus A180 for selecting a TEM board of TEM 72, but will not interfere with subsequent use of TEM 72 of TE 18 when it is in a HC/TE or TE primary mode. Since bit output 446 of MCWL means is high, tri-statable driver 448 prevents the HC SUDW strobe output 257 from becoming TEMCL means HC trigger TEM write pulses to TEM 72.

Since bit outputs one and two of MCWL means 240 are low and high to TEMCL means OR gate 442, its high output 304 prevents driver 302 from being enabled as depicted in FIGS. 8A and 8B. Thus no TE address update output 300 is directed from FF 350 of FIFO means 270 to HC 16 via bus 38. With bit seven output 454 of MCWL means 240 being high to both inputs of TEMCL means OR gate 456, OR gate output 456 provides a high to the input of TEMCL means OR gate 460. With high output 458 parallel-connected via output 294 to enable inputs of driver 290 aand 292 for MCB FIFO status signals and MCB buffer means 274, no FIGO error status output 298, FIFO read status 296, or FIFO bus output 312 is permitted to HC 16 via bus 38. Regardless of whether output 450 of TEMCL means OR gate 422 is high or low as another input to OR gate 460, high output 280 of OR gate 460 (as the result of its input 458 being high) is parallel-connected to the R input of FIFO means 396 of FIFO arrangement means 272 and the C input of FF 398 thereof. With means 274 and driver 282 being disabled, high output 280 has no effect during the S mode of a TE.

With the logic of TEMCL means 244 of MCB 78 aforedescribed for the S mode of a selected TE, the transfer of SUDWs and their associated setup address from HC 16 will now be described. Accordingly, the operator of HC 16, after selecting a LBCWV (32 bits) such as shown in FIG. 16 as a SUDW for latch means 562 of LBPL arrangement 528 of FIG. 9, strikes the keyboard of SKPC system 160 such that this SUDW along with its setup address is transmitted via bus 178 in response to control outputs 181 and 183 of logic means 164 to BBLM 180s and 184 respectively. At the same time the HC via logic means 164 provides appropriate encoded directional, enable and clock-in outputs via buses 222, 220 and 218 respectively such that the preselected LBCWV SUDW and its associated address are latched-in BBLMs 180 and 184 respectively so as to provide a latched output of SUDW and associated address to appear on bus 76 via buses 190, 38, 312, 318, 316 and 308 as to SUDW; and buses 198, 38, 262 and 264 as to its address. Although the LBCWV SUDW and its address appear at all arrangements 542, 668 and 762 as well as at the D inputs of the FFs of TEMSICC logic means 326 and address decoder 324 therefor, see FIGS. 9–11 and 8C; decoder 544 of arrangement 542 only responds to the address for the LBCWV SUDW. After the address and SUDW have been latched out by the HC to the selected TE in S mode, the HC via its logic means 164 provides a HC SUDW strobe output 257 to TEMCL means 244 so that a setup strobe and enable inputs appear at all arrangements of FIGS. 9–11 and the TEMSI logic arrangement of FIG. 8C. However, because of address decoder 544 only being responsive, it provides a clock output 588 to latch means 562 of LBPL arrangement 528 so that the LBCWV SUDW is latched in to means 562 from bus 76 via buses 534, 548 and 568.

In similar fashion a selected SUDW for LB mask value (LBMV) which is made up of a series of Xs and Is, but not shown in the FIG. 16 table, is latched out by HC 16 with its associated address to bus 76 of the selected TE. Again, after HC SUDW strobe 257 by the HC, decoder 544 responds to the LBMV address and provides a clock output 590 to latch mens 560 of arrangement 528 so that selected LBMV SUDW is latched therein. Further, the operator then selects a delay time-value (DTV) SUDW such as shown in the FIG. 16 table. Again, the HC latches out the selected DTV SUDW with its associated address to bus 76 of the selected TE. Decoder 544 again responds to the DTV SUDW address, fter HC SUDW strobe 257, and provides clock output 586 to counter device 570 of DTPL means 572 so as to latch-in selected DTV SUDW. At the same time clock output 586 is parallel-connected via branch 598 and (inverter 599) inverted (high) to the C input of FF 594. Accordingly, Q output 602, with the S and D input tied high, is high to TBCL means 584. Also in the S mode, the TE is shut down and AND gate 514 of 1st TB 80 receives input 520 (low) via FF 876 and its Q* output 601 and bus 76, see FIG. 12A (sheet 2). Thus, output 596 of gate 514 is low and device 570 is not enabled.

Similarly, as to the second arrangement 668 of FIG. 10, the operator selects an UBCWV (32 bits) such as shown in the FIG. 16 table as a SUDW. Then the HC latches to bus 76 the UBCWV SUDW and its address. Decoder 670 of arrangement 668 responds to this address and clock output 702 latches-in the UBCWV SUDW in latch means 680 of UBPL arrangement 682. Further, a selected UBMV SUDW and its address then appears on bus 76, decoder 670 responds to its address and the HC SUDW strobe 257 and provides a clock output 700 so that UBMV SUDW is latched in latch means 684 of UBPL arrangement 682.

Next the operator selects both TEM value (TEMV) SUDW [eight (8) bits] and TEM storage criteria operation value (TEMSCOV) SUDW (8 bits) such as shown in items 7 and 8 in the FIG. 16 table respectively. In this case the HC transmits a 16-bit combined SUDW made up of the aforementioned 8-bit SUDWs and latches it out (the combined SUDW) with its address to bus 76. Decoder 670 in response to the address of the combined SUDW and the HC SUDW strobe 257 provides clock output 704 to both SUDW latch means 688 and 694 for TBCL means 584 and TEAGC arrangement 642. Accordingly, TEMSCOV SUDW is directed via bus portion 686 to means 688 (latched therein); and TEMV SUDW is directed via bus portion 692 to means 684 and also latched therein.

Similarly, the HC operator selects a new/old mask value (NOMV) SUDW (32 bits) such as shown in item 4 of the FIG. 16 table. Decoder 764 in response to the address for NOMV SUDW for one HC 16 and HC SUDW strobe 257 provides a clock output 798 to latch means 794 of NOPL arrangement 796 so that the NOMV SUDW is latched therein. Then the operator selects a qualifier compare/mask value (QCMV) SUDW (16 bits) such as shown in item 6 of the FIG. 16 table. Decoder 764 in response to the HC setup address associated with QCMV SUDW and the HC SUDW strobe 257 provides clock output 797 to latch means 778 of QPL arrangement 776 so as to latch therein the selected QCMV SUDW.

Next the HC operator selects an M, S or I configuration value (MSICV) SUDW (2 bits) such as shown in item 1 of the FIG. 16 table. Then decoder 324 of TEMSI logic arrangement (see FIG. 8C) in response to the HC setup address associated with the MSICV SUDW as they appear on bus 76 together with HC SUDW strobe 257 provides clock output 334 to the C input of FFs 478 and 480 of TEMSICC logic means 326 so that separate bits of MSICV SUDW are directed to the D inputs of FFs 478 and 480 and then latched in to the Q output of FF 478 and the Q and Q* outputs of FF 480 as the result of the clock output from decoder 324.

In view of the foregoing, it should now be evident that each system TE can be individually set up as selected by the HC and then provided with a different set of SUDW values for the various logic arrangements of the TE. Such different sets normally being biased on the expected input from MFC 12 being evaluated by a TE connected thereto. Once one or more TEs are set up of system 10 as desired, then the setup TEs are ready for either any primary mode or Q mode as desired by the HC operator.

TE PRIMARY MODE NO. 2

In this mode, as specified in FIG. 15, zero bit output 434 of latch means 240 is low. Thus buffered TEMCL means setup enable output 350 is low thereby providing inverted high inputs to decoder 544 and buffer means 546 of first LAD/SUDWB arrangement 542, via input 550 and bus 76 (FIG. 9), to decoder 670 and buffer means 666 via input 676 and bus 76 to second LAD/SUDWB arrangement 668 (FIG. 10); and to decoder 764 and buffer means 766 of third LAD/SUDB arrangement 762 via bis 76 and input 770 (FIG. 11). At the same time zero bit low output 434 is parallel-connected to inverter 435. High output 437 from inverter 435 is connected to setup enable that is connected to decoder 324 for TEMSICC logic means 326, see FIG. 8C. This disables all four setup decoders 324, 544, 670 and 764 and setup buffers 546, 666 and 766. With high output from inverter 435 also as input to NOR gate 438 and regardless of whether output of TEMCL means OR gate 422 is high or low, low output of NOR gate 438 as MCB setup strobe output 328 is parallel-connected via bis 76 to input 554 and decoder 544 (FIG. 9), input 672 and decoder 670 (FIG. 10) and input 774 and decoder 764 (FIG. 11). MCB setup data strobe low output 328 is also parallel-connected via its branch 327 to decoder 324 for TEMSICC logic means 326 of MCB 78 (FIG. 8C). Thus all setup strobe pulses are disabled. With all inverted setup enable inputs high to decoders 324, 544, 670 and 764 and buffer means 546, 566 and 766, and with all setup strobes low to these decoders, no data (parameters) are latched-in to TEMSICC logic means 326 of MCB 78 (FIG. 7); latch means 560 and 562 of arrangement 538 and device 570 of arrangement 572 (FIG. 9); 680 and 684 of arrangement 682, 688 for TBCL means 584 and 694 for TEAGC arrangement 642 (FIG. 10; and 794 of arrangement 796 and 778 of arrangement 776 (FIG. 11).

With bits one and two outputs 266 and 440 of MCWL means 240 high and low respectively, low output 440 is inverted by inverter 444 to become a high MCB address direction control output 268 to MCB BA means 260. Since MCB address tri-state control output 266 is high, then BA means 260 will not permit TEM address between buses 38 and 76 during mode 2 of a TE of system 10 as shown in FIG. 7. With bits one and two being high and low, output of TEMCL means OR gate 442 is high thereby disabling via output 304 driver 302 of TE address update output 300 of FIFO control logic means 270. Also with with bit three and four outputs 320 and 322 of MCWL means 240 both high and representing MCB data tri-state and direction controls respectively, MCB BBM 314 prevents the passage of any data between buses 38 and 76 during mode 2 of a system TE.

Bit five output 446 of latch means 240 is high but is inverted low by inverter 447 prior to being a low input to TEMCL means NOR gate 436. Since bit zero output 434 is also low and another input to NOR gate 436, the high output of NOR gate 436 is buffered MCB tri-state high output 340 that is connected via bus 76 to input 622 and NAND gate 626 (FIG. 10). Then the low output of the NAND gate 626 is parallel-interconnected to latch means 524, 642, 618 and 608 and buffer means 644 thereby permitting one or more accepted SDWs via buses 532, 534 and 76, a TEM address output of TEAGC arrangement 642 via output bus 558 and bus 76, flag bit outputs 646 and 648 via bus 76, major TTWSM via output bus 650 and bus 76, and write command signal output 716 via bus 76 to input 718 of TEM board 74 and input 276, via bus 76, of FIFO logic means 270.

At the same time bit six output 452 of latch means 240 is high and provides buffered high TEMCL means read control output 342 that is connected via bus 76 to input A176 of TEM memory board 74 (FIG. 13). Buffered high output A174 of high read control input A166 is parallel-interconnected to BB means A142 and A144 and write signal generator means A152. By reason of this high output A174, BB means A142 and A144 permit one or more associated TTWs of TTWSM and accepted SDWs of an analyzed SDWSM input to RAM means A156 for storage upon write pulse output from write signal generator A152 to RAM means A156 via buffer means A154 together with TEM address from TEAGC arrangement 642 via buses 76, A168, A180, etc.

Since bit output seven is high for this mode 2 and is the same for previously discussed Q and S modes zero (five) and seven, no further discussion will be made here. Thus FIFO means status outputs 296 and 298 are disabled as well as buffer means 274.

ANALYSIS OF SAMPLE DATA STREAM INPUT FOR ACCEPTANCE/REJECTION DURING MODE 2 WITH PRESELECTED MAGNITUDE BOUNDARY MODE (MBM) BEING INSIDE THE PRESELECTED LOWER/UPPER (L/U) BOUNDARY LIMITS, ETC., BUT NO END POINT MODE (EPM)

In this mode, for a TE, the TEMSCOV SUDW of the FIG. 16 table (item B) for SUDW latch means 688 is selected as follows: inside the upper/lower boundary limits enabled, new/old parameter enabled, delay timer parameter enabled, MBM selected, qualifier parameter enabled and EPM not enabled. Also, TEMCV SUDW is selected for wrap of TEM of the selected TE. MSICV SUDW is selected so that the selected TE functions as independent of other system TEs. Prior to operation of TE in this mode HCMC is momentarily low as effected by HC 16 so as to clear counters, reset latches, etc., of the TE selected. Subsequently, the selected setup parameters and storage criteria (secondary modes for TBCL means 584) are all latched in as aforedescribed by HC 16 in mode 7 for a TE.

While in this mode one SDW input for initial analysis is inputted by latch means 508 of first TB 80 upon the occurrence of an inverted pulse of sample clock input 510 thereof as illustrated in FIG. 9. Accordingly, the SDW input is fed to LBPL arrangement 528 via bus 522 to SDW LB mask means 526 thereof, to UBPL arrangement 682 via buses 522, 114 and 736 to SDW UB mask means 728 thereof (FIG. 10) and to NOPL arrangement 796 via buses 522, 114 and 806 to both old (accepted) SDW input latch means 748 and new SDW mask means 799 (FIG. 11). Similarly, as also depicted in FIG. 11, SQWSM input 758 is directed to latch means 758 and this means in response to each inverted pulse of TB clock input 750 (that stems from TB clock output 518 of FIG. 9) provides a SQW via bus 784 to comparison means 780 of QPL arrangement 776.

With the SDWSM input being fed to mask means 526 of LBPL arrangement 528 together with previously setup compare and mask word latch means 562 and 560 respectively thereof, the LBPL arrangement functions to first mask at means 526 SDWSM input 522 with mask setup means output 574 and then to compare outputs 576 and 578 at comparator 564. The mask means only allows passage of those bits of any SDW of the SDWSM input that were designated as 1s and 0s in the selected LB mask value SUDW as evident from item 2 of the FIG. 16 table. On the other hand, those bits of the LB mask value SUDW designated as Xs they are passed out on bus 578 as zeros (0s). Output 580 of comparator 564 indicates whether the current SDW of the SDWSM input being initially analyzed for acceptance/rejection is below (high) or not below (low) the preset LBCWV for the LBPL arrangement as selected by the user of HC 16 during the S mode of TE 18. Output 582 of comparator 564 indicates if the current SDW is equal to (high) or not equal to (low) the preselected LBCWV. These outputs 580 and 582 are then directed via bus 114 to input latch means 862 of TBCL means 584 of second TB 82 as best shown in FIG. 12A (sheet 1).

Similarly, with the SDWSM input being also fed to mask means 728 of UBPL arrangement 682 together with its previously setup compare and mask word latch means 680 and 684, the parameter arrangement functions to first mask at means 728 each current SDW of the SDWSM input with setup mask latch means output 734 and then to compare masked output 738 and predetermined compare word value output 732 at comparator 732. Output 740 of comparator 730 indicates whether the preset UBCWV as selected by the user of HC 16 during the S mode is less than (a high) or not less than (a low) the SDW of the SDWSM input being initially analyzed by UBPL arrangement 682 as generally illustrated in FIG. 10. Output 742 of comparator 730 further indicates whether or not the preset UBCWV is equal to (a high) or not equal to (a low) the SDW of the SDWSM input currently being analyzed. These outputs 740 and 742 are then directed to input latch means 862 of TBCL means 584 as best shown in FIG. 12A (sheet 1).

As generally illustrated in FIG. 11 NOPL arrangement 796 functions to latch-in at input latch means 807 an accepted SDW of the SDWSM input as analyzed by TBCL means 584 and as effected by TB trigger output 744 of TBCL means 584 via bus 114, input 746 and inverter 747 during a pulse of TB clock input 599 to the TBCL means. The arrangement also functions to input the current SDW of the SDWSM input of bus 806 to new SDW mask means 799 while it further functions to input via bus 808 the last latched/accepted SDW of means 748 to old SDW mask means 800. Moreover, the arrangement also simultaneously directs via bus 804 the predetermined NOMV SUDW (such as indicated by the FIG. 16 table, item 4) of latch means 794 to both mask mens 798 and 800. Masked outputs 810 and 812 of these means 799 and 800 are then compared by comparator 802 which indicates via output 814 and bus 114 to input latch means 862 of TBCL means 584 (FIG. 12A, sheet 1) whether the current SDW of the SDWSM input doesn't equal the last accepted (old) SDW of means 807 (a low) or the current SDW of the SDWSM input does equal (a high) the last (old) accepted SDW of means 807. Thus redundant data samples are detected, or redundant sets of bits within the data samples are detected and are rejected by TBCL means 584 as will be more fully apparent hereinafter.

As generally illustrated, QPL arrangement 776 directs via bus 784 SQWSM input to comparison (comparator) means 780 and also directs predetermined QCMV SUDW outputs 786 and 788 of latch means 778 to comparator and masking means 780 and 782 respectively. The masking means then provides an output 790 which indicates whether the current sample qualifier word (SQW) of the SQWSM input matches (a low) the QCMV as preselected by the user of HC 16 during the S mode for the selected TE and as indicated, e.g., by the FIG. 16 table, item 6. And if any SQW does not match the setup QCMV parameter then output 790 of means 782 is a high. This output is then connected via bus 114 to an input of NAND gate 836 of TBCL means 584 as best shown in FIG. 12A (sheet 1).

Delay counter device 570 of DTPL arrangement 572 not only receives a preset DTV SUDW (such as shown in the FIG. 16 table, item 5) via bus 568 and control output 586 of first LAD/SUDW arrangement 542 but also receives counter clock input from AND gate 514 as generally illustrated in FIG. 9. With first TB 80 receiving SDWSM input along with its inverted sample clock, the sample clock input to the AND gate is high. Since both inputs 658 and 712 to TBCL means OR gate 872 are currently both low, the OR gate output to the D input of FF 876 is also low as illustrated in FIG. 12A (sheet 2). When sequencer 818 receives via bus 114 and its input 599, a TB clock output 518 (FIG. 9), first sequenced and inverted output 820 of the sequencer to the C input of FF 806 causes its Q* output 601 and bus 114 to provide a high to another input 512 of AND gate 514 as best shown in FIG. 9. With both inputs to the AND gate being high its high output 596 to device 570 permits it to count in relation to the setup parameter previously received. It is noted here when the AND gate output is low such as when Q* output is low then device 570 is not counting and also provides a high to the R input of FF 594. When the preselected DTV SUDW is clocked in to device 570 via bus 568 when output 586 is low from decoder 544, then inverted branch 598 of this output provides a high to the C input of FF 594. With the C input high then Q output 602 is high to NAND gate 834 to TBCL means 584. When device 570 has reached the proper count in relation to the predetermined DTV SUDW then the output of device 570 is low to the R input of FF 594 thereby resetting the Q output thereof low. With Q output 602 low to NAND gate 834 the DTPL arrangement preset parameter condition has been met. On the other hand, when the preset parameter condition of device 570 has not been met (the delay is not complete), Q output 602 of the FF is high to input 602 of NAND gate 834. In view of the foregoing, it should now be evident that if any SDW of the SDWSM input on bus 522 or any SQW of the SQWSM input on bus 784 fail to meet the parameter requirements of either arrangements 528, 682 and 796 or arrangement 776, then any SDW of SDWSM input on bus 522 or any SQW of the SQWSM input on bus 784 will not be accepted by TBCL means 584 of system 10 as will become more fully apparent below. Further, regardless of the preset parameters for arrangements 528, 682, 776 and 796, these arrangements will not govern until DTPL arrangement 572 indicates that its preset parameter condition has been met. Further, the details of the logic for each of these arrangements 572, 528, 682, 776 and 796 is believed to be within the skill of any qualified electronic data processing system designer.

To assist in understanding the operation of TBCL means 584 when SUDW means 688 has been preset for MBM (inside) for analyzing any SDW of the SDWSM input on bus 522 reference is now made to the exemplary table of FIG. 17A for an operative mode of the TBCL means. Moreover, upper and lower boundaries comparison word values are assumed to be preset during the S mode of TE 18 at 20 and 10 respectively. At the same time, qualifier match and delay counter outputs 790 and 602 to NAND gates 836 and 834 are both low. Enable outputs 838 and 840 of latch means 688 are both high to gates 834 and 836. It is noted here that open collector output 846 of these gates is tied high and with high inputs 838 and 840 and low inputs 602 and 790 to gates 834 and 836, the open collector output remains high. Output 844 in being connected to open collector 846 provides a high input to latch means 852. The latch means in response to second inverted/sequenced output 854 and its branch 856 provides output 904 (high) to an input of AND gate 902. Fourth sequenced output 896 and Q output 880 of FF 876 (now low with no HC MS signal and no TEM board stop signal (high) via input 712) are both low. Thus, output 900 of TBCL means NOR gate 882 is pulsed high as another input to AND gate 902. Output 906 of gate 902 provides the C input of FF 908. With the C input high, Q* output A180 is low. Whether output A180 is high or low as hereinafter described it influences TBCL means TE address output 708 as high or low for controlling TEAGC logic means 656.

Now with further reference to FIG. 17A, a first given value of a SDW of SDWSM input on bus 522 is five (5). Since the lower boundary is ten and greater than the SDW value then the output of NOR gate A4 (in response to high input A10 and low input A2) is low to an input of XOR gate A24. Since output A20 of latch means 688 is low for inside the boundaries, it provides a low to another input of XOR gate A24.

Output A26 of latch means 688 has been preset high when the MBM is selected. Because of inverter A32 providing a low output (with input A26 high) and with output A76 of AND gate 832 low as result of low inputs A20 and A60 to XOR gate A24, separate inputs to NAND gates A28 and A30 are low, thus providing a high output to open collector output A68 of these NAND gates. It is noted here, it is assumed that output 814 of NOPL arrangement 796 (FIG. 11) is low, that latch means output A34 is high, thus output A62 of NAND gate A18 is high to an input of AND gate 922 with branch output 920 of latch means 852 high then output of AND gate 922 is high. With open collector output A68 high, NAND gate A94 receives a low input from inverter A72 but a high input from output A78 of AND gate 922 thereby providing a high FDFB output 620 that is directed to DFB input latch means 618 FIG. 12A (sheet 2). Also low output A76 of AND gate 832 (because its input A66 is low) causes the output of MBM NAND gate 986 to go high to open collector output A89. The D input of FF 908 receives open collector output A68 (high) of NAND gates A28 and A30. Fourth sequences NOR gate 882 is input to AND gate 902. With output 904 of latch means 852 to other input of AND gate 902 being high, then the C input (high) with the D input (high) drives Q* output A80 of FF 908 (low). During HCMS, Q output 880 of FF 876 is high to NOR gate 926 when first sequenced/inverted output 878 occurs to the C input of FF 876 as initial condition for MBM of the FIG. 17A table. The output of NOR gate 930 is low because its input 928 from Q output of FF 816 is high but its other input A31 is low (with latch means output A26 high to inverter A32). Because of the high and low inputs to NOR gate 926, the S input of FF 908 is low, thereby rendering Q* output A80 to be low and output A46 of latch means 859 to be low when it is driven by second sequenced/inverted output 854 via its branches 856 and 857. Then with both inputs of XOR gate A42 being low, NOR gate 980 receives a low input.

During MBM (inside) for TE mode 2 and with the SDW value being five, inverted ATTCR and latched master shutdown inputs 610 and 936 both being low to NOR gate 866, the S input of FF 870 is high thereby keeping Q output 970 of the FF low as the result of the C input of NOR gate 960 remaining low until either the next inverted ATTCR high input to NOR gate 866 or the next latched master shutdown high input thereto. However, since this SDW is the first sample acquired since latched HCMS Q output 880 and branch 936 were high, the Q output of FF 870 is still high when the second sequenced output 854 via branch 856 latches the output 970 into latch means 852 yielding a high on output 962. The Q output 970 of FF 870 goes low when fifth squenced output 958 via NOR gate 960 clocks the low D input of FF 870. Therefore with Q output 970 high, output 962 (and its branches 972) of latch means 852 remain high to FSM NAND gate 974. This causes FSM NAND gate 974 to output a low to open collector A89. EBM NAND gate 990 and MBM NAND gate 986 both provide high outputs and since output A36 (and its branch A40) of latch means 688 is low, EPM NAND gate 912 also provides a high output. Consequently, with open collector output A89 being low, the S input of FF 886 is pulsed low; thus Q output 706 thereof is pulsed high. The high on input 975 to OR gate 976 causes output 978 to be high. NOR gate 980 provides a low output 708. High pulse output 706 is inverted by inverter A108 of TEAGC logic means 656 as best shown in FIG. 12B. With both inputs (inverted input 706 and input 708, to OR gate A110 being low, output A112 is pulsed low. Inverted high output of inverter A114 increments address counter means 720 at the end of the pulse. Before counter means 720 are incremented, the current address output bus 721 thereof is latched-in to TEM address input latch means 640 at the beginning of high pulse 706. Thus, as indicated by the FIG. 17A table, DARP system 10 accepts the first SDW. SDWSM input on bus 522, even though it has a value of five during TE mode 2 of TE 18 with preselected secondary MBM being inside with preset boundary conditions of ten and twenty (10 and 20). Since FDFB output 620 is high and since FSFB output 622 is also high (because latch means output 962 and branch 972 are interconnected to FSFB output 622), then latch means 618 in response to strobe 616 provides high flag bit outputs 646 and 648 for FSFB and FDFB inputs. These flagged outputs then are associated with a major TTW output of latch means 608 so as to form a flagged TTW with the accepted SDW as they all appear on bus 76 for storage in TEM 72, TEM board 74 thereof. Trigger output 744 of OR gate A90 causes, via inverted trigger input 530 to latch means 524, to provide an accepted SDW of 5 on bus 76. At the same time trigger output 744 via inverted input 746 to latch means 806 of NOPL arrangement 796 causes the latch means to accept the next SDW of 5 therefor. The low output of OR gate A110 is connected via branch 714, buffer means 644, output 716 to write input 718 of TEM board 74 so that accepted SDW of 5 and its associated (flagged) TTW are stored in RAM means A156, as best shown in FIG. 12A (sheets 1 and 2), FIG. 12B and FIG. 13.

Also, ATTG 14 provides a valid ATTW input 612 (high) to TBCL means 584. When fourth-delayed output 896 (via branch 898) of sequencer 818 is inputted to NAND gate 894 during a pulse of TB clock input 599 then high output 950 of the NAND gate provides output 952 of AND gate 948 to the C input of FF 944 thereby resulting in clocking output 942 (high) of AND gate 938 via the D input of FF 944 of Q output 614 thereof and ATTWSM latch means 608. As the result of this Q output 614, a major TTW is provided by latch means on bus 650 for each pulsed Q output 614. Thus, when accepted SDW of 5 appears on bus 76 it is also provided with its associated (flagged) TTW as shown in the FIG. 17A table. It is noted here prior to the next valid ATTW output to AND gate 938 time delay circuit 953 causes the R input of FF to go low thereby resetting Q output 614 low and resetting latch means 608 prior to another output of a major TTW onto bus 76 via bus 650 when the next valid ATTW signal is received from ATTG 14 during system use.

On the other hand, during the MBM of the FIG. 17A table, when a SDW has a value of 10, then the preset LBCWV equals the SDW value, and output 582 of LBPL arrangement 528 of first TB 80 is high to latch means 862 while its other output 580 is low thereto.

Since output 740 of UBPL arrangement 682 of second TB 82 is also low, both inputs A2 and A10 to NOR gate A4 are now low, thereby providing a high input to XOR gate A24. With other input A20 being low to XOR gate A24, it provides a high output to AND gate 832. Since other input 830 of AND gate 832 is also high, output of AND gate 832 is high to an input of NAND gate A30. Since latch means output A26 to the NAND gate is also high, then the output of the NAND gate is low thereby causing open collector output A68 to go low. When open collector output goes low, inverted input A70 to NAND gate A94 goes high thereby causing FDFB output 620 to go low (zero value) as indicated by the FIG. 17A table when SDW value is ten.

MBM NAND gate 986 receives all high inputs from outputs A26, A76, A78 and 984 thereby providing a low output to open collector A89. With the open collector low to the S input of FF 886, Q output 706 is pulsed high. Also fifth sequenced output 958 (low) via its branch 959 in being connected to the C input of FF 886 serves to control the duration of Q output 706 (high) by making it go low at a predetermined time. At the same time with open collector A68 low and when fourth sequenced AND gate output 906 (high) occurs, Q* output A80 is clocked high thereby causing XOR gate A42 to have output A81 (high) to NOR gate 980 causing TE address enable output 708 (low) to TEAGC logic means 656. The high pulse 706 inverted by A108 is a low pulse input to OR gate A110. Low output 714 to OR gate A110 causes buffer means 644 to provide a TE memory write signal output 716 onto bus 76 for input 718 to buffer means A4B of TEM board 74 of TE memory 72 as shown in FIGS. 12B and 13. At the same time, low trigger output 744 causes an inverted trigger input 530 to first TB latch means 524 for output of accepted SDW (with value of ten) to bus 76 (FIG. 9) and an inverted trigger input 746 to third TB latch means 748 for establishing another accepted SDW of 10 for continued updating and operation of NOPL arrangement 796 (FIG. 11) in relation to subsequent SDWs of the SDWSM input on bus 522 (FIG. 9). As aforementioned, latch means 608 provides a TTW for SDW of 10, but this time the two flag bits are zero from latch means 618 since no FDFB nor FSFB events (high) occurred in TBCL means when SDW is 10 as confirmed by the FIG. 17A table.

The associated (flagged) TTW and accepted SDW of 10 on bus 76 are then directed to BB means A142 and A144 of TEM board 74 of TEM 72 of TE 18 as depicted in FIG. 13. Since read control input A166 is high from TEMCL means 244, buffer means output A174 is high thereby permitting associated TTW and accepted SDWs to be stored in RAM means A156. Also, TEM address generated by TEAGC arrangement 642 for the accepted SDW appears on bus 76 and is directed via input bus A168 to buffer means A148. The TEM address is assumed to be such that TEM board 74 is selected and its bank havng RAM means A156 is also selected thereby storing the properly addressed TTW and accepted SDW of 10 when the write signal generator means output to the RAM means responds to TE memory write signal output 716 from second TB 82 via TEM board input 718. As indicated by the FIG. 17A table, the next SDW value is eleven (11) but at this time ATTCR occurs from ATTG 14. Accordingly, ATTG 14 provides inverted input 610 (high) to TBCL means NOR gate 866. Output 868 (low) of the NOR gate sets the S input low of FF 870 high thereby causing latch means 852 to receive a high input 970 and to provide a high output 962 when second inverted/sequenced output 854 (via its branch 856) occurs. This output 962 (high) then is inputted via its branches 972 and 975 to FSM NAND gate 974 and OR gate 976. Since fourth sequenced NORed output 900 is high, FSM NAND gate 974 provides a low to open collector A89. Similarly, since inverted EPM output A36 of latch means 688 is also a high input to OR gate 976, output 978 of the OR gate is high to NOR gate 980.

Because SDW value is 11 and inside the boundaries of FIG. 17A table selected conditions, open collector A68 will go low as it did for the prior SDW value, 10. Consequently, the inputs to XOR gate A42 are both high. With NOR gate 980 receiving high and low inputs from OR and XOR gates 976 and A42 respectively, output 708 of gate 980 is low. Since open collector A89 is also low, Q output 706 of FF 886 is high thereby causing TEAGC arrangement to provide a TE address on bus 76 and buffer means 644 to provide a low output to write input 718 of TEM 72 so as to cause the associated TTW with its FSFB (high) and accepted SDW (11) to be properly addressed and stored in the RAM means of TEM board 74 thereof. Also, because outputs 706 and 708 of TBCL means are high and low respectively for SDW of 11, TEAGC counter means 720 are incremented so as to provide the next counting level of address of TEAGC latch means 640 via bus 721. Then when the next high pulse 706 occurs the next counting level of address will be latched-in before counting means 720 counts again when output 722 (high) is received. It is noted here if the DTV and QCMV for SUDWs of the FIG. 16 table have not been met during any SDW such as a SDW of 10 as given in the FIG. 17A table, then output 844 would be low and latched output 904 would be low. Therefore MBM NAND gate would make open collector A89 high and SDW of 10 would not be stored in TEM 72. Similarly, if NOPL arrangement output 814 is high and output A34 of latch means 688 is high, then output A62 of NAND gate A18 is low and open collector A89 is high, thus no SDW of 10 is stored in TEM 72. Moreover, if DTV or QCMV is not met for a SDW or even NOPL arrangement output 814 is high for the SDW; but ATTCR occurs from ATTG 14 then output of FSM NAND gate 974 is low, open collector A89 low and the SDW is stored. Thus, TBCL means 584 as designed is highly versatile in accepting/rejecting any SDW and can be readily tailored for accepting/rejecting any SDW in relation to a SDWSM input of MFC 12 being evaluated. In view of the foregoing, the remaining SDW values and their results as indicated in the FIG. 17A table should be self-explanatory.

CONTINUED OPERATION OF TE MODE 2 BUT WITH MBM BEING OUTSIDE THE PRESELECTED L/U BOUNDARY LIMITS BUT WITH NO EPM

Accordingly, TE 18 of system 10 is now preset during mode seven by user of HC 16 such that latch means decoder output A20 (FIG. 12A, sheet 1) is now high but all other present conditions for TE 18 thereof are the same. Hence, when HC 16 reselects TE 18 back to mode 2, reference is now made to the FIG. 17B table for MBM (outside). As with the FIG. 17A table, the first SDW of 5 has been forced stored even though otherwise acceptable by TBCL means MBM NAND gate output A86 being low. Assume that the SDW value being analyzed by the system is 25. In this situation the output of NOR gate A4 provides a low input to XOR gate A24 but latch means output A20 is high thereto. Then output of AND gate 832 provides a high output to MBM NAND gate 986. With all other inputs to gate 986 being high, open collector A89 goes low thereby resulting in Q output 706 of FF 886 being pulsed high.

At the same time, both inputs to NAND gate A30 are high because latch means output A26 is high and the output of AND gate 832 is high. Consequently, open collector A68 goes low and Q output A80 of FF 908 goes when NORed fourth sequenced output (high) is received by AND gate 902 prior to actuating the C input of FF 908 high. Since output A46 of latch means 859 is low due to prior SDW of 15 being inside the preset boundaries of FIG. 17B table, then XOR gate A42 provides a high to NOR gate 980. With the other input of NOR gate 980 being also a high from OR gate 976 (EPM enable output A36 from latch means 688 is low) then output 708 of NOR gate 980 is low. Since outputs 706 and 616 are high while output 708 is low, RAM means A136 of TE memory board 74 stores properly addressed and SDW of value 25 and its associated TTW with its flag bits zero as confirmed by the FIG. 17B table.

At the next SDW at 10 of the FIG. 17B table, it is not only equal to the preset lower boundary but also ATTCR output (low) from ATTG 14 occurs. Accordingly, as with MBM (inside) of mode 2, FSM NAND gate 974 causes open collector A89 to go low thereby resulting in storage of properly addressed and correlated TTWSM/accepted SDW of 10 in RAM means A106 of TEM board 74 along with its associated TTW where the FSFB of the associated TTW is high as indicated by the one value in the FIG. 17B table.

CONTINUED OPERATION OF TE MODE 2 WITH EVENT BM BEING INSIDE THE L/U BOUNDARY LIMITS BUT WITH NO EPM

With system TE 18 preset for event inside, then the user of HC 16 places TE 18 again in mode 2. Assuming that SDW is 10, then is equals the lower boundary. Accordingly, second sequenced/inverted output 854 via and gate output 998 causes multiplexer output A50 to be high with output A20 low of latch means 688. In other words, output A20 in being connected to multiplexer 918 functions as a time sequence selection enable for the multiplexer. When output A20 is low then outputs A50 and A54 are timely sequenced in subsequent order. With SDW at 10, output A6 of latch means 862 is high thereby resulting in output A52 of NAND gate A8 being low so that the S input of FF 890 sets Q output A58 high to the input of XOR gate A22. With the output of XOR gate A22 high and with inverted output A33 high for low output A26 of latch means 688, all inputs to EBM NAND gate 990 are high thereby causing open collector A89 to go low as the result of the low output of gate 990. At the same time with high inputs to NAND gate A28, open collector A68 goes low, thereby causing the Q* output of FF 908 to go high when the output of AND gate 902 goes high to the C input thereof. Since latch means output A46 is low because prior SDW value was 5 for the FIG. 17C table, then XOR gate A42 provides a high input to NOR gate 980. Since the other input from OR gate 976 to NOR gate 980 is also high (because inverted EPM output A36 via branch A38 is high), output 708 of gate 980 is low. Since outputs 706 and 708 are high and low as aforedescribed, RAM means A156 TEM board 74 receives a properly addressed SDW at 10 with its associated TTW including flag bits as confirmed by the FIG. 17C table.

With SDW at 8 in the FIG. 17C table, output A58 of FF 890 remains high. Consequently the output of XOR gate A22 is high and all inputs to EBM NAND gate 990 are high thereby causing open collector A89 to go low. Because NAND gate A28 receives high inputs, open collector A68 goes low and Q* output A80 of FF 908 goes high. Since both inputs to XOR gate A42 are high, NOR gate 980 receives a low input from the XOR gate but a high input from OR gate 976 (because EPM output A36 via its inverted branch A38 is high). Consequently, NOR gate 980 provides a pulsed low output 708 while a pulsed high output 706 occurs at FF 886. Also trigger output 744 actuates latch means 524 and 806 as aforedescribed. FIFO logic means 270 is actuated by the TEM write signal 716 via bus 76 as aforedescribed. Accordingly, a TTW/SDW at 8 is properly stored/addressed in RAM means A156 of TEM board 74 as indicated by the FIG. 17C table. One of the reasons SDW at 8 though outside the boundary limits (not inside) was accepted, is that Q output A58 of FF 890 stayed high as the result of prior SDW at 10 which equaled the preset LBCWV SUDW of 10 of LBPL arrangement 528 of FIG. 9. All subsequent SDWs will be accepted by TBCL means 584 of TE 18 until a SDW equals the preset UBCWV SUDW of 20.

On the other hand, when SDW is 20, then it equals the preset UBWV and multiplexer AND gate output A56 is high thereby causing the C input of FF 890 to clock Q output A58 low (with the D input grounded). Note that the C input is pulsed by the inverted sixth sequence output 992 of sequencer 818 during a given pulse of TB clock input 599. EBM NAND gate input 988 was previously pulsed by the fourth sequence output 896 of sequencer 818 during the given pulse. Therefore, both open collectors A68 and A89 would be low and the addressed storage would occur in TEM board 74 as aforedescribed and confirmed by the table of FIG. 17C. Because Q output A58 is low for an immediate subsequent pulse to the given pulse, when the next SDW is acquired that SDW and all subsequent SDWs will be rejected until a SDW equals the preset LBCWV of 10. The remainder of the FIG. 17C table is believed to be self-explanatory.

CONTINUED OPERATION OF TE MODE 2 WITH EVENT BM BEING OUTISE THE L/U BOUNDARY LIMITS BUT WITH NO EPM

During this mode, enable output A20 is high so that outputs A50 and A54 of multiplexer 918 are timely reversed such that output A54 now occurs first, while output A50 occurs second during each pulse of TB clock input 599 of system 10. When inverted Q output 884 of FF 876 is high as the result of the HCMS being removed by the user of HC 16 so that the D input of FF 876 is low, Q output A58 of FF 890 is low, by reason of the HCMS previously being high. A high on input A20 of XOR A22 causes output A64 to be high. This causes open collector outputs A68 and A89 to be low for every acquired SDW until a SDW equals the preset LBCWV of 10 is detected and its corresponding SQW is accepted. Once such a SDW is detected, only a SDW equal to the preset UBCWV of 20 will re-initiate data acceptance for storage in the TEM. With SDW at 20 as indicated in the FIG. 17D table, output A56 of AND gate A14 goes high therefore the Q output of FF 890

(with the D input grounded) stays low (since it was low as effected by HCMS released when SDW of 5) to an input of XOR gate A22. With output A20 high, output of XOR gate A22 is high thereby resulting in all inputs to EBM NAND gate 990 being high so that open collector A89 goes low. Note that the inverted second sequence output 854 has caused AND gate A14 to output the C pulse of FF 890 when enable output A20 is high. Similarly both inputs to NAND gate A28 are high, therefore open collector A68 goes low. With open collector A68 low, Q* output A80 goes high. Since latch means output A46 is low as effected by latched master shutdown during initiation of this mode and SDW previously being a value of 5, XOR gate A42 provides a high input to NOR gate 980. With the other input to NOR gate 980 also high via output 978 of OR gate 976, output 708 of NOR gate 980 is also low. With both outputs 616 and 706 high along with 708 low together with TB trigger output 744 also being low, a properly addressed TTW/SDW of 20 will be stored in RAM means A156 of TEM board 74.

SDW is now at 15; Q output A58 of FF 890 remains low. With output A64 of XOR gate A22 high (since enable output A20 is high) and the output of inverter A32 high the output of NAND gate A28 goes low so that open collector A68 is low. Also all inputs to EBM NAND gate 990 are high thereby causing open collector A89 to go low. Then with outputs 616 and 706 high and TB trigger output 744 low as well as TE address trigger output 708 low, SDW of 15 with its associated TTW is stored in RAM A156.

Now with SDW being 10 as indicated in the FIG. 17D table, the SDW is equal to preset LBCWV of 10. With output A20 high, multiplexer output A54 goes high first but output A12 is low. Therefore, AND gate A56 is low and thus Q output A58 stays low as previously set when SDW equaled 20. With Q output A58 being low both open collectors A68 and A89 are low so that and SDW at 10 with its TTW is stored in RAM means A156. At the same time SDW is 10, ATTCR occurs from ATTG 14 so that the output of FSM NAND gate 974 goes low. but open collector A89 also went low from the output of EBM NAND gate 990.

However, when sixth sequenced output 992 occurs during the same TB pulse with SDW at 10, output A50 of multiplexer 918 is high and output A6 of latch means 862 is high. Therefore output A52 of NAND gate A8 is low to the S input of FF 890 and its Q output A58 is high just prior to the next SDW of the FIG. 17D table.

With SDW now at 16 but Q output A58 is still high; the Q output remains so because the SDW does not equal UBCWV of 20. Output A64 of XOR gate A22 goes low and open collectors A68 and A89 remain high. Since open collector A68 is high, Q* output A80 of FF 908 goes low. The output of XOR gate A42 is high because output A46 of latch means 859 is high because prior SDW of 10 was accepted by TE 18 of system 10. With both inputs to NOR gate 980 high, its output 708 is low. However, Q outputs 616 and 708 are low, thus SDW at 6 is rejected because TB output 744 is high and no counting of TEAGC arrangement 642 occurs. Q output A58 of FF 890 remains high to the next SDW value and will continue high after that unless SDW value equals the preset UBCWV of 20.

Although not heretofore mentioned in FIG. 17A-17D tables whenever a SDW is rejected by EBM or MBM NAND gates, FDFB output 620 is high to indicate that the SDW was rejected by weight NAND gate depending on the selected secondary mode for TBCL means 584. In view of the foregoing, the remaining SDW values of the FIG. 17D table are believed to be self-explanatory. Also with no EPM mode but MBM selected for any system TE, the output of XOR gate A24 for any system TE in being high for accepting a SDW is dependent upon one of the inputs to XOR gate A24 being high and of presetting and selecting various parameters of the FIG. 16 table for effecting overall data collection of acceptable SDWs in the TEM. On the other hand, when EBM is selected with no EPM, output of XOR gate A64 in being high for accepting a SDW is dependent also upon one of the inputs to XOR gate A22 being high even though timing sequence of multimplexer 918 is reversible for effecting different data collections in the TEM in conjunction with presetting and selecting of various parameter functions of the FIG. 16 table. Moreover, even though MBM or EBM is selected without EPM, the output of FSM NAND 974 can be low regardless of the acceptability of a SDW because of TTCR or TE shutdown by reason of HCMS or a preset TEM stop configuration.

CONTINUED OPERATION OF TE MODE 2 WITH MBM FOR INSIDE THE L/U BOUNDARY LIMITS AND EPM

System 10 during setup of a selected TE for mode 7 with EPM, output A36 of SUDW latch means 688 is high as depicted in FIG. 12A (sheet 1). Reference is now made to the FIG. 18A table. When a SDW is a value of 0 it is outside the preset UB/LB CWVs of 10 and 20. Because the HCMS being high prior to starting this mode and initially selecting SDW at 0, the S input of FF 870 has been set low and thus Q output 970 is high. With latch means output 962 now high after the inverted second delayed output 854, all inputs to FSM NAND gate 974 are high, thus open collector A89 is low and pulse Q output 706 of FF 886 is high. Output A60 of NOR gate A4 is low to an input of XOR gate A24. With output A20 also low to XOR gate A24, its output is low and thus open collector A68 is high. With open collector A68 high and branch output 975 from latch means 852 also high, both FDFB and FSFB outputs 620 and 622 are high. With Q* output A80 and latch means output A46 both low, but OR gate output 978 high, then NOR gate output 708 is pulsed low. With Q output 706 of FF 886 pulsed high, SDW at 0 is stored in TEM so as to provide a startup record for TEM even though SDW at 0 is otherwise unacceptable.

When the SDW value is ten (10), the SDW equals the preset LBCWV of ten. NOR gate A4, with low inputs from latch means 862, provides high input A60 to XOR gate A24. Since output A20 of latch means 688 is low, XOR gate A22 and XOR gate A24 both provide high outputs A64 and A66 such that open collectors A68 and A89 go low. However, since Q* output A80 of FF 908 is high and latch means output A46 is high, output A81 of XOR gate A42 is low. With output 978 of OR gate 976 being low, then output 708 of NOR gate 980 is high. With output 708 high and Q output 706 also high, the prior count of counting means 720 is latched-in means 640, but SDW at 10 is rejected.

When SDW is 20 and equal to the preset UBCWV, output A60 of NOR gate A4 is high. With XOR gate A24 receiving high output A4 and low output A20, its output A66 is high. Then since all inputs to NAND gates A30 and 986 are high open collectors A68 and A89 are low. Then Q* output A80 is high. With latch means output A46 now being high; XOR gate output A81 is low and OR gate output 978 is also low. Then output 708 of NOR gate 980 is high and even though SDW of 20 (with its associated TTW) is on bus 76 (because TB trigger output 744 is low), SDW of 20 is not stored in TEM and since there was no prior count by counting means 720, the count level stays the same.

When SDW is 15, output A66 of XOR gate A24 is again high; thus open collectors A68 and A89 are both low. Output 708 of NOR gate 980 would remain low as with prior SDW at 20, but TTCR occurred. In this situation the S input of FF 870 is low, Q output 970 thereof is high. Then latch means output 962 is high including its branch 972 as an input to FSM NAND gate 974 and including its other branch 975 to OR gate 976. Output 978 of OR gate 976 is now high to an input of NOR gate 980. With the other input to gate 980 low then output 708 is low to TEAGC logic means 656 and SDW of 15 is stored in TEM. With open collector A68 being low and connected to an input of EPM NAND gate 912, its output A82 is high.

When SDW is 5, the value is outside the preset UB/LB CWVs. Output A60 of NOR gate A4 is low. Output A66 of XOR gate A24 is low since it receives two low inputs A20 and A64. Then open collector A68 is high. With open collector A68 high, FDFB output 620 is now high and such is confirmed by the FIG. 18A table. With open collector A68 high and latch means output A46 high (because Q* A80 was high for prior SDWs), then all inputs to EPM NAND gate 912 are high; and open collector A89 is low. With open collector A68 high, Q* output A80 is now low, thus output A81 of XOR gate A42 is high. With OR gate output 978 low, output 708 of NOR gate 980 is low. With Q output 706 of FF 886 pulsed high, SDW of 5 with its associated/flagged TTW is stored in TEM because of EPM NAND gate output A82 going low. It is noted here if SDW would have been 25 instead of 12 after SDW was 5 then Q* output A80 of FF 908 would have been low, output A81 of XOR gate A42 low; and thus output 708 is high. Also, with latch means output A46 low and with its branch A44 being an input to EPM NAND gate 912, its output A82 is high.

CONTINUED OPERATION OF TE MODE 2 with MBM FOR OUTSIDE THE L/U BOUNDARY LIMITS AND EPM Output A20 of latch means 688 is now high while all other outputs thereof remain high. Reference is made to the FIG. 18B table and with the SDW at zero (0). Output A60 of NOR gate A4 is low. With output A20 being high, output A66 of XOR gate A24 is high. Consequently, open collector A68 is low. With Q* output A80 high and latch means output A46 low, XOR gate output A81 is high; and OR gate output 978 is low. Thus NOR gate output 708 is low. Latch means output A46 is low because HCMS was high for causing the S input of FF 908 to go low thereby setting Q* output A80 low before starting TE 18 to analyze any SDW. With latch means output A46 low, its branch A44 is low and EPM NAND gate output A82 is high. However, open collector A89 is low since output A76 is high to an input of MBM NAND gate 986. Also, because of the effect of HCMS being high before starting and then being low to start all system TEs simultaneously, FSM NAND gate output A84 is low and FSFB output 622 is high as confirmed by the FIG. 18B table. Thus the SDW at 0 is accepted/stored by system 10.

When SDW is 20, output A60 of NOR gate A4 is high to XOR gate A24. With output A20 also high to XOR gate A24, its output A66 is low. With AND gate output A76 low, output A70 of NAND gate A30 is high and open collector A68 is high. With output A70 high, FDFB output 620 is high. With open collector A68 high, Q* output A80 is low. Since Q* output A80 was high for the prior SDW of 0, then latch means A46 is high, and XOR gate output A81 is high. With open collector A68 high and output A46 high, all inputs to EPM NAND gate 912 are high; open collector A89 is low. With NOR gate 980 receiving high of output A81 and low of output 978, output 708 is low. Thus SDW of 20, otherwise unacceptable, is stored because of the action of EPM NAND gate 912.

When SDW is 10. Again output A66 of XOR gate A66 is low, open collector A68 is again high. Outputs A80 and A46 to XOR gate A42 are both low, thus XOR gate output A81 is low. With OR gate output 978 also low, NOR gate output 708 is high. Since output A46 is low, then EPM NAND gate 912 has no effect and open collector A89 is high. Thus SDW of 10 is rejected but TEAGC counter means 720 provides the next counting level because of the delay in TEAGC logic means 656 in processing high/low outputs 706/708 of prior SDW 20 as evident from FIG. 12B.

When SDW is 15, TTCR occurs and because of output 975 to OR gate 976 being high, OR gate output 978 is high. Even though XOR gate output A81 is still low, OR gate output 978 changed to high so that NOR gate output 708 is now low. With outputs 706/708 now pulsed high/low, SDW at 15 is stored.

When SDW is 3, it is outside the boundary limits and because the prior SDW of 18 was rejected due to SDW 14 occurring at TTCR, then SDW of 3 is accepted due to MBM NAND gate output A86 being low. However, when SDW is 22 (outside the boundary limits) it would have been rejected because both outputs A81/978 to NOR gate 980 would have been low; but TTCR occurred and OR gate output 978 became high. Thus EPM NAND gate 912 together with outputs A81/978 serve to minimize data collection of TEM 72 by storing data once when a value of SDW is outside the boundary limits and then again when a value of SDW is inside the limits unless TTCR or shutdown of TE 18 occurs due to HCMS (high) or TEM selected stop configuration occurred. It is noted here, because of EPM NAND gate 912, even if NOPL arrangement output 814 becomes high indicating a repeat SDW, the EPM NAND gate can govern. On the other hand, if DTPL arrangement output 602 is high, QPL arrangement output 790 is high or TE arm output 660 is low when TE 18 is slave configured it (TE 18) shuts down despite EPM NAND gate 912.

CONTINUED OPERATION OF TE MODE 2 WITH EBM INSIDE THE L/U BOUNDARY LIMITS AND WITH EPM

During this operation system 10 outputs A20 and A26 of latch means 688 are both low. When the SDM is at five (5) Q output A58 remains low. Since inputs A20 and A58 are both low to XOR gate 22, its output A64 is low. Consequently, open collector A68 is high. However, because of the effects of HCMS being high before starting, latched means output 962 is high, thus FSM NAND gate output A84 is low and FSFB output 622 is high. With OR gate output 978 high and XOR gate output A81 low, NOR gate output 708 is low. With open collector A89 low, SDW at 5 and otherwise unacceptable is stored in TEM 72 so as to record initial starting of TE 18 and therefore provide an accurate record data collection in analyzing the SDWSM input of TE 18.

When the SDW is ten (10), it equals the preset LBCWV. FF Q output A58 is high at the inverted second sequenced output of multiplexer because NAND gate output A52 is low to the S input of FF 890. Output A64 of XOR gate A22 is high; thus open collectors A68 and A89 are both low. In other words, all inputs to EBM NAND gate 990 are high. Outputs A80 and A46 are high and low respectively to inputs of XOR gate A42. Then output 708 of NOR gate 980 is low with the XOR gate output high and OR gate output 978 low. Thus, as indicated by the FIG. 18C table, a SDW of 10 with its associated TTW from output bus 650 of latch means 608 along with flag outputs 646 and 648 is stored/addressed in RAM means A156.

For the SDW at twenty (20), Q output A58 remains high until inverted sixth sequenced gate output A56 of multiplexer 918 goes high thereby enabling the C input of FF 890 to clock the low D input thereof so as to cause the Q output A58 to go low. Before Q output A58 is low, XOR gate output A64 is high; and open collectors A68 and A89 are both low despite output A82 of EPM NAND gate 912 being high. However, Q* output A80 of FF 908 and latch means output A46 are both high. Then NOR gate 980 receives two low inputs and its output 708 is high thereby stopping the counters of TEAGC arrangement 642. In this situation, even though TBCL means trigger output 744 is low (because open collector A89 is low) for accepting SDW at 20 and an accepted SDW with its associated TTW appear on bus 76, such is not stored in RAM means A156 because it is not addressable with output 708 high. However, with Q output 706 of FF 886 pulsed high, counter output of counter means 720 (because of prior high/low pulsed outputs 706/708) is latched-in in TEM latch means 640 as confirmed by the FIG. 18C table.

With SDW at eleven (11), Q output A58 remains low because its low value occurred when the previous SDW value at 20 (which equaled the preset upper boundary) caused Q output A58 to go low when the inverted sixth sequenced output 992 occurred. XOR gate A22 receives two low outputs A20 and A58 and thus its output is low. Therefore, open collector A68 is high. Output A80 is low and output A46 is high. Because TTCR occurs here, OR gate output 978 is high; and thus output 78 of NOR gate 980 is low. By reason of open collector A68 being high and output A46 high, its branch A44 is high, and thus, all inputs to EPM NAND gate 912 are high causing open collector A89 to go low. At the same time since TTCR occurred, all inputs to FSM NAND gate 974 are also high. Because of open collector A68 being high together with the occurrence of TTCR, FDFB and FSFB bit outputs 620 and 622 are both high as indicated in the FIG. 18C table for SDW at 11. Hence with Q output 706 of FF 886 and its branch 616 high and output 708 low, an accepted SDW at 11 with its associated/flagged TTW is addressed/stored in RAM means A156. In view of the foregoing, the remaining values of the SDWs of the FIG. 18C table are believed to be self-explanatory.

CONTINUED OPERATION OF TE MODE 2 EVENT BM OUTSIDE THE L/U BOUNDARY LIMITS AND WITH EPM

During this operation, outputs A20 and A26 are high and low respectively. With decoder output A20 high, multiplexer outputs A54 and A50 are reversed with multiplexer output A50 being effected by inverted sixth sequenced output 992 while multiplexer output A54 is effected by inverted second sequenced output 854 during any pulse cycle of system 10 as it operates in this mode. When the SDW is twenty five (25), Q output A58 is still low, output A64 of XOR gate A22 is high (since output A20 is high). Thus, open collector outputs A68 and A89 are both low. Q* output A80 and output A46 are now both high. Output 708 of NOR gate 980 is high since the gate receives low output A81 from XOR gate A42 and low output 978 from OR gate 976. With output 706 high, prior counting output of counting means 720 is latched-in TEM latch means 640, but with output 708 high an accepted SDW with its TTW on bus 76 (because TB trigger output 744 is low) is not stored in TEM 72 as confirmed by the FIG. 18D table.

When SDW is 20, it is rejected by TBCL means 584 because output 980 and A46 are both high but open collector A68 is low, (thus EPM NAND gate output A82 is high). With OR gate output 978 low and XOR gate output A81 also low, NOR gate output 708 is high. Because prior pulse of output 708 was also high, then TEAGC counting means 720 were not pulsed and the counting level stayed the same as confirmed by the FIG. 18D table when SDW is 20 after SDW was 25.

When the SDW is eleven (11) and with Q output A58 high as result of the prior SDW being ten (10), output A64 of XOR gate A22 is low thereby open collector A68 is high. With Q output A80 low but latched output A46 high, output 708 of NOR gate 980 is low. All inputs to EPM NAND gate 912 are high (open collector A68 high and output A46 high including its branch A44) then open collector A89 is low. With outputs 616 and 706 high of FF 886, TBCL means trigger output 744 low and TE address counter output 708 low, accepted SDW 11 with its TTW is addressed/stored in RAM means A156 of TEM board 74. Also, because open collector A68 is high, FDFB output 620 is high as confirmed by the FIG. 18D table.

In view of the foregoing, it should be evident that EPM NAND gate 912 minimizes data collection. For instance, when SDW is 11 not outside but inside, storage occurs. When successive SDW is 16 still inside, no storage occurs because of the EPM NAND gate. Similarly, when SDW is 20 and then 8 (outside) the EPM NAND gate prevents storage of SDW at 8 as indicated by the FIG. 18D table.

Although not heretofore mentioned during any operation of TE Mode 2 as aforedescribed, MCB tri-state address control output 266 is high as best shown in FIG. 8B and as confirmed by the FIG. 15 table. Hence, any TEM address on bus 76 is not transmittable to bus 38 for receipt by HC 16 and display review by user thereof during system use.

CONTINUED OPERATION BUT TE MODE 3 FOR ANY L/U BOUNDARY LIMITS OF MBM OR EBM AND WITH OR WITHOUT EPM

For this operation the results are the same as in TE mode 2 aforedescribed but TE address control tri-state output 266 is low (see FIG. 15) and thus any TEM address on bus 76 is transmitted via bus 38 to HC 16 for review by user thereof during system use.

Also, during mode 3 with bit 2 output 440 of MCWL means 240 being low and with bit 1 output 266 thereof also zero, output 304 of OR gate 442 is zero, as shown in FIG. 8B. Output 304 in being zero permits driver 302 to provide TE address update output 306 to HC 16 via bus 38 as shown in FIG. 8A and as will now be described. It is further noted here that bit output 446 is high, thus driver 448 is tri-stated so no HC trigger output 257 interferes with FIFO control logic means 270 or data collection of TEM 72 as effected by TBCL means 584.

Accordingly, whenever buffer means output 716 is pulsed low for storage of a SDW, output 717 via bus 76 is also pulsed low, as depicted in FIG. 8A. With HCMC output 259 high, interconnecting TEMCL means output 282 is also high to inverter 394. With inverted output 393 low and with branch output 374 pulsed low in response to a pulse on output 717 the output of NOR gate 362 goes low on the rising trailing edge of pulsed low branch output 374 so as to reset FF 356. With the reset Q* output 300 high to driver 302, the high output of the driver is then directed to HC logic means 164 via input 222 as shown in FIG. 6. The logic means in response to input 222 then timely grabs the TEM address from TEAGC arrangement 642 as it appears (for a given pulse of TB clock input 599) at BBLM 184 via buses 558, 76, 264, 262, 38, 198 and 200. The HC 16 then functions via logic means 164 to store the TEM address in SKPC system via bus 178 for display on monitor 162 via bus 162.

At the same time, output of NOR gate 352 with Q output 370 of FF 356 now low provides output 372 (high) to sequencer 354. First delayed output 376 to the C input of FF 356 clocks the D input (high) of FF 360 so that Q* output 400 goes low before another pulse output 717 occurs indicating an acceptable SDW. Then the FIFO logic means repeats the cycle for each acceptable SDW and thus provides a timely TE address update output 306 for HC 16 so as to properly grab each TEM address generated by TEAGC arrangement 642 for an acceptable SDW as determined by TBCL lmeans 584. Since HC 16 is asynchronous to any system TE, TE address update output 306 when a given system TE is in mode 3 assures proper correlation of TEM address of the given TE with HC display 162 for operator review.

WRITE OPERATION OF FIFO MEANS DURING TE MODE 2 FOR ANY MBM OR EBM

As mentioned above during mode 3 for TEM address update, NOR gate receives a low pulse from output 717 whenever a SDW is acceptable. When reset Q output (low) of FF 356 occurs, output 372 of NOR gate 352 is not only high but is reshaped to a desired duration. Branch 373 of output 372 clocks the C input of FF 360 so that Q* output 400 is low when the D input thereof is high. The D input is connected to the full FF output of FIFO means 396 via output 406. When the FIFO means becomes full of accepted SDWs and associated TTWs via buses 76 and 308 as result of the action of TBCL means 584, then output 406 goes low.

Assuming that the D input of FF 360 is still high, the C input for each pulse output 372 of NOR gate 352 keeps Q output 388 high to AND gate 364 when third delayed output 382 (high) occurs. Then NOR gate 368 receives the high output of AND gate 364 and the inverted low output of inverter 394 and provides a low output 386 to the R input of FF 360 so as to reset same with Q and Q* outputs low and high respectively. When the next pulse occurs for an accepted SDW, output 373 clocks the C input of FF 360 and if the D input is still high, Q* output 400 is low again. Then as long as Q* output 400 stays low for each output 373 for clocking the C input, the FIFO means will continue to write in accepted SDWs and TTWs so as to form a stored SDWSM and associated TTWSM therein.

However, when the FIFO means becomes full, then output 406 goes low. When the next output 373 occurs, the C input clocks the low D input, Q* output 400 goes high and the FIFO means does not store any more accepted SDW with TTW until emptied such as in HC/TE mode 6 as explained hereinafter.

In similar fashion, FIFO means stores accepted SDWs with TTWs during HC/TE mode 3, but with TE address update output 306 as described above. Further, in HC/TE mode 6, the FIFO means 396 not only stores accepted SDWs with TTWs, but also provides its stored information to HC 16 as hereinafter described. Further, in TE mode 2 or 3, as well as HC/TE mode 6 for any system TE during system use, any TE in mode 2, 3 or 6 during such use not only stores accepted SDWs with TTWs in its TEM, but also stores such in its FIFO means. This double storage by each TE permits the HC operator to switch from one selected TE to another at will for readout of data storage fromm the FIFO means of a TE while all TEs continue to store in their TEM so long as any TE is not otherwise shut down, e.g., mode Q.

WRAP OR STOP CONFIGURATION OF THE TEM OF A TE DURING TE MODE 2 OR 3 AS WELL AS HC/TE MODE 4 OR 6

As aforedescribed and with reference to FIG. 12B, TEAGC logic means 656 is provided with means for selecting and controlling the configuration of the TEM of a TE. Depending on the selection made by the user of the SKPC system of HC 16 during the S mode, the user can select a wrap or stop configuration.

Assume that a wrap or continuous operation is selected. Then wrap/stop enable output 695 of latch means 694 is high while all leads of bus 696 to comparator 698 are high as well. During a given pulse of TB clock input 599, a SDW has been found to be acceptable such that outputs 706 and 708 are pulsed high and low respectively. Accordingly, output 722 of TEAGC logic means 656 is high to counter means 720 and the C input of FF A118. Assume at the same time that counter means A106 has reached its maximum counting level such that output 724 of counter means A106 is high to the D input of FF A118. Consequently the FF will provide a high Q output A126 to comparator 698. With the opposite/corresponding terminal of the comparator grounded, its output A128 is low to NOR gate A122 and NAND gate A130.

With the other input of NOR gate A122 receiving latched-in high ouput 695, output 712 of the NOR gate is low to OR gate 872 as depicted in FIG. 12A, sheet 2. Since the other input of OR gate 872 is also assumed low, then OR gate output 874 is low and the Q and Q* outputs of FF 876 are low and high respectively when the C input thereof receives first inverted/delayed output 878 of sequencer 818 during a pulse immediately subsequent to the given pulse of TB clock input 599.

With such Q and Q* outputs, a TE is not shut down as aforedescribed.

With the other input of NAND gate A130 biased high, output A132 of the NAND gate is high to an input of AND gate A124. With the other input of AND gate A124 being high, its output A134 is high to an input of NAND gate A136. Branch output 710 of first inverted/-delayed output 878 is connected to the other input of NAND gate A136. With output 710 high during the subsequent pulse of TB clock input 899, output A138 of the NAND gate is low to AND gate 140. Even though HCMC output 654 is high to the other input of AND gate A140, its output 726 is low to the reset input of both counter means 720 and FF A118 so that counter means 720 begin another counting cycle thereby wrapping the TEM and so that Q output A126 is now low until counting means 720 reaches another maximum counting level for causing another rewrap of the TEW so long as the TEM remains in the wrap configuration as controlled by TEAGC logic means 656 and latch means 694 as aforedescribed.

Assume now that a stop configuration of the TEM of a TE is now desired by the user of HC 16. One of the reasons for a stop configuration could be the SDWSM input of MFC 12 being analyzed is to be cut off at a certain point in time. Then output 695 of SUDW latch means 694 would be low and any one of the leads of output bus 696 could be low depending on the storage capacity of the TEM desired, or all leads of output bus 696 could be high so that maximum storage capacity of the TEM is selected. In other words, if maximum storage capacity is selected and Q output A126 goes high as aforedescribed, then comparator output A128 goes low. And, if any lead of bus 696 is selected low by the HC user during the S mode, such as, e.g., lead four thereof, then when counter means A106 reaches its initial counting level, the fourth lead of bus 723 (high) parallel-connected thereto will be compared with the fourth lead (low) of bus 696 so as to provide comparator output A128 low to NOR gate A122 and NAND gate A130. With both inputs to NOR gate A122 low, its output 712 is high to OR gate 872 (FIG. 12A, sheet 2) thereby shutting down the TE so that no further SDWs of the SDWSM input are analyzed for acceptance or rejection.

With one input to NAND gate A130 low, its output to AND gate A124 is high to AND gate A124. With the other input to AND gate A124 being low, its output A134 is low to NAND gate A136. when first inverted/-delayed output 710 (pulsed high) is received during the subsequent pulse of TB clock input 599, then output A138 is high to AND gate A140. With HCMC output 654 being high AND gate output 726 is high to the R input of FF A118 and the reset input of counter means 720 so that both the FF and the counter means stay in their current condition with Q output A126 high and counter means 720 stopped at a selected counting level because the TE has been shut down by the operator selected stop configuration for the TEM in storing data. However, when the operator selects a mode such as the TE being directly linked to the HC such as the S mode, then HCMC output 654 can be selected to go low thereby resetting FF A118 and counter means 720 prior to another data storage cycle of the TE after a TE mode 2, 3, 4 or 6 is selected and HCMS output 261 is released (now low) by the HC operator.

HC/TE MODE 1 OF SELECTED TE

During this mode and as the result of the operator selecting TE 18, output 454 of MCWL means 240 to TEMCL means 244 is high so that output 294 is high thereby preventing any output from FIFO buffer means 274 and FIFO status error and ready outputs 296 and 298 as best shown in FIGS. 8A and 8B. TEM readout control output 452 of latch means 240 is low so that input A166 is low to buffer means of TEM board 74 via TEMCL means output 342 and bus 76 as best shown in FIGS. 8B and 13. Outputs 434 and 446 of latch means 240 are both low. By reason of inverter 447 of TEMCL means 244, NOR gate 436 receives high and low inputs from latch means outputs 446 and 434 respectively. Then low output 462 of NOR gate 436 is directed via TEMCL means output 340 and bus 76 to first TB inverter 540 (FIG. 9) to second TB input 622 and NAND gate 626 (FIG. 10). As the result of the output of inverter 540 being high no accepted SDW is transferred from latch means 524 to bus 76. Similarly, as the result of output 630 of NAND gate 626 being high, no TEM write signal 716 (low) is transmitted by buffer means 644 to input 718 of TEM board 74 via bus 76 (and to an input 276 of NOR gate 352 of FIFO control logic means 270 via bus 76 and output 717, see FIG. 8A), no output of TEM address latch means 640 is transmitted via bus 558 and no TTW output is transmitted from latch means 608 and 618 via bus 650 and flag-bit outputs 646 and 648.

MCB data direction control output 322 of MCWL means 240 is high while MCB tri-state control output 320 thereof is low as depicted in FIG. 8B. Consequently TEMCL ouputs 320 and 322 (low and high) to BBM 314 (FIG. 7) permit a stored SDWSM and associated (flagged) TTWSM as read from RAM means A156 of TEM board 74 is transmitted from buses 76, 308 and 316 via BBM 314 to buses 318, 312 and 38 to BBLMs 180 and 182 of HC 16 as best shown in FIG. 6. With readout control input A166 being low during mode 1, a stored SDWSM and associated TTWSM of RAM means A156 is first directed from BB means A142 and A144 to BBLMs 180 and 182 of HC 16 via buses A162, A164, 76, 308 and 316, buffer means 314 and buses 318, 312, 38, 190 and 194. As the read SDWSM and associated TTWSM is received by BBLMs 180 and 182 by HC 16 it is grabbed thereby as the result of encoded direction control output 222 of logic means 164 immediately directing the SDWSM and TTWSM to SKPC system 160 via bus 178 for storage therein and display on monitor 162 via bus 170. At the same time, MCB address and data direction control outputs 440 and 266 of latch means 240 are high and low respectively as illustrated in FIG. 8B. Because of inverter 444 of TEMCL means 244 its MCB address direction control output 288 is now low. With both MCB address tri-state and direction outputs 266 and 268 low, MCB BA means 260 permits HC TEM address from SKPC system 160 of HC 16 to address buffer means A148 of TEM board 74 via bus 178, BBLM 184, buses 38 and 262, BA means 260, and buses 264, 76 and A168.

Since NORed output 462 is low and its inverted output 466 is high to TEMCL means OR gate 468 thereby providing a high output to TBCL means OR gate 872 and shutting down TBCL means 584 with open collector A89 being high so that any SDW otherwise acceptable is not stored in TEM board 74 as it is being read. With output 446 low of MCWL means 240, HC trigger output 277 is provided via driver means 448, output 277 and bus 76 to write input 718 of TEM board 74. However, with read control input A166 low, its buffered low input A174 to write generator means 152 prevents a write output therefrom. HC trigger output 277 in being is connected via branch 276 to FIFO control logic means 270 causes output 400 of FIFO control logic means to store the read SDWSM and TTWSM (via buses 76 and 308) from TEM RAM means A156 in FIFO means 396 unless the FIFO means is full as aforedescribed. Disabled MCB buffer means 274 and status word outputs 296 and 298 (as the result of output 294 being high from TEMCL means to 244) prevent any FIFO output from TEM 72 of TE 18 to HC 16 via buses 312 and 38.

It is noted here with MCWL means output 266 high, NOR gate output 304 is high thereby disabling driver 302 so that no TE address update output 306 is provided to HC 16. Similarly, with inverted output 437 high, NOR gate output 438 is low thereby preventing SUDW strobe outputs 327 and 328 from interfering with the prior setups of the two FFs of TEMSICC logic means 326 (FIG. 8C) and the three arrangements 542, 668 and 762 (FIGS. 9-11). Moreover, with setup enable 330 high, decoder 324 (FIG. 8C) is not enabled. Also, with setup enable output 350 of TEMCL means 244 low, three arrangements 542, 668 and 762 (FIGS. 9-11) are not enabled.

HC/TE MODE 4 OF SELECTED TE

During this mode, HC 16 writes its stored SDWSM and associated TTWSM from SKPC system 160 to both TEM board 74 of TE 18 and FIFO means 396 thereof. The bit pattern output of MCWL means 240 is the same as HC/TE mode 1 except that TEM readout control output 452 of latch means 240 is now high so that read control output 344 of TEMCL means 244 is now high to buffer means A146 of TEM board 74 via bus 76. Also, MCB data direction control output 322 of MCWL means 240 is now low while MCB data tri-state control output 320 thereof is still low as in TE mode 1. With MCB data direction output 322 of TEMCL means 244 high to BBM means 314 of MCB 78 (FIG. 7) then a stored SDWSM and TTWSM from SKPC system 160 of HC 16 can be directed to RAM means A156 of TEM board 74 and FIFO means 396.

To this end with reference to stored SDWSM from HC 16 to TEM board 74, logic means 164 of HC 16 in response to output 172 and 174 from SKPC system 160 provides a stored SDW and associated TTW from the memory of the SKPC system via bus 178, buffer means 179 and buses 192 and 196 to be latched-in to BBLMs 180 and 182 respectively. At the same time, logic means 164 causes a TEM address of SKPC system 160 associated with the aforementioned SDW and TTW to be transmitted from SKPC system 160 to be latched-in BBLM 184 via bus 178, buffer means 179 and buses 202 and 204. With the TEM address, SDW and TTW latched-in in BBLMs 184, 180 and 182 respectively for each pulse cycle of HC 16, the HC buses 198, 200, 194 and 190 are interconnected to the TEM board 74.

To this end, the latched-in TEM address is transmitted from BBLM 184 to TEM board buffer means A148 via buses 198, 200, 38 and 262, BA means 260 and buses 264, 76 and A168. The latched-in TTW is transmitted from BBLM 182 to BB means A144 of TEM board 74 via buses 194, 38, 312, and 318; BBM 314; and buses 316, 308, 76 and A164. Similarly, the latched-in SDW is transmitted from BBLM 180 to BB means A142 via buses 190, 38, etc.; BBM 314; and buses 316, 308, etc. Thus, for each pulse cycle of the HC, a TEM address, along with its associated SDW and TTW, is transmitted from SKPC system 160 of the HC to TEM board 74 of TE 18.

At the same time, HC trigger output 257 (with select decoder output 252 low of TE 18 and TEMCL means drive 448 thereof enabled), provides TEMCL means HC trigger output 277 (low) to TEM board buffer means A146 via bus 76 and input 718. Of course, HC trigger output 257 is provided by logic means output 233 to HC combined arrangement 165 as aforedescribed. With TEMCL means read control output 342 high, then TEM board buffer means A174 is high to BB means A142 and A144 for directing each SDW and its TTW from BB means A142 and A144 via buses A170 and A172 to RAM means A156 for storage. After buffer means A148, the TEM address is directed to decoder A160 for selecting TEM board 74, to bank decoder A158 for selecting a bank thereof and to RAM means A156 for addressing the memory means thereof in order to store the SDW and TTW from BB means A142 and A144. This is effected when the write pulse from generator means A152 (with read control output 174 high and HC trigger output received via input 718, etc.) is directed to RAM means A156.

Thus, for each pulse of HC 16 in conjunction with its trigger pulse 257 a SDW, TTW and TEM address is transmitted from SKPC system 160 to TEM board RAM means 156A for storage therein.

At the same time HC 16 is writing its SDWSM to TEM board RAM means A156, it is also writing the SDWSM to FIFO means 396 of FIG. 8A until the FIFO means is filled as aforedescribed.

HC/TE MODE 6 OF SELECTED TE (REAL-TIME DATA ACQUISITION)

During this mode bit output 434 of MCWL means 240 is still low to TEMCL means setup enable output 350 as in all modes except the S mode aforedescribed. Bit output 446 of latch means 240 is high so that TEMCL means driver 448 is disabled and no TEMCL means HC trigger output 277 is provided via bus 76 to write input 718 of TEM board 74. With inverted output 447 low and with latch means output 434 also low, the output of NOR gate 436 is high to TEMCL means tri-state control output 340. With tri-state output 340 being high and inverted by both first TB inverter 540 and 2nd TB NAND gate 626 one or more accepted SDWs and associated TTWs appear on bus 76 for storage in RAM means A156 and FIFO means 396 as result of analysis of a SDWSM input by three arrangements 528, 682 and 796, and TBCL means 584, when OR gate shutdown output 874 (FIG. 12A, sheet 2) is low as aforedescribed.

At the same time, output 266 of MCWL means 240 for TEMCL means MCB tri-state control of BA means 260 is high. Although output 440 of latch means 240 is low, inverted MCB directional control output 268 is high. Thus MCB BA means, 260 in receiving outputs 266 and 268 both high, blocks any TEM address on buses 38 and 76 from being transferred therebetween.

With latch means outputs 266 and 440 being high and low respectively, TEMCL means OR gate output 304 is high. Thus as in modes 1-2, and 4, e.g., it disables MCB driver 302 thereby preventing any TE address update signal from FIFO control logic means 270 to HC 16 as aforedescribed. As in modes 1 and 4, setup strobe and enable outputs of TEMCL means 244 are such that they do not interfere with the prior setup of the arrangements of FIGS. 8C and 9–11 as aforedescribed.

Outputs 320 and 322 of latch means 240 are both high and correspond to MCB data tri-state control and MCB data enable for BBM 314. Thus no data passes from a selected TE to HC 16 via BBM 314 or vice versa during this mode. Also, output 452 of latch means 240 is high thereby causing TEMCL means read-out control 342 for TEM board 74 to be high via bus 76 to TEM board read control input A166. Thus, no readout of TEM board RAM means A156 occurs during this mode.

With bit output 446 of MCWL means 240 being high, driver 448 is disabled so that no HC trigger output 277 comes from TEMCL means 244 to interfere with either FIFO control logic means 270 and NOR gate 352 thereof or output 714 of TEAGC logic means 656 for causing a write pulse 718 to TEM board 72 as the result of acceptance of a SDW by TBCL means 584. Bit output 454 of latch means 240 is now low so that TEMCL means output 294 is now low to MCB buffer means 274 and to FIFO status word drivers 290 and 292 thereby enabling same. When HC trigger output 257 pulses low and with TE 18 decoder 236 being selected (its output 252 low), TEMCL means OR gate output 450 is pulsed low to OR gate 460 thereby providing a low pulse output to the R (read) input of FIFO means 396 and the C input of FF 396.

When a low pulse is received by OR gate 352 of FIFO control logic means 270 from branch output 717 as the result of TBCL means 584 indicating the acceptability of a SDW in relation to a pulse of TB clock input 599, then FIFO control logic means provides a low output 400 to FIFO means 396 for effecting storage of a SDW and TTW in the FIFO means as aforedescribed as best shown in FIG. 8A. With a SDW and TTW being stored in the FIFO means, EF (ready to read) output 286 of FIFO means 396 is now high and this is directed by driver 290, output 296, buses 38 and 206 to buffer means 186 of HC 16 (FIG. 6). At the same time, TEMCL means output 280 is pulsed low and the R input of FIFO means read out the stored SDW and TTW to HC 16 via bus 310 buffer means 274, buses 312 and 38 to BBLMs 180 and 182 (FIG. 6). Logic means 164 of HC 16 in response to outputs 172 and 174 from SKPC system 160 provides an encoded directional control output 222 to BBLMs 180 and 182 and enabled control output 226 to buffer means 186 so that not only the SDW and TTW is taken by the SKPC system via bus 178 and buffer means 179, but the read output (FIFO read output 296) of status word buffer means 186 via bus 208 to bus 178, etc. The SDW, TTW and read output of buffer means 186 after receipt by SKPC system 160 can be viewed on display 162 for review by the operator.

Assume that FF output 406 of FIFO means 396 indicates that it is full of stored SDWSM and TTWSM. Then when another pulse input is received by NOR gate 352 from branch output 717 of TBCL means 584, branch output 373 of the NOR gate clocks in the high D input to FF 360. Then Q* output 400 is high to FIFO means 396 thereby stopping it from storing any SDW and TTW as it appears on buses 76 and 308 to FIFO means 396 as long as Q* output 400 remains high.

At the same time Q output 388 of FF 360 is low to OR gate 368. When inverted second delayed output 378 is received by the OR gate, the S input of FF 358 is low thereby setting Q output 408 to FIFO means high for indicating an error output that one or more SDWs on bus 308 may have been missed because FIFO means 396 is full of stored information. After Q output 408 of FF 358 is set high by the S input thereof, then double inverted/branch output (high) of output 400 is connected to the C input of FF 358 so as to clock the grounded D input thereof, thereby causing Q output 408 to go low. When the next pulse output of NOR gate 352 occurs, Q* 388 of FF 360 stays low so long as output 406 stays high because of FIFO means 396 still being full. Thus, Q output 408 will again go high when the S input thereof goes low. When Q output 388 of FF 360 is low, output 386 of NOR gate 368 is high because both inputs, AND gate output 384 and inverted output 392 are low. With output 386 high, FF 360 is not reset via its high R input.

When FIFO means is no longer full, then one or more SDWs and TTWs are stored therein as they appear on bus 308. With a SDW stored and Q output 408 still high, then this high of Q output 408 is stored therewith. After Q output 408 goes low, Q output 408 of FF 358 stays low because of the C input of double inverted branch output of output 400 clocking the grounded D input. When the SDW and TTW with its high flag for indicating an error of one or more SDWs may have been missed (when the FIFO means is full) is read by the low pulse of output 280 to the R input of the FIFO means, then the high flag output of the read SDW and TTW appears on the output 410 to the D input of FF 398. Then the rising trailing edge of the low pulse on TEMCL means output 280 (where such pulse reads the stored SDW and TTW of FIFO means 396 onto bus 310, etc.), causes the C input of FF 398 to clock the high of the D input so that Q output 288 (high) thereof via driver 292, output 298, buses 38 and 206 transmits the error signal to HC buffer means 186. At the same time, the SDW and TTW on bus 310 is transmitted from buffer means 274 via buses 312 and 38 to buses 190 and BBLM 180 as to the SDW and to buses 194 and BBLM 182 as to the TTW. Then logic means 164 with its encoded directional control output 222 to BBLMs 180 and 182 and enabled control output 226 to buffer means 186 causes SKPC system 160 to obtain via buses 192, and 196, buses 208 and 178 each SDW and TTW along with read and error MCB outputs 296 and 298. Thus, these read and error outputs from FIFO means 396 are in effect further flag outputs with each SDW/TTW along with the flag output of FDFB and FSFB of any TTW as aforedescribed. Thus, when error output 298 is high as aforedescribed, then one or more SDWs may have been missed when FIFO means 396 was full. Similarly, when read output 296 is high, then SDW/TTW information is stored in the FIFO means so that it can be read. It should now be evident by virtue of each accepted SDW (as it appears on bus 76 from latch means 524 as the result of acceptable analysis by TBCL means 584 as aforedescribed in relation to the FIG. 17A–17D and 18A–18D tables) that FIFO means 396 provides an immediate real-time or progressive output of all SDWs/TTWs stored therein to HC 16 for display on monitor 162.

One of the reasons that FIFO means 396 of any system TE may become full of stored SDWs during system use is that any system TE and HC 16 are in asynchronous relation to each. At the same time, FIFO means 396 of TE 18 is providing real-time data acquisition output to HC 16, TEM 72 thereof such as its TEM board 74 is storing all SDWs and TTWs as they appear on bus 76 (by reason of TEM address of TEAGC arrangement 642 also being on bus 76) as a secondary complete data collection for later operator review, if necessary, via HC monitor 162 when TE 18 is in mode 1.

VARIOUS CONFIGURATIONS OF SYSTEM TEs

In view of the foregoing aforedescribed modes of the system TEs, it is evident that they can be configured in various ways. To further illustrate this, reference is made to FIG. 19, that depicts a TE in the S mode. In this mode the HC is linked to the TE such that HC setup data word strobe, one or more HC setup data words and HC setup address are provided via MCB 78 to the MCB TEMSI logic arrangement and each TB (80, 82 and 84) where a decoder of the TEMSI arrangement or any TB is only responsive to its respective address of the HC address. Also, it is noted here that the outputs of each TB are tri-stated so that no accepted SDWSM nor TTWSM appears on bus 76 to interfere with HC setup address or data words.

Figure 20:
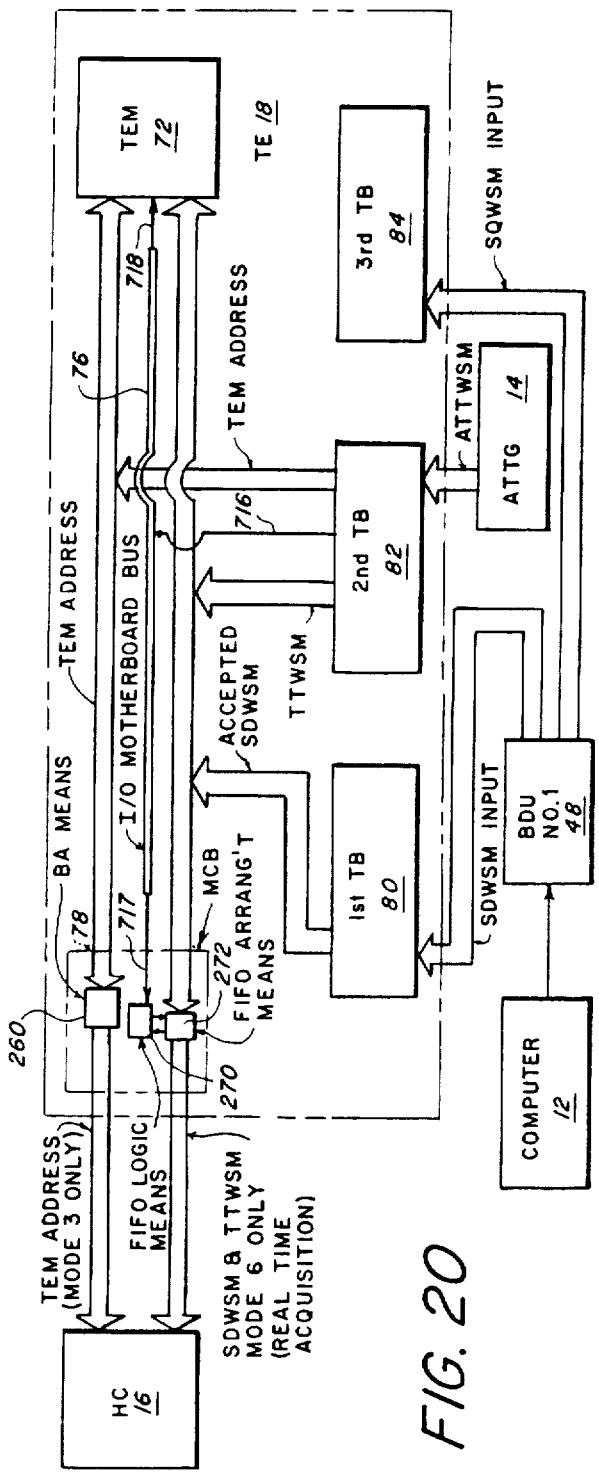
FIG. 20 is another schematic view of the system with parts added and other parts removed and generally illustrates two primary modes of a TE of the system and a HC/TE primary mode where the configuration of the system for each mode is slightly different but where, for each mode, the system effects data collection of time-tagged/accepted SDWs of a SDWSM input from a computer being evaluated.

Similarly, FIG. 20 depicts a TE not only in modes 2 and 3, but also mode 6 where one or more SDWSM inputs from MFC 12 are being analyzed for acceptability by the improved system. In modes 2 and 3, accepted SDWSM and its associated TTWSM is being stored as data collection in the TEM for subsequent review by the HC operator when the TE is in mode 4 or 6. Additionally, when the TE is in mode 3, TEM address of TEAGC arrangement 642 of second TB is also linked via MCB BA means 260 to HC 16 for monitor 162 review. To assure synchronization of TEM address with the HC, the TE provides TEM address update output as aforedescribed in mode 3. When the TE is in mode 6, real-time data acquisition of accepted SDWSM and TTWSM along with additional read and error flag outputs as aforedescribed is provided by MCB FIFO arrangement means 272 while at the same time secondary data collection of accepted SDWSM and TTWSM is taken by the TEM of the TE. When any system TE is in mode 2, 3 or 6 (or even 4 as discussed further below) FIFO means 396 thereof functions to store until full either the accepted SDWSM as determined by TBCL means 584 for mode 2, 3 or 6 or the SDWSM furnished by the HC during mode 4. One of the advantages of storing accepted SDWSM in the FIFO means of any TE is that the FIFO means of each system TE can be selectively linked one at a time by the operator to the HC during mode 6 for reading (of the FIFO means while one or more TEs of all system TEs) in mode 2 continue to take TEM data collection.

Figure 21:
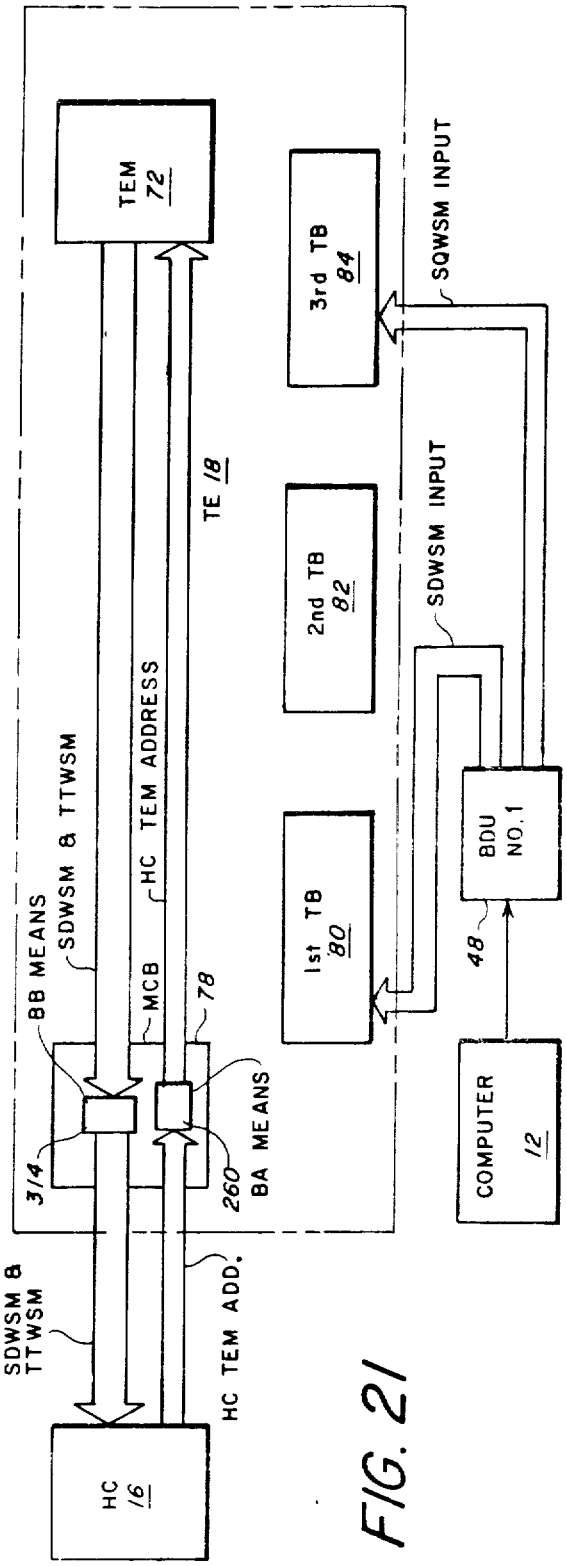
FIG. 21 is another schematic view of the system with parts removed and generally illustrates another HC/TE primary mode of the system where it is configured so that the HC reads the data collection of the memory of a system TE directly linked thereto.

As shown in FIG. 21, a system TE is in mode 1 for reading the previously obtained TEM data collection whether effected by mode 2, 3, 4 or 6. In this mode outputs of each TB of the TE are tri-stated so that no output of a TB such as accepted SDWSM or TTWSM appears on bus 76 to interfere with the read SDWSM output of the TEM.

Figure 22:
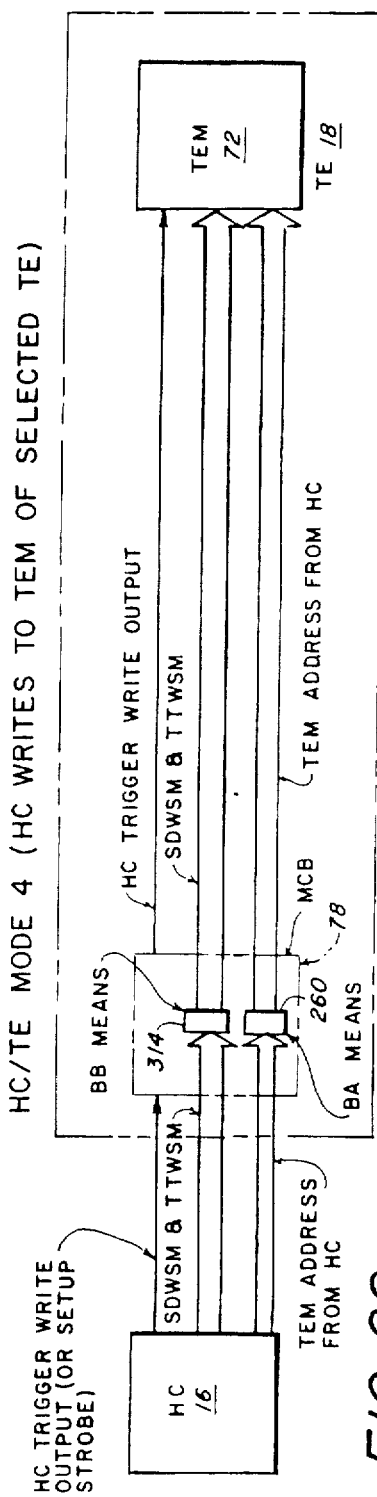
FIG. 22 is still another schematic view of the system with parts removed and generally illustrates still another HC/TE mode of the system where it is configured so that the HC writes its stored data collection to the memory of a system TE directly linked thereto.

As further shown in FIG. 22, a system TE is in mode 4 where the HC writes SDWSM furnished by the HC to the TEM of the TE. As in mode 1 or 7 (the S mode) each TB is tri-stated so as not to interfere with the TEM address and SDWSM/TTWSM all from the HC to the TEM of the TE. One of the advantages of mode 4 is that it can provide a built-in test for each system TE. Thus, after each TE is in mode 4, it can be placed in mode 1 to see if the TEM will read back the HC SDWSM read to it.

Another mode of a system TE not shown by FIGS. 19-22 is the Q mode (inactive or standby) where the Q mode TE is not linked to the HC while the other system TEs are in either mode 2 or mode 1, 3-4, 6-7. Depending on the requirements of the system for analyzing digital data source means, not all system TEs may be needed; then one or more system TEs will be inactivated by being in mode Q. On the other hand, depending on the requirements of the system for analyzing a digital data source means, such as MFC 12, one or more system TEs (after being set up in the S mode) may be placed on standby, mode Q, until needed for analysis. As in mode 1, 4 or 7, each TB of a TE in the Q mode is tri-stated so as not to provide storable data to the TEM thereof.

As shown in FIGS. 1 and 5, ATTG 14 provides a common ATTWSM to each system TE during system use. Also, the ATTG is subject to HCMS output 124 to counter 116. Thus, when inverted HCMS output 124 is low, counter 116 is stopped. Thus, regardless of how each system TE is configured, the common ATTWSM output of ATTG 14 (when inverted HCMS output 124 is high) to all system TEs assures accurate matrix data collection between all TEMs of the system TEs. It is further noted here when a system TE is mode selected by HC 16, the selected mode remains by virtue of MCWL means, e.g., MCWL means 240 of TE 18, regardless if any one system TE at any point in time is directly linked with its select decoder being selected to HC 16, such as mode S, 1, 4 and 6.

MASTER, SLAVE OR INDEPENDENT CONFIGURATION OF A TE

Figure 23:
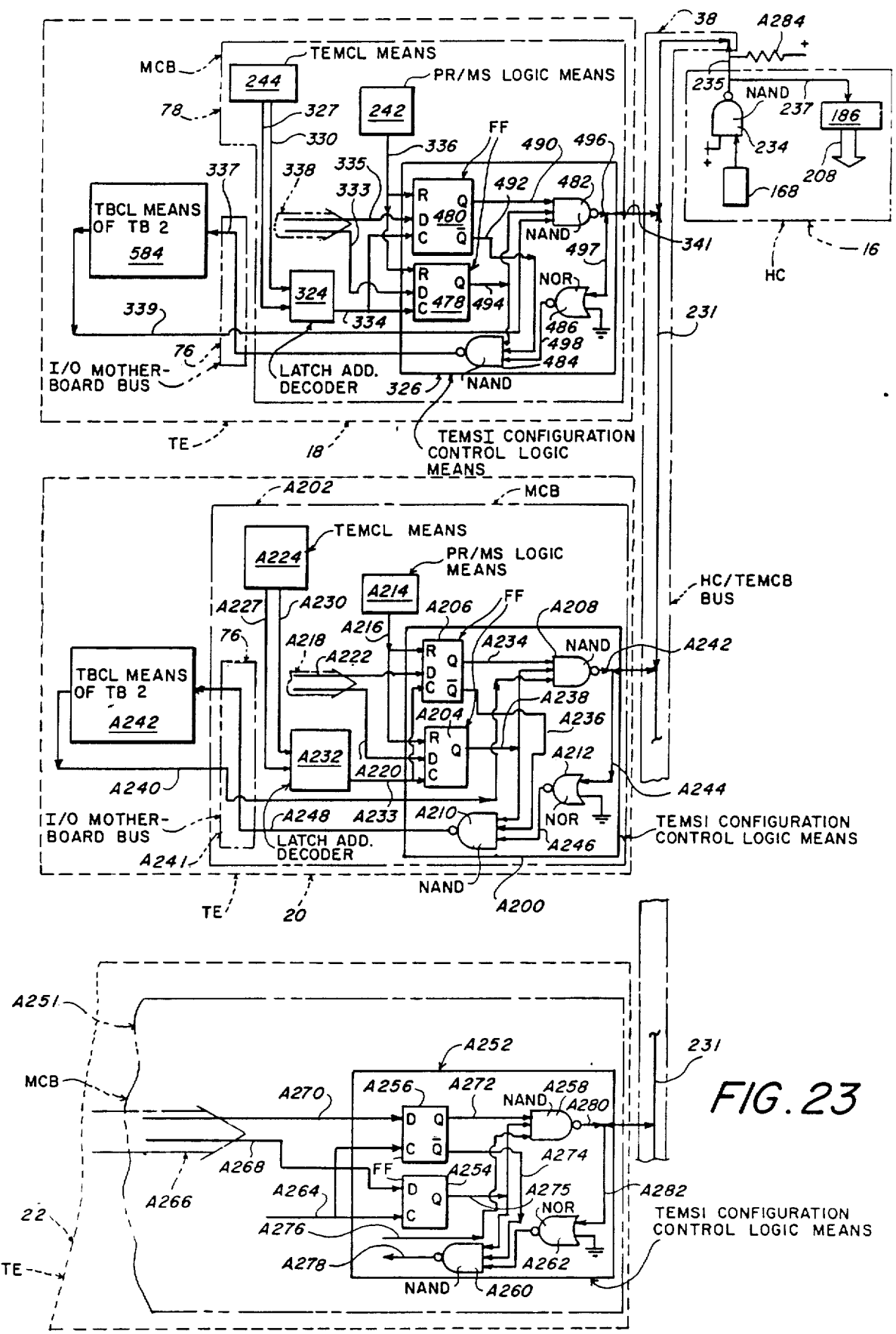
FIG. 23 is a diagrammatic view with parts removed and generally illustrates three TEs of the improved system, with one TE being in master configuration, the other in slave configuration and the last in independent configuration; with all TEs being in operative relation to the HC computer thereof.

With reference to FIG. 23, three TEs 18, 20 and 22 are disclosed in conjunction with HC 16. TE 18 is made up of elements as previously described and disclosed in FIGS. 6, 7,. 8B and 10. Since TE 20 is comprised of corresponding elements as TE 18, the elements of TE 20 disclosed in FIG. 23 will not be identified. TE master, slave or independent configuration control (TEMSICC) logic means A200 of MCB A202 of TE 20 is generally made up of a pair of FFs A204 and A206, a pair of NAND gates A208 and A210 and a NOR gate A212. Power-on reset and mode strobe (PR/MS) logic means A214 is provided with a reset output A216 parallel-connected to the R inputs of FFs A204 and A206. An input data bus A218 has two data inputs A220 and A222 connected to the D inputs of FFs A204 and A206. TEMCL means A224 of MCB A202 is provided with setup strobe and enable outputs A227 and A230 connected to latch address decoder A232. For the sake of brevity, encoded address inputs to decoders 324 and A232 of TEs 18 and 20 are not shown. Decoder A232 is provided with an output A233 parallel connected to the C inputs of FFs A204 and A206.

TE master configuration (MC) control Q output A234 of FF A206 is an input to NAND gate A208. TE slave configuration (SC) control Q* output A236 of FF A206 is an input to NAND gate A210. TE master/independent configuration (MIC) control Q output A238 of FF A204 is parallel-connected to inputs of NAND gates A208 and A210. TE 2nd TB trigger slave configuration (TSC) control output A240 of TBCL means A242 of the 2nd TB of TE 20 is connected via a I/O mother board bus A241 to a third input of NAND gate A208. Output A242 of NAND gate A208 is connected to internal TE (ITE) control output 231 for all systems TEs as provided by bus 38. A branch output A244 of output A242 is connected to an input of NOR gate A212. As evident in FIG. 23, TE control output 231 is parallel-connected to outputs 496 and A242 of NAND gates 482 and A208 thereby forming an open collector therebetween. Output A246 of NOR gate A212 is connected to a third input of NAND gate A210. TE ARM output A248 of NAND gate A210 is connected via bus A241 to TBCL means A242.

MCB A251 of TE 22 is provided with TEMSICC logic means A252. The logic means is generally made up of two FFs A254 and A256; two NAND gates A258 and 260; and a NOR gate A262. An output A264 of a latch address decoder (not shown) is parallel-connected to the C inputs of FFs A254 and A256. An input data bus A266 having two separate leads A268 and A270 are connected to the D inputs of FFs A254 and A256. TE MC Q output A272 and TC SC Q* output A274 of FF A256 are connected respectively to inputs of NAND gates A258 and A260. A TE MIC Q output A275 of FF A254 is parallel-connected to inputs of NAND gates A258 and A260. A TB TSC control output A276 of the 2nd TB TBCL means (not shown) of TE 22 is connected to another input of NAND gate A258. TE arm output A278 of NAND gate A260 is connected to an input of 2nd TB TBCL means (not shown) of TE 22.

When TE 22 is selected for independent configured (IC) secondary mode during the S mode, D input A270 of data bus A266 and the D input A268 of data bus A266 are set high and low respectively. Then when decoder output A264 provides a high to the C inputs of FFs A254 and A256, Q output A222, Q* output A274 and Q output A275 are high, low and low respectively. Output A280 of NAND gate A258 is connected to ITE control output 231 and parallel-connected via branch A282 to an input of NOR gate A262.

Prior to an operative phase of TE MSI configuration for any TE of system 10, an HC operator during S mode 7 of selected TE 18 makes TE 18 slave configured; thus data outputs 333 and 335 are low and high to the D inputs of FFs 478 and 480. On the other hand, TE 20 is selected to be MC. Accordingly, during S mode of selected TE 20, data input A222 is high to the D input of FF A206 thereby causing Q output A234, Q* output A236 and Q output A238 to go high, low and high respectively when output A233 of decoder A232 is high to the C inputs of FFs A204 and A206. It is noted here that output A216 of PR/MS logic means A214 is low when all TEs of system 10 are simultaneously powered up prior to use of system 10 and HC 16 thereof. With output A216 initially low FFs A204 and A206 are reset before TE 20 use. Similarly, FFs 478 and 480 of logic means 326 of TE 18 are reset in this fashion. Thus, it is evident, the FFs of the TEMSICC logic means of all system TEs are reset in this fashion prior to use in some Q or P mode as aforedescribed in evaluating the SDWSM inputs of MFC 12.

HC external trigger output 235 is connected to ITE control output 231, thereby extending the open collector between all system TEs to the HC as well. A positive bias source A284 including its series resistor is connected to HC output 235. Output 235 is normally high during system use. However, the importance of the relationship between ITE control output 231 and HC output 235 will become more apparent hereinafter.

During analysis of a SDWSM input by MC TE 20, output A240 of TBCL means A242 will be high or low. It is noted here that output A240 stems from the Q output of a FF (not shown) of TBCL means A242. But this FF of TBCL means A242 is analogous to Q output 662 of FF 908 of TBCL means 584 (FIG. 12A, sheet 1) as aforedescribed. Thus, when output A240 goes low then NAND gate output A242 goes high, output 498 of NOR gate 486 to SC TE 18 goes low; therefore output 337 of NAND gate 484 thereto goes high (and TBCL means 584 remains armed to carry out its secondary mode analysis as aforedescribed for MBM, EBM, etc.). But when output A240 goes high, then NAND gate output 337 goes low and the secondary modes of TBCL means 584 are in effect disarmed and TBCL means 584 is shutdown unless a FSM event occurs as aforedescribed such as TTCR or shutdown (HCMS or TEM stop configuration occurs.) Thus, SC TE 18 is controlled by MC TE 20 or any other MC system TE (not shown) of system 10.

When output 235 of HC 16 goes low (as effected by SkPC system 160 (operation selection) logic means 164, combined arrangement output 230, etc.), then output 337 of SC TE 18 goes low or any SC TE of system 10 goes low regardless of output A242 of MC TE 20 or the NAND gate output of any MC TE (not shown) of system 10. Thus, the TBCL means of any SC TE can be disarmed by HC output 235 being low (and thus override any MC system TE output to ITE control 231).

On the other hand, TE 22 has been set up for an IC secondary mode. To this end, data inputs A270 and A268 of bus A266 are set high and low respectively during the S mode for IC TE 22. When the C inputs of FFs A254 and A256 are high as provided by output A264 of decoder (not shown), then Q output A272, Q* output A274 and Q output A275 are high, low and low respectively. With at least one input always low to NAND gate A260 and even though output branch A282 to an input of NOR gate A262 may be high or low depending on whether trigger open collector output 231 is high or low as aforedescribed, output A278 of NAND gate 260 is always high to the TE arm input (not shown) of TBCL means (not shown) of IC TE 22. Thus, with its TE arm input (not shown) always high for IC TE 22, or for any IC TE of system 10, the TBCL means of any IC TE is not disabled by its TE arm input because it remains high.

Figure 19:
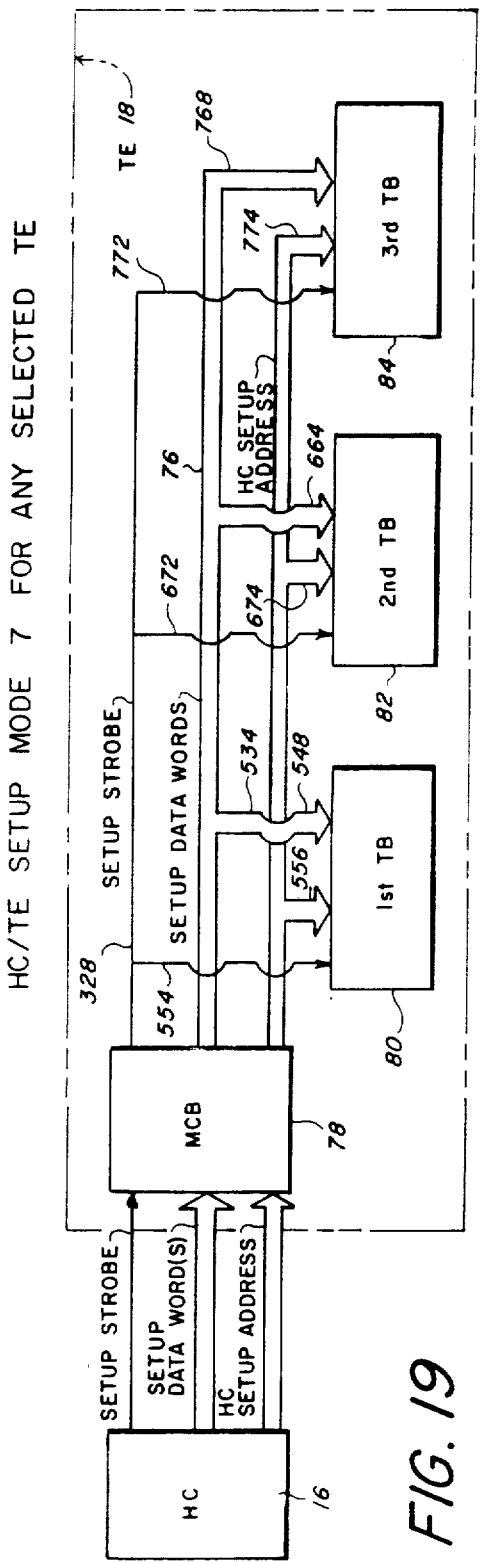
- FIG. 19 is a schematic view of the system with parts removed and generally illustrates the configuration of a TE of the system when it is in setup mode.

In view of the foregoing, it is evident that DARP system 10 is highly versatile and can be readily tailored to meet the requirements for effectively and efficiently analyzing various performance outputs of any computer being diagnosed such as MFC 12. In other words, for a given number of TEs of system 10 a certain number can be master and slave the remainder independent, all master and slave, all independent, etc. Although not heretofore mentioned, branch 237 of HC trigger output 231 during use of system 10 provides a status signal high or low to display 162 of HC 16 via buffer means 186, buses 208 and 178, buffer means 179, SPCS 160 and bus 170 as best shown in FIGS. 6 and 19.

SUMMARY

Figure 24A:
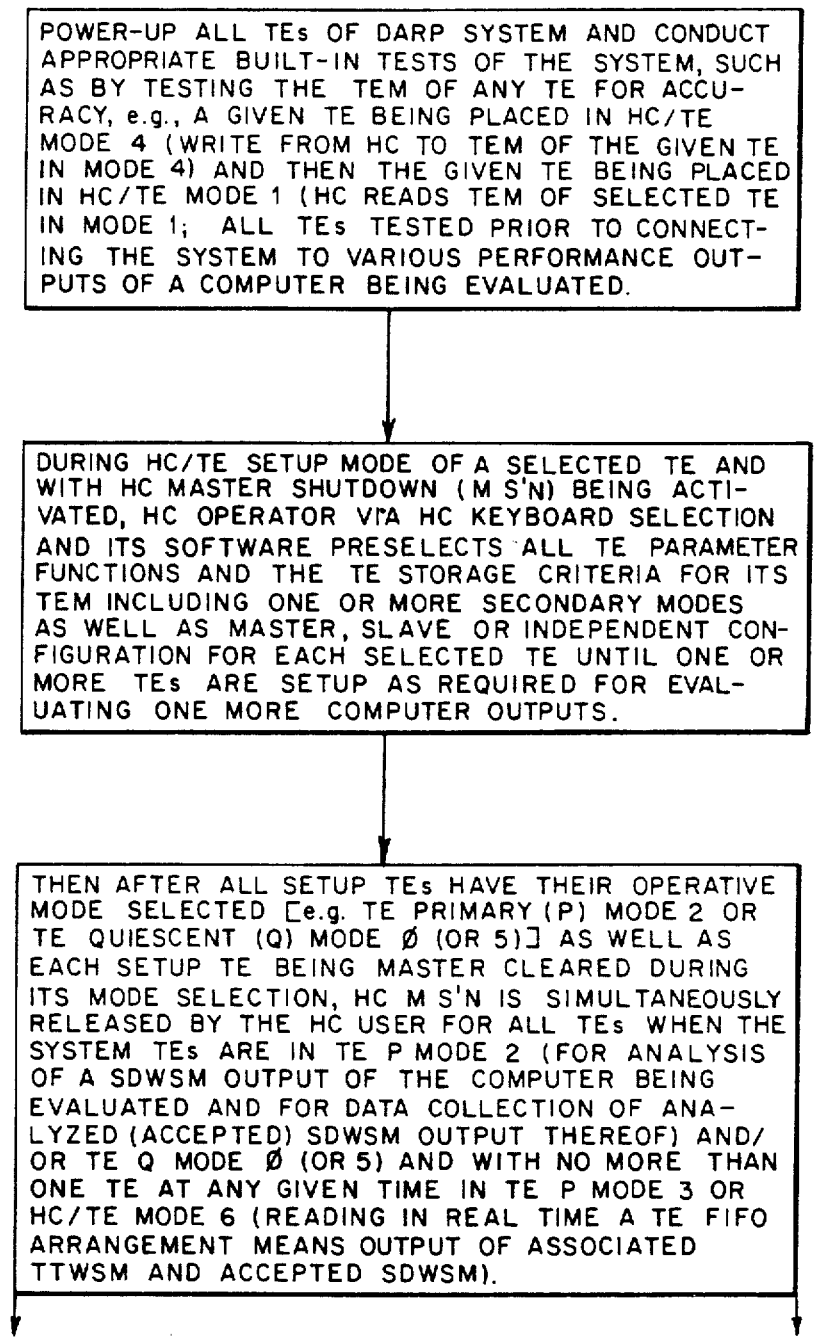
FIGS. 24A–24B is a flow chart illustrating an overall operative embodiment of the improved system.
Figure 24B:
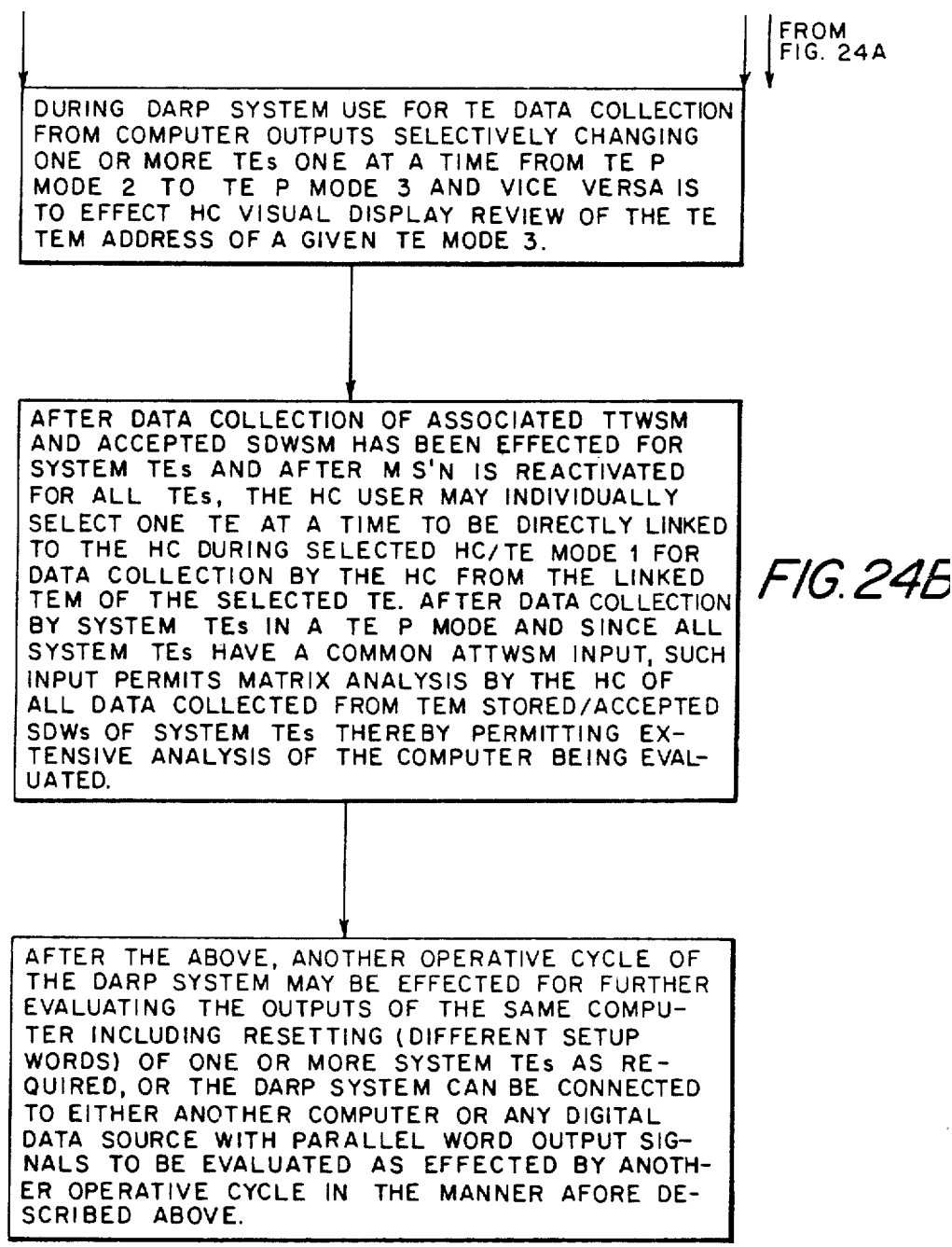

To further illustrate an operative embodiment of system 10 with a computer 12 being evaluated, a series of successive program blocks are provided in FIGS. 24A and 24B that are believed to be self-explanatory. Moreover, by reason of the recorded results of accepted and stored SDWs and TTWs as exemplified by the various tables of FIGS. 17A-17D and FIGS. 18A-18D the user of the system may conduct an intelligent final analysis for determining whether or not any performance output of MFC 12 is operating in a correct fashion.

In one reduction to practice all SDWSM or SQWSM outputs of MFC 12 were driven by a sample clock of 6.67 Mega Hertz (MH). ATTG 14 was provided with a 10.0 MH oscillator 128 and a 32-bit synchronous counter. ATTG sequencer 118 provided first sequenced output 132 at 25.0 nanoseconds (NS), second sequenced output 136 at 90.0 NS, third sequenced output 134 at 100.0 NS and fourth sequenced output 138 at 105 NS. For the TEMCL means of the MCB of a TE a 32×8 PROM was used for PROM 238 of TE 18. Similarly, three to eight decoder elements such as decoder 324, FIG. 8C of TE 18. As to sequencer 818 of TBCL means 584 of second TB 82, its first sequenced output 820 was at 45 NS, second sequenced output 854 at 60 NS, third sequenced output 892 at 90 NS, fourth sequenced output 896 at 105 NS, fifth sequenced output 958 at 135 NS, and sixth sequenced output 992 at 150 NS.

Obviously many modifications and variations of the present invention are possible in light of the above teachings. It is therefore to be understood that, within the scope of the appended claims, the invention may be practiced otherwise than as specifically described.

What is claimed is:

1. A selective multimode/multiconfigurable DARP system for diagnosing one or more parallel signal word outputs of a digital data source means, said system comprising:

host computer (HC) means and at least one trigger element (TE) means, the HC means being made up of combined control arrangement means, the arrangement means providing TE select output means, TE mode select output means, mode strobe output means and data word setup strobe output means, the HC means also being made up of setup data word buffer latch (SUDWBL) means and setup address buffer latch (SUABL) means, the one TE means being made up of master control board (MCB) means and trigger board (TB) means, the MCB means of the one TE means having TE select decoder means, PROM means, mode control word latch (MCWL) means and TE mode control logic (TEMCL) means, the HC TE select output means being interconnected to an input of the TE select decoder means of the MCB means of the one TE means, the HC TE select output means providing an encoded output to the TE select decoder means for effecting selection of the one TE means, the TE mode select output means being interconnected to input means of the PROM means of the MCB means, the MCB means for connecting an output of the TE select decoder means to another input means of the PROM means such that the output of the TE select decoder means causes actuation of the PROM means when the one TE means is selected, output means of the PROM means being connected to input means of the MCWL means, output means of the MCWL means being connected to input means of the TEMCL means, an encoded TE mode select output of the TE mode select output means resulting in a setup (S) mode output of the PROM means to the MCWL means and then to the TEMCL means when the one TE means is selected and when the MCWL means of the one TE means is strobed by the HC mode strobe output means during system use, the TB means being made up of at least one latch address decoder/setup data words buffer (LAD/SUDWB) arrangement means and at least one parameter logic (PL) arrangement means, the PL arrangement means being made up of setup data word (SUDW) latch means, the LAD means of the LAD/SUDWB arrangement means providing strobe output means to the SUDW latch means, the SUDWB means of the LAD/SUDWB arrangement means providing setup data word (SUDW) output means to the SUDW latch means, first means for connecting the SUDWBL means of the HC means to the SUDWB means of the LAD/SUDWB arrangement means, second means for connecting the SUABL means of the HC means to the latch address decoder (LAD) means of the LAD/SUDWB arrangement means, the encoded S mode output of the MCWL means to the TEMCL means in conjunction with the HC setup strobe output to the TEMCL means providing MCB setup strobe output of the TEMCL means to the LAD means of the LAD/SUDWB arrangement means together with an MCB setput enable output of the TEMCL means to both the LAD and SUDWB means of the LAD/SUDWB arrangement means, the HC means in conjunction with the encoded TE select and TE mode select outputs also providing a preselected setup data word (SUDW) output from the SUDWBL means via the first means to the SUDWB means of the LAD/SUDWB arrangement means while at the same time providing an associated setup address from the HC SUABL means via the second means to the LAD means of the LAD/SUDWB arrangement means so as to provide a latchable setup data word output from the output means of the SUDWB means of the LAD/SUDWB arrangement means to the SUDW latch means of the PL arrangement means as the output means of the LAD means of the LAD/SUDWB arrangement means in response to the setup address received by the LAD means from the HC SUABL means in conjunction with both the MCB setup strobe output and the MCB setup enable output to the LAD means provides a strobe output to the one SUDW latch means of the PL arrangement means for latching-in the HC preselected SUDW output of the SUDWB means of the LAD/SUDWB arrangement means.

2. A system as set forth in claim 1 wherein the PL arrangement means is an upper boundary PL arrangement means.

3. A system as set forth in claim 1 wherein the PL arrangement means is a lower boundary PL arrangement means.

4. A system as set forth in claim 1 wherein the SUDW latch means is mask SUDW latch means.

5. A system as set forth in claim 1 wherein the SUDW latch means is compare SUDW latch means.

6. A system as set forth in claim 1 wherein the PL arrangement means is new/old PL arrangement means.

7. A system as set forth in claim 6 wherein the SUDW latch means is new/old mask SUDW latch means.

8. A system as set forth in claim 1 wherein the PL arrangement means is qualifier parameter logic (QPL) arrangement means.

9. A system as set forth in claim 8 wherein the SUDW latch means is compare/mask SUDWB latch means.

10. A system as set forth in claim 9 wherein the LAD means of the LAD/SUDWB arrangement means is provided with separate SUDW strobe output means with one strobe output means being connected to the DTPL arrangement means and the other strobe output means being connected to the LBPL arrangement means.

11. A system as set forth in claim 1 wherein the PL arrangement means is comprised of delay timer parameter logic (DTPL) arrangement means and lower boundary parameter logic (LBPL) arrangement means and wherein the SUDW output means of the SUDWB means of the LAD/SUDWB arrangement means is parallel-interconnected to the DTPL and LBPL arrangement means.

12. A system as set forth in claim 1 wherein at least one TE means is comprised of a plurality of two or more TE means and wherein the TE select output means of the HC means is interconnected to each TE means of the plurality for individually selecting each TE means of the plurality during setup mode operation of the system.

13. A system as set forth in claim 1 wherein the MCB means is provided with bidirectional buffer (BB) means, wherein the first means is interconnected to the BB means, and wherein the TEMCL means is provided with direction control and enable output means connected to the BB means for controlling direction of a SUDW output from the SUDWBL means via the first means to the SUDWB means during S mode use of the system.

14. A system as set forth in claim 1 wherein the MCB means is provided with bidirectional address (BA) means, wherein the second means is interconnected to the BA means, and wherein the TEMCL means is provided with address direction and control output means for controlling direction of the setup address output from the SUABL means via the second means to the LAD means.

15. A selective multimode/mulitconfigurable DARP system for evaluating one or more parallel signal word outputs of digital data source means, said system comprising:
host computer (HC) means and at least one trigger element (TE) means,
the HC means being made up of combined control arrangement menas, the arrangement means providing an encoded TE select output means, an encoded TE mode select output means, mode strobe output means and setup strobe output means, the HC means also being made up of setup data word buffer latch (SUDWBL) means and setup address buffer latch (SUABL) means,
the one TE means being made up of MCB means, the MCB means having TE select decoder means, PROM means, mode control word latch (MCWL) means and TE mode control logic (TEMCL) means, latch address decoder (LAD) means; and TE master slave or independent configuration control (TEMSICC) logic arrangement means,
the HC encoded TE select output means being interconnected to an input of the TE select decoder means of the MCB means of the one TE means, the HC encoded TE select output means providing an encoded output to the TE select decoder means of the one TE means for selecting same,
the HC encoded mode select output means being interconnected to input means of the PROM means of the MCB means,
output means of the TE select decoder means being connected to another input means of the PROM means such that the output of the TE select decoder means causes actuation of the PROM when the one TE means is selected,
encoded output means of the PROM means being connected to input means of the MCWL means, encoded output means of the MCWL means being connected to input means of the TEMCL means, an encoded TE mode select output of the HC TE mode select output means resulting in a setup (S) mode output of the output means of both the PROM means and the MCWL means to the TEMCL means when the one TE means is selected and when the MCWL means of the one TE means is strobed by the HC mode strobe output means during system use,
the S mode output of the MCWL means to the TEMCL means in conjunction with the HC setup strobe output to the TEMCL means providing an MCB setup strobe output of the TEMCL means to the LAD means together with the MCB setup enable output of the TEMCL means to the LAD means,
the TEMSICC logic arrangement means being comprised of a pair of flip-flop (FF) means,
each FF means of the pair having C and D inputs,
first means for interconnecting the SUDWBL means of the HC means to the D input of each FF means of the pair thereof,
second means for interconnecting the HC SUABL means to the LAD means, and
the LAD means having a setup strobe output parallel-connected to the C inputs of the pair of FF means,
the HC means in conjunction with the encoded TE select and TE mode outputs providing a preselected setup data word (SUDW) output from the SUDWBL means via the first means to the D inputs of the pair of FF means of the TEMSICC logic arrangement means while at the same time also providing an associated setup data address from the SUABL means via the second means to the LAD means so that the SUDW output of the SUDWBL means is latched-in from the D inputs of the pair of FF means to at least one Q output of each FF means of the pair thereof.

16. A system as set forth in claim 15 wherein the SUDW output of the SUDWBL means is patterned for effecting independent configuration of the TE means during a mode thereof.

17. A system as set forth in claim 15 wherein the SUDW output of the SUDWBL means is patterned for effecting master configuration of the TE means during a mode thereof.

18. A selective multimode/multiconfigurable DARP system for evaluating one or more parallel signal word outputs of digital data source means, said system comprising:
host computer (HC) means and at least one trigger element (TE) means,
the HC means being made up of combined control arrangement means, the arrangement means providing TE select output means, TE mode select output means, mode strobe output means and setup strobe output means, the HC means also being made up of setup data word buffer latch (SUDWBL) means and setup address buffer latch (SUABL) means, the HC means having software and keyboard controlled I/O processing control system (SKPCS) means for providing a series of three different setup data words (SDWs) and another series of three different setup addresses where each SDW of the series is associated with its respective setup address of the series when the user of the SKPCS means during system use selects a SDW and its associated setup address, the HC means being provided with means for interconnecting the SKPCS means, SUABL means and SUDWBL means, the HC means also being provided with latch-control logic (LCL) means having output means connected to the SUABL means, the SUDWBL means and the interconnecting means for controlling the transfer of each SDW and its associated address from the SKPCS means to the SUDWBL means and the SUABL means respectively when a SDW and its associated setup address is selected by the user of the SKPCS means, the one TE means beng made up of master control board (MCB) means and trigger board (TB) means, the MCB means of the one TE means having TE select decoder means, PROM means, mode control word latch (MCWL) means and TE mode control logic (TEMCL) means, the HC TE select output means being interconnected to input means of the TE select decoder means of the MCB means, the HC TE select output means providing an encoded output to the TE select decoder means of the MCB means for selecting the one TE means, the TE mode select output means being interconnected to input means of the PROM means of the MCB means the MCB means for connecting output means of the TE select decoder means to input means of the PROM means such that the output of the TE select decoder means causes actuation of the PROM when the one TE means is selected, the TE mode select output means being connected to other input means of the PROM means, output means of the PROM means being connected to input means of the MCWL means, output means of the MCWL means being connected to input means of the TEMCL means, an encoded TE mode select output of the TE mode select output means resulting in a setup (S) mode output of the PROM means to the MCWL means and then to the TEMCL means when the one TE means is selected and when the MCWL means of the one TE means is strobed by the HC mode strobe output means during system use, the TB means being made up of latch address decoder/setup data word buffer (LAD/SUDWB) arrangement means, parameter logic (PL) arrangement means, first and second SUDW latch means, TE address generator control (TEAGC) arrangement means and trigger board control logic (TBCL) means, the PL arrangement means being provided with mask word latch means and compare word latch means, the first SUDW latch means being operatively associated with the TBCL means, the second SUDW latch means being operatively associated with the TEAGC arrangement means, first means for interconnecting the SUDWBL means to the setup data words buffer (SUDWB) means of the LAD/SUDWB arrangement means, second means for interconnecting the SUABL means to the latch address decoder (LAD) means of the LAD/SUDWB arrangement means, TEMCL means having setup enable output means connected to the LAD means of the LAD/SUDWB arrangement means and the SUDWB means thereof, TEMCL means also having setup strobe output means connected to the LAD means, the S mode output of the MCWL means to the TEMCL means in conjunction with the HC setup strobe output to the TEMCL means providing an MCB setup strobe output from the TEMCL means via its setup strobe output means to the LAD means, first setup strobe output means of the LAD means being connected to the compare word latch means of the PL arrangement means, second setup strobe output means of the LAD means being connected to the mask word latch means of the PL arrangement means, third setup stroke output means of the LAD means being parallel-connected to the first and second SUDW latch means, and SUDW output means of the SUDWB means of the LAD/SUDWB arrangement means being connected to the mask word latch means and the compare word latch means, one portion of the SUDW output means being connected to the first SUDW latch means, another portion of the SUDW output means being connected to the second SUDW latch means, the HC means in conjunction with the encoded TE select and TE mode select outputs also providing a preselected setup data word output from the SUDWBL means via the first means to the SUDWB means of the LAD/SUDWB arrangement means while at the same time providing an associated setup address from the HC SUABL means via the second means to the LAD means of the LAD/SUDWB arrangement means so as to provide a latchable SUDW output from the output means of the SUDWB means of the LAD/SUDWB arrangement means to the compare word latch means of the PL arrangement means when the associated setup address is received by the LAD means that results in the first strobe output means providing an output to the compare word latch means for latching-in the SUDW output of the SUDWB means.

19. A system as set forth in claim 18 wherein the HC means provides another SUDW output from the SUDWBL means via the first means to the SUDWB means and another setup address from the SUABL means via the second means to the LAD means so as to provide a latchable other SUDW output from the SUDWB means to the mask word latch means when the other associated setup address is received by the LAD means that results in a second strobe output of the LAD means to the mask word latch means so as to latch-in the other SUDW output from the SUDWB means thereto.

20. A system as set forth in claim 18 wherein the HC means provides a third SUDW output from SUDWBL means via the third means to the SUDWB means and a third setup address from the SUABL means via the second means to the LAD means so as to provide a latchable third SUDW output from the SUDWB means, one portion of the third SUDW output being connected to the first SUDW latch means and another portion of the SUDW output being connected to the second SUDW latch means when the third associated setup address is received by the LAD means that results in a third strobe output of the LAD via the third strobe output means to the first and second SUDW latch means so as to cause latching-in of the one portion of the third SUDW in the first SUDW latch means and the latching-in of the second portion of the third SUDW in the second SUDW latch means.

21. A selective multimode/multiconfigurable DARP system for evaluating one or more signal parallel word outputs of digital data source means comprising:
 host computer (HC) means and at least one trigger element (TE) means,
 the HC means being made up of combined control arrangement means, the arrangement means providing TE select output means and HC master clear output means,
 the one TE means being made up of master control board (MCB) means and trigger board (TB) means,
 the MCB means having TE select decoder means and gate means,
 the TE select output means of the HC means being connected to the TE select decoder means of the MCB means,
 output means of the TE select decoder means being connected to an input of the gate means, the HC master clear output means being connected to another input of the gate means,
 the TB means having TE address generator control (TEAGC) arrangement means and trigger board control logic (TBCL) means,
 the TEAGC arrangement means being made up of TE address counter (TEAC) means, the TEAC having reset input means,
 the TBCL means being made up of flip-flop (FF) means, the FF means having an S input and Q and Q* outputs, and
 output means of the gate means being interconnected to the reset input means of the TEAC means and the S input of the FF means, the output means of the gate means providing a low output for resetting the TEAC means and for setting the Q and Q* outputs of the FF means both high and low respectively means when the output of the TE select output means of the HC means has selected the TE means by providing a low output from the output means of the TE select decoder means while at the same time the output of the HC master clear output means has been actuated low all as the result of selective control by the user of the HC means.

22. A system as set forth in claim 21 wherein the gate means is an OR gate means.

23. A system as set forth in claim 21 wherein the TEAGC arrangement means is comprised of TEAGC logic means, wherein the TEAGC logic means is provided with flip-flop (FF) means, wherein the FF means of the TEAGC logic means has reset input means; and wherein output means of the gate means is also connected to the reset input means of the FF means of the TEAGC logic means.

24. A system as set forth in claim 21 wherein the MCB means is further comprised of first-in, first out (FIFO) control logic means and FIFO arrangement means, wherein the FIFO control logic means is generally made up of a series of three FF means, wherein the output means of the gate means is connected to the FIFO arrangement means for resetting same when the output of the output means of the gate means is low, wherein the output means of the gate means is also connected to the R input of one of the FF means of the series thereof for resetting the Q output of the one thereof when the output of the output means is low, wherein the FIFO control logic means is also comprised of inverter means and gate means, wherein the inverter means and gate means are interconnected to the R inputs of the second and third FF means of the series thereof, and wherein the output means of the gate means is also interconnected to the inverter means and the gate means so that the R inputs of the second and third FF means will timely reset at least one Q output of the second and third FF means during each pulsed operative cycle of the FIFO control logic means when the HC master clear output means together with the output means of the gate means of the MCB means are both low as the result of operator control of the HC means during a primary mode of the TE means.

25. A system as set forth in claim 24 wherein the FIFO arrangement means is comprised of FIFO means and flip-flop (FF) means; wherein the FIFO means and FF means have reset input means; and wherein the output means of the gate means is interconnected to the reset input means of the FIFO means and to the reset input means of the FF means all for resetting the FIFO means and the FF means when the output of the output means of the gate means of the MCB means is low.

26. A selective multimode/multiconfigurable DARP system for evaluating one or more parallel signal word outputs of digital data source means, said system comprising:
 host computer (HC) means, at least one trigger element (TE) means and digital data source means having at least one performance output means providing a sample data word stream (SDWSM) input to the one TE means and a sample clock input thereto,
 the HC means being made up of combined control arrangement means, the combined control arrangement means having HC master shutdown (HCMS) output means,
 the TE means being made up of master control board (MCB) means, TE memory (TEM) means and trigger board (TB) means; the TB means being comprised of SDWSM input latch means, lower boundary parameter logic (LBPL) arrangement means, upper boundary parameter logic (UBPL) arrangement means, trigger board control logic (TBCL) means and TE address generator control (TEAGC) arrangement means,
 the SDWSM input and the sample clock input being connected to the SDWSM input latch means, output means of the SDWSM input latch means being separately connected to the LBPL and UBPL arrangement means so as to provide a SDW input of the SDWSM input to the LBPL and UBPL arrangement means in response to each pulse of the sample clock input,
 the LBPL and UBPL arrangement means having predetermined LB and UB comparison word values, output means of the LBPL and UBPL arrangement means being separately connected to the TBCL means for indicating whether any SDW of the SDWSM input in being analyzed by the LBPL and UBPL arrangement means is equal to, not equal to, greater than or less than the predetermined UB and LB comparison word values, the TBCL means being comprised of sequencer means, secondary mode analysis (SMA) means, open collector means, first and second flip-flop (FF) means, forced storage mode (FSM) means; NOR gate means, the first FF means having C and D inputs and a Q output; the second FF means having R and S inputs and a Q output, the sequencer means having first and second delayed output means;

the HCMS output means being connected to the D input of the first FF means, the first delayed output means being connected to the C input of the first FF means, the second delayed output means being connected to an input of the NOR gate means, the Q output of the first FF means being connected to another input of the NOR gate means; the inverted output of the NOR gate means being interconnected to the SMA means and to the FSM means, inverter means connected to the Q output of the first FF means; output means of the inverter means being connected to the R input of the second FF means, output means of the SMA means and output means of the FSM means being interconnected to the open collector means, output means of the open collector means being connected to the S input of the second FF means, the TEAGC arrangement means being made up of TE address generator control (TEAGC) logic means, the Q output of the second FF means being connected to the TEAGC logic means, output means of the TEAGC logic means being connected to the TEM means, the HCMS output means when high as the result of operator actuation of the HC means causes the Q output of the first FF means to be high when the C input of the first FF means is actuated by the first delayed output means, the output means of the NOR gate means is low when actuated by the second delayed output means thereby causing the output means of the SMA and FSM means to be high thereby resulting in the open collector means being high to the S input of the second FF means while the output means of the inverter means is low to the R input of the second FF means thereby resetting the Q output of the second FF means to low so as to prevent the TEM means for storing therein an accepted SDW of a SDWSM input as the result of analysis by the LBPL and UBPL arrangement means and the SMA means.

27. A system as set forth in claim 26 wherein the system is also comprised of asynchronous time-tag generator (ATTG) means, wherein the ATTG means is provided with counter means; the HCMS output means being connected to the counter means and wherein the HCMS output means shuts down the counter means whenever the HCMS output means is high.

28. A system as set forth in claim 26 wherein the TB means is comprised of delay timer parameter logic (DTPL) arrangement means and AND gate means, wherein the sample clock input is connected to an input of the AND gate means, wherein the first FF means is provided with Q* output means, wherein the Q* output means is connected to another input of the AND gate means and wherein the output of the AND gate means is connected to the DTPL arrangement means and wherein the Q* output means when low as the result of the HCMS output means being high causes the output of the AND gate means to be low so as to stop operation of the DTPL arrangement means.

29. A system as set forth in claim 26 wherein the combined control arrangement means is also comprised of TE mode select output means, wherein the MCB means is comprised of TE mode control logic (TEMCL) means, PROM means and mode control word latch (MCWL) means, wherein the TEMCL means is provided with OR gate means, the TE mode select output means being connected to the PROM means, output means of the PROM means being connected to the MCWL means, output means of the MCWL means being connected to an input of the OR gate means, the HCMS output means being connected to another input of the OR gate means, the output of the OR gate means being connected to the D input of the first FF means, wherein the output means of the MCWL means is high to the input of the OR gate means during at least one mode of the TE means so as to provide a high output to the D input of the first FF means thereby causing the Q output of the second FF means to go low for shutting down the TEAGC arrangement means and thus the TEM means from storing any SDW of the SDWSM input.

30. A system as set forth in claim 26 wherein the TEAGC logic means is provided with wrap/stop (W/S) logic means for the TEM means, wherein the TBCL means is provided with an OR gate means, output means of the W/S logic means being connected to an input of the OR gate means, the HCMS output means being connected to another input of the OR gate means, the output of the OR gate means being connected to the D input of the first FF means, and wherein the Q output of the second FF means goes low for shutting down the TEAGC arrangement means and thus the TEM means from storing any SDW of the SDWSM input when the output of the W/S logic means is high.

31. A selective multimode/multiconfigurable DARP system for evaluating one or more parallel signal word outputs of digital data source means, said system comprising:

host computer (HC) means, at least one trigger element (TE) means and digital data source means, the digital data source means having at least one performance output means providing a sample data word stream (SDWSM) input to the TE means and a sample clock input thereto, the HC means being made up of combined control arrangement means, the combined control arrangement means having HC master shutdown (HCMS) means, the one TE means being made up of TE memory (TEM) means and trigger board (TB) means, the TB means being comprised of SDWSM input latch means, and trigger board control logic (TBCL) means, the SDWSM input and the sample clock input being connected to the SDWSM input latch means, output means of the SDWSM input latch means providing a SDW in response to each pulse of the sample clock input, the TBCL means being comprised of sequencer means, first and second flip-flop (FF) means, inverter means, forced storage mode (FSM) means, input latch means and a series of two NOR gate means, the sequencer means having a series of three delayed output means, the HCMS output means being connected to the D input of the first FF means, the first delayed output means of the series of three thereof being connected to the C input of the first FF means, the second delayed output means of the series of three thereof being connected to the input latch means, the Q output of the first FF means being connected to an input of the first NOR gate means of the series of two thereof, the inverted output of the first NOR gate means being connected to the S input of the second FF means, the Q output of the second FF means being connected to input means of the input latch means, output means of the input latch means being connected to an input of the FSM means, the third delayed output means of the series of three thereof being connected to an input of the second NOR gate means of the series of three thereof, the Q output of the first FF means being also connected to another input of the second NOR gate means, inverted output means of the second NOR gate means being connected to another input of the FSM means, the HCMS output means when high as effected by the user of the HC means causes the Q output of the second FF means to be high to the FSM means while the inverted output of the second NOR gate means to the FSM means is low thereby causing the output of the FSM means to be high so as to prevent storage of any sample data word (SDW) from the SDWSM intput to the TEM means, and the HCMS output means when actuated from high to low as effected by the user of the HC means causes the Q output of the first FF means to be low when the C input of the first FF means is actuated by the first delayed output means, then the inverted output of the second NOR gate means is high to the FSM means while the output means of the input latch means remains high so that the output of the FSM means is low for effecting forced storage of a SDW from the SDWSM input when the HCMS output means is actuated from high to low.

32. A selective multimode/multiconfigurable DARP system for evaluating one or more signal parallel word outputs of digital data source means, said system comprising:

host computer (HC) means, at least one trigger element (TE) means and digital data source means to be evaluated, the HC means being made up of combined control arrangement means, the arrangement means providing TE select output means, mode strobe output means and TE mode select output means, the source means providing a SDWSM input to the TE means and a sample clock input means thereto, the one TE means being made up of master control board (MCB) means, trigger board (TB) means and TE memory (TEM) means, the MCB means having bidirectional buffer (BB) means, the MCB means having TE select decoder (TESD) means, PROM means, mode control word latch (MCWL) means and TE mode control logic (TEMCL) means, the TE select output means being connected to input means of the TESD means, the TE select output means providing an encoded output to the TESD means for selecting the one TE means during system use, the TE select output means being also connected to input means of the PROM means for enabling same, the TE mode select output means being connected to another input means of the PROM means, output means of the PROM means being connected to the MCWL means, and output means of the MCWL means being connected to input means of the TEMCL means, the mode strobe output means being connected to the MCWL means, the TE mode select output means providing an encoded mode select output to the PROM means so as to provide a TE primary mode output from the PROM means to the TEMCL means when a pulse of the mode strobe means occurs, the TB means being made up of sample data word stream (SDWSM) input latch means, lower boundary parameter logic (LBPL) arrangement means, upper boundary parameter logic (UBPL) arrangement means, SDWSM input latch means for receiving a SDWSM input and sample clock input from the source means, TB control logic (TBCL) means, and setup data word latch (SUDWL) means, the SUDWL means having output means connected to the TBCL means and being preset with an operator-selected setup data word output during setup mode of the one TE means, the preset output of the output means of the SUDWL means for enabling and controlling secondary mode operation of the TBCL means during a TE primary mode of the system, TB clock input means being connected to the sample clock input means and the TBCL means and the TB clock input providing a pulse to the TBCL means for each pulse of the sample clock input means, the LBPL arrangement means being comprised of lower boundary (LB) mask means and LB data comparator means, the UBPL arrangement means being comprised of upper boundary (UB) mask means and UB data comparator means, accepted SDWSM latch means, output means of the SDWSM input latch means being parallel-interconnected to the accepted SDWSM latch means, the LB mask means and the UB mask means, the output means providing a SDW from the SDWSM input to the accepted SDWSM latch means and the LB and UB mask means in response to each pulse of the sample clock input upon use of the system during a TE primary mode thereof, the LB mask means being provided with a predetermined mask word during setup mode (SM) of the TE means for masking the SDWSM input therewith, output means of the LS mask means being connected to the LB data comparator means and providing a masked SDWSm input thereto, the LB data comparator means being provided with a predetermined LB compare word value (LBCWV) during SM of the TE means for comparing the masked SDWSM input therewith, the LB data comparator means having output means connected to the TBCL means and providing output to the TBCL means for indicating when any compared/masked SDW of the SDWSM input is a value less than, greater than, equal to or not equal to the predetermined LBCWV of the LBPL arrangement means, the UB mask means being provided with a predetermined mask word during SM of the TE means for masking the SDWSM input therewith, output means of the UB mask means being connected to the UB data comparator means and providing a masked SDWSM input thereto, the UB data comparator means being provided with a predetermined UB compare word value (UBCWV) during SM of the TE means for comparing the masked SDWSM input therewith, the UB data comparator means having output means connected to the TBCL means and providing an output to the TBCL means for indicating when any compared/masked SDW of the SDWSM input is a value equal to, not equal to, greater than or less than the predetermined UBCWV of the UBPL arrangement means, the accepted SDWSM latch means having output means connected to the TEM means and the BB means of the MCB means, the TEMCL means having direction and tri-state control output means connected to the BB means for controlling the direction of any data word or any data word stream between the HC means and the TE means, the output of the output means of the TEMCL means for tri-stating and direction controlling the BB means so that any accepted SDW of the SDWSM input is not transferred from the one TE means to the HC means during a TE primary mode of the system, and the TBCL means having trigger board output (TBO) means connected to the accepted SDWSM output latch means, the TBCL means in receiving the output of the SUDWL means together with the outputs of the LB and UB comparator means providing values in relation to the predetermined LBCWV and UBCWV for determining whether or not a SDW of the SDWSM input is acceptable for storage in the TEM, such acceptability of a SDW from the SDWSM input occurring in response to each pulse of the TB clock input when the output of the TBO means goes low thereby causing the accepted SDWSM latch means via its output means to release the SDW from the SDWSM input on the output means of the SDWSM input latch means to the TEM for storage therein.

33. A system as set forth in claim 32 wherein the TB means is comprised of delay timer parameter logic (DTPL) arrangement means, the DTPL arrangement means having output means connected to the TBCL means, the output of the output means of the DTPL arrangement means for indicating when the preset delay conditions of the DTPL arrangement means have been met so that the TBCL means can analyze the outputs of the LB and UB comparator means as to the acceptability of a SDW of the SDWSM input in relation to each pulse of the TB clock input.

34. A system as set forth in claim 32 wherein the TB means is comprised of new/old parameter logic NOPL arrangement means, wherein the TBCL means has input means, wherein the NOPL arrangement means has output means connected to the input means of the TBCL means, and wherein the output means of the SUDWL means has control means connected to the input means for enabling same.

35. A system as set forth in claim 32 wherein the TB means is comprised of new/old parameter logic (NOPL) arrangement means, wherein the NOPL arrangement means is generally made up of old (accepted) SDW input latch means; wherein the output means of the SDWSM input latch means is also parallel-interconnected to the old (accepted) SDW input latch means and wherein the TBO means is also connected to the old (accepted) SDW input latch means, the output of the TBO means for latching-in a SDW of the SDWSM input in the old SDW input latch means when the output of the TBO means goes low indicating acceptance of the SDW as the result of the determination by the TBCL means in relation to a pulse of the TB clock input means.

36. A system as set forth in claim 35 wherein the NOPL arrangement means is generally comprised of predetermined new/old mask word (PNOMW) latch means, old SDW mask means, new SDW mask means and new/old SDW comparator means, wherein output means of the PNOMW latch means is parallel-interconnected to the new and old SDW mask means, wherein the output means of the SDWSM input latch means is also parallel-interconnected to the new SDW mask means, wherein output means of the old SDW input latch means is connected to the old SDW mask means, wherein output means of the old SDW mask means and output means of the new SDW mask means are separately connected to the SDW comparator means, and wherein output means of the new/old SDW comparator means is connected to the TBCL means for indicating whether or not a new SDW of the SDWSM input equals or doesn't equal an old accepted SDW as latch-in in the old (accepted) SDW input latch means.

37. A system as set forth in claim 32 wherein the TB means is comprised of qualifier parameter logic (QPL) arrangement means and SQWSM input latch means, wherein the source means provides a SQWSM input connected to the SQWSM input latch means, wherein output means of the SQWSM input latch means is connected to the QPL arrangement means, and wherein the TB clock input means is also connected to the SQWSM input latch means so as to provide a SQW output to the output means of the SQWSM input latch means as each SQW of the SQWSM input from the source means is received by the SQWSM input latch means.

38. A system as set forth in claim 37 wherein the QPL arrangement means is generally made up of predetermined compare/mask qualifier word (PCQW) latch means, setup and SQWSM comparison means, and masking means for compared setup/SQWSM output means, wherein the output means of the SQWSM input latch means is connected to the setup and SQWSM comparison means, wherein predetermined compare word output means of the PCQW latch means is connected to the setup and SQWSM comparison means, wherein predetermined mask word output means of the PCQW latch means and compared setup/SQWSM output means of the setup and SQWSM comparison means are separately connected to the masking means and wherein output means of the masking means are connected to the TBCL means for indicating whether or not any compared/masked SQW of the SQWSM input is matched by the predetermined mask qualifier word of the PCQW latch means.

39. A selective multimode/multiconfigurable DARP system for evaluating one or more signal parallel word outputs of digital data source means, said system comprising:

digital data source means, at least one trigger element (TE) means, and asynchronous time-tag generator (ATTG) means, the digital data source means providing a sample data word stream (SDWSM) input and a sample clock input, the one TE means being made up of trigger board (TB) means and TE memory (TEM) means, the TB means being made up of SDWSM input latch means, lower boundary parameter logic (LBPL) arrangement means, upper boundary parameter logic (UBPL) arrangement means, trigger board control logic (TBCL) means, asynchronous time-tag word stream (ATTWSM) input latch means, setup data word (SUDW) latch means, and TB clock input means, the TBCL means being made up of a parameter logic (PL) input latch means, secondary mode analysis means, sequence means and flip-flop (FF) means, the FF means having C and D inputs and Q output means, the TB clock input means being connected to the sample clock input and the sequence means so as to provide a pulse for each SDW of the SDWSM input to the SDWSM input latch means, the SWDSM input and the sample clock input being connected to the SDWSM input latch means and providing a SDW on the output means in response to each pulse of the sample clock input, the output means of the SDWSM input latch means being connected to both the LBPL and UBPL arrangement means, the LBPL arrangement means being comprised of LB data comparator means, output means of the LB data comparator means for indicating as the result of LBPL arrangement means receiving a SDW of the SDWSM input for each pulse of the sample clock input whether or not a SDW of the SDWSM input is a value less than, equal to, not equal to or greater than the predetermined LB compare word value (LBCWV) of the LBPL arrangement means, the UBPL arrangement means being comprised of UB data comparator means, output means of the UB data comparator means for indicating as the result of the UBPL arrangement means receiving a SDW of the SDWSM input fo each pulse of the sample clock input whether or not a SDW of the SDWSM input is a value greater than, equal to, not equal to or less than the predetermined UB comparator word value (UBCWV) of the UBPL arrangement means, the ATTG means being comprised of ATTWSM output means and valid asynchronous time-tag word (ATTW) signal output means for each ATTW output of the ATTWSM output means, the ATTWSM output means being connected to the ATTWSM input latch means, the output means of the LBPL arrangement means and the output means of the UBPL arrangement means being separately connected to the PL input latch means, output means of the PL input latch means being connected to the secondary mode analysis means, output means of the SUDWL means being connected to the secondary mode analysis means, the SUDWL means being preset with an operator-selected setup data word (SUDW) during setup mode of the one TE means such that the present SUDW of the SUDWL means provides an output of the output means thereof for enabling and controlling the operation of the secondary mode analysis means, the sequence means in response to each pulse of the TB clock input means having delayed sequence output means connected to the PL input latching means so as to latch-in the output means of UBPL and LBPL arrangement means to the output of the output means of the PL input latch means whereby the secondary mode analysis means as the result of the preset output of the output means of the SUDWL means together with the output of the output means of the PL input latch means provides an analysis whether or not each SDW of the SDWSM input is acceptable for storage in the TEM means, and the sequence means in response to each pulse of the TB clock input means having further delayed sequence output means including gate means connected to the C input of the FF means, the valid ATTW output means being separately connected to the D input of the FF means and the gate means, the Q output means of the FF means being connected to the ATTWSM input latch means whereby the further delayed sequence output means inlcuding the gate means in conjunction with the FF means timely delays and transforms each ATTW signal of the ATTW signal output means so that the output of the Q output means for each ATTW signal is substantially synchronized with each pulse of the TB clock input means so as to provide a TTWSM output from the ATTWSM input latch means that is timely associated with each SDW of the SDWSM input whether or not any SDW of the SDWSM input is accepted by the secondary mode analysis means of the TBCL means.

40. A system as set forth in claim 39 wherein the TB means is comprised of new/old parameter logic (NOPL) arrangement means, wherein the NOPL arrangement means is comprised of new/old SDW comparator means for indicating when a new SDW of the SDWSM input is equal to or not equal to an old previously analyzed (accepted) SDW of the SDWSM input, wherein output means of the comparator means are connected to PL input latch means for indicating when a new SDW and an old SDW are queal or not equal to each other and wherein output means of the PL input latch means are connected to secondary mode analysis means for interrupting same when a new SDW of the SDWSM input is equal to an old previously accepted SDW thereof thereby rejecting the new SDW.

41. A system as set forth in claim 39 wherein the TB means is comprised of delay timer parameter logic (DTPL) arrangement means, wherein the TBCL means is provided with gate means, wherein output means of the gate means are connected to the secondary mode analysis means, wherein output means of the DTPL arrangement means is connected to an input of the gate means, wherein the output of the output means of the DTPL arrangement means indicates when the preset conditions of the DTPL arrangement means have been met so that the secondary mode analysis means is enabled.

42. A system as set forth in claim 39 wherein the TB means is comprised of qualifier parameter logic (QPL) arrangement means and sample qualifier word stream (SQWSM) input latch means, wherein the source means provides SQWSM input to the SQWSM input latch means, wherein output means of the SQWSM input latch means is connected to the QPL arrangement means, wherein TBCL means is provided with gate means, wherein the TB clock input is connected to the SQWSM input latch means, wherein each pulse of the TB clock input provides a SQW of the SQWSM input on the output means of the SQWSM input latch means, wherein the TBCL means is provided with gate means, wherein output means of the gate means is connected to the secondary mode analysis means; and wherein output means of the QPL arrangement means is connected to an input of the gate means such that the output of the output means of the QPL arrangement means indicates when a SQW of the SQWSM input matches or not matches a predetermined qualifier word value of the QPL arrangement means; and such that when the output of the output means of the QPL arrangement means indicates no match, output of the output means of the gate means interrupts the secondary mode analysis means.

43. A selective multimode/multiconfigurable DARP system for evaluating one or more signal parallel word outputs of digital data source means, said system comprising:
digital data source means and at least one trigger element (TE) means, the digital data source means providing a sample data word stream (SDWSM) input and a sample clock input,
the one TE means being made up of trigger board means and TE memory means,
the TB means being made up of SDWSM input latch means, lower boundary parameter logic (LBPL) arrangement means, upper boundary parameter logic (UBPL) arrangement means, TE address generator control (TEAGC) arrangement means, trigger board control logic (TBCL) means and setup data word (SUDW) latch means,
the TBCL means being made up of sequence means, parameter logic (PL) input latch means, secondary mode analysis (SMA) means, first and second open collector means, and first and second flip-flop (FF) means,
the SMA means being made up of a first pair of exclusive OR (XOR) gate means; and second and third pairs of gate means,
the SDWSM input latch means having output means, the SDWSM input and the sample clock input being connected to the SDWSM input latch means; the SDWSM input latch means providing a SDW from the SDWSM input to its output means in response to each pulse of the sample clock input,
the TB clock input means being connected to the sample clock input and the sequence means so as to provide a pulse for each SDW of the SDWSM input to the SDWSM input latch means,
the output means of the SDWSM input latch means being connected to both the LBPL and the UBPL arrangement means,
the LBPL arrangement means being comprised of LB data comparator means, output means of the LB data comparator means for indicating a value of less than, equal to, not equal to, or greater than the predetermined LB compare word value (LBCWV) of the LBPL arrangement means when a SDW of the SDWSM input is received in response to each pulse of the sample clock input,
the UBPL arrangement means being comprised of UB data comparator means, output means of the UB data comparator means for indicating a value that is greater than, equal to, not equal to or less than the predetermined UB comparator word value (UBCWV) of the UBPL arrangement means when a SDW of the SDWSM input is received in response to each pulse of the sample clock input,
the output means of the LBPL arrangement means and the output means of the UBPL arrangement means being separately connected to the PL input latch means, output means of the PL input latch means being interconnected to an input of each XOR gate means of the first pair of XOR gate means, output means of the first pair of XOR gate means being interconnected to an input of each gate means of the second pair of gate means and to an input of each gate means of the third pair of gate means, output means of the second pair of gate means being connected to the first open collector means, output means of the third pair of gate means being connected to the second open collector means,
delayed output means of the sequence means being connected to PL input latch means, separate output means of the PL input latch means indicating separate values equal to, greater than, not equal to or not greater than the predetermined UBCWV of the UBPL and LBPL arrangement means,
output means of the first open collector means being connected to the D input of the second FF means, output means of the second open collector means being connected to the S input of the first FF means,
the Q output of the first FF means and the Q* output of the second FF means being connected to separate inputs of the TEAGC arrangement means such that the Q and Q* outputs of the first and second FF means provide actuation of the TEAGC arrangement means when output means of the first pair of XOR gate means as the result of the separate output means of the PL input latch means together with the output means of the SUDW input latch means indicates that a SDW of the SDWSM input is acceptable for storage in the TEM means.

44. A system as set forth in claim 43 wherein each gate means of the second pair of gate means is a NAND gate.

45. A system as set forth in claim 43 wherein one of the gate means of the third pair of gate means is an event boundary mode (EBM) NAND gate means and wherein the other one of the third pair of gate means is a magnitude boundary mode (MBM) NAND gate means.

46. A selective multimode/multiconfigurable DARP system for evaluating one or more signal parallel word outputs of digital data source means comprising:
digital data source means, at least one trigger element (TE) means and asynchronous time-tag generator (ATTG) means, the digital data source means providing a sample data word stream (SDWSM) input and a sample clock input for the TE means, the one TE means being made up of trigger board (TB) means, the TB means being made up of SDWSM input latch means, accepted SDWSM latch means, asynchronous time-tag word stream (ATTWSM) input latch means, trigger board (TB) clock input means, and trigger board control logic (TBCL) means, the ATTWSM input latch means having output means, the TBCL means being made up of sequencer means, sequence controlled input latch means, forced storage mode (FSM) means, open collector means and first and second flip-flop (FF) means, the ATTG means being comprised of counter means, asynchronous time-tag word (ATTW) signal output means and asynchronous time tag counter rollover (ATTCR) signal output means, the counter means having ATTWSM output means connected to the ATTWSM input latch means and providing ATTWSM output thereto, the counter means being interconnected to the ATTW signal output means and providing a valid ATTW signal output to the ATTW signal output means for each count of the counter means, the counter means being also interconnected to the ATTCR signal output means and providing a ATTCR signal output to the ATTCR signal output means when the counting means reaches a predetermined maximum counting level, the SDWSM input and the sample data clock input being separately connected to the SDWSM input latch means, output means of the SDWSM input latch means being connected to the accepted SDWSM latch means, the open collector means being connected to an output of the FSM means and having output means connected to the accepted SDWSM latch means so as to provide an accepted SDW of the SDWSM input on the output means of the accepted SDWSM latch means when the output means of the open collector means provides a signal indicating acceptance of a SDW from the SDWSM input in relation to a pulse of the TB clock input means, each pulse of the sample clock input providing a SDW of the SDWSM input to the output means of the SDWSM input latch means, the TB clock input means being connected to the sample clock input and the sequencer means so as to provide a pulse to the sequencer means for each pulse of the sample clock input, the sequencer means having a series of three delayed output means, the first delayed output means of the series thereof being connected to the sequence-controlled input latch means, the second and third delayed output means of the series of three thereof having gate means connected thereto, the gate means having input means and output means, the output means being connected to the C input of the first FF means, the ATTW signal output means being interconnected to the input means of the gate means and to the D input of the first FF means, the Q output of the first FF means being connected to the ATTWSM input latch means, the second and third delayed output means for transforming each valid ATTW signal output of the ATTW signal output means so that each signal of the Q output is synchronized with its associated output signal of the output means of the open collector means so as to provide a TTW of the ATTWSM output on the output means of the ATTWSM input latch means timely associated with an accepted SDW of the SDWSM input on the output means of the accepted SDWSM latch means, the ATTCR signal output means being connected to the S input of the second FF means, the Q output of the second FF means being connected to an input of the sequence-controlled input latch means, output means of the sequence-controlled input latch means being connected to an input of the FSM means, the ATTCR signal output means providing a low ATTCR signal output indicative of when the counter means is at the predetermined maximum counting level to the S input of the second FF means, the Q output of the second FF means providing a timely output of the output means of the sequence-controlled input latch means to the FSM means when the sequence-controlled input latch means is timely actuated by the first delayed output means of the series thereof, and the third delayed output means of the series thereof being also connected to the FSM means so as to provide an output of the FSM means to the output means of the open collector means so as to provide an accepted SDW of the SDWSM input on the output means of the accepted SDWSM latch means that is timely associated with a TTW of the ATTWSM output on the output means of the ATTWSM input latch means.

47. A selective multimode/multiconfigurable DARP system for evaluating one or more signal parallel word outputs of digital data source means, said system comprising:

digital data source means, at least one trigger element (TE) means and asynchronous time-tag generator (ATTG) means, the digital data source means providing a sample data word stream (SDWSM) input and a sample clock input for the TE means, the one TE means being made up of trigger board (TB) means, the TB means being made up of SDWSM input latch means, asynchronous time-tag word stream (ATTWSM) input latch means, at least one flag bit input latch means, lower boundary parameter logic (LBPL) arrangement means, upper boundary parameter logic (UBPL) arrangement means and trigger board control logic (TBCL) means, the TBCL means being made up of sequencer means, parameter logic (PL) input latch means, secondary mode analysis (SMA) means, forced storage mode (FSM) means, forced storage flag bit means, open collector means and first and second flip-flop (FF) means, the sequencer means having a series of three delayed output means, the ATTG means being comprised of counter means, asynchronout time-tag word (ATTW) signal output means, and asynchronout time-tag counter rollover (ATTCR) signal output means, the counter means having ATTWSM output means connected to the ATTWSM input latch means and providing ATTWSM output thereto, the counter means being interconnected to the ATTW signal output means and providing a valid ATTW signal output to the ATTW signal output means for each count of the counter means, the counter means being also interconnected to the ATTCR signal output means and providing a ATTCR signal output means when the counter means reaches a predetermined maximum counting level during system use, the SMA means and the FSM means each having output means connected to the open collector means, the FSFB means having output means connected to the flag-bit input latch means, output means of the open collector means being connected to the flag-bit input latch means such that the output means of the flag-bit input latch means provides a FSFB output whenever a ATTCR signal occurs during system use, the SDWSM input and the sample clock input being connected to the SDWSM input latch means, the TB clock input means being connected to the sample clock input and the sequencer means so as to provide a pulse in response to each pulse of the sample clock input, output means of the SDWSM input latch means being interconnected to both the LBPL and the UBPL arrangement means, the output of the output means of the SDWSM input latch means providing a SDW of the SDWSM input for each pulse of the sample clock input, the UBPL and the LBPL arrangement means having different predetermined comparison word values (PCWVs) and being comprised of LB data comparator means and UB data comparator means respectively, separate output means of the LB data comparator means and the UB data comparator means indicating as the result of the LBPL and UBPL arrangement means receiving a SDW of the SDWSM input for each pulse of the sample clock input whether any SDW of the SDWSM input for each pulse of the sample clock input is less than, equal to, not equal to, or greater than the LB PCWV of the LBPL arrangement means and the UB PCWV of the UBPL arrangement means, the output means of the LBPL and the UBPL arrangement means being separately connected to the PL input latch means, output means of the PL input latch means being connected to the SMA means, first delayed output means of the series of three delayed output means of the sequencer means thereof being connected to the PL input latch means such that the output means of the PL input latch means timely indicates whether a SDW of a SDWSM input is equal to, greater than, not equal to, or not greater than the different PCWVs of the LBPL and UBPL arrangement means, the SMA means as the result of this indication by the output means of the PL input latch means determining whether or not a SDW is acceptable or rejectable, the second and third delayed output means of the series of three delayed output means of the sequencer means including gate means, the gate means having input means and output means, the output means being connected to the C input of the first FF means, the ATTW signal output means being interconnected to the input means of the gate means and the D input of the first FF means, the Q output of the first FF means being connected to the ATTWSM input latch means, the second and third delayed output means for transforming each valid ATTW signal output of the ATTW signal output means so that each signal of the Q output is synchronized with its associated output signal of the output means of the open collector means so as to provide a TTW of the ATTWSM output on the output means of the ATTWSM input latch means that is timely associated with a SDW of the SDWSM input on the output means of the accepted SDWSM input latch means, the ATTCR signal output means being connected to the S input of the second FF means, the Q output of the second FF means being connected to the FSM means and the FSFB means, the third delayed output means being connected to the SMA means and the FSM means such that the output means of the open collector means causes a FSFB to be associated with the TTW on the output means of the ATTWSM input latch means and further associated with a SDW of the SDWM input on the output means of the accepted SDWSM latch means whenever the Q output of the second FF means indicates that a TTCR signal has occurred.

48. A system as set forth in claim 47 wherein the TBCL means is comprised of forced data flag bit (FDFB) means; wherein the FDFB means is connected to the SMA means and to the flag bit input latch means, wherein another output means of the flag bit input latch means provides a FDFB output when a SDW as analyzed by the SMA means is rejected and wherein the output means of the open collector means causes FSFB and FDFB outputs on the one and other output means of the flag bit input latch means to be associated with a TTW output on the output means of the ATTWSM input latch means and further associated with a SDW of the SDWSM input on the output means of the accepted SDWSM latch means whenever the Q output of the second FF means indicates that a TTCR signal has occurred.

49. A system as set forth in claim 47 wherein the output means of the ATTWSM input latch means has at least one less bit than the ATTWSM output thereto from the counting means of the ATTG means so that the TTW output of the output means of the ATTWSM input latch means is able to accommodate the FSFB output of the output means of the flag bit input latch means associated therewith.

50. A system as set forth in claim 48 wherein the output means of the ATTWSM input latch means has two less bits therein than the ATTWSM output thereto from the counting means of the ATTG means so that the TTW output of the output means of the ATTWSM input latch is able to accommodate both the FSFB and FDFB outputs of both output means of the flag bit input latch means during system use.

51. A multimode/multiconfigurable DARP system for evaluating one or more parallel signal word outputs of digital data source means, said system comprising:

at least one trigger element (TE) means and digital data source means, the digital data source means providing a sample data word stream (SDWSM) input and a sample clock input, the one TE means being made up of trigger board (TB) means and TE memory (TEM) means, the TB means being comprised of SDWSM input latch means, a trigger board (TB) clock input, lower boundary parameter logic (LBPL) arrangement means, upper boundary parameter logic (UBPL) arrangement means, trigger board control logic (TBCL) means and setup data word (SUDW) latch means for effecting selective operation of the TBCL means, the SDWSM input and the sample clock input being connected to the SDWSM input latch means, output means of the SDWSM input latch means being separately connected to the LBPL and UBPL arrangement means, the output of the output means of the SDWSM input latch means providing a SDW of the SDWSM input for each pulse of the sample clock input to the LBPL and the UBPL arrangement means for effecting analysis of the SDW, the TBCL means being generally made up of parameter logic (PL) input latch means, NOR gate means, exclusive OR (XOR) gate means, magnitude boundary mode (MBM) means, and sequencer means, the NOR and XOR gate means having one and another input means, the MBM means having a series of three input means, the sequencer means having first and second delayed output means, the TB clock input being connected to the sample clock input and the sequencer means, and providing a pulse to the sequencer means in response to each pulse of the sample clock input, the LBPL and UBPL arrangement means having different predetermined comparison word value (PCWV) means, separate output means of the LBPL and UBPL arrangement means being individually connected to the PL input latch means, outputs of the output means of the LBPL and UBPL arrangement means indicating when a SDW is either greater than, less than, equal to or not equal to the PCWV means of the LBPL and UBPL arrangement means, output means of the PL input latch means connected to one input means of the NOR gate means for interconnecting the output of the output means of the LBPL arrangement means to the one input means of NOR gate means when the PL input latch means is actuated by the first delayed output means of the sequencer means in response to each pulse of the TB clock input, another output means of the PL input latch means connected to the other input means of the NOR gate means for interconnecting the output of the output means of the UBPL arrangement means to the other input means of the NOR gate means when the PL input latch means is actuated by the first delayed output means of the sequencer means in response to each pulse of the TB clock input, the NOR gate means having output means connected to the input means of the XOR gate means, boundary limit enabling output means of the SUDW latch means being connected to the other input means of the XOR gate means, output means of the XOR gate means being connected to one input means of the MBM means, magnitude enabling output means of the SUDW latch means being connected to the second input means of the MBM means, second delayed output means of the sequencer means being connected to the third input of the MBM means, output means of the MBM means being connected to the TEM means for effecting storage of one or more SDWS of the SDWSM input when the output means of the LBPL and UBPL arrangement means indicates that a SDW is either greater than the PCWV means of the UBPL arrangement means or less than the PCWV means of the LBPL arrangement means upon the boundary limit enabling means being enabled for outside the boundaries of the LB and UB PCWV means or that a SDW is either less than the UB PCWV means or greater than the LB PCWV means upon the boundary limit enabling means being enabled for inside the boundaries of the LB and UB PCWV means whereby the output means of the MBM as the result of this indication for a SDW provides an output for effecting storage of an acceptable SDW of a SDWSM input when the MBM means is actuated by the second delayed output means of the sequencer means.

52. A system as set forth in claim 51 wherein the TB means is comprised of new/old parameter logic (NOPL) arrangement means, the NOPL arrangement means being made up of predetermined new/old mask word value (PNOMWV) means and old accepted SDW input latch means having an old accepted SDW latched therein as the result of a prior accepted SDW by the output means of the MBM means during a prior pulse of the TB clock input, output means of the NOPL arrangement means being connected to the PL input latch means, the MBM means having fourth input means, third output means of the PL input latch means being connected to the fourth input means of the MBM means, output of the output means of the NOPL arrangement means indicating whether a new SDW either is equal to or not equal to an old accepted SDW so that output of the third output means of the PL input latch means indicates to the MBM means whether a new SDW is equal to or not equal to an old accepted SDW of the old accepted SDW input latch means of the NOPL arrangement means when the first delayed output means occurs for each pulse of the TB clock input.

53. A system as set forth in claim 52 wherein the TBCL means is provided with NAND gate means, the NAND gate means having one and another input means, the third output means of the PL input latch means being connected to one input means of the NAND gate means, new/old enabling output means of the SUDW latch means being connected to the other input means of the NAND gate means, and wherein output means of the NAND gate means is connected to the fourth input means of the MBM means.

54. A multimode/multiconfigurable DARP system for evaluating one or more parallel signal word outputs of digital data source means, said system comprising:

at least one trigger element (TE) means and digital data source means, the digital data source means providing a sample data word stream (SDWSM) input and a sample clock input for the TE means, the one TE means being made up of trigger board (TB) means and TE memory (TEM) means, the TB means being comprised of SDWSM input latch means, TB clock input means, lower boundary parameter logic (LBPL) arrangement means, upper boundary parameter logic (UBPL) arrangement means, trigger board control logic (TBCL) means and setup data word latch (SUDWL) means for effecting selective operation of the TBCL means, the SDWSM input and the sample clock input being connected to the SDWSM input latch means, output means of the SDWSM input latch means being separately connected to the LBPL and the UBPL arrangement means, the output of the output means of the SDWSM input latch means providing a SDW of the SDWSM input to the LBPL and the UBPL arrangement means for effecting analysis of a SDW for each pulse of the sample clock input, the TBCL means being generally made up of parameter logic (PL) input latch means, first and second NOR gate means, first and second exclusive OR (XOR) gate means, NAND gate means, flip-flop (FF) means, input latch means, end point mode (EPM) means and sequencer means, the FF means having C and D inputs and a Q* output; the first and second NOR gate means, the first and second XOR gate means and the NAND gate means all having one and another input means; the EPM means having a series of four input means, the TB clock input means being connected to the sample clock input and the sequencer means, the sequencer means being made up of first and second delayed output means, first delayed output means being connected to PL input latch means and the input latch means, the second delayed output means being connected to the C input of the FF means and the first input means of the EPM means, the LBPL and UBPL arrangement means having different predetermined comparison word value (PCWV) means, separate output means of the LBPL and UBPL arrangement means being individually connected to the PL input latch means, the outputs of the output means of the LBPL and UBPL arrangement means indicating when a SDW is either greater than or less than the PCWV means of the LBPL arrangement means and when a SDW is either greater than or less than the PCWV means of the UBPL arrangement means, output means of the PL input latch means being connected to one input means of the first NOR gate means for interconnecting the output of the output means of the LBPL arrangement means to one input means of the first NOR gate means when the PL input latch means is actuated by the first delayed output means in response to each pulse of the TB clock input, another output means of the PL input latch means being connected to the other input means of the first NOR gate means for interconnecting the output of the output means of the UBPL arrangement means to the other input means of the first NOR gate means when the PL input latch means is actuated by the first delayed output means in response to each pulse of the TB clock input, output means of the first NOR gate means being connected to one input means of the first XOR gate means, boundary limit enabling output means of the SUDWL means being connected to the other input means of the first XOR gate means, output means of the first XOR gate means being connected to one input means of the NAND gate means, output means of the NAND gate means being connected to the D input of the FF means and to the second input means of the EPM means, magnitude enabling output means of the SUDWL means being connected to the other input means of the NAND gate means, the Q* output of the FF means being connected to the input latch means and one input means of the second XOR gate means, output means of the input latch means being connected to the other input means of the second XOR gate means and to the third input means of the EPM means, the C input of the FF means in response to the second delayed output means of the sequencer means as the result of a pulse by the TB clock input clocking the D input thereof via the Q* output thereof to the input latch means and the one input means of the second XOR gate means, output means of the input latch means providing the Q* output of the immediately prior pulse to the other input means of the second XOR gate means in response to the first delayed output means of the sequencer means for an immediately subsequent pulse of the TB clock input while the second delayed output means of the sequencer means in response to the immediately subsequent pulse of the TB clock input and to the C input of the FF means clocks the D input thereof via the Q* output thereof to the input latch means and the one input means of the second XOR gate means, output means of the second XOR gate means being connected to one input means of the second NOR gate means, EPM enabling output means of the SUDWL means being connected to the fourth input means of the EPM means, the EPM enabling output means having inverter means connected thereto, output means of the inverter means being connected to the other input means of the second NOR gate means, and separate output means of the EPM means and the second NOR gate means being interconnected to the TEM means for effecting storage of an addressed accepted SDW when the output means of both the EPM means and the second NOR gate means are low as the result of the output means of the input latch means being high together with the output means of the LBPL and UBPL arrangement means indicating that a SDW either is greater than the PCWV means of the LBPL arrangement means or is less than the PCWV means of the UBPL arrangement means upon the boundary limit enabling means being enabled for inside the boundaries of the LB and UB PCWV means or that a SDW is either less than the LB PCWV means or greater than the UB PCWV means upon the boundary limit enabling means being enabled for outside the boundaries of the LB and UB PCWV means.

55. A multimode/multiconfigurable DARP system for evaluating one or more parallel signal word outputs of digital data source means, said system comprising:

at least one trigger element (TE) means and digital data source means, the digital data source means providing a sample data word stream (SDWSM) input and a sample clock input for the TE means, the one TE means being made up of trigger board (TB) means and TE memory (TEM) memory means, the TB means being comprised of SDWSM input latch means, trigger board (TB) clock input means, lower boundary parameter logic (LBPL) arrangement means, upper boundary parameter logic (UBPL) arrangement means, trigger board control logic (TBCL) means and setup data word (SUDWL) means for effecting selective operation of the TBCL means, the SDWSM input and the sample clock input being connected to the SDWSM input latch means, output means of the SDWSM input latch means being separately connected to LBPL and UBPL arrangement means, output of the output means of the SDWSM input means providing a SDW of the SDWSM input for each pulse of the sample clock input to the LBPL and the UBPL arrangement means for effecting analysis of the SDW, the TBCL means being generally made up of parameter logic (PL) input latch means, sequencer means, multiplexer means, NAND gate means, AND gate means, flip-flop (FF) means, exclusive OR (XOR) gate means and event boundary mode (EBM) means, FF means having C and S inputs and a Q output; the NAND gate means, the AND gate means and the XOR gate means all having one and other input means; the EBM means having a series of four input means, the sequencer means being comprised of a series of three delayed output means, the TB clock input being connected to the sequencer means and the sample clock input, the LBPL and UBPL arrangement means having different predetermined comparison word value (PCWV) means, separate output means of the LBPL and UBPL arrangement means being individually connected to the PL input latch means, outputs of the output means of the LBPL and UBPL arrangement means indicating when a SDW is either equal to or not equal to the LB PCWV means of the LBPL arrangement means and the UB PCWV means of the UBPL arrangement means, first delayed output means of the sequencer means being connected to the PL input latch means and the multiplexer means, one output means of the PL input latch means being connected to one input means of the NAND gate means for interconnecting the output of the output means of the LBPL arrangement to the one input means of the NAND gate means when the one output means of the PL input latch means is actuated by the first delayed output means in response to each pulse of the TB clock input means, another output means of the PL input latch means being connected to one input means of the AND gate means for interconnecting the output of the output means of the UBPL arrangement means to the one input means of the AND gate means when the PL input latch means is actuated by the first delayed output means in response to each pulse of the TB clock input means, second delayed output means of the sequencer means being connected to first input means of the EBM means, third delayed output means of the sequencer means being connected to the multiplexer means, one output means of the multiplexer means being connected to the other input means of the NAND gate means, another output means of the multiplexer means being connected to the other input means of the AND gate means, output means of the NAND gate means being connected to the S input of the FF means, output means of the AND gate means being connected to the C input of the FF means, the Q output of the FF means being connected to one input means of the XOR gate means, output means of the XOR gate means being connected to second input means of the EBM means, boundary limit enabling output means of the SUDWL means being connected to the multiplexer means for interconnecting via the first and second output means of the multiplexer means the first and third delayed output means of the sequencer means to other input means of the NAND and AND gate means when the boundary limit enabling output means is low; and for also interconnecting the third and first delayed output means with the other input means of the NAND and AND gate means respectively when the boundary limit enabling means is high, EBM enabling output means of the SUDWL means being connected to third input means of the EBM means, and output means of the EBM means being connected to the TEM means for effecting storage of one or more SDWs in response to the second delayed output means for a given pulse of the TB clock input means when the output means of the LBPL arrangement means indicates that a SDW of the SDWSM input is equal to the PCWV means of the LBPL arrangement means so that the Q output of the FF means is set high thereby permitting storage of a SDW equal to the PCWV means of the LBPL arrangement means but also permitting storage of immediately subsequent SDWs not equal to the PCWV means of the UBPL arrangement means when the boundary limit enabling means is low; and also for effecting storage when the output of the UBPL arrangement means indicates that a SDW of the SDWSM input is equal to the PCWV means of the UBPL arrangement so that the Q output of the FF means is clocked low thereby permitting storage of a SDW equal to the PCWV means of the UBPL arrangement means but also permitting storage of immediately subsequent SDWs not equal to the PCWV means of the LBPL arrangement means when the boundary limit enabling means is high.

56. A system as set forth in claim 55 wherein the TB means is comprised of new/old parameter logic (NOPL) arrangement means, the NOPL arrangement means having predetermined new/old mask word value (PNOMWV) means and old accepted SDW input latch means, the old accepted SDW input latch means for receiving a SDW for latch-in therein when a SDW is acceptable as indicated by output means of the EBM means for a prior pulse of the TB clock input means, output means of the NOPL arrangement means being connected to the PL input latch means, third output means of the PL input latch means being connected to fourth input means of the EPM means, the output of the output means of the NOPL arrangement means indicating whether a new SDW either equals or does not equal an old accepted SDW of the old accepted SDW input latch means so that the third output means of the PL input latch means indicates to the EPM means whether a new SDW equals or does not equal the old accepted SDW when the first delayed output means occurs for each pulse of the TB clock input.

57. A system as set forth in claim 55 wherein the TBCL means is provided with second NAND gate means, the second NAND gate means having one and another input means, the third output means of the PL input latch means being connected to one input means of the NAND gate means, new/old enabling output means of the SUDWL means being connected to the other input means of the NAND gate means, and wherein the output of the NAND gate means is connected to fourth input means of the EBM means.

58. A multimode/multiconfigurable DARP system for evaluating one or more parallel signal word outputs of digital data source means, said system comprising:
- at least one trigger element (TE) means and digital data source means, the digital data source means providing a sample data word stream (SDWSM) input and a sample clock input,
- the one TE means being made up of trigger board (TB) means and TE memory (TEM) memory means, the TB means being comprised of SDWSM input latch means, trigger board (TB) clock input means, lower boundary parameter logic (LBPL) arrangement means, upper boundary parameter logic (UBPL) arrangement means, trigger board control logic (TBCL) means and setup data word (SUDWL) means for effecting selective operation of the TBCL means,
- the SDWSM input and the sample clock input being connected to the SDWSM input latch means, output means of the SDWSM input latch means being separately connected to LBPL and UBPL arrangement means, the output of the output means of the SDWSM input latch means providing a SDW of the SDWSM input for each pulse of the sample clock input to the LBPL and the UBPL arrangement means for effecting analysis of the SDW,
- the TBCL means being generally made up of parameter logic (PL) input latch means, sequencer means, multiplexer means, first and second NAND gate means, AND gate means, first and second flip-flop (FF) means, first and second exclusive OR (XOR) gate means, input latch means, NOR gate means and end point mode (EPM) means, the first FF means having C and D inputs and a Q* output, the second FF means having C and S inputs and a Q output, EPM means having a series of four input means; the first and second NAND gate means, the AND gate means, the first and second XOR gate means and the NOR gate means all having one and another input means; the sequencer means being comprised of a series of three delayed output means, the TB clock input means being connected to the sequencer means and the sample clock input,
- the LBPL and UBPL arrangement means having different predetermined comparison word value (PCWV) means, separate output means of the LBPL and UBPL arrangement means being individually connected to the PL input latch means, outputs of the output means of the LBPL and UBPL arrangement means indicating when a SDW is either equal to or not equal to the PCWV means of the LBPL arrangement means and the PCWV means of the UBPL arrangement means,
- first delayed output means of the sequencer means being connected to the PL input latch means, the multiplexer means and the input latch means,
- output means of the PL input latch means being connected to the one input means of the first NAND gate means for interconnecting the output of the output means of the LBPL arrangement to the one input means of the NAND gate means when the PL input latch means is actuated by the first delayed output means in response to each pulse of the TB clock input means,
- another output means of the PL input latch means connected to the one input means of the AND gate means for interconnecting the output of the output means of the UBPL arrangement means to the one input means of the AND gate means when the PL input latch means is actuated by the first delayed output means in response to each pulse of the TB clock input means,
- second delayed output means of the sequencer means being connected to one input means of the EPM means and the C input of the first FF means, third delayed output means of the sequencer means being connected to the multiplexer means,
- one output means of the multiplexer means being connected to the other input means of the first NAND gate means, the other output means of the multiplexer means being connected to the other input means of the AND gate means, the output means of the first NAND gate means being connected to the S input of the second FF means, the output means of the AND gate means being connected to the C input of the second FF means, the Q output of the second FF means being connected to the one input means of the first XOR gate means, output means of the XOR gate means being connected to the one input means of the second NAND gate means,
- boundary limit enabling output means of the SUDWL means being connected to the multiplexer means for interconnecting via the first and second output means of the multiplexer means the first and third delayed output means with the other input means of the first NAND and AND gate means respectively when the boundary limit enabling output means is low; and for also interconnecting the third and first delayed output means with the other input means of the first NAND and AND gate means respectively when the boundary limit enabling means is high,
- event enabling output means of the SUDWL means being connected to the other input means of the second NAND gate means, output means of the second NAND gate mean being connected to the D input of the first FF means and to second input means of the EPM means, the Q output of the first FF means being connected to the one input means of the second XOR gate means and the input latch means, output means of the input latch means being connected to the other input means of the second XOR gate means and to the third input means of the EPM means, output means of the second XOR gate means being connected to one input means of the NOR gate means,
- the Q* output either high or low of the first FF means occurring when the C input of the first FF means is actuated by the second delayed output means during a given pulse of the TB clock input means, and being transmitted to the output means of the input latch means when the input latch means is actuated by the first delayed output means of an immediately subsequent pulse of the TB clock input prior to the second delayed output means of the immediately subsequent pulse for actuating the C input of the first FF means to provide another Q* output,
- EPM enabling output means of the SUDWL means being connected to fourth input means of the EPM means, the EPM enabling output means having inverter means, output means of the inverter means being connected to the other input means of the NOR gate means, separate output means of the EPM means and the NOR gate means being interconnected to the TEM for effecting storage of an addressed/accepted SDW upon the output means of both the EPM means and the NOR gate means are low as the result of the boundary limit enabling output means being low together with the Q* output of the first FF means being high upon the output means of the LBPL arrangement means indicating that a SDW of the SDWSM input is equal to the PCWV means of the LBPL arrangement means for a given pulse of the TB clock input means while the output means of the UBPL arrangement means indicates that an immediately subsequent SDW of the SDWSM input is equal to the PCWV means of the UBPL arrangement means for an immediately subsequent pulse of the TB clock input so that the high Q output of the first FF means may be transmitted to the output means of the input latch means when actuated by the first delayed output means by the immediately subsequent pulse of the TB clock input to the given pulse thereof in order that the output means of the EPM means and the NOR gate means effects storage of a SDW in the TEM means when the subsequent Q output of the first FF means is low as the result of the C input of the first FF means being actuated by the second delayed output means of the sequencer means and the immediate subsequent pulse thereto by the TB clock input means while the output means of the LBPL arrangement means indicates a second subsequent SDW of the SDWSM input is not equal to the PCWV means of the LBPL arrangement means.

59. A multimode/multiconfigurable DARP system for evaluating one or more parallel signal word outputs of digital data source means, said system comprising:

master (M) and slave (S) trigger element (TE) means; and digital data source means, the digital data source means providing M and S sample data word streams (SDWSM) inputs; and M and S sample clock inputs, each TE means of the M and S TE means being made up of trigger board (TB) means and master control board (MCB) means, each M and S TB means being made up of M and S SDWSM input latch means, M and S parameter logic (PL) arrangement means, M and S trigger board control logic (TBCL) means and M and S setup data word latch (SUDWL) means for effecting selective operation of the M and S TBCL means, each MCB of the M and S TE means being made up of master/slave configuration control (MSCC) logic means, the MSCC logic means being comprised of first and second flip-flop (FF) means, first and second NAND gate means and NOR gate means, the first FF means having Q and Q* outputs, the second FF means having a Q output, the first and second NAND gate means having a series of three input means, the NOR gate means having one and another input means with the one input means being grounded, the first and second FF means of a master configured (MC) MSCC logic means of the MCB means of the M TE means being set up so that the Q and Q* outputs of the first FF means are high and low respectively while the Q output of the second FF means is high, the first and second FF means of a slave configured (SC) MSCC logic means of the MCB means of a S TE means being set up so that the Q and Q* outputs of the first FF means are low and high respectively while the Q output of the second FF means is high, the Q(M) and Q*(S) outputs of the first FF means of the MSCC logic means of the M and S TE means being connected to their associated first input means of the first and second NAND gate means, output means of the first NAND gate means of the MSCC logic means of the M and S TE means being interconnected and being further interconnected to other input means of the NOR gate means of the MSCC logic means thereof, the Q(M) and Q(S) outputs of the second FF means of the MSCC logic means of the M and S TE means being interconnected to their associated second input means of the first NAND gate means of the M and S TE means and to second input means of the second NAND gate means thereof, output means of the M and S NOR gate means of the MSCC logic means of the M and S TE means being connected to its associated third input means of the M and S second NAND gate means;

the M and S SDWSM input latch means being connected to its associated M and S SDWSM inputs, output means of the M and S SDWSM input latch means being connected to its associated M and S PL arrangement means and providing M and S SDW inputs of the M and S SDWSM inputs to the M and S PL arrangement means in response to the M the M pulses of the M and S sample clock inputs to the M and S SDWSM input latch means, output means of the M and S PL arrangement means and the M and S SUDWL means being connected to their associated M and S TBCL means, M and S output means of the M and S TBCL means being connected to their associated third input means of the M and S first NAND gate means such that outputs of the M and S output means of the M and S TBCL means when low indicates that an acceptable SDW has been determined by the M and S TBCL means in response to the outputs of the M and S PL arrangement means and the M and S SUDWL means during the DARP system use, and output means of the S second NAND gate means being connected to the S TBCL means, the output means of the S second NAND gate means when low for shutting down the S output means of the S TBCL means thereby effecting nonacceptability of one or more SDWs of the S SDWSM input as the result of the output means of the M TBCL means being high thereby causing the output of the M first NAND gate means to be low and the output of the S NOR gate means to be high so that the output of the second S NAND gate means is low.

60. A system as set forth in claim 59 wherein the system is comprised of a series of three or more TE means, wherein each TE means of a plurality of two or more TE means of the series thereof is a M TE means provided with a MC MSCC logic means, wherein any M TE means may effect shutdown of the S TBCL means of any S TE means when the output of the first NAND gate means of a MSCC logic of any M TE means is low.

61. A system as set forth in claim 59 wherein the M and S MCB means are each provided with power-on reset logic means, wherein the first and second FF means of the M and S TE means are each provided with R inputs, wherein outputs of the M and S power-on reset logic means are connected to their associated R inputs of the first and second FF means of the MC and SC MSCC logic means and wherein the outputs of the M and S power-on reset logic means reset all Q and Q* outputs of the first and second FF means of the M and S MSCC logic means during power-up of the M and S TE means upon system use.

62. A system as set forth in claim 61 wherein the first and second FF means of the MC and SC MSCC logic means are provided with D inputs, wherein the D inputs of the first and second FF means of the MC and SC MSCC logic means are provided with setup inputs for setting all Q and Q* outputs of the first and second FF means of the MC and SC MSCC logic means after power-up of the M and S TE means.

63. A multimode/multiconfigurable DARP system for evaluating one or more parallel signal word outputs of digital data source means, said system comprising:
   host computer (HC) means, master (M) and slave (S) trigger element (TE) means; and digital data source means, the digital data source means providing M and S sample data word streams (SDWSM) inputs and M and S sample clock inputs,
   each TE means of the M and S TE means being made up of trigger board (TB) means and master control board (MCB) means, each M and S TB means being made up of M and S SDWSM input latch means, M and S parameter logic (PL) arrangement means, M and S trigger board control logic (TBCL means and M and S setup data word latch (SUDWL) means for effecting selective operation of the M and S TBCL means,
   each MCB means of the M and S TE means being made up of master/slave configuration control (MSCC) logic means, the MSCC logic means being comprised of first and second flip-flop (FF) means, first and second NAND gate means and NOR gate means, the first FF means of the M and S TE means having Q and Q* outputs, the second FF means of the M and S TE means having Q outputs, the first and second NAND gate means of the M and S TE means each have a series of three input means, the NOR gate means of the M and S TE means each have one and another input means with the one input means of the NOR gate means of the M and S TE means being grounded,
   the first and second FF means of a master configured (MC) MSCC logic means of the MCB means of a M TE means being set up so that the Q and Q* outputs of the first FF means are high and low respectively while the Q output of the second FF means is high,
   the first and second FF means of a slave configured (SC) MSCC logic means of the MCB means of a S TE means being set up so that the Q and Q* outputs of the first FF means are low and high respectively while the Q output of the second FF means is high,
   the Q(M) and Q(S) outputs of the first FF means of the MSCC logic means of the M and S TE means being connected to their associated first input means of the first NAND gate means of the M and S TE means, the Q*(M) and Q*(S) outputs of the first FF means of the MSCC logic means of the M and S TE means being connected to their associated first input means of the second NAND gate means of the M and S TE means, output means of the first NAND gate means of the MSCC logic means of the M and S TE means being interconnected and being further interconnected to the other input means of the NOR gate means of the MSCC logic means thereof, the Q(M) and Q(S) outputs of the second FF means of the MSCC logic means of the M and S TE means being interconnected to their associated second input means of the first NAND gate means of the M and S TE means and to second input means of the second NAND gate means thereof, output means of the M and S NOR gate means of the MSCC logic means of the M and S TE means being connected to their associated third input means of the M and S second NAND gate means thereof,
   the M and S SDWSM input latch means being connected to their associated M and S SDWSM inputs, output means of the M and S SDWSM input latch means being connected to its associated PL arrangement means and providing M and S SDW inputs of the M and S SDWSM inputs to the M and S PL arrangement means in response to pulses of the M and S sample clock inputs to the M and S SDWSM input latch means,
   output means of the M and S PL arrangement means and the M and S SUDWL means being connected to their associated M and S TBCL means, M and S output means of the M and S TBCL means being connected to their associated third input means of the first NAND gate means such that the outputs of the M and S output means of the M and S TBCL means when low indicates that an acceptable SDW has been determined by the M and S TBCL means in response to outputs of the M and S PL arrangement means and the M and S SUDWL means during system use,
   output means of the HC means being interconnected to the output means of the M and S first NAND gate means,
   output means of the S second NAND gate being connected to the S TBCL means, the output means of the S and second NAND gate means when low for shutting down the S output means of the S TBCL means thereby effecting nonacceptability of one or more S SDWs when the output means of the HC means goes low as the result of operator control of the HC means during system use so that the output means of the S NOR gate means goes high regardless of the output of the M output means of the M TBCL means.

64. A multimode/multiconfigurable DARP system for evaluating one or more parallel signal word outputs of digital data source means, said system comprising:
   master (M), slave (S) and independent (I) trigger element (TE) means; and digital data source means, the digital data source means providing M, S and I sample data word stream (SDWSM) inputs; and M, S and I sample clock inputs,
   each TE means of the M, S and I TE means being made up of trigger board (TB) means and master control board (MCB) means, each M, S and I TB means being made up of M, S and I SDWSM input latch means; M, S and I parameter logic (PL) arrangement means, M, S and I trigger board control logic (TBCL) means; and M, S and I setup data word latch (SUDWL) means for effecting selective operation of the M, S and I TBCL means, each MCB means of the M, S and I TE means, being made up of master, slave and independent configuration control (MSICC) logic means, the MSICC logic means of the M, S and I TE means being made up of first and second flip-flop (FF) means, first and second NAND gate means and NOR gate means, the first FF means of the M, S and I TE means having Q and Q* outputs; the second FF means of the M, S and I TE means having a Q output; the first and second NAND gate means of the M, S and I TE means each having a series of three input means; the NOR gate means of the M, S and I TE means each having one and another input means, with the one input means of any M, S and I TE means being grounded, the first and second FF means of a master configured (MC) MSICC logic means of the M TE means being set up so that the Q and Q* outputs of the first FF means are high and low respectively while the Q output of the second FF means is high respectively, the first and second FF means of a slave configured (SC) MSICC logic means of the S TE means being set up so that the Q and Q* outputs of the first FF means are low and high respectively while the Q output of the second FF means is high, the first and second FF means of independent configured (IC) MSICC logic means of the I TE means being set up so that the Q and Q outputs of the first FF means are high and low respectively while the Q output of the second FF means is low;

the Q(M), Q(S) and Q(I) outputs of the first FF means of the MSICC logic means of the M, S and I TE means being connected to their associated first input means of the first NAND gate means; the Q*(M), Q*(S) and Q*(I) outputs of the first FF means of the MSICC logic of the M, S and I TE means being connected to their associated second input means of the second NAND gate means; output means of the first NAND gate means of the MSICC logic means of the M, S and I TE means being interconnected and being further interconnected to other input means of the NOR gate means of the MSICC logic means thereof; the Q(M), Q(S) and Q(I) outputs of the second FF means of the MSICC logic means of the M, S and I TE means being interconnected to their associated second input means of the first NAND gate means of the M, S, and I TE means and to second input means of the second NAND gate means thereof, output means of the NOR gate means of the MSICC logic means of the M, S and I TE means being connected to their associated third input means of the M, S and I second NAND gate means;

the M, S and I SDWSM input latch means being connected to their associated M, S and I SDWSM inputs; output means of the M, S and I input latch means being connected to their associated M, S, and I PL arrangement means; and providing M, S and I SDW inputs of the M, S and I SDWSM inputs to the M, S and I PL arrangement means in response to pulses of the M, S and I sample clock inputs to the M, S and I SDWSM input latch means;

output means of the M, S and I PL arrangement means and the M, S and I SUDWL means being connected to their associated M, S and I TBCL means; M, S and I output means of the M, S and I TBCL means being connected to their associated third input means of the M, S and I first NAND gate means, such that the output of the M, S and I output means of the M, S and I TBCL means when low indicates that an acceptable SDW has been determined by the M, S and I TBCL means in response to the outputs of the M, S and I PL arrangement means and the M, S and I SUDWL means during DARP system use, and output means of the I second NAND gate means being connected to the I TBCL means, the output means of the I second NAND gate means always being high for enabling the I output means of the I TBCL means to indicate acceptability or nonacceptability of one or more I SDWs of the I SDWSM input regardless of the M and S output means of the M and S TBCL means being high or low.

65. A multimode/multiconfigurable DARP system for evaluating one or more parallel signal word outputs of digital data source means, said system comprising:

common asynchronous time-tag generator (ATTG) means, a series of two or more trigger element (TE) means, TE memory TEM) means and digital data source means providing separate sample data word stream (SDWSM) input to each TE means and separate sample clock input thereto, each TE means of the series having trigger board (TB) means, the TB means being made up of SDWSM input latch means, parameter logic (PL) arrangement means, accepted SDWSM latch means, set up data word latch (SUDWL) means, asynchronous time-tag word stream (ATTWSM) input latch means and trigger board control logic (TBCL) means, the common ATTG means being made up of counter means for providing an ATTWSM output, output means of the common ATTG means for connecting the ATTWSM output to the ATTWSM input latch means of each TE means, the common ATTG means also providing a valid asynchronous time-tag word (ATTW) signal for each count of its counting means, the output means of the common ATTG means for also connecting the output of the valid ATTW signal to the TBCL means of each TE means, output means of the SDWSM input latch means of each TE means being connected to its associated PL arrangement means thereof, the output of the output means of the SDWSM input latch means of each TE means providing a SDW to its associated PL arrangement means in response to the SDWSM input to the SDWSM input latch means thereof for each pulse of the sample clock input.

output means of the PL arrangement means of each TB means being connected to its associated TBCL means thereof, output means of the SUDWL means of each TB means being connected to its associated TBCL means thereof, output of the output means of the PL arrangement means of each TB means for indicating whether a SDW is either inside or outside of a parameter, the TBCL means of each TB means as the result of the output of the output means of the PL arrangement means associated therewith together with the output means of the SUDWL means associated therewith for determining whether or not a SDW of the SDWSM input for each pulse of the sample clock input is acceptable or nonacceptable, the TBCL means of each TB means including means for transforming and synchronizing the valid ATTW signal received thereby and providing a synchronized TTW signal output to its associated ATTWSM input latch means thereof, output means of the ATTWSM input latch means of the TB means of each TE means being connected to its associated TEM means of each TE means such that the output means of the ATTWSM input latch means of each TE means providing a timely time-tagged word (TTW) output to its associated TEM means thereof in response to the synchronized TTW signal output of the TBCL means associated therewith, output means of the accepted SDWSM latch means of the TB means of each TE means being also connected to its associated TEM means of each TE means, output means of the TBCL means of the TB means of each TE means being connected to its associated accepted SDWSM input latch means of the TB means thereof; output of the output means of the TBCL means of each TE means when indicating an acceptable SDW for any pulse of the sample clock input as the result of the determination of the TBCL means providing an acceptable SDW output of the output means of the SDWSM input latch means whereby the acceptable SDW output of any TE means along with a timely associated TTW output of the associated ATTWSM input latch means of any TE means is stored in its TEM means thereof.

66. A system as set forth in claim 65 wherein the TB means of each TE means is provided with TE address generator control TEAGC arrangement means, wherein second output means of the TBCL means of each TE means is connected to its associated TEAGC arrangement means, wherein TEM address output means of the TEAGC arrangement means of each TE means is connected to its associated TEM means thereof, and wherein output of the second output means of the TBCL means of any TE means upon indicating an acceptable TEM address enable output causes its associated TEAGC arrangement means to provide a TEM address output for effecting storage in its associated TEM means of an accepted SDW and TTW associated therewith whereby any TE means of the system carries out its own data collection of addressed acceptable SDWs and TTWs associated therewith upon any TE means being in a primary mode during system use.

67. A multimode/multiconfigurable DARP system for evaluating one or more parallel signal word outputs of digital data source means, said system comprising:

at least one trigger element (TE) means, digital data source means providing a sample data word stream (SDWSM) input to the TE means and a sample clock input thereto, the one TE means being made up of TE memory (TEM) means, trigger board (TB) means and master control board (MCB) means, the TB means being comprised of trigger board (TB) clock input means, SDWSM input latch means, accepted SDWSM latch means, asynchronous time-tag word stream (ATTWSM) input latch means, TE address generator control (TEAGC) arrangement means and NAND gate means, the MCB means being comprised of mode control word latch (MCWL) means, the TB means having trigger board control logic (TBCL means, asynchronous time-tag generator (ATTG) means, the ATTG means having counter means for providing an ATTWSM output, output means of the ATTG means for connecting the ATTWSM output to the ATTWSM input latch means, the ATTG means also providing a valid asynchronous time-tag word (ATTW) signal for each count of the counting means, the output means of the ATTG means for also connecting the output of the valid ATTW signal to the TBCL means, output means of the TBCL means being connected to the ATTWSM input latch means, the SDWSM input and the sample clock input being connected to the SDWSM input latch means, output means of the SDWSM input latch means being connected to the accepted SDWSM latch means, the output means of the SDWSM input latch means providing a SDW of the SDWSM input for each pulse of the sample clock input, the TB clock input means being connected to the sample clock input, output means of the ATTWSM input latch means being connected to the TEM means, the TBCL means for synchronizing and transforming each output of the valid ATTW signal for each count of the counting means so that the output means of the TBCL means provides a timely output to the ATTWSM input latch means for releasing a TTW on the output means of the ATTWSM input latch means that is timely associated with a pulse of the TB clock input means which pulse is response to a pulse of the sample clock input.

output means of the accepted SDWSM latch means being connected to the TEM means and providing an accepted SDW from the SDWSM input to the TEM means for storage when a SDW has been determined to be acceptable by the TE means, the MCWL means of the MCB means having output means connected to the NAND gate means, the TEAGC arrangement means having TE address generator control (TEAGC) logic means, output means of the TEAGC logic means also being connected to the TEM means, the output of the NAND gate means being connected to the output means of the TEAGC logic means, the ATTWSM input latch means, and the accepted SDWSM latch means, the output means of the MCWL means when low to the NAND gate means causing the accepted SDWSM latch means, the ATTWSM input latch means and the output means of the TEAGC logic means all in being connected to the output of the NAND gate to be tri-stated so that no accepted SDW nor valid TTW is stored in the TEM means when the TE means is in a quiescent (Q) or a host computer (HC)/TE primary mode during system use.

68. A system as set forth in claim 67 wherein the TEAGC arrangement means is provided with a TEM address (TEMA) input latch means; wherein output means of the TEMA input latch means is connected to the TEM means such that output of the TEMA input latch means provides a TEM address for an accepted SDW in relation to a pulse of the sample clock input; wherein the TEMA input latch means is also connected to the output of the NAND gate means, and wherein the output means of the MCWL means when low causes the TEMA input latch means to be tri-stated thereby preventing a TEM address from being presented by the output means of the TEMA input latch means to the TEM means upon a Q or HC/TE primary mode during system use.

69. A multimode/multiconfigurable DARP system for evaluating one or more parallel signal word outputs of digital data source means, said system comprising:
host computer (HC) means and at least one trigger element (TE) means,
said HC means being comprised of HC input/output (I/O) bus means, TEM address bidirectional buffer (TEMABB) latch means, associated time-tag word stream bidirectional buffer (ATTWSMBB) means, accepted sample data word stream (ASDWSM) bidirectional buffer (ASDWSMBB) means, latch-control logic (LCL) means; and software and keyboard-controlled processing control (SKPC) system, the SKPC system having memory means for storing TEM address and for storing ATTWSM and ASDWSM,
the one TE means being comprised of master control board (MCB) means, trigger board (TB) means and TEM memory (TEM) means, the MCB means having mode control word latch (MCWL) means,
the TEM means being comprised of RAM means, TEM address input means and TEM read control input means, the TEM read control input means being connected to the RAM means,
the HC (I/O) bus means for interconnecting the SKPC system to the TEMABB latch means, the ATTWSMBB means and the ASDWSMBB means,
the SKPC system having output means and clock control means, the output means and the clock control means being connected to the LCL means;
the LCL means being provided with latch clock and enable output means and direction control output means, the latch clock and enable output means together with the direction control output means being interconnected to the TEMABB latch means, the ATTWSMBB means and the ASDWSMBB means,
The HC means, the MCB means and the TB means all including first means for interconnecting the TEMABB latch means to the TEM address input means,
the HC means, the MCB and the TB means all including second means for interconnecting the ATTWSMBB means and the ASDWSMBB means to the RAM means of the TEM means for reading a stored data collection of ATTWSM and ASDWSM in the RAM means thereof,
the MCWL means having read control output means, the TB means including interconnecting means for interconnecting the read control output means to the TEM read control input means, the MCWL means in response to mode control output means of the TE means when the TE means is selected to provide an output for its read control output means that actuates the TEM RAM means to read a stored data collection of ATTWSM and ASDWSM when the TEM RAM means receives a TEM address via its TEM address input means, and
the SKPC system providing an output via its output means and clock control means for actuating the LCL means to direct a TEM address from the SKPC system via the I/O bus means to the TEMABBL latch means, the LCL means in response to this output of the SKPC system providing an output via its latch clock and enable output means together with its direction control output means for not only latching-in the TEM address in the TEMABB latch means but also for directing the latched-in TEM address to the TEM address input means for reading a stored data collection of ATTWSM and ASDWSM from the TEM RAM means to the ATTWSMBB means and the ASDWSMBB means respectively.

70. A system as set forth in claim 69 wherein the LCL means in further response to this output of the SKPC system provides another output via its direction control output means for directing the read ATTWSM and ASDWSM of the TEM RAM means from the ATTWSMBB means and ASDWSMBB means to the SKPC system via the HC I/O bus means.

71. A system as set forth in claim 69 wherein the TEM means is comprised of ATTWSM bidirectional (ATTWSMB) buffer means and ASDWSM bidirectional (ASDWSMB) buffer means, wherein the ATTWSMB buffer means and ASDWSMB buffer means are connected to the second means, wherein the TEM read control input means includes means connected to the ATTWSMB buffer means and the ASDWSMB buffer means for controlling the direction of the ATTWSMB buffer means and the ASDWSMB buffer means for transferring a data collection of ATTWSM and ASDWSM from the RAM means to the ATTWSMBB means and the ASDWSMBB means when a read control output means of the MCWL means is received by the TEM read input control means and when a TEM address of the HC means is received by the TEM address input means.

72. A system as set forth in claim 69 wherein the HC means is also comprised of bidirectional buffer (BB) means, wherein the BB means is connected to the I/O bus means of the HC means, and wherein the LCL means is provided with direction control and enable output means connected to the BB means for controlling the direction thereof with reference to a TEM address or a ATTWSM and ASDWSM appearing on the I/O bus means.

73. A system as set forth in claim 69 wherein the MCB means is also comprised of bidirectional buffer (BB) means and bidirectional address (BA) means, wherein the BA means and the BB means both of the MCB means are connected to the first and second means respectively for interconnecting the HC means to the TEM means, wherein the MCWL means is also provided with first and second direction control output means connected to the BA means and the BB means respectively, and wherein outputs of the first and second directional control output means is such that the TEM address is premitted from the HC means to the TEM means via the first means while the ATTWSM and ASDWSM is permitted from the TEM means to the HC means via the second means when the HC means and the TE means as selected by the HC means are linked together during system use and a HC/TE mode.

74. A system as set forth in claim 69 wherein the TB means is comprised of trigger board control logic (TBCL) means, wherein the TBCL means is provided with output means for effecting transfer of a SDW from a SDWSM input of digital data source means being evaluated as an accepted SDW to the second means for interconnecting the HC means to the TEM means wherein the MCWL means is provided with shutdown output means connected to the TBCL means and wherein the output of the shutdown output means shuts down the output means of the TBCL means when the TEM means via the second means is transferring ATTWSM and ASDWSM from its RAM means to the HC means.

75. A multimode/multiconfigurable DARP system for evaluating one or more parallel signal word outputs of digital data source means, said system comprising:
host computer (HC) means and trigger element (TE) means,
said HC means being comprised of HC input/output (I/O) bus means, TEM address bidirectional buffer (TEMABB) latch means, associated time-tag word stream bidirectional buffer (ATTWSMBB) latch means, accepted sample data word stream bidirectional buffer (ASDWSMBB) latch means, combined control (CC) arrangement means for the TE means, latch-control logic (LCL) means; and software and keyboard-controlled processing control (SKPC) system, the SKPC system having memory means for storing TEM address and for storing ATTWSM and ASDWSM;
the TE means being comprised of master control board (MCB) means, trigger board (TB) means and TE memory (TEM) means, the MCB means having mode control word latch (MCWL) means, the TEM means being comprised of RAM means, TEM address input means and TEM write input means, the TEM write input means being connected to the RAM means,
the HC I/O bus means for interconnecting the SKPC sytem to the TEMABB latch means, the ATTWSMBB latch means and the ASDWSMBB latch means,
the SKPC system having output means and clock control means, the output means and the clock control means being connected to the LCL means,
the LCL means being provided with latch clock means, enable output means and direction control output means, the latch clock and enable output means together with the direction control output means being interconnected to the TEMABB latch means, the ATTWSMBB latch means and the ASDWSMBB latch means,
the HC means, the MCB means and the TB means all including first means for interconnecting the TEMABB latch means to the TEM write input means.
the LCL means having clock output means connected to the CC arrangement means, the CC arrangement means having HC write output means, the HC write output means being interconnected to the MCB means, the TB means and the write input means of the TEM means, the output of the clock output means of the LCL means providing a timely output of the HC write output means to the TEM write input means for activating the RAM means,
the HC means, the MCB means and the TB means all including second means for interconnecting the ATTWSMBB latch means and the ASDWSMBB latch means to the RAM means of the TEM means so that a stored data collection of ATTWSM and ASDWSM of the memory means of the SKPC system may be written via the HC I/O bus means, the ATTWSMBB latch means and the ASDWSMBB latch means and the second means to the RAM means when the TEM address input means receives a TEM address from the HC means via the first means and when the TEM write input means receives the output of the HC write output means for activating the RAM means to store ATTWSM and ASDWSM from the HC means via the second means in conjunction with the TEM address from the HC means to the TEM address input means via the first means, and
the SKPC system in response to operator control thereof providing a stored data collection to ATTWSM and ASDWSM from the memory means of the SKPC system via the I/O bus means to the ATTWSMBB latch means and the ASDWSMBB latch means respectively and also providing a TEM address from the memory means of SKPC system via the I/O bus means to TEMABB latch means, the LCL means in response to the output of the SKPC system providing an output via its latch clock and enable output means together with its direction control output means for not only latching-in the ATTWSM and ASDWSM in the ATTWSMBB latch means and the ASDWSMBB latch means but also for directing the latched-in ATTWSM and ASDWSM to the RAM means via the second means while at the same time not only latching-in the TEM address in the TEMBB latch means but also for directing the latched-in TEM address to the address input means as the output of the HC write output means activates the RAM means for effecting storage of the directed/addressed ATTWSM and SDWSM therein.

76. A system as set forth in claim 75 wherein the MCWL means is provided with read control output means, wherein the TEM means includes read input means, wherein the TB means includes means for interconnecting the read control output means to the read input means, wherein the TEM means is provided with ATTWSM bidirectional buffer (ATTWSMBB) means and ASDWSM bidirectional buffer (ASDWSMBB) means, wherein the ATTWSMBB means and the ASDWSMBB means are connected to the second means, wherein the read input means includes direction control output means, the direction control output means being connected to the ATTWSMBB means and the ASDWSMBB means, and wherein output of the read control output means is such that the ATTWSMBB means and the ASDWSMBB means are directed for directing an ATTWSM and ASDWSM from the HC means to the RAM means for storage.

77. A system as set forth in claim 75 wherein the MCB means is provided with bidirectional address (BA) means and bidirectional buffer (BB) means, wherein the BA means and the BB means are connected to the first and second means respectively, wherein the MCWL means is provided with directional control output means, the directional control output means being connected to the BB means and the BA means and wherein output of the directional control output means of the MCWL means is such that the BB means and the BA means permit a stoed data collection of ATTWSM and ASDWSM along with a TEM address all from the HC means to the RAM means for enabling storage of the addressed data collection.

78. A system as set forth in claim 75 wherein the TB means is comprised of trigger board control logic (TBCL) means, wherein the system is comprised of digital data source means, the digital data source means providing a SDWSM input to the TB means for evaluation by the TB means and the TBCL means thereof, wherein the TBCL means is provided with output means for effecting transfer of a SDW from the SDWSM input being evaluated by the TB means and the TBCL means as an accepted SDW to the second means for interconnecting the HC means to the TEM means, wherein the MCWL means is provided with shutdown output means connected to the TBCL means and wherein output of the shutdown output means shuts down the output means of the TBCL means when the HC means via the second means is transferring ATTWSM and ASDWSM from the SKPC system to the RAM means.

79. A multimode/multiconfigurable DARP system for evaluating one or more parallel signal word outputs of digital source means, said system comprising:

host computer (HC) means, trigger element (TE) means and digital data source means, the digital data source means providing a sample data word stream (SDWSM) input and a sample clock (SC) input, the TE means being made up of trigger board (TB) means and master control board (MCB) means, the TB means being comprised of SDWSM input latch means, parameter logic (PL) arrangement means, accepted SDWSM latch means, setup data word latch (SUDWL) means and trigger board control logic (TBCL) means, the MCB means being comprised of mode control word latch (MCWL) means; first-in, first-out (FIFO) control logic means and FIFO arrangement means, the SDWSM input and the SC input being connected to the SDWSM input latch means, output means of the SDWSM input latch means being connected to the PL arrangement means and the accepted SDWSM latch means, output of the output means providing a SDW of the SDWSM input to the PL arrangement means for analysis for each pulse of the SC input during system use.

the PL arrangement means having predetermined comparison word value (PCWV) means for enabling analysis of each SDW as it is received from the output means of the SDWSM input latch means, output means of the PL arrangement means being connected to the TBCL means, the output of the output means of the PL arrangement means indicating the analytic results of the PCMV means in relation to each SDW received by the PL arrangement means.

the SUDWL means haing enabling output means, the enabling output means of the SUDWL means being connected to the TBCL means, the TBCL means having first and second output means connected to the accepted SDWSM latch means and the FIFO control logic means respectively, the TBCL means in response to the output means of both the PL arrangement means and the SUDWL means for determining whether or not a SDW of the SDWSM input is acceptable for each pulse of the SC input; the first and second output means providing outputs indicating acceptance of a SDW of the SDWSM input, FIFO arrangement means having FIFO means, the FIFO control logic means having output means connected to the write input of the FIFO means, output means of the accepted SDWSM latch means being connected to the FIFO means, output means of the FIFO means being connected to the means for enabling real time read-out visual display of an acceptable SDW in response to a pulse of the SC input, the MCWL means having read output control means connected to the read input of the FIFO means, the outputs of the first and second output means of the TBCL means causing the output means of the accepted SDWSM latch means to provide an accepted SDW to the FIFO means in response to a pulse of the SC input while at the same time causing output of the output means of the FIFO control logic means to be such as to store the accepted SDW to the FIFO means; and output of the read control output means of the MCWL means being such that a stored SDW of the FIFO means is read out via the output means thereof to the HC means for real time acquisition visual display.

80. A system as set forth in claim 79 wherein the FIFO means is provided with status output means for indicating that a stored SDW in the FIFO means is being read therefrom.

81. A system as set forth in claim 79 wherein the FIFO means is provided with status output means for indicating when the FIFO means is full.

82. A system as set forth in claim 81 wherein the status output means is connected to the FIFO control logic means, wherein the FIFO control logic means includes latch-type means connected to the status output means of the FIFO means and to the output means of the FIFO control logic means that is connected to the write input of the FIFO means and wherein the latch-type means provide an output to the output means of the FIFO control logic means that prevents the FIFO means from storing any further accepted SDW from the output means of the accepted SDWSM latch means when the FIFO means is full as indicated by the status output means of the FIFO means.

83. A system as set forth in claim 82 wherein the FIFO means is provided with flip-flop (FF) means, the FF means having C and D inputs and a Q output, wherein the read output control means of the MCWL means is connected to the C input of the FF means, wherein the FIFO control logic means is provided with status error-indicating output means, the status error indicating output means being interconnected via the FIFO means to the D input of FF means, wherein the status error indicating output means provides a status error output that one or more accepted SDWs may be lost when the FIFO means is full and wherein the Q output of the FF means provides a visual error output to the HC means when the C input of the FF means receives an input from the read output control means for clocking the D input indicating the status error output of the status error indicating output means of the FIFO control logic means.

84. A multimode/multiconfigurable DARP system for evaluating one or more parallel signal word outputs of digital data source means, said system comprising:

digital data source (DDS) means and at least one trigger element (TE) means, the DDS means providing a sample data word stream (SDWSM) input to the TE means and a sample clock input thereto, the TE means being comprised of master control board (MCB) means, trigger board (TB) means and TE memory (TEM) means; the MCB means having first-in, first-out (FIFO) control logic arrangement means, the TB means having TB clock input means, SDWSM input latch means, parameter logic (PL) arrangement means, accepted SDWSM latch means and trigger board control logic (TBCL) means, the SDWSM input and the sample clock input being separately connected to the SDWSM input latch means, output means of the SDWSM input latch means being interconnected to the PL arrangement means, the TBCL means and the accepted SDWSM latch means, the output means of the SDWSM input latch means providing a SDW from the SDWSM input to the PL arrangement means for analysis in response to each pulse of the sample clock input during system use; the sample clock input being connected to the TB clock input, the TB clock input being connected to the TBCL means, the PL arrangement means having predetermined comparison word value (PCMV) means for indicating when any SDW being evaluated from the SDWSM input is equal to, not equal to, less than or greater than the PCWV; output means of the PL arrangement means connected to the TBCL means and indicating thereto whether any SDW being evaluated is equal to, not equal to, greater than or less than the PCWV of the PCWV means, FIFO control logic arrangement means comprised of FIFO control logic means and FIFO arrangement means, the FIFO arrangement means being provided with FIFO means, the FIFO means having write input means for effecting storage of one or more accepted sample data words (SDWs) therein and accepted SDWSM input means, output means of the FIFO control logic means being connected to the write input means of the FIFO means, the TEM means being made up of RAM means, accepted SDWSM input means and write input means, the accepted SDWSM input means and the write input means being separately connected to the RAM means, output means of the accepted SDWSM latch means being interconnected to the accepted SDWSM input means of both the TEM means and the FIFO means, first output means of the TBCL means being connected to the accepted SDWSM latch means, second output means of the TBCL means being interconnected to the FIFO control logic means and the write input means of the TEM means, the TBCL means in response to an output of the output means of the PL arrangement means in relation to evaluation of a SDW as well as in response to a pulse of the TB clock input means in relation to the SDW being evaluated providing an output via its first output means whether or not the SDW is acceptable.

the accepted SDWSM latch means in response to the output of the first output means of the TBCL means providing an accepted SDW from the SDWSM input on its output means when the output of the first output means of the TBCL means indicates a SDW as the result of analysis by both the PL arrangement means and the TBCL means to be acceptable.

the second output means of the TBCL means as the result of the first output means indicating the acceptability of a SDW providing an output to the write input means of the TEM means for directing the RAM means to store the accepted SDW on the output means of the accepted SDWSM latch means that is connected to the accepted SDWSM input means of the TEM means, and the FIFO control logic means having logic means therein in response to the output of the second output means of the TBCL means indicating acceptance of a SDW for providing an output via its output means to the write input means of the FIFO means for effecting simultaneous storage of the accepted SDW in the FIFO means.

85. A system as set forth in claim 84 wherein the MCB means is comprised of mode control word latch means, wherein the MCWL means is provided with host computer trigger output (HCTO) means connected to the write input means of the TE means, wherein the MCWL means is provided with logic means for preventing the HCTO means when the second means of the TBCL means is operatively associated with the TEM means and the FIFO control logic means during one or more primary modes of the TE means as the system is used.

86. A system as set forth in claim 84 wherein the system is comprised of asynchronous time-tag generator (ATTG) means, wherein the TBCL means of the TE means is provided with ATTWSM input latch means, wherein the TEM means is provided with a time-tag word stream (TTWSM) input means connected to the RAM means, wherein the ATTG means provides ATTWSM input to the ATTWSM input latch means and a valid asynchronous time-tag word (ATTW) signal output to the TBCL means in relation to each valid count of the ATTG means, wherein output means of the ATTWSM input latch means being connected to the accepted SDWSM input means of the FIFO means and the TTWSM input means of the RAM means; wherein third output means of the TBCL means are connected to the ATTWSM input latch means such that the third output means in response to each valid ATTW signal output of the ATTG means provides a synchronized output in relation to a pulse of the TB clock input means such that a TTW is provided on the output means of the ATTWSM input latch means from the ATTWSM input thereto that is timely associated with an accepted SDW from the output means of the accepted SDWSM latch means so that the accepted SDW and its associated TTW may be simultaneously stored in the RAM and the FIFO means.

87. A multimode/multiconfigurable DARP system for evaluating one or more parallel signal word outputs of digital data source means, said system comprising:

the TE means being comprised of trigger board (TB) means and setup data word latch (SUDWL) means, the TB means being comprised of TE address generator control (TEAGC) arrangement means, the TEAGC arrangement means being made up of TE address generator control (TEAGC) logic means, and TE address counter (TEAC) means, The TEAGC logic means having comparator means and gate logic means, the SUDWL means having first output means connected to the TEAGC gate logic means and second output means connected to the comparator means, the TEAC means having output means connected to the comparator means, output means of the TEAGC gate logic means being connected to the TEAC means, first output means of the SUDWL means providing an output in response to operator selection whether the TEAC means are to rollover or stop when the TEAC means reaches its maximum counting level; and output means of the comparator means being connected to the TEAGC gate logic means such that the output means of the comparator means in response to the second output means of the SUDWL means and the output means of the TEAC means providing an output indicating whether the TEAC means is to stop or rollover when the TEAC means is at maximum counting level during system use.

88. A system as set forth in claim 87 wherein the TB means is comprised of trigger board control logic (TBCL) means, wherein second output means of the gate logic means of the TEAGC logic means is connected to the TBCL means, and wherein the output of the second output means is such that it will shut down the TBCL means when the first output means of the SUDWL means indicates that the TEAC means is to be stopped at maximum counting level.

89. A multimode/multiconfigurable DARP system for evaluating one or more parallel signal word outputs of digital data source means, said system comprising:

at least one trigger element (TE) means, the TE means being comprised of trigger board (TB) means and set up data word latch (SUDWL) means, the TB means being comprised of TE address generator control (TEAGC) arrangement means, trigger board control logic (TBCL) means, the TEAGC arrangement means being made up of TE address generator control (TEAGC) logic means and TE address counter TEAC means, the TEAGC logic means being made up of first and second gate means, comparator means and flip-flop (FF) means, the FF means having a Q output and C and D inputs, the SUDWL means having first output means connected to the first and second gate means, second output means of the SUDWL means being connected to the comparator means, first output means of the TEAC means being connected to the comparator means and operatively associated with the second output means of the SUDWL means, second output means of the TEAC means being connected to the D input of the FF means, the Q output of the FF means being connected to the comparator means, output means of the comparator means being connected to the first and second gate means, output means of the first gate means being connected to the TBCL means, the first output means of the SUDWL means being such in response to operator selection during system use for indicating whether or not the TEAC means is to rollover or stop when the TEAC means reaches a predetermined counting level, the second output means of the SUDWL means in response to operator selection during system use for indicating whether or not the TEAC means is to stop counting at a predetermined level, and the first output means of the SUDWL means when indicating that the TEAC means is to stop counting and the second output means of the SUDWL means when indicating that the TEAG means is to stop counting at a predetermined level, then the first gate means via its output means provides an output for shutting down the TBCL means.

90. A system as set forth in claim 89 wherein the second output means of the SUDWL means in response to operator selection indicates that the predetermined counting level of the TEAC means is the maximum counting level thereof, wherein the TEAC means at its maximum counting level provides an output via its second output means to the D input of the FF means, wherein the FF means in response to the D input and an input to the C input provides a Q output to the comparator means that results in the output means of the comparator means causing the output means of the first gate means to stop the TBCL means.

91. A system as set forth in claim 89 wherein the TEAC means have reset input means, wherein the second gate means has output means connected to the reset input means of the TEAC means and wherein the output means of the second gate means does not reset the TEAC means when the first output means of the SUDWL means indicates stopping of the TEAC means and the ouput means of the comparator means indicates stopping of the TEAC means at a predetermined counting level.

* * * * *